(12) United States Patent
Cosic

(10) Patent No.: US 11,699,295 B1
(45) Date of Patent: Jul. 11, 2023

(54) MACHINE LEARNING FOR COMPUTING ENABLED SYSTEMS AND/OR DEVICES

(71) Applicant: Jasmin Cosic, Miami, FL (US)

(72) Inventor: Jasmin Cosic, Miami, FL (US)

( * ) Notice: Subject to any disclaimer, the term of this patent is extended or adjusted under 35 U.S.C. 154(b) by 199 days.

(21) Appl. No.: 17/332,337

(22) Filed: May 27, 2021

Related U.S. Application Data

(63) Continuation of application No. 16/584,736, filed on Sep. 26, 2019, now Pat. No. 11,055,583, which is a continuation of application No. 15/822,150, filed on Nov. 26, 2017, now Pat. No. 10,474,934.

(51) Int. Cl.
| | | |
|---|---|---|
| *G06V 10/75* | (2022.01) | |
| *G06N 5/022* | (2023.01) | |
| *G06V 30/194* | (2022.01) | |
| *G06T 7/70* | (2017.01) | |
| *G06F 9/30* | (2018.01) | |
| *G06N 20/00* | (2019.01) | |
| G06F 15/80 | (2006.01) | |
| G06F 15/78 | (2006.01) | |

(52) U.S. Cl.
CPC ........ *G06V 30/194* (2022.01); *G06F 9/30076* (2013.01); *G06N 20/00* (2019.01); *G06T 7/70* (2017.01); *G06V 10/751* (2022.01); *G06F 15/78* (2013.01); *G06F 15/80* (2013.01); *G06N 5/022* (2013.01)

(58) Field of Classification Search
CPC .......... G06T 2207/20081; G06V 10/70; G06V 10/766; G06V 30/194; G06V 40/28; G06V 40/113; G06F 3/002; G06F 3/005; G06F 3/017; G06N 5/022; G06N 5/025; G06N 20/00
See application file for complete search history.

(56) References Cited

U.S. PATENT DOCUMENTS

| | | |
|---|---|---|
| 4,370,707 A | 1/1983 | Phillips et al. |
| 4,730,315 A | 3/1988 | Saito et al. |
| 4,860,203 A | 8/1989 | Corrigan et al. |
| 5,560,011 A | 9/1996 | Uyama |
| 5,602,982 A | 2/1997 | Judd et al. |
| 5,874,834 A | 2/1999 | New |
| 6,026,234 A | 2/2000 | Hanson et al. |
| 6,088,731 A | 7/2000 | Kiraly et al. |
| 6,106,299 A | 8/2000 | Ackermann et al. |
| 6,126,330 A | 10/2000 | Knight |
| 6,314,558 B1 | 11/2001 | Angel et al. |
| 6,408,262 B1 | 6/2002 | Leerberg et al. |
| 6,643,842 B2 | 11/2003 | Angel et al. |

(Continued)

OTHER PUBLICATIONS

Chen et al. Case-Based Reasoning System and Artificial Neural Networks: A Review Neural Comput & Applic (2001) 10: pp. 264-276, 13 pages.

(Continued)

*Primary Examiner* — Andrew W Johns
(74) *Attorney, Agent, or Firm* — Imperium Patent Works

(57) ABSTRACT

Aspects of the disclosure generally relate to computing enabled systems and/or devices and may be generally directed to machine learning for computing enabled systems and/or devices. In some aspects, the system captures one or more digital pictures, receives one or more instruction sets, and learns correlations between the captured pictures and the received instruction sets.

169 Claims, 41 Drawing Sheets

(56) References Cited

U.S. PATENT DOCUMENTS

| | | |
|---|---|---|
| 6,728,689 B1 | 4/2004 | Drissi et al. |
| 6,735,632 B1 | 5/2004 | Kiraly et al. |
| 6,754,631 B1 | 6/2004 | Din |
| 6,801,912 B2 | 10/2004 | Moskowitz et al. |
| 6,842,877 B2 | 1/2005 | Robarts et al. |
| 6,915,105 B2 | 7/2005 | Masuda |
| 6,973,446 B2 | 12/2005 | Mamitsuka et al. |
| 6,996,758 B1 | 2/2006 | Herron et al. |
| 7,017,153 B2 | 3/2006 | Gouriou et al. |
| 7,052,277 B2 | 5/2006 | Kellman |
| 7,113,946 B2 | 9/2006 | Cosic |
| 7,117,225 B2 | 10/2006 | Cosic |
| 7,222,127 B1 | 5/2007 | Bem et al. |
| 7,240,335 B2 | 7/2007 | Angel et al. |
| 7,249,349 B2 | 7/2007 | Hundt et al. |
| 7,424,705 B2 | 9/2008 | Lewis et al. |
| 7,478,371 B1 | 1/2009 | Gove |
| 7,484,205 B2 | 1/2009 | Venkatapathy |
| 7,565,340 B2 | 7/2009 | Herlocker et al. |
| 7,721,218 B2 | 5/2010 | Awe et al. |
| 7,765,537 B2 | 7/2010 | Havin et al. |
| 7,797,259 B2 | 9/2010 | Jiang et al. |
| 7,840,060 B2 | 11/2010 | Podilchuk |
| 7,925,984 B2 | 4/2011 | Awe et al. |
| 7,987,144 B1 | 7/2011 | Drissi et al. |
| 8,005,828 B2 | 8/2011 | Buchner et al. |
| 8,019,699 B2 | 9/2011 | Baxter |
| 8,078,556 B2 | 12/2011 | Adi et al. |
| 8,090,669 B2 | 1/2012 | Shahani et al. |
| 8,137,112 B2 | 3/2012 | Woolf et al. |
| 8,166,463 B2 | 4/2012 | Gill et al. |
| 8,195,674 B1 | 6/2012 | Bem et al. |
| 8,196,119 B2 | 6/2012 | Gill et al. |
| 8,244,730 B2 | 8/2012 | Gupta |
| 8,251,704 B2 | 8/2012 | Woolf et al. |
| 8,261,199 B2 | 9/2012 | Cradick et al. |
| 8,266,608 B2 | 9/2012 | Hecht et al. |
| 8,335,805 B2 | 12/2012 | Cosic |
| 8,356,026 B2 | 1/2013 | Heimendinger |
| 8,364,612 B2 | 1/2013 | Van Gael et al. |
| 8,386,401 B2 | 2/2013 | Virkar et al. |
| 8,397,227 B2 | 3/2013 | Fan et al. |
| 8,417,740 B2 | 4/2013 | Cosic |
| 8,464,225 B2 | 6/2013 | Greifeneder |
| 8,549,359 B2 | 10/2013 | Zheng |
| 8,572,035 B2 | 10/2013 | Cosic |
| 8,589,414 B2 | 11/2013 | Waite et al. |
| 8,595,154 B2 | 11/2013 | Breckenridge et al. |
| 8,655,260 B2 | 2/2014 | Yueh et al. |
| 8,655,900 B2 | 2/2014 | Cosic |
| 8,667,472 B1 | 3/2014 | Molinari |
| 8,996,432 B1 | 3/2015 | Fu |
| 9,047,324 B2 | 6/2015 | Cosic |
| 9,158,813 B2 | 10/2015 | Ntoulas et al. |
| 9,268,454 B2 | 2/2016 | Hamilton, II et al. |
| 9,282,309 B1 | 3/2016 | Cosic |
| 9,298,749 B2 | 3/2016 | Cosic |
| 9,305,216 B1 | 4/2016 | Mishra |
| 9,325,314 B2 | 4/2016 | Shin |
| 9,367,806 B1 | 6/2016 | Cosic |
| 9,443,192 B1 | 9/2016 | Cosic |
| 9,488,984 B1 | 11/2016 | Williams et al. |
| 9,582,762 B1 | 2/2017 | Cosic |
| 9,595,294 B2 | 3/2017 | Cosic |
| 9,697,869 B2 | 7/2017 | Cosic |
| 9,864,933 B1 * | 1/2018 | Cosic .................. G06F 18/22 |
| 10,162,740 B1 | 12/2018 | Setty et al. |
| 10,300,370 B1 * | 5/2019 | Amihood et al. ...... G06F 3/011 |
| 10,474,934 B1 * | 11/2019 | Cosic .................... G06T 7/70 |
| 11,055,583 B1 * | 7/2021 | Cosic .................. G06N 3/084 |
| 2003/0026588 A1 | 2/2003 | Elder et al. |
| 2003/0065662 A1 | 4/2003 | Cosic |
| 2003/0122578 A1 | 7/2003 | Masui et al. |
| 2004/0117771 A1 | 6/2004 | Venkatapathy |
| 2004/0194017 A1 | 9/2004 | Cosic |
| 2004/0249774 A1 | 12/2004 | Caid et al. |
| 2004/0267521 A1 | 12/2004 | Cutler et al. |
| 2005/0149517 A1 | 7/2005 | Cosic |
| 2005/0149542 A1 | 7/2005 | Cosic |
| 2005/0240412 A1 | 10/2005 | Fujita |
| 2005/0245303 A1 | 11/2005 | Graepel et al. |
| 2005/0289105 A1 | 12/2005 | Cosic |
| 2006/0047612 A1 | 3/2006 | Stanley et al. |
| 2006/0184410 A1 | 8/2006 | Ramamurthy et al. |
| 2006/0190930 A1 | 8/2006 | Hecht et al. |
| 2006/0265406 A1 | 11/2006 | Chkodrov et al. |
| 2007/0006159 A1 | 1/2007 | Hecht et al. |
| 2007/0050606 A1 | 3/2007 | Ferren et al. |
| 2007/0050719 A1 | 3/2007 | Lui et al. |
| 2007/0058856 A1 | 3/2007 | Boregowda et al. |
| 2007/0061735 A1 | 3/2007 | Hoffberg et al. |
| 2007/0106633 A1 | 5/2007 | Reiner |
| 2008/0144893 A1 | 6/2008 | Guo et al. |
| 2008/0215508 A1 | 9/2008 | Hanneman et al. |
| 2008/0254429 A1 | 10/2008 | Woolf et al. |
| 2008/0281764 A1 | 11/2008 | Baxter |
| 2008/0288259 A1 | 11/2008 | Chambers et al. |
| 2009/0044113 A1 | 2/2009 | Jones et al. |
| 2009/0067727 A1 | 3/2009 | Hirohata |
| 2009/0110061 A1 | 4/2009 | Lee et al. |
| 2009/0131152 A1 | 5/2009 | Busse |
| 2009/0136095 A1 | 5/2009 | Marcon et al. |
| 2009/0141969 A1 | 6/2009 | Yu et al. |
| 2009/0222388 A1 | 9/2009 | Hua et al. |
| 2009/0287643 A1 | 11/2009 | Corville et al. |
| 2009/0324010 A1 | 12/2009 | Hou |
| 2010/0023541 A1 | 1/2010 | Cosic |
| 2010/0033780 A1 | 2/2010 | Gitter |
| 2010/0063949 A1 | 3/2010 | Eaton et al. |
| 2010/0082536 A1 | 4/2010 | Cosic |
| 2010/0114746 A1 | 5/2010 | Bobbitt et al. |
| 2010/0138370 A1 | 6/2010 | Wu et al. |
| 2010/0241595 A1 | 9/2010 | Felsher |
| 2010/0278420 A1 | 11/2010 | Shet et al. |
| 2011/0007079 A1 | 1/2011 | Perez et al. |
| 2011/0030031 A1 | 2/2011 | Lussier et al. |
| 2011/0085734 A1 | 4/2011 | Berg et al. |
| 2011/0218672 A1 | 9/2011 | Maisonnier et al. |
| 2011/0270794 A1 | 11/2011 | Drory et al. |
| 2012/0150773 A1 | 6/2012 | DiCorpo et al. |
| 2012/0167057 A1 | 6/2012 | Schmich et al. |
| 2012/0192096 A1 | 7/2012 | Bowman et al. |
| 2012/0284026 A1 | 11/2012 | Cardillo et al. |
| 2012/0290347 A1 | 11/2012 | Elazouni et al. |
| 2013/0007532 A1 | 1/2013 | Miller et al. |
| 2013/0047049 A1 | 2/2013 | Chen et al. |
| 2013/0156345 A1 | 6/2013 | Shmunk |
| 2013/0159021 A1 | 6/2013 | Felsher |
| 2013/0218932 A1 | 8/2013 | Cosic |
| 2013/0226974 A1 | 8/2013 | Cosic |
| 2013/0238533 A1 | 9/2013 | Virkar et al. |
| 2013/0278501 A1 | 10/2013 | Bulzacki |
| 2013/0278631 A1 | 10/2013 | Border et al. |
| 2013/0329946 A1 | 12/2013 | Archibald et al. |
| 2014/0052717 A1 | 2/2014 | Franks et al. |
| 2014/0075249 A1 | 3/2014 | Sato et al. |
| 2014/0161250 A1 | 6/2014 | Leeds et al. |
| 2014/0177946 A1 | 6/2014 | Lim et al. |
| 2014/0207580 A1 | 6/2014 | Minnis et al. |
| 2014/0211988 A1 | 7/2014 | Fan et al. |
| 2014/0267011 A1 * | 9/2014 | Devries .................. G06F 3/017 |
| | | 345/156 |
| 2014/0278754 A1 | 9/2014 | Cronin et al. |
| 2015/0006171 A1 | 1/2015 | Westby et al. |
| 2015/0023186 A1 | 1/2015 | Vasseur et al. |
| 2015/0023205 A1 | 1/2015 | Vasseur et al. |
| 2015/0039304 A1 | 2/2015 | Wein |
| 2015/0055821 A1 | 2/2015 | Fotland |
| 2015/0089081 A1 | 3/2015 | Thubert et al. |
| 2015/0264306 A1 | 9/2015 | Marilly et al. |
| 2015/0269156 A1 | 9/2015 | Awadallah et al. |
| 2015/0269415 A1 | 9/2015 | Gelbman |
| 2015/0310041 A1 | 10/2015 | Kier et al. |
| 2015/0324685 A1 | 11/2015 | Bohn et al. |

(56) References Cited

U.S. PATENT DOCUMENTS

| | | | |
|---|---|---|---|
| 2015/0339213 | A1 | 11/2015 | Lee et al. |
| 2016/0063118 | A1 | 3/2016 | Campbell et al. |
| 2016/0077166 | A1 | 3/2016 | Morozov et al. |
| 2016/0140999 | A1 | 5/2016 | Cosic |
| 2016/0142650 | A1 | 5/2016 | Cosic |
| 2016/0167226 | A1 | 6/2016 | Schnittman |
| 2016/0243701 | A1 | 8/2016 | Gildert et al. |
| 2016/0246819 | A1 | 8/2016 | Cosic |
| 2016/0246850 | A1 | 8/2016 | Cosic |
| 2016/0246868 | A1 | 8/2016 | Cosic |
| 2016/0274187 | A1 | 9/2016 | Menon et al. |
| 2016/0292185 | A1 | 10/2016 | Cosic |
| 2016/0328480 | A1 | 11/2016 | Owens et al. |
| 2017/0161958 | A1 | 6/2017 | Eilat |
| 2018/0017791 | A1 | 1/2018 | Beckman |
| 2018/0060144 | A1 | 3/2018 | Capobianco et al. |
| 2018/0068564 | A1 | 3/2018 | Tanigawa et al. |
| 2018/0096261 | A1 | 4/2018 | Chu et al. |
| 2018/0101146 | A1 | 4/2018 | Hariharan et al. |
| 2018/0120813 | A1 | 5/2018 | Coffman et al. |
| 2018/0174207 | A1 | 6/2018 | Potucek et al. |
| 2018/0375720 | A1 | 12/2018 | Yang et al. |
| 2019/0028545 | A1 | 1/2019 | Yang et al. |
| 2019/0034765 | A1 | 1/2019 | Kaehler et al. |
| 2019/0096503 | A1 | 3/2019 | Chakravarty et al. |
| 2019/0107839 | A1 | 4/2019 | Parashar et al. |
| 2019/0213446 | A1 | 7/2019 | Tsou et al. |

OTHER PUBLICATIONS

John J. Grefenstette, Connie Loggia Ramsey, Alan C. Schultz, Learning Sequential Decision Rules Using Simulation Models and Competition, 1990, Navy Center for Applied Research in Artificial Intelligence, Naval Research Laboratory, Washington, DC, 27 pages.
Alan C. Schultz, John J. Grefenstette, Using a Genetic Algorithm to Learn Behaviors for Autonomous Vehicles, 1992, Navy Center for Applied Research in Artificial Intelligence, Naval Research Laboratory, Washington, DC, 12 pages.
Koppula et al., "Anticipating human activities using object affordances for reactive robotic response", IEEE TRAMI 2016, published May 5, 2015, 16 pages.
Orme, "System design tips for entry level smartphones—part 3", found online at "https://community.arm.com/processors/b/blog/posts/system-design-tips-for-entry-level-smartphones---part-3", Oct. 21, 2013, 12 pages.
Nowostawski, Mariusz et al., "Dynamic Demes Parallel Genetic Algorithm", May 13, 1999, 6 pages.
Stack Overflow, How can I quantify difference between two images?, accessed Aug. 2, 2017 at https://stackoverflow.com/questions/189943/how-can-i-quantify-difference-between-two-images, 8 pages.
Skolicki, Zbigniew et al., "The Influence of Migration Sizes and Intervals on Island Models", Jun. 29, 2005, 8 pages.
Vahid Lari, et al., "Decentralized dynamic resource management support for massively parallel processor arrays", Sep. 11, 2011, 8 pages.
Vahid Lari, et al., "Distributed resource reservation in massively parallel processor arrays", May 16, 2011, 4 pages.
Mohsen Hayati and Yazdan Shirvany, "Artificial Neural Network Approach for Short Term Load Forecasting for Illam Region", Jan. 2007, 5 pages.
Hasim Sak, Andrew Senior, and Francoise Beaufays, "Long Short-Term Memory Recurrent Neural Network Architectures for Large Scale Acoustic Modeling", Jan. 2014, 5 pages.
Jorg Walter and Klaus Schulten, "Implementation of self-organizing neural networks for visuo-motor control of an industrial robot", Jan. 1993, 10 pages.
Heikki Hyotyniemi and Aamo Lehtola, "A Universal Relation Database Interface for Knowledge Based Systems", Apr. 1991, 5 pages.

Mrissa, Michael, et al. "An avatar architecture for the web of things." IEEE Internet Computing 19.2 (2015): 30-38., 9 pages.
Luck, Michael, and Ruth Aylett. "Applying ar lincial intelligence to virtual reality: Intelligent virtual environments." Applied Artificial Intelligence 14 1 (2000): 3-32., 30 pages.
Terdjimi, Mehdi, et al. "An avatar-based adaptation workflow for the web of things." Enabling Technologies Infrastructure for Collaborative Enterprises (WETICE), 2016 IEEE 25th International Conference on. IEEE, 2016., 6 pages.
Bogdanovych, Anton, et al. "Authentic interactive reenactment of cultural heritage with 3D virtual worlds and artificial intelligence." Applied Artificial Intelligence 24.6 (2010): 617-647., 32 pages.
Hernandez, Marco E. Perez, and Stephan Reiff-Marganiec. "Autonomous and self controlling smart objects for the future internet." Future internet of things and cloud (FiCloud), 2015 3rd international conference on. IEEE, 2015., 8 pages.
Medini et al., "Building a Web of Things with Avatars", Managing the Web of Things (2017), 30 pages.
Zhang, Yiying, Lei Guo, and Nicolas D. Georganas. "AGILE: An architecture for agent-based collaborative and interactive virtual environments." Proc. Workshop on Application Virtual Reality Technologies for Future Telecommunication System, IEEE Globecom '2000 Conference. 2000. (Year: 2000), 9 pages.
Eladhari, Mirjam P., "Semi-Autonomous Avatars in Virtual Game Worlds," Pre-conference to the ECREA 2010—3rd European Communication Conference, Avatars and Humans. Representing Users in Digital Games, Hamburg, Germany, Oct. 2010, Available from: Jan. 21, 2012 (Year: 2012), 8 pages.
ABOUT | OpenCV, retrieved from <URL: http://opencv.org/about.html> on Dec. 13, 2014, 1 pages.
Animetrics, Inc. | 3D Facial Recognition, retrieved from <URL: http://animetrics.com/> on Dec. 13, 2014, 2 pages.
Bag-of-words model, retrieved from <URL: http://wikipedia.com> on Nov. 19, 2015, 2 pages.
Beier-Neely morphing algorithm, retrieved from <URL: http://wikipedia.com> on Nov. 19, 2015, 1 pages.
Computer vision, retrieved from <URL: http://wikipedia.com> on Nov. 19, 2015, 7 pages.
Convolutional neural network, retrieved from <URL: http://wikipedia.com> on Nov. 11, 2015, 5 pages.
Decimation (signal processing), retrieved from <URL: http://wikipedia.com> on Nov. 19, 2015, 3 pages.
Digital image processing, retrieved from <URL: http://wikipedia.com> on Nov. 19, 2015, 3 pages.
Dissolve (filmmaking), retrieved from <URL: http://wikipedia.com> on Nov. 11, 2015, 2 pages.
Facial recognition system, retrieved from <URL: http://wikipedia.com> on Nov. 11, 2015, 6 pages.
Feature detection (computer vision), retrieved from <URL: http://wikipedia.com> on Nov. 19, 2015, 3 pages.
Feature extraction, retrieved from <URL: http://wikipedia.com> on Nov. 19, 2015, 2 pages.
Gesture recognition, retrieved from <URL: http://wikipedia.com> on Nov. 19, 2015, 5 pages.
GrabCut, retrieved from <URL: http://wikipedia.com> on Nov. 1, 2015, 1 pages.
Image processing, retrieved from <URL: http://wikipedia.com> on Nov. 19, 2015, 2 pages.
Image segmentation, retrieved from <URL: http://wikipedia.com> on Nov. 19, 2015, 12 pages.
Image warping, retrieved from <URL: http://wikipedia.com> on Nov. 1, 2015, 2 pages.
Inbetweening, retrieved from <URL: http://wikipedia.com> on Nov. 11, 2015, 2 pages.
Interpolation, retrieved from <URL: http://wikipedia.com> on Nov. 1, 2015, 5 pages.
Language model, retrieved from <URL: http://wikipedia.com> on Nov. 19, 2015, 4 pages.
List of speech recognition software, retrieved from <URL: http://wikipedia.com> on Nov. 19, 2015, 4 pages.
Livewire Segmentation Technique, retrieved from <URL: http://wikipedia.com> on Nov. 1, 2015, 2 pages.

(56) References Cited

OTHER PUBLICATIONS

Morphing, retrieved from <URL: http://wikipedia.com> on Nov. 11, 2015, 2 pages.
Motion estimation, retrieved from <URL: http://wikipedia.com> on Nov. 19, 2015, 2 pages.
Muse: Face Morph || Mesh Warping, retrieved from <URL: http://alexwolfe.blogspot.com/2011/10/face-morph-mesh-warping.html> on Nov. 19, 2015, 2 pages.
N-gram, retrieved from <URL: http://wikipedia.com> on Nov. 1, 2015, 5 pages.
Optical flow, retrieved from <URL: http://wikipedia.com> on Nov. 1, 2015, 4 pages.
Outline of object recognition, retrieved from <URL: http://wikipedia.com> on Nov. 19, 2015, 7 pages.
Phonotactics, retrieved from <URL: http://wikipedia.com> on Nov. 19, 2015, 3 pages.
Recurrent neural network, retrieved from <URL: http://wikipedia.com> on Nov. 11, 2015, 5 pages.
Sample rate conversion, retrieved from <URL: http://wikipedia.com> on Nov. 1, 2015, 2 pages.
Simple interactive object extraction, retrieved from <URL: http://wikipedia.com> on Nov. 19, 2015, 2 pages.
Speech recognition, retrieved from <URL: http://wikipedia.com> on Nov. 11, 2015, 12 pages.
Speech segmentation, retrieved from <URL: http://wikipedia.com> on Nov. 1, 2015, 4 pages.
Welcome to recognize-speech.com, retrieved from <URL: http://recognize-speech.com/> on Oct. 18, 2015, 1 pages.
Introduction Speech, retrieved from <URL: http://recognize-speech.com/speech> on Oct. 18, 2015, 1 pages.
Preprocessing, retrieved from <URL: http://recognize-speech.com/preprocessing> on Oct. 18, 2015, 4 pages.
Feature Extraction, retrieved from <URL: http://recognize-speech.com/feature-extraction> on Oct. 18, 2015, 3 pages.
Acoustic model, retrieved from <URL: http://recognize-speech.com/acoustic-model> on Oct. 18, 2015, 2 pages.
Video content analysis, retrieved from <URL: http://wikipedia.com> on Nov. 19, 2015, 2 pages.
Video tracking, retrieved from <URL: http://wikipedia.com> on Nov. 1, 2015, 2 pages.
Andrej Karpathy, Thomas Leung, George Toderici, Rahul Sukthankar, Sanketh Shetty, Li Fei-Fei, Large-scale Video Classification with Convolutional Neural Networks, Apr. 14, 2014, 8 pages, Stanford University.
Karen Simonyan, Andrew Zisserman, Two-Stream Convolutional Networks for Action Recognition in Videos, Nov. 13, 2014, 11 pages, University of Oxford.
Tracing (software), retrieved from <URL: http://wikipedia.com> on Jan. 10, 2014, 3 pages.
Tree (data structure), retrieved from <URL: http://wikipedia.com> on Jun. 24, 2014, 6 pages.
PTRACE(2), retrieved from <URL: http://unixhelp.ed.ac.uk/CGI/man-cgi2ptrace> on Mar. 19, 2014, 5 pages.
Wevtutil, retrieved from <URL: http://technet.microsoft.com/en-us/library/cc732848(d=default,I=en-us,v=ws.11).aspx> on Apr. 28, 2014, 5 pages.
Intel Processor Trace, retrieved from <URL: https://software.intel.com/en-us/blogs/2013/09/18/processor-tracing> on Apr. 28, 2014, 3 pages.
Younghoon Jung, Java Dynamics Reflection and a lot more, Oct. 10, 2012, 55 pages, Columbia University.
Amitabh Srivastava, Alan Eustace, ATOM a System for Building Customized Program Analysis Tools, May 3, 2004, 12 pages.
Mathew Smithson, Kapil Anand, Aparna Kotha, Khaled Elwazeer, Nathan Giles, Rajeev Barua, Binary Rewriting without Relocation Information, Nov. 10, 2010, 11 pages, University of Maryland.
Marek Olszewski, Keir Mierte, Adam Czajkowski, Angela Demle Brown, JIT Instrumentation—A Novel Approach to Dynamically Instrument Operating Systems, Feb. 12, 2007, 14 pages, University of Toronto.

Matthew Rimmer, "Tesla Motors' Open Source Revolution: Intellectual Property and the Carbon Crisis," Medium (Jun. 15, 2014), 13 pages.
Keith Barry, "Guide to Lane Departure Warning and Lane Keeping Assist," Consumer Reports (Jun. 28, 2017), 13 pages.
The Tesla Team, "Dual Motor Model S and Autopilot," Tesla Blog (Oct. 10, 2014), 3 pages.
Gabe Nelson, "Tesla enables 'autopilot' for the Model S, promises a world without steering wheels," Automotive News (Oct. 15, 2015), 3 pages.
Chris Davies, "Tesla Enhanced Autopilot: What 8.1 is (and isn't) and 2016 will bring," Slash Gear (Dec. 22, 2016), 6 pages.
Andrew J. Hawkins, "Tesla has been working on a backup plan in case its self-driving promises fail," The Verge (Aug. 9, 2017), 5 pages.
Jordan Golson, "Tesla's Self-Driving Care Hardware Will Run You $8,000," The Verge (Oct. 20, 2016), 3 pages.
Kirsten Korosec, "Elon Musk Says Tesla Vehicles Will Drive Themselves in Two Years," Fortune (Dec. 21, 2015), 7 pages.
XAutoworld, "Transcript: Elon Musk's Autopilot 2.0 Conference Call," XAutoworld (Nov. 20, 2016), 17 pages.
About Event Tracing, retrieved from <URL: http://msdn.microsoft.com/en-us/library/aa363668(d=default,l=en-us,v=vs.85).aspx> on Jan. 12, 2014, 2 pages.
Add dynamic Java code to your application, retrieved from <URL: http://www.javaworld.com/article/2071777/design-patterns/add-dynamic-java-code-to-your-application.html> on May 13, 2014, 6 pages.
BCEL, retrieved from <URL: http://commons.apache.org> on May 13, 2014, 2 pages.
Artificial intelligence, retrieved from <URL: http://wikipedia.com> on May 21, 2014, 28 pages.
Artificial neural network, retrieved from <URL: http://wikipedia.com> on May 21, 2014, 12 pages.
Branch (computer science), retrieved from <URL: http://wikipedia.com> on May 6, 2014, 2 pages.
Branch trace, retrieved from <URL: http://wikipedia.com> on May 28, 2014, 2 pages.
C Function Call Conventions and the Stack, retrieved from <URL: http://www.csee umbc.edu/~chang/cs313.s02/stack.shtml> on Jan. 11, 2014, 4 pages.
Call stack, retrieved from <URL: http://wikipedia.com> on Jan. 11, 2014, 5 pages.
Program compilation and execution flow, retrieved from <URL: http://cs.stackexchange.com/questions/6187/program-compilation-and-execution-flow> on Jan. 9, 2014, 2 pages.
Control unit, retrieved from <URL: http://wikipedia.com> on May 25, 2014, 2 pages.
Create dynamic applications with javax.tools, retrieved from <URL: http://www.ibm.com/developerworks/library/j-jcomp/> on May 13, 2014, 11 pages.
Creating a Debugging and Profiling Agent with JVMTI, retrieved from <URL: http://www.oracle.com/technetwork/articles/java/jvmti-136367.html> on Jan. 11, 2014, 18 pages.
Decision tree learning, retrieved from <URL: http://wikipedia.com> on Jun. 24, 2014, 5 pages.
Dynamic Bytecode Instrumentation, retrieved from <URL: http://www.drdobbs.com/tools/dynamic-bytecode-instrumentation/184406433> on Apr. 26, 2014, 6 pages.
Dynamic programming language, retrieved from <URL: http://wikipedia.com> on May 7, 2014, 4 pages.
Dynamic recompilation, retrieved from <URL: http://wikipedia.com> on May 19, 2014, 4 pages.
Eval(), retrieved from <URL: https://developer.mozilla.org/en-US/docs/Web/JavaScript/Reference/Global_Objects/eval> on May 7, 2014, 13 pages.
Function, retrieved from <URL: https://developer.mozilla.org/en-US/docs/Web/JavaScript/Reference/Global_Objects/Function> on May 7, 2014, 11 pages.
FunctionEnter2 Function, retrieved from <URL: https://msdn.microsoft.com/en-us/library/aa964981 (d=default,l=en-us,v=vs.110).aspx> on Mar. 19, 2014, 2 pages.

(56) References Cited

OTHER PUBLICATIONS

FunctionLeave2 Function, retrieved from <URL: https://msdn.microsoft.com/en-us/library/aa964942(d=default,l=en-us,v=vs.110).aspx> on Mar. 19, 2014, 1 pages.
Heuristic, retrieved from <URL: http://wikipedia.com> on May 22, 2014, 5 pages.
How to: Configure Trace Switches, retrieved from <URL: https://msdn.microsoft.com/en-us/library/vstudio/t06xyy08(d=default,l=en-us,v=vs.100).aspx> on Mar. 19, 2014, 3 pages.
Indirect branch, retrieved from <URL: http://wikipedia.com> on May 5, 2014, 1 pages.
Instruction cycle, retrieved from <URL: http://wikipedia.com> on Apr. 30, 2014, 2 pages.
Instruction set, retrieved from <URL: http://wikipedia.com> on Apr. 29, 2014, 6 pages.
Interrupt, retrieved from <URL: http://wikipedia.com> on May 15, 2014, 5 pages.
Introduction to Instrumentation and Tracing, retrieved from <URL: http://msdn.microsoft.com/en-us/library/aa983649(d=default,l=en-us,v=vs.71).aspx> on Jan. 10, 2014, 2 pages.
Java bytecode, retrieved from <URL: http://wikipedia.com> on May 27, 2014, 4 pages.
Package java.util.logging, retrieved from <URL: http://docs.oracle.eom/javase/1.5.0/docs/api/java/util/logging/package-summary.html> on Mar. 19, 2014, 2 pages.
Iavac—Java programming language compiler, retrieved from <URL: http://docs.oracle.com/javase/7/docs/technotes/tools/windows/javac.html> on May 13, 2014, 12 pages.
Interface JavaCompiler, retrieved from <URL: http://wikipedia.com> on May 13, 2014, 4 pages.
Javassist, retrieved from <URL: http://wikipedia.com> on May 13, 2014, 2 pages.
Just-in-time compilation, retrieved from <URL: http://wikipedia.com> on May 19, 2014, 5 pages.
JVM Tool Interface, retrieved from <URL: http://docs.oracle.com/javase/7/docs/platform/jvmti/jvmti.html> on Apr. 26, 2014, 127 pages.
Machine code, retrieved from <URL: http://wikipedia.com> on Apr. 30, 2014, 3 pages.
Metaprogramming, retrieved from <URL: http://wikipedia.com> on May 8, 2014, 3 pages.
Microsoft.VisualBasic.Logging Namespace, retrieved from <URL: http://msdn.microsoft.com/en-us/library/ms128122(d=default,l=en-us,v=vs.110).aspx> on Jan. 13, 2014, 1 pages.
Pin (computer program), retrieved from <URL: http://wikipedia.com> on May 6, 2014, 3 pages.
Processor register, retrieved from <URL: http://wikipedia.com> on Apr. 29, 2014, 4 pages.
Profiling (computer programming), retrieved from <URL: http://wikipedia.com> on Jan. 10, 2014, 4 pages.
Profiling Overview, retrieved from <URL: http://msdn.microsoft.com/en-us/library/bb384493(d=default,l=en-us,v=vs.110).aspx> on Jan. 12, 2014, 6 pages.
Program counter, retrieved from <URL: http://wikipedia.com> on Apr. 24, 2014, 2 pages.
Ptrace, retrieved from <URL: http://wikipedia.com> on Apr. 24, 2014, 2 pages.
Reflection (computer programming), retrieved from <URL: http://wikipedia.com> on May 7, 2014, 5 pages.
Class Runtime, retrieved from <URL: http://docs.oracle.com/javase/7/docs/api/java/lang/Runtime.html> on Jan. 10, 2014, 10 pages.
Self-modifying code, retrieved from <URL: http://wikipedia.com> on Jan. 12, 2014, 6 pages.
Subjective logic, retrieved from <URL: http://wikipedia.com> on May 22, 2014, 5 pages.
System.CodeDom.Compiler Namespace, retrieved from <URL: http://msdn.microsoft.com/en-us/library/z6b99ydt(d=default,l=en-us,v=vs.110).aspx> on May 13, 2014, 2 pages.
System.Reflection.Emit Namespace, retrieved from <URL: http://msdn.microsoft.com/en-us/library/xd5tw18y(d=default,l=en-us,v=vs.110).aspx> on May 13, 2014, 2 pages.

\* cited by examiner

MACHINE LEARNING FOR COMPUTING ENABLED SYSTEMS AND/OR DEVICES

CROSS REFERENCE TO RELATED APPLICATION

This application is a continuation of, and claims priority under 35 U.S.C. § 120 from, nonprovisional U.S. patent application Ser. No. 16/584,736 entitled "MACHINE LEARNING FOR COMPUTING ENABLED SYSTEMS AND/OR DEVICES", filed on Sep. 26, 2019, which is a continuation of, and claims priority under 35 U.S.C. § 120 from, nonprovisional U.S. patent application Ser. No. 15/822,150 entitled "MACHINE LEARNING FOR COMPUTING ENABLED SYSTEMS AND/OR DEVICES", issued as U.S. Pat. No. 10,474,934, filed on Nov. 26, 2017. The disclosures of the foregoing documents are incorporated herein by reference.

FIELD

The disclosure generally relates to computing enabled systems and/or devices.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND

Computing enabled systems and/or devices range from appliances, toys, entertainment electronics, computers, and communication systems and/or devices to vehicles, robots, and industrial systems and/or devices, and/or others. These systems and/or devices depend on user's input to various degrees for their operation. A machine learning solution is needed for computing enabled systems and/or devices to be less dependent on or fully independent from user input.

SUMMARY OF THE INVENTION

In some aspects, the disclosure relates to a system. The system may be implemented at least in part on one or more computing devices. In some embodiments, the system comprises a processor circuit configured to execute instruction sets for operating a device. The system may further include a memory unit configured to store data. The system may further include a picture capturing apparatus configured to capture digital pictures. The system may further include an artificial intelligence unit. In some embodiments, the artificial intelligence unit may be configured to: receive a first digital picture from the picture capturing apparatus. The artificial intelligence unit may be further configured to: receive one or more instruction sets for operating the device from the processor circuit. The artificial intelligence unit may be further configured to: learn the first digital picture correlated with the one or more instruction sets for operating the device. The artificial intelligence unit may be further configured to: receive a new digital picture from the picture capturing apparatus. The artificial intelligence unit may be further configured to: anticipate the one or more instruction sets for operating the device correlated with the first digital picture based on at least a partial match between the new digital picture and the first digital picture. The artificial intelligence unit may be further configured to: cause the processor circuit to execute the one or more instruction sets for operating the device correlated with the first digital picture, the executing performed in response to the anticipating of the artificial intelligence unit, wherein the device performs one or more operations defined by the one or more instruction sets for operating the device correlated with the first digital picture, the one or more operations performed in response to the executing by the processor circuit.

In certain embodiments, at least one of the processor circuit, the memory unit, the picture capturing apparatus, or the artificial intelligence unit are part of, operating on, or coupled to the device. In further embodiments, the device includes one or more devices. In further embodiments, the device includes a smartphone, a fixture, a control device, a computing enabled device, or a computer.

In some embodiments, the processor circuit includes one or more processor circuits. In further embodiments, the processor circuit includes a logic circuit. The logic circuit may include a microcontroller. The one or more instruction sets may include one or more inputs into or one or more outputs from the logic circuit.

In certain embodiments, the processor circuit includes a logic circuit, the instruction sets for operating the device include inputs into the logic circuit, and executing instruction sets for operating the device includes performing logic operations on the inputs into the logic circuit and producing outputs for operating the device. The logic circuit may include a microcontroller. In further embodiments, the processor circuit includes a logic circuit, the instruction sets for operating the device include outputs from the logic circuit for operating the device, and executing instruction sets for operating the device includes performing logic operations on inputs into the logic circuit and producing the outputs from the logic circuit for operating the device.

In some embodiments, the memory unit includes one or more memory units. In further embodiments, the memory unit resides on a remote computing device, the remote computing device coupled to the processor circuit via a network. The remote computing device may include a server.

In some embodiments, the picture capturing apparatus includes one or more picture capturing apparatuses. In further embodiments, the picture capturing apparatus includes a motion picture camera or a still picture camera. In further embodiments, the picture capturing apparatus resides on a remote device, the remote device coupled to the processor circuit via a network.

In certain embodiments, the artificial intelligence unit is coupled to the picture capturing apparatus. In further embodiments, the artificial intelligence unit is coupled to the memory unit. In further embodiments, the artificial intelligence unit is part of, operating on, or coupled to the processor circuit. In further embodiments, the system further comprises: a second processor circuit, wherein the artificial intelligence unit is part of, operating on, or coupled to the second processor circuit. In further embodiments, the artificial intelligence unit is part of, operating on, or coupled to a remote computing device, the remote computing device coupled to the processor circuit via a network. In further embodiments, the artificial intelligence unit includes a circuit, a computing apparatus, or a computing system attachable to the processor circuit. In further embodiments, the artificial intelligence unit includes a circuit, a computing apparatus, or a computing system attachable to the device. In further embodiments, the artificial intelligence unit is attachable to an application for operating the device, the application running on the processor circuit. In further embodiments, the artificial intelligence unit includes a circuit, a computing apparatus, or a computing system built into the processor circuit. In further embodiments, the artificial intelligence unit includes a circuit, a computing apparatus, or a computing system built into the device. In further embodiments, the artificial intelligence unit is built into an application for operating the device, the application running on the processor circuit. In further embodiments, the artificial intelligence unit is provided as a feature of the processor circuit. In further embodiments, the artificial intelligence unit is provided as a feature of an application running on the processor circuit. In further embodiments, the artificial intelligence unit is provided as a feature of the device. In further embodiments, the artificial intelligence unit is further configured to: take control from, share control with, or release control to the processor circuit. In further embodiments, the artificial intelligence unit is further configured to: take control from, share control with, or release control to an application or an object of the application, the application running on the processor circuit. In further embodiments, the artificial intelligence unit is further configured to: take control from, share control with, or release control to a user or a system.

In some embodiments, the first digital picture includes a stream of digital pictures. In further embodiments, the new digital picture includes a stream of digital pictures. In further embodiments, the first and the new digital pictures portray the device's surrounding. In further embodiments, the first and the new digital pictures portray a remote device's surrounding. In further embodiments, the first or the new digital picture includes a JPEG picture, a GIF picture, a TIFF picture, a PNG picture, a PDF picture, or a digitally encoded picture. The stream of digital pictures may include a MPEG motion picture, an AVI motion picture, a FLV motion picture, a MOV motion picture, a RM motion picture, a SWF motion picture, a WMV motion picture, a DivX motion picture, or a digitally encoded motion picture. In further embodiments, the first digital picture includes a comparative digital picture whose at least one portion can be used for comparisons with at least one portion of digital pictures subsequent to the first digital picture, the digital pictures subsequent to the first digital picture comprising the new digital picture. In further embodiments, the first digital picture includes a comparative digital picture that can be used for comparisons with the new digital picture. In further embodiments, the new digital picture includes an anticipatory digital picture whose correlated one or more instruction sets can be used for anticipation of one or more instruction sets to be executed by the processor circuit.

In certain embodiments, the one or more instruction sets for operating the device include one or more instruction sets that temporally correspond to the first digital picture. The one or more instruction sets that temporally correspond to the first digital picture may include one or more instruction sets executed at a time of the capturing the first digital picture. The one or more instruction sets that temporally correspond to the first digital picture may include one or more instruction sets executed prior to the capturing the first digital picture. The one or more instruction sets that temporally correspond to the first digital picture may include one or more instruction sets executed within a threshold period of time prior to the capturing the first digital picture. The one or more instruction sets that temporally correspond to the first digital picture may include one or more instruction sets executed subsequent to the capturing the first digital picture. The one or more instruction sets that temporally correspond to the first digital picture may include one or more instruction sets executed within a threshold period of time subsequent to the capturing the first digital picture. The one or more instruction sets that temporally correspond to the first digital picture may include one or more instruction sets executed within a threshold period of time prior to the capturing the first digital picture or a threshold period of time subsequent to the capturing the first digital picture. The one or more instruction sets that temporally correspond to the first digital picture may include one or more instruction sets executed from a start of capturing a preceding digital picture to a start of capturing the first digital picture. The one or more instruction sets that temporally correspond to the first digital picture may include one or more instruction sets executed from a start of capturing the first digital picture to a start of capturing a subsequent digital picture. The one or more instruction sets that temporally correspond to the first digital picture may include one or more instruction sets executed from a completion of capturing a preceding digital picture to a completion of capturing the first digital picture. The one or more instruction sets that temporally correspond to the first digital picture include one or more instruction sets executed from a completion of capturing the first digital picture to a completion of capturing a subsequent digital picture.

In some embodiments, the one or more instruction sets for operating the device are executed by the processor circuit. In further embodiments, the one or more instruction sets for operating the device are part of an application for operating the device, the application running on the processor circuit. In further embodiments, the one or more instruction sets for operating the device include one or more inputs into or one or more outputs from the processor circuit. In further embodiments, the one or more instruction sets for operating the device include values or states of one or more registers or elements of the processor circuit. In further embodiments, an instruction set includes at least one of: a command, a keyword, a symbol, an instruction, an operator, a variable, a value, an object, a data structure, a function, a parameter, a state, a signal, an input, an output, a character, a digit, or a reference thereto. In further embodiments, the one or more instruction sets include a source code, a bytecode, an intermediate code, a compiled code, an interpreted code, a translated code, a runtime code, an assembly code, a structured query language (SQL) code, or a machine code. In further embodiments, the one or more instruction sets include one or more code segments, lines of code, statements, instructions, functions, routines, subroutines, or basic blocks. In further embodiments, the processor circuit includes a logic circuit. The one or more instruction sets for operating the device include one or more inputs into a logic circuit. The one or more instruction sets for operating the device include one or more outputs from a logic circuit. In further embodiments, the one or more instruction sets for operating the device include one or more instruction sets for operating an application or an object of the application, the application running on the processor circuit.

In some embodiments, the receiving the one or more instruction sets for operating the device from the processor circuit includes obtaining the one or more instruction sets from the processor circuit. In further embodiments, the receiving the one or more instruction sets for operating the device from the processor circuit includes receiving the one or more instruction sets as they are executed by the processor circuit. In further embodiments, the receiving the one or more instruction sets for operating the device from the processor circuit includes receiving the one or more instruction sets for operating the device from a register or an element of the processor circuit. In further embodiments, the receiving the one or more instruction sets for operating the device from the processor circuit includes receiving the one or more instruction sets for operating the device from an element that is part of, operating on, or coupled to the processor circuit. In further embodiments, the receiving the one or more instruction sets for operating the device from the processor circuit includes receiving the one or more instruction sets for operating the device from at least one of: the memory unit, the device, a virtual machine, a runtime engine, a hard drive, a storage device, a peripheral device, a network connected device, or a user. In further embodiments, the receiving the one or more instruction sets for operating the device from the processor circuit includes receiving the one or more instruction sets from a plurality of processor circuits, applications, memory units, devices, virtual machines, runtime engines, hard drives, storage devices, peripheral devices, network connected devices, or users.

In certain embodiments, the processor circuit includes a logic circuit, and wherein the receiving the one or more instruction sets for operating the device from the processor circuit includes receiving the one or more instruction sets for operating the device from the logic circuit. The logic circuit may include a microcontroller. The receiving the one or more instruction sets for operating the device from the logic circuit may include receiving the one or more instruction sets for operating the device from an element of the logic circuit. The receiving the one or more instruction sets for operating the device from the logic circuit may include receiving one or more inputs into the logic circuit. The receiving the one or more instruction sets for operating the device from the logic circuit may include receiving one or more outputs from the logic circuit.

In some embodiments, the receiving the one or more instruction sets for operating the device from the processor circuit includes receiving the one or more instruction sets for operating the device from an application for operating the device, the application running on the processor circuit. In further embodiments, the system further comprises: an application including instruction sets for operating the device, the application running on the processor circuit, wherein the receiving the one or more instruction sets for operating the device from the processor circuit includes receiving the one or more instruction sets for operating the device from the application.

In certain embodiments, the receiving the one or more instruction sets for operating the device from the processor circuit includes receiving the one or more instruction sets at a source code write time, a compile time, an interpretation time, a translation time, a linking time, a loading time, or a runtime. In further embodiments, the receiving the one or more instruction sets for operating the device from the processor circuit includes at least one of: tracing, profiling, or instrumentation of a source code, a bytecode, an intermediate code, a compiled code, an interpreted code, a translated code, a runtime code, an assembly code, a structured query language (SQL) code, or a machine code. In further embodiments, the receiving the one or more instruction sets for operating the device from the processor circuit includes at least one of: tracing, profiling, or instrumentation of an element that is part of, operating on, or coupled to the processor circuit. In further embodiments, the receiving the one or more instruction sets for operating the device from the processor circuit includes at least one of: tracing, profiling, or instrumentation of a register of the processor circuit, the memory unit, a storage, or a repository where the one or more instruction sets for operating the device are stored. In further embodiments, the receiving the one or more instruction sets for operating the device from the processor circuit includes at least one of: tracing, profiling, or instrumentation of the processor circuit, the device, a virtual machine, a runtime engine, an operating system, an execution stack, a program counter, or a processing element. In further embodiments, the receiving the one or more instruction sets for operating the device from the processor circuit includes at least one of: tracing, profiling, or instrumentation of the processor circuit or tracing, profiling, or instrumentation of a component of the processor circuit. In further embodiments, the receiving the one or more instruction sets for operating the device from the processor circuit includes at least one of: tracing, profiling, or instrumentation of an application or an object of the application, the application running on the processor circuit. In further embodiments, the receiving the one or more instruction sets for operating the device from the processor circuit includes at least one of: tracing, profiling, or instrumentation at a source code write time, a compile time, an interpretation time, a translation time, a linking time, a loading time, or a runtime. In further embodiments, the receiving the one or more instruction sets for operating the device from the processor circuit includes at least one of: tracing, profiling, or instrumentation of one or more of code segments, lines of code, statements, instructions, functions, routines, subroutines, or basic blocks. In further embodiments, the receiving the one or more instruction sets for operating the device from the processor circuit includes at least one of: tracing, profiling, or instrumentation of a user input. In further embodiments, the receiving the one or more instruction sets for operating the device from the processor circuit includes at least one of: a manual, an automatic, a dynamic, or a just in time (JIT) tracing, profiling, or instrumentation. In further embodiments, the receiving the one or more instruction sets for operating the device from the processor circuit includes utilizing at least one of: a .NET tool, a .NET application programming interface (API), a Java tool, a Java API, a logging tool, or an independent tool for obtaining instruction sets. In further embodiments, the receiving the one or more instruction sets for operating the device from the processor circuit includes utilizing an assembly language. In further embodiments, the receiving the one or more instruction sets for operating the device from the processor circuit includes utilizing a branch or a jump. In further embodiments, the receiving the one or more instruction sets for operating the device from the processor circuit includes a branch tracing or a simulation tracing.

In some embodiments, the system further comprises: an interface configured to receive instruction sets, wherein the one or more instruction sets for operating the device are received by the interface. The interface may include an acquisition interface.

In certain embodiments, the first digital picture correlated with the one or more instruction sets for operating the device includes a unit of knowledge of how the device operated in a visual surrounding. In further embodiments, the first digital picture correlated with the one or more instruction sets for operating the device is included in a neuron, a node, a vertex, or an element of a data structure. The data structure may include a neural network, a graph, a collection of sequences, a sequence, a collection of knowledge cells, a knowledgebase, or a knowledge structure. Some of the neurons, nodes, vertices, or elements may be interconnected.

In some embodiments, the first digital picture correlated with the one or more instruction sets for operating the device is structured into a knowledge cell. In further embodiments, the knowledge cell includes a unit of knowledge of how the device operated in a visual surrounding. In further embodiments, the knowledge cell is included in a neuron, a node, a vertex, or an element of a data structure. The data structure may include a neural network, a graph, a collection of sequences, a sequence, a collection of knowledge cells, a knowledgebase, or a knowledge structure. Some of the neurons, nodes, vertices, or elements may be interconnected.

In certain embodiments, the learning the first digital picture correlated with the one or more instruction sets for operating the device includes correlating the first digital picture with the one or more instruction sets for operating the device. The correlating the first digital picture with the one or more instruction sets for operating the device may include generating a knowledge cell, the knowledge cell comprising the first digital picture correlated with the one or more instruction sets for operating the device. The correlating the first digital picture with the one or more instruction sets for operating the device may include structuring a unit of knowledge of how the device operated in a visual surrounding.

In some embodiments, the learning the first digital picture correlated with the one or more instruction sets for operating the device includes learning a user's knowledge, style, or methodology of operating the device in a visual surrounding. In further embodiments, the learning the first digital picture correlated with the one or more instruction sets for operating the device includes spontaneous learning the first digital picture correlated with the one or more instruction sets for operating the device.

In some embodiments, the learning the first digital picture correlated with the one or more instruction sets for operating the device includes storing, into the memory unit, the first digital picture correlated with the one or more instruction sets for operating the device, the first digital picture correlated with the one or more instruction sets for operating the device being part of a stored plurality of digital pictures correlated with one or more instruction sets for operating the device. In further embodiments, the plurality of digital pictures correlated with one or more instruction sets for operating the device include a neural network, a graph, a collection of sequences, a sequence, a collection of knowledge cells, a knowledgebase, a knowledge structure, or a data structure. In further embodiments, the plurality of digital pictures correlated with one or more instruction sets for operating the device are organized into a neural network, a graph, a collection of sequences, a sequence, a collection of knowledge cells, a knowledgebase, a knowledge structure, or a data structure. In further embodiments, each of the plurality of digital pictures correlated with one or more instruction sets for operating the device is included in a neuron, a node, a vertex, or an element of a data structure. The data structure may include a neural network, a graph, a collection of sequences, a sequence, a collection of knowledge cells, a knowledgebase, or a knowledge structure. Some of the neurons, nodes, vertices, or elements may be interconnected. In further embodiments, the plurality of digital pictures correlated with one or more instruction sets for operating the device include a user's knowledge, style, or methodology of operating the device in visual surroundings. In further embodiments, the plurality of digital pictures correlated with one or more instruction sets for operating the device are stored on a remote computing device. In further embodiments, the plurality of digital pictures correlated with one or more instruction sets for operating the device include an artificial intelligence system for knowledge structuring, storing, or representation. The artificial intelligence system for knowledge structuring, storing, or representation may include at least one of: a deep learning system, a supervised learning system, an unsupervised learning system, a neural network, a search-based system, an optimization-based system, a logic-based system, a fuzzy logic-based system, a tree-based system, a graph-based system, a hierarchical system, a symbolic system, a sub-symbolic system, an evolutionary system, a genetic system, a multi-agent system, a deterministic system, a probabilistic system, or a statistical system.

In certain embodiments, the anticipating the one or more instruction sets for operating the device correlated with the first digital picture based on at least a partial match between the new digital picture and the first digital picture includes comparing at least one portion of the new digital picture with at least one portion of the first digital picture. The at least one portion of the new digital picture may include at least one region, at least one feature, or at least one pixel of the new digital picture. The at least one portion of the first digital picture may include at least one region, at least one feature, or at least one pixel of the first digital picture. The comparing the at least one portion of the new digital picture with the at least one portion of the first digital picture may include comparing at least one region of the new digital picture with at least one region of the first digital picture. The comparing the at least one portion of the new digital picture with the at least one portion of the first digital picture may include comparing at least one feature of the new digital picture with at least one feature of the first digital picture. The at least one portion of the new digital picture with the at least one portion of the first digital picture may include comparing at least one pixel of the new digital picture with at least one pixel of the first digital picture. The comparing the at least one portion of the new digital picture with the at least one portion of the first digital picture may include at least one of: performing a color adjustment, performing a size adjustment, performing a content manipulation, utilizing a transparency, or utilizing a mask on the new or the first digital picture. The comparing the at least one portion of the new digital picture with the at least one portion of the first digital picture may include recognizing at least one person or object in the new digital picture and at least one person or object in the first digital picture, and comparing the at least one person or object from the new digital picture with the at least one person or object from the first digital picture.

In some embodiments, he anticipating the one or more instruction sets for operating the device correlated with the first digital picture based on at least a partial match between the new digital picture and the first digital picture includes determining that there is at least a partial match between the new digital picture and the first digital picture. In further embodiments, the determining that there is at least a partial match between the new digital picture and the first digital picture includes determining that there is at least a partial match between one or more portions of the new digital picture and one or more portions of the first digital picture. In further embodiments, the determining that there is at least a partial match between the new digital picture and the first digital picture includes determining that a similarity between at least one portion of the new digital picture and at least one portion of the first digital picture exceeds a similarity threshold. In further embodiments, the determining that there is at least a partial match between the new digital picture and the first digital picture includes determining a substantial similarity between at least one portion of the new digital picture and at least one portion of the first digital picture. The at least one portion of the new digital picture may include at least one region, at least one feature, or at least one pixel of the new digital picture. The at least one portion of the first digital picture may include at least one region, at least one feature, or at least one pixel of the first digital picture. The substantial similarity may be achieved when a similarity between the at least one portion of the new digital picture and the at least one portion of the first digital picture exceeds a similarity threshold. The substantial similarity may be achieved when a number or a percentage of matching or partially matching regions from the new digital picture and from the first digital picture exceeds a threshold number or threshold percentage. The substantial similarity may be achieved when a number or a percentage of matching or partially matching features from the new digital picture and from the first digital picture exceeds a threshold number or threshold percentage. The substantial similarity may be achieved when a number or a percentage of matching or partially matching pixels from the new digital picture and from the first digital picture exceeds a threshold number or threshold percentage. The substantial similarity may be achieved when one or more same or similar objects are recognized in the new digital picture and the first digital picture. In further embodiments, the determining that there is at least a partial match between the new digital picture and the first digital picture includes determining that a number or a percentage of matching regions from the new digital picture and from the first digital picture exceeds a threshold number or threshold percentage. The matching regions from the new digital picture and from the first digital picture may be determined factoring in at least one of: a location of a region, an importance of a region, a threshold for a similarity in a region, or a threshold for a difference in a region. In further embodiments, the determining that there is at least a partial match between the new digital picture and the first digital picture includes determining that a number or a percentage of matching features from the new digital picture and from the first digital picture exceeds a threshold number or threshold percentage. The matching features from the new digital picture and from the first digital picture may be determined factoring in at least one of: a type of a feature, an importance of a feature, a location of a feature, a threshold for a similarity in a feature, or a threshold for a difference in a feature. In further embodiments, the determining that there is at least a partial match between the new digital picture and the first digital picture includes determining that a number or a percentage of matching pixels from the new digital picture and from the first digital picture exceeds a threshold number or threshold percentage. The matching pixels from the new digital picture and from the first digital picture may be determined factoring in at least one of: a location of a pixel, a threshold for a similarity in a pixel, or a threshold for a difference in a pixel. In further embodiments, the determining that there is at least a partial match between the new digital picture and the first digital picture includes recognizing a same person or object in the new and the first digital pictures.

In some embodiments, the causing the processor circuit to execute the one or more instruction sets for operating the device correlated with the first digital picture includes causing the processor circuit to execute the one or more instruction sets for operating the device correlated with the first digital picture instead of or prior to an instruction set that would have been executed next. In further embodiments, the causing the processor circuit to execute the one or more instruction sets for operating the device correlated with the first digital picture includes modifying one or more instruction sets of the processor circuit. In further embodiments, the causing the processor circuit to execute the one or more instruction sets for operating the device correlated with the first digital picture includes modifying a register or an element of the processor circuit. In further embodiments, the causing the processor circuit to execute the one or more instruction sets for operating the device correlated with the first digital picture includes inserting the one or more instruction sets for operating the device correlated with the first digital picture into a register or an element of the processor circuit. In further embodiments, the causing the processor circuit to execute the one or more instruction sets for operating the device correlated with the first digital picture includes redirecting the processor circuit to the one or more instruction sets for operating the device correlated with the first digital picture. In further embodiments, the causing the processor circuit to execute the one or more instruction sets for operating the device correlated with the first digital picture includes redirecting the processor circuit to one or more alternate instruction sets, the alternate instruction sets comprising the one or more instruction sets for operating the device correlated with the first digital picture. In further embodiments, the causing the processor circuit to execute the one or more instruction sets for operating the device correlated with the first digital picture includes transmitting, to the processor circuit for execution, the one or more instruction sets for operating the device correlated with the first digital picture. In further embodiments, the executing the one or more instruction sets for operating the device correlated with the first digital picture includes issuing an interrupt to the processor circuit and executing the one or more instruction sets for operating the device correlated with the first digital picture following the interrupt. In further embodiments, the causing the processor circuit to execute the one or more instruction sets for operating the device correlated with the first digital picture includes modifying an element that is part of, operating on, or coupled to the processor circuit.

In certain embodiments, the processor circuit includes a logic circuit, and wherein the causing the processor circuit to execute the one or more instruction sets for operating the device correlated with the first digital picture includes causing the logic circuit to execute the one or more instruction sets for operating the device correlated with the first digital picture. The logic circuit may include a microcontroller. The causing the logic circuit to execute the one or more instruction sets for operating the device correlated with the first digital picture may include modifying an element of the logic circuit. The causing the logic circuit to execute the one or more instruction sets for operating the device correlated with the first digital picture may include inserting the one or more instruction sets for operating the device correlated with the first digital picture into an element of the logic circuit. The causing the logic circuit to execute the one or more instruction sets for operating the device correlated with the first digital picture may include redirecting the logic circuit to the one or more instruction sets for operating the device correlated with the first digital picture. The causing the logic circuit to execute the one or more instruction sets for operating the device correlated with the first digital picture may include replacing inputs into the logic circuit with the one or more instruction sets for operating the device correlated with the first digital picture. The causing the logic circuit to execute the one or more instruction sets for operating the device correlated with the first digital picture may include replacing outputs from the logic circuit with the one or more instruction sets for operating the device correlated with the first digital picture.

In certain embodiments, the causing the processor circuit to execute the one or more instruction sets for operating the device correlated with the first digital picture includes causing an application for operating the device to execute the one or more instruction sets for operating the device correlated with the first digital picture, the application running on the processor circuit.

In further embodiments, the system further comprises: an application including instruction sets for operating the device, the application running on the processor circuit, wherein the causing the processor circuit to execute the one or more instruction sets for operating the device correlated with the first digital picture includes modifying the application.

In further embodiments, the causing the processor circuit to execute the one or more instruction sets for operating the device correlated with the first digital picture includes redirecting an application to the one or more instruction sets for operating the device correlated with the first digital picture, the application running on the processor circuit. In further embodiments, the causing the processor circuit to execute the one or more instruction sets for operating the device correlated with the first digital picture includes redirecting an application to one or more alternate instruction sets, the application running on the processor circuit, the alternate instruction sets comprising the one or more instruction sets for operating the device correlated with the first digital picture. In further embodiments, the causing the processor circuit to execute the one or more instruction sets for operating the device correlated with the first digital picture includes modifying one or more instruction sets of an application, the application running on the processor circuit. In further embodiments, the causing the processor circuit to execute the one or more instruction sets for operating the device correlated with the first digital picture includes modifying a source code, a bytecode, an intermediate code, a compiled code, an interpreted code, a translated code, a runtime code, an assembly code, or a machine code. In further embodiments, the causing the processor circuit to execute the one or more instruction sets for operating the device correlated with the first digital picture includes modifying at least one of: the memory unit, a register of the processor circuit, a storage, or a repository where instruction sets are stored or used. In further embodiments, the causing the processor circuit to execute the one or more instruction sets for operating the device correlated with the first digital picture includes modifying one or more instruction sets for operating an application or an object of the application, the application running on the processor circuit. In further embodiments, the causing the processor circuit to execute the one or more instruction sets for operating the device correlated with the first digital picture includes modifying at least one of: an element of the processor circuit, an element of the device, a virtual machine, a runtime engine, an operating system, an execution stack, a program counter, or a user input. In further embodiments, the causing the processor circuit to execute the one or more instruction sets for operating the device correlated with the first digital picture includes modifying one or more instruction sets at a source code write time, a compile time, an interpretation time, a translation time, a linking time, a loading time, or a runtime. In further embodiments, the causing the processor circuit to execute the one or more instruction sets for operating the device correlated with the first digital picture includes modifying one or more code segments, lines of code, statements, instructions, functions, routines, subroutines, or basic blocks. In further embodiments, the causing the processor circuit to execute the one or more instruction sets for operating the device correlated with the first digital picture includes a manual, an automatic, a dynamic, or a just in time (JIT) instrumentation of an application, the application running on the processor circuit. In further embodiments, the causing the processor circuit to execute the one or more instruction sets for operating the device correlated with the first digital picture includes utilizing one or more of a .NET tool, a .NET application programming interface (API), a Java tool, a Java API, an operating system tool, or an independent tool for modifying instruction sets. In further embodiments, the causing the processor circuit to execute the one or more instruction sets for operating the device correlated with the first digital picture includes utilizing at least one of: a dynamic, an interpreted, or a scripting programming language. In further embodiments, the causing the processor circuit to execute the one or more instruction sets for operating the device correlated with the first digital picture includes utilizing at least one of: a dynamic code, a dynamic class loading, or a reflection. In further embodiments, the causing the processor circuit to execute the one or more instruction sets for operating the device correlated with the first digital picture includes utilizing an assembly language. In further embodiments, the causing the processor circuit to execute the one or more instruction sets for operating the device correlated with the first digital picture includes utilizing at least one of: a metaprogramming, a self-modifying code, or an instruction set modification tool. In further embodiments, the causing the processor circuit to execute the one or more instruction sets for operating the device correlated with the first digital picture includes utilizing at least one of: just in time (JIT) compiling, JIT interpretation, JIT translation, dynamic recompiling, or binary rewriting. In further embodiments, the causing the processor circuit to execute the one or more instruction sets for operating the device correlated with the first digital picture includes utilizing at least one of: a dynamic expression creation, a dynamic expression execution, a dynamic function creation, or a dynamic function execution. In further embodiments, the causing the processor circuit to execute the one or more instruction sets for operating the device correlated with the first digital picture includes adding or inserting additional code into a code of an application, the application running on the processor circuit. In further embodiments, the causing the processor circuit to execute the one or more instruction sets for operating the device correlated with the first digital picture includes at least one of: modifying, removing, rewriting, or overwriting a code of an application, the application running on the processor circuit. In further embodiments, the causing the processor circuit to execute the one or more instruction sets for operating the device correlated with the first digital picture includes at least one of: branching, redirecting, extending, or hot swapping a code of an application, the application running on the processor circuit. The branching or redirecting the code may include inserting at least one of: a branch, a jump, or a means for redirecting an execution. In further embodiments, the executing the one or more instruction sets for operating the device correlated with the first digital picture includes implementing a user's knowledge, style, or methodology of operating the device in a visual surrounding.

In some embodiments, the system further comprises: an interface configured to cause execution of instruction sets, wherein the executing the one or more instruction sets for operating the device correlated with the first digital picture is caused by the interface. The interface may include a modification interface.

In certain embodiments, the one or more operations defined by the one or more instruction sets for operating the device correlated with the first digital picture include at least one of: an operation with or by a smartphone, an operation with or by a fixture, an operation with or by a control device, or an operation with or by a computer or computing enabled device.

In some embodiments, the performing the one or more operations defined by the one or more instruction sets for operating the device correlated with the first digital picture includes implementing a user's knowledge, style, or methodology of operating the device in a visual surrounding.

In certain embodiments, the system further comprises: an application running on the processor circuit.

In some embodiments, the instruction sets for operating the device are part of an application for operating the device, the application running on the processor circuit.

In certain embodiments, the system further comprises: an application for operating the device, the application running on the processor circuit. The application for operating the device may include the instruction sets for operating the device.

In some embodiments, the artificial intelligence unit is further configured to: receive at least one extra information. In further embodiments, the at least one extra information include one or more of: a time information, a location information, a computed information, an observed information, a sensory information, or a contextual information. In further embodiments, the at least one extra information include one or more of: an information on a digital picture, an information on an object in the digital picture, an information on the device's visual surrounding, an information on an instruction set, an information on an application, an information on an object of the application, an information on the processor circuit, an information on the device, or an information on an user. In further embodiments, the artificial intelligence unit is further configured to: learn the first digital picture correlated with the at least one extra information. The learning the first digital picture correlated with at least one extra information may include correlating the first digital picture with the at least one extra information. The learning the first digital picture correlated with at least one extra information may include storing the first digital picture correlated with the at least one extra information into the memory unit. In further embodiments, the anticipating the one or more instruction sets for operating the device correlated with the first digital picture based on at least a partial match between the new digital picture and the first digital picture includes anticipating the one or more instruction sets for operating the device correlated with the first digital picture based on at least a partial match between an extra information correlated with the new digital picture and an extra information correlated with the first digital picture. The anticipating the one or more instruction sets for operating the device correlated with the first digital picture based on at least a partial match between an extra information correlated with the new digital picture and an extra information correlated with the first digital picture may include comparing an extra information correlated with the new digital picture and an extra information correlated with the first digital picture. The anticipating the one or more instruction sets for operating the device correlated with the first digital picture based on at least a partial match between an extra information correlated with the new digital picture and an extra information correlated with the first digital picture may include determining that a similarity between an extra information correlated with the new digital picture and an extra information correlated with the first digital picture exceeds a similarity threshold.

In some embodiments, the system further comprises: a user interface, wherein the artificial intelligence unit is further configured to: present, via the user interface, a user with an option to execute the one or more instruction sets for operating the device correlated with the first digital picture.

In certain embodiments, the system further comprises: a user interface, wherein the artificial intelligence unit is further configured to: receive, via the user interface, a user's selection to execute the one or more instruction sets for operating the device correlated with the first digital picture.

In some embodiments, the artificial intelligence unit is further configured to: rate the executed one or more instruction sets for operating the device correlated with the first digital picture. The rating the executed one or more instruction sets for operating the device correlated with the first digital picture may include displaying, on a display, the executed one or more instruction sets for operating the device correlated with the first digital picture along with one or more rating values as options to be selected by a user. The rating the executed one or more instruction sets for operating the device correlated with the first digital picture may include rating the executed one or more instruction sets for operating the device correlated with the first digital picture without a user input. The rating the executed one or more instruction sets for operating the device correlated with the first digital picture may include associating one or more rating values with the executed one or more instruction sets for operating the device correlated with the first digital picture and storing the one or more rating values into the memory unit.

In certain embodiments, the system further comprises: a user interface, wherein the artificial intelligence unit is further configured to: present, via the user interface, a user with an option to cancel the execution of the executed one or more instruction sets for operating the device correlated with the first digital picture. In further embodiments, the canceling the execution of the executed one or more instruction sets for operating the device correlated with the first digital picture includes restoring the processor circuit or the device to a prior state. The restoring the processor circuit or the device to a prior state may include saving the state of the processor circuit or the device prior to executing the one or more instruction sets for operating the device correlated with the first digital picture.

In some embodiments, the system further comprises: an input device configured to receive a user's operating directions, the user's operating directions for instructing the processor circuit on how to operate the device.

In certain embodiments, the autonomous device operating includes a partially or a fully autonomous device operating. The partially autonomous device operating may include executing the one or more instruction sets for operating the device correlated with the first digital picture responsive to a user confirmation. The fully autonomous device operating may include executing the one or more instruction sets for operating the device correlated with the first digital picture without a user confirmation.

In some embodiments, the artificial intelligence unit is further configured to: receive a second digital picture from the picture capturing apparatus; receive additional one or more instruction sets for operating the device from the processor circuit; and learn the second digital picture correlated with the additional one or more instruction sets for operating the device. In further embodiments, the second digital picture includes a second stream of digital pictures. In further embodiments, the learning the first digital picture correlated with the one or more instruction sets for operating the device and the learning the second digital picture correlated with the additional one or more instruction sets for operating the device include creating a connection between the first digital picture correlated with the one or more instruction sets for operating the device and the second digital picture correlated with the additional one or more instruction sets for operating the device. The connection may include or is associated with at least one of: an occurrence count, a weight, a parameter, or a data. In further embodiments, the learning the first digital picture correlated with the one or more instruction sets for operating the device and the learning the second digital picture correlated with the additional one or more instruction sets for operating the device include updating a connection between the first digital picture correlated with the one or more instruction sets for operating the device and the second digital picture correlated with the additional one or more instruction sets for operating the device. The updating the connection between the first digital picture correlated with the one or more instruction sets for operating the device and the second digital picture correlated with the additional one or more instruction sets for operating the device may include updating at least one of: an occurrence count, a weight, a parameter, or a data included in or associated with the connection. In further embodiments, the learning the first digital picture correlated with the one or more instruction sets for operating the device includes storing the first digital picture correlated with the one or more instruction sets for operating the device into a first node of a data structure, and wherein the learning the second digital picture correlated with the additional one or more instruction sets for operating the device includes storing the second digital picture correlated with the additional one or more instruction sets for operating the device into a second node of the data structure. The data structure may include a neural network, a graph, a collection of sequences, a sequence, a collection of knowledge cells, a knowledgebase, or a knowledge structure. The learning the first digital picture correlated with the one or more instruction sets for operating the device and the learning the second digital picture correlated with the additional one or more instruction sets for operating the device may include creating a connection between the first node and the second node. The learning the first digital picture correlated with the one or more instruction sets for operating the device and the learning the second digital picture correlated with the additional one or more instruction sets for operating the device may include updating a connection between the first node and the second node. In further embodiments, the first digital picture correlated with the one or more instruction sets for operating the device is stored into a first node of a neural network and the second digital picture correlated with the additional one or more instruction sets for operating the device is stored into a second node of the neural network. The first node and the second node may be connected by a connection. The first node may be part of a first layer of the neural network and the second node may be part of a second layer of the neural network. In further embodiments, the first digital picture correlated with the one or more instruction sets for operating the device is stored into a first node of a graph and the second digital picture correlated with the additional one or more instruction sets for operating the device is stored into a second node of the graph. The first node and the second node may be connected by a connection. In further embodiments, the first digital picture correlated with the one or more instruction sets for operating the device is stored into a first node of a sequence and the second digital picture correlated with the additional one or more instruction sets for operating the device is stored into a second node of the sequence.

In some aspects, the disclosure relates to a non-transitory computer storage medium having a computer program stored thereon, the program including instructions that when executed by one or more processor circuits cause the one or more processor circuits to perform operations comprising: receiving a first digital picture from a picture capturing apparatus. The operations may further include receiving one or more instruction sets for operating a device. The operations may further include learning the first digital picture correlated with the one or more instruction sets for operating the device. The operations may further include receiving a new digital picture from the picture capturing apparatus. The operations may further include anticipating the one or more instruction sets for operating the device correlated with the first digital picture based on at least a partial match between the new digital picture and the first digital picture. The operations may further include causing an execution of the one or more instruction sets for operating the device correlated with the first digital picture, the causing performed in response to the anticipating the one or more instruction sets for operating the device correlated with the first digital picture based on at least a partial match between the new digital picture and the first digital picture, wherein the device performs one or more operations defined by the one or more instruction sets for operating the device correlated with the first digital picture, the one or more operations performed in response to the executing.

In some aspects, the disclosure relates to a method comprising: (a) receiving a first digital picture from a picture capturing apparatus by one or more processor circuits. The method may further include (b) receiving one or more instruction sets for operating a device by the one or more processor circuits. The method may further include (c) learning the first digital picture correlated with the one or more instruction sets for operating the device, the learning of (c) performed by the one or more processor circuits. The method may further include (d) receiving a new digital picture from the picture capturing apparatus by the one or more processor circuits. The method may further include (e) anticipating the one or more instruction sets for operating the device correlated with the first digital picture based on at least a partial match between the new digital picture and the first digital picture, the anticipating of (e) performed by the one or more processor circuits. The method may further include (f) executing the one or more instruction sets for operating the device correlated with the first digital picture, the executing of (f) performed in response to the anticipating of (e). The method may further include (g) performing, by the device, one or more operations defined by the one or more instruction sets for operating the device correlated with the first digital picture, the one or more operations performed in response to the executing of (f).

The operations or steps of the non-transitory computer storage medium and/or the method may be performed by any of the elements of the above described systems as applicable. The non-transitory computer storage medium and/or the method may include any of the operations, steps, and embodiments of the above described systems as applicable as well as the following embodiments.

In certain embodiments, the device includes one or more devices. In further embodiments, the device includes a smartphone, a fixture, a control device, a computing enabled device, or a computer. In further embodiments, the picture capturing apparatus includes one or more picture capturing apparatuses. In further embodiments, the picture capturing apparatus includes a motion picture camera or a still picture camera. In further embodiments, the picture capturing apparatus resides on a remote device, the remote device coupled to the one or more processor circuits via a network.

In some embodiments, the one or more instruction sets for operating the device include one or more instruction sets that temporally correspond to the first digital picture. The one or more instruction sets that temporally correspond to the first digital picture may include one or more instruction sets executed at a time of the capturing the first digital picture. The one or more instruction sets that temporally correspond to the first digital picture may include one or more instruction sets executed prior to the capturing the first digital picture. The one or more instruction sets that temporally correspond to the first digital picture may include one or more instruction sets executed within a threshold period of time prior to the capturing the first digital picture. The one or more instruction sets that temporally correspond to the first digital picture may include one or more instruction sets executed subsequent to the capturing the first digital picture. The one or more instruction sets that temporally correspond to the first digital picture may include one or more instruction sets executed within a threshold period of time subsequent to the capturing the first digital picture. The one or more instruction sets that temporally correspond to the first digital picture may include one or more instruction sets executed within a threshold period of time prior to the capturing the first digital picture or a threshold period of time subsequent to the capturing the first digital picture. The one or more instruction sets that temporally correspond to the first digital picture may include one or more instruction sets executed from a start of capturing a preceding digital picture to a start of capturing the first digital picture. The one or more instruction sets that temporally correspond to the first digital picture may include one or more instruction sets executed from a start of capturing the first digital picture to a start of capturing a subsequent digital picture. The one or more instruction sets that temporally correspond to the first digital picture may include one or more instruction sets executed from a completion of capturing a preceding digital picture to a completion of capturing the first digital picture. The one or more instruction sets that temporally correspond to the first digital picture may include one or more instruction sets executed from a completion of capturing the first digital picture to a completion of capturing a subsequent digital picture.

In certain embodiments, the one or more instruction sets for operating the device are executed by a processor circuit. In further embodiments, the one or more instruction sets for operating the device are part of an application for operating the device. In further embodiments, the one or more instruction sets for operating the device include one or more inputs into or one or more outputs from a processor circuit. In further embodiments, the one or more instruction sets for operating the device include values or states of one or more registers or elements of a processor circuit. In further embodiments, an instruction set includes at least one of: a command, a keyword, a symbol, an instruction, an operator, a variable, a value, an object, a data structure, a function, a parameter, a state, a signal, an input, an output, a character, a digit, or a reference thereto. In further embodiments, the one or more instruction sets include a source code, a bytecode, an intermediate code, a compiled code, an interpreted code, a translated code, a runtime code, an assembly code, a structured query language (SQL) code, or a machine code. In further embodiments, the one or more instruction sets include one or more code segments, lines of code, statements, instructions, functions, routines, subroutines, or basic blocks. In further embodiments, the one or more instruction sets for operating the device include one or more inputs into a logic circuit. In further embodiments, the one or more instruction sets for operating the device include one or more outputs from a logic circuit. In further embodiments, the one or more instruction sets for operating the device include one or more instruction sets for operating an application or an object of the application.

In some embodiments, the receiving the one or more instruction sets for operating the device includes obtaining the one or more instruction sets. In further embodiments, the receiving the one or more instruction sets for operating the device includes receiving the one or more instruction sets as they are executed. In further embodiments, the receiving the one or more instruction sets for operating the device includes receiving the one or more instruction sets for operating the device from a register or an element of a processor circuit. In further embodiments, the receiving the one or more instruction sets for operating the device includes receiving the one or more instruction sets for operating the device from an element that is part of, operating on, or coupled to a processor circuit. In further embodiments, the receiving the one or more instruction sets for operating the device includes receiving the one or more instruction sets for operating the device from at least one of: a memory unit, the device, a virtual machine, a runtime engine, a hard drive, a storage device, a peripheral device, a network connected device, or a user. In further embodiments, the receiving the one or more instruction sets for operating the device includes receiving the one or more instruction sets from a plurality of processor circuits, applications, memory units, devices, virtual machines, runtime engines, hard drives, storage devices, peripheral devices, network connected devices, or users.

In certain embodiments, the receiving the one or more instruction sets for operating the device includes receiving the one or more instruction sets for operating the device from a logic circuit. The logic circuit may include a microcontroller. The receiving the one or more instruction sets for operating the device from the logic circuit may include receiving the one or more instruction sets for operating the device from an element of the logic circuit. The receiving the one or more instruction sets for operating the device from the logic circuit may include receiving one or more inputs into the logic circuit. The receiving the one or more instruction sets for operating the device from the logic circuit may include receiving one or more outputs from the logic circuit.

In some embodiments, the receiving the one or more instruction sets for operating the device includes receiving the one or more instruction sets for operating the device from an application for operating the device. In further embodiments, the receiving the one or more instruction sets for operating the device includes receiving the one or more instruction sets for operating the device from an application, the application including instruction sets for operating the device. In further embodiments, the receiving the one or more instruction sets for operating the device includes receiving the one or more instruction sets at a source code write time, a compile time, an interpretation time, a translation time, a linking time, a loading time, or a runtime. In further embodiments, the receiving the one or more instruction sets for operating the device includes at least one of: tracing, profiling, or instrumentation of a source code, a bytecode, an intermediate code, a compiled code, an interpreted code, a translated code, a runtime code, an assembly code, a structured query language (SQL) code, or a machine code. In further embodiments, the receiving the one or more instruction sets for operating the device includes at least one of: tracing, profiling, or instrumentation of an element that is part of, operating on, or coupled to a processor circuit. In further embodiments, the receiving the one or more instruction sets for operating the device includes at least one of: tracing, profiling, or instrumentation of a register of a processor circuit, a memory unit, a storage, or a repository where the one or more instruction sets for operating the device are stored. In further embodiments, the receiving the one or more instruction sets for operating the device includes at least one of: tracing, profiling, or instrumentation of a processor circuit, the device, a virtual machine, a runtime engine, an operating system, an execution stack, a program counter, or a processing element. In further embodiments, the receiving the one or more instruction sets for operating the device includes at least one of: tracing, profiling, or instrumentation of a processor circuit or tracing, profiling, or instrumentation of a component of the processor circuit. In further embodiments, the receiving the one or more instruction sets for operating the device includes at least one of: tracing, profiling, or instrumentation of an application or an object of the application. In further embodiments, the receiving the one or more instruction sets for operating the device includes at least one of: tracing, profiling, or instrumentation at a source code write time, a compile time, an interpretation time, a translation time, a linking time, a loading time, or a runtime. In further embodiments, the receiving the one or more instruction sets for operating the device includes at least one of: tracing, profiling, or instrumentation of one or more of code segments, lines of code, statements, instructions, functions, routines, subroutines, or basic blocks. In further embodiments, the receiving the one or more instruction sets for operating the device includes at least one of: tracing, profiling, or instrumentation of a user input. In further embodiments, the receiving the one or more instruction sets for operating the device includes at least one of: a manual, an automatic, a dynamic, or a just in time (JIT) tracing, profiling, or instrumentation. In further embodiments, the receiving the one or more instruction sets for operating the device includes utilizing at least one of: a .NET tool, a .NET application programming interface (API), a Java tool, a Java API, a logging tool, or an independent tool for obtaining instruction sets. In further embodiments, the receiving the one or more instruction sets for operating the device includes utilizing an assembly language. In further embodiments, the receiving the one or more instruction sets for operating the device includes utilizing a branch or a jump. In further embodiments, the receiving the one or more instruction sets for operating the device includes a branch tracing or a simulation tracing. In further embodiments, the receiving the one or more instruction sets for operating the device includes receiving the one or more instruction sets for operating the device by an interface. The interface may include an acquisition interface.

In certain embodiments, the first digital picture correlated with the one or more instruction sets for operating the device includes a unit of knowledge of how the device operated in a visual surrounding. In further embodiments, the first digital picture correlated with the one or more instruction sets for operating the device is included in a neuron, a node, a vertex, or an element of a data structure. The data structure may include a neural network, a graph, a collection of sequences, a sequence, a collection of knowledge cells, a knowledgebase, or a knowledge structure. Some of the neurons, nodes, vertices, or elements may be interconnected. In further embodiments, the first digital picture correlated with the one or more instruction sets for operating the device is structured into a knowledge cell. In further embodiments, the knowledge cell includes a unit of knowledge of how the device operated in a visual surrounding. In further embodiments, the knowledge cell is included in a neuron, a node, a vertex, or an element of a data structure. The data structure may include a neural network, a graph, a collection of sequences, a sequence, a collection of knowledge cells, a knowledgebase, or a knowledge structure. Some of the neurons, nodes, vertices, or elements may be interconnected.

In certain embodiments, the learning the first digital picture correlated with the one or more instruction sets for operating the device includes correlating the first digital picture with the one or more instruction sets for operating the device. The correlating the first digital picture with the one or more instruction sets for operating the device may include generating a knowledge cell, the knowledge cell comprising the first digital picture correlated with the one or more instruction sets for operating the device. The correlating the first digital picture with the one or more instruction sets for operating the device may include structuring a unit of knowledge of how the device operated in a visual surrounding. In further embodiments, the learning the first digital picture correlated with the one or more instruction sets for operating the device includes learning a user's knowledge, style, or methodology of operating the device in a visual surrounding. In further embodiments, the learning the first digital picture correlated with the one or more instruction sets for operating the device includes spontaneous learning the first digital picture correlated with the one or more instruction sets for operating the device.

In some embodiments, the learning the first digital picture correlated with the one or more instruction sets for operating the device includes storing, into a memory unit, the first digital picture correlated with the one or more instruction sets for operating the device, the first digital picture correlated with the one or more instruction sets for operating the device being part of a stored plurality of digital pictures correlated with one or more instruction sets for operating the device. In further embodiments, the memory unit includes one or more memory units. In further embodiments, the memory unit resides on a remote computing device, the remote computing device coupled to the one or more processor circuits via a network. The remote computing device may include a server. In further embodiments, the plurality of digital pictures correlated with one or more instruction sets for operating the device include a neural network, a graph, a collection of sequences, a sequence, a collection of knowledge cells, a knowledgebase, a knowledge structure, or a data structure. In further embodiments, the plurality of digital pictures correlated with one or more instruction sets for operating the device are organized into a neural network, a graph, a collection of sequences, a sequence, a collection of knowledge cells, a knowledgebase, a knowledge structure, or a data structure. In further embodiments, each of the plurality of digital pictures correlated with one or more instruction sets for operating the device is included in a neuron, a node, a vertex, or an element of a data structure.

The data structure may include a neural network, a graph, a collection of sequences, a sequence, a collection of knowledge cells, a knowledgebase, or a knowledge structure. Some of the neurons, nodes, vertices, or elements may be interconnected. In further embodiments, the plurality of digital pictures correlated with one or more instruction sets for operating the device include a user's knowledge, style, or methodology of operating the device in visual surroundings. In further embodiments, the plurality of digital pictures correlated with one or more instruction sets for operating the device are stored on a remote computing device. In further embodiments, the plurality of digital pictures correlated with one or more instruction sets for operating the device include an artificial intelligence system for knowledge structuring, storing, or representation. The artificial intelligence system for knowledge structuring, storing, or representation may include at least one of: a deep learning system, a supervised learning system, an unsupervised learning system, a neural network, a search-based system, an optimization-based system, a logic-based system, a fuzzy logic-based system, a tree-based system, a graph-based system, a hierarchical system, a symbolic system, a sub-symbolic system, an evolutionary system, a genetic system, a multi-agent system, a deterministic system, a probabilistic system, or a statistical system.

In some embodiments, the anticipating the one or more instruction sets for operating the device correlated with the first digital picture based on at least a partial match between the new digital picture and the first digital picture includes comparing at least one portion of the new digital picture with at least one portion of the first digital picture. The at least one portion of the new digital picture may include at least one region, at least one feature, or at least one pixel of the new digital picture. The at least one portion of the first digital picture may include at least one region, at least one feature, or at least one pixel of the first digital picture. The comparing the at least one portion of the new digital picture with the at least one portion of the first digital picture may include comparing at least one region of the new digital picture with at least one region of the first digital picture. The comparing the at least one portion of the new digital picture with the at least one portion of the first digital picture may include comparing at least one feature of the new digital picture with at least one feature of the first digital picture. The comparing the at least one portion of the new digital picture with the at least one portion of the first digital picture may include comparing at least one pixel of the new digital picture with at least one pixel of the first digital picture. The comparing the at least one portion of the new digital picture with the at least one portion of the first digital picture may include at least one of: performing a color adjustment, performing a size adjustment, performing a content manipulation, utilizing a transparency, or utilizing a mask on the new or the first digital picture. The comparing the at least one portion of the new digital picture with the at least one portion of the first digital picture may include recognizing at least one person or object in the new digital picture and at least one person or object in the first digital picture, and comparing the at least one person or object from the new digital picture with the at least one person or object from the first digital picture.

In certain embodiments, the anticipating the one or more instruction sets for operating the device correlated with the first digital picture based on at least a partial match between the new digital picture and the first digital picture includes determining that there is at least a partial match between the new digital picture and the first digital picture. In further embodiments, the determining that there is at least a partial match between the new digital picture and the first digital picture includes determining that there is at least a partial match between one or more portions of the new digital picture and one or more portions of the first digital picture. In further embodiments, the determining that there is at least a partial match between the new digital picture and the first digital picture includes determining that a similarity between at least one portion of the new digital picture and at least one portion of the first digital picture exceeds a similarity threshold. In further embodiments, the determining that there is at least a partial match between the new digital picture and the first digital picture includes determining a substantial similarity between at least one portion of the new digital picture and at least one portion of the first digital picture. The at least one portion of the new digital picture may include at least one region, at least one feature, or at least one pixel of the new digital picture. The at least one portion of the first digital picture may include at least one region, at least one feature, or at least one pixel of the first digital picture. The substantial similarity may be achieved when a similarity between the at least one portion of the new digital picture and the at least one portion of the first digital picture exceeds a similarity threshold. The substantial similarity may be achieved when a number or a percentage of matching or partially matching regions from the new digital picture and from the first digital picture exceeds a threshold number or threshold percentage. The substantial similarity may be achieved when a number or a percentage of matching or partially matching features from the new digital picture and from the first digital picture exceeds a threshold number or threshold percentage. The substantial similarity may be achieved when a number or a percentage of matching or partially matching pixels from the new digital picture and from the first digital picture exceeds a threshold number or threshold percentage. The substantial similarity may be achieved when one or more same or similar objects are recognized in the new digital picture and the first digital picture. In further embodiments, the determining that there is at least a partial match between the new digital picture and the first digital picture includes determining that a number or a percentage of matching regions from the new digital picture and from the first digital picture exceeds a threshold number or threshold percentage. The matching regions from the new digital picture and from the first digital picture may be determined factoring in at least one of: a location of a region, an importance of a region, a threshold for a similarity in a region, or a threshold for a difference in a region. In further embodiments, the determining that there is at least a partial match between the new digital picture and the first digital picture includes determining that a number or a percentage of matching features from the new digital picture and from the first digital picture exceeds a threshold number or threshold percentage. The matching features from the new digital picture and from the first digital picture may be determined factoring in at least one of: a type of a feature, an importance of a feature, a location of a feature, a threshold for a similarity in a feature, or a threshold for a difference in a feature. In further embodiments, the determining that there is at least a partial match between the new digital picture and the first digital picture includes determining that a number or a percentage of matching pixels from the new digital picture and from the first digital picture exceeds a threshold number or threshold percentage. The matching pixels from the new digital picture and from the first digital picture may be determined factoring in at least one of: a location of a pixel, a threshold for a similarity in a pixel, or a threshold for a difference in a pixel. In further embodiments, the determining that there is at least a partial match between the new digital picture and the first digital picture includes recognizing a same person or object in the new and the first digital pictures.

In some embodiments, the executing the one or more instruction sets for operating the device correlated with the first digital picture includes executing the one or more instruction sets for operating the device correlated with the first digital picture instead of or prior to an instruction set that would have been executed next. In further embodiments, the executing the one or more instruction sets for operating the device correlated with the first digital picture includes modifying one or more instruction sets. In further embodiments, the executing the one or more instruction sets for operating the device correlated with the first digital picture includes modifying a register or an element of a processor circuit. In further embodiments, the executing the one or more instruction sets for operating the device correlated with the first digital picture includes inserting the one or more instruction sets for operating the device correlated with the first digital picture into a register or an element of a processor circuit. In further embodiments, the executing the one or more instruction sets for operating the device correlated with the first digital picture includes redirecting a processor circuit to the one or more instruction sets for operating the device correlated with the first digital picture. In further embodiments, the executing the one or more instruction sets for operating the device correlated with the first digital picture includes redirecting a processor circuit to one or more alternate instruction sets, the alternate instruction sets comprising the one or more instruction sets for operating the device correlated with the first digital picture. In further embodiments, the executing the one or more instruction sets for operating the device correlated with the first digital picture includes transmitting, to a processor circuit for execution, the one or more instruction sets for operating the device correlated with the first digital picture. In further embodiments, the executing the one or more instruction sets for operating the device correlated with the first digital picture includes issuing an interrupt to a processor circuit and executing the one or more instruction sets for operating the device correlated with the first digital picture following the interrupt. In further embodiments, the executing the one or more instruction sets for operating the device correlated with the first digital picture includes modifying an element that is part of, operating on, or coupled to a processor circuit.

In certain embodiments, the executing the one or more instruction sets for operating the device correlated with the first digital picture includes executing, by a logic circuit, the one or more instruction sets for operating the device correlated with the first digital picture. The logic circuit may include a microcontroller. The executing, by the logic circuit, the one or more instruction sets for operating the device correlated with the first digital picture may include modifying an element of the logic circuit. The executing, by the logic circuit, the one or more instruction sets for operating the device correlated with the first digital picture may include inserting the one or more instruction sets for operating the device correlated with the first digital picture into an element of the logic circuit. The executing, by the logic circuit, the one or more instruction sets for operating the device correlated with the first digital picture may include redirecting the logic circuit to the one or more instruction sets for operating the device correlated with the first digital picture. The executing, by the logic circuit, the one or more instruction sets for operating the device correlated with the first digital picture may include replacing inputs into the logic circuit with the one or more instruction sets for operating the device correlated with the first digital picture. The executing, by the logic circuit, the one or more instruction sets for operating the device correlated with the first digital picture may include replacing outputs from the logic circuit with the one or more instruction sets for operating the device correlated with the first digital picture.

In some embodiments, the executing the one or more instruction sets for operating the device correlated with the first digital picture includes executing, by an application for operating the device, the one or more instruction sets for operating the device correlated with the first digital picture. In further embodiments, the executing the one or more instruction sets for operating the device correlated with the first digital picture includes modifying an application, the application including instruction sets for operating the device. In further embodiments, the executing the one or more instruction sets for operating the device correlated with the first digital picture includes redirecting an application to the one or more instruction sets for operating the device correlated with the first digital picture. In further embodiments, the executing the one or more instruction sets for operating the device correlated with the first digital picture includes redirecting an application to one or more alternate instruction sets, the alternate instruction sets comprising the one or more instruction sets for operating the device correlated with the first digital picture. In further embodiments, the executing the one or more instruction sets for operating the device correlated with the first digital picture includes modifying one or more instruction sets of an application. In further embodiments, the executing the one or more instruction sets for operating the device correlated with the first digital picture includes modifying a source code, a bytecode, an intermediate code, a compiled code, an interpreted code, a translated code, a runtime code, an assembly code, or a machine code. In further embodiments, the executing the one or more instruction sets for operating the device correlated with the first digital picture includes modifying at least one of: a memory unit, a register of a processor circuit, a storage, or a repository where instruction sets are stored or used. In further embodiments, the executing the one or more instruction sets for operating the device correlated with the first digital picture includes modifying one or more instruction sets for operating an application or an object of the application. In further embodiments, the executing the one or more instruction sets for operating the device correlated with the first digital picture includes modifying at least one of: an element of a processor circuit, an element of the device, a virtual machine, a runtime engine, an operating system, an execution stack, a program counter, or a user input. In further embodiments, the executing the one or more instruction sets for operating the device correlated with the first digital picture includes modifying one or more instruction sets at a source code write time, a compile time, an interpretation time, a translation time, a linking time, a loading time, or a runtime. In further embodiments, the executing the one or more instruction sets for operating the device correlated with the first digital picture includes modifying one or more code segments, lines of code, statements, instructions, functions, routines, subroutines, or basic blocks. In further embodiments, the executing the one or more instruction sets for operating the device correlated with the first digital picture includes a manual, an automatic, a dynamic, or a just in time (JIT) instrumentation of an application. In further embodiments, the executing the one or more instruction sets for operating the device correlated with the first digital picture includes utilizing one or more of a .NET tool, a .NET application programming interface (API), a Java tool, a Java API, an operating system tool, or an independent tool for modifying instruction sets. In further embodiments, the executing the one or more instruction sets for operating the device correlated with the first digital picture includes utilizing at least one of: a dynamic, an interpreted, or a scripting programming language. In further embodiments, the executing the one or more instruction sets for operating the device correlated with the first digital picture includes utilizing at least one of: a dynamic code, a dynamic class loading, or a reflection. In further embodiments, the executing the one or more instruction sets for operating the device correlated with the first digital picture includes utilizing an assembly language. In further embodiments, the executing the one or more instruction sets for operating the device correlated with the first digital picture includes utilizing at least one of: a metaprogramming, a self-modifying code, or an instruction set modification tool. In further embodiments, the executing the one or more instruction sets for operating the device correlated with the first digital picture includes utilizing at least one of: just in time (JIT) compiling, JIT interpretation, JIT translation, dynamic recompiling, or binary rewriting. In further embodiments, the executing the one or more instruction sets for operating the device correlated with the first digital picture includes utilizing at least one of: a dynamic expression creation, a dynamic expression execution, a dynamic function creation, or a dynamic function execution. In further embodiments, the executing the one or more instruction sets for operating the device correlated with the first digital picture includes adding or inserting additional code into a code of an application. In further embodiments, the executing the one or more instruction sets for operating the device correlated with the first digital picture includes at least one of: modifying, removing, rewriting, or overwriting a code of an application. In further embodiments, the executing the one or more instruction sets for operating the device correlated with the first digital picture includes at least one of: branching, redirecting, extending, or hot swapping a code of an application. The branching or redirecting the code may include inserting at least one of: a branch, a jump, or a means for redirecting an execution. In further embodiments, the executing the one or more instruction sets for operating the device correlated with the first digital picture includes implementing a user's knowledge, style, or methodology of operating the device in a visual surrounding. In further embodiments, the executing the one or more instruction sets for operating the device correlated with the first digital picture includes executing the one or more instruction sets for operating the device correlated with the first digital picture via an interface. The interface may include a modification interface.

In certain embodiments, the one or more operations defined by the one or more instruction sets for operating the device correlated with the first digital picture include at least one of: an operation with or by a smartphone, an operation with or by a fixture, an operation with or by a control device, or an operation with or by a computer or computing enabled device. In further embodiments, the performing the one or more operations defined by the one or more instruction sets for operating the device correlated with the first digital picture includes implementing a user's knowledge, style, or methodology of operating the device in a visual surrounding.

In some embodiments, the instruction sets for operating the device are part of an application for operating the device.

In certain embodiments, the operations of the non-transitory computer storage medium and/or the method further comprise: receiving at least one extra information. In further embodiments, the at least one extra information include one or more of: a time information, a location information, a computed information, an observed information, a sensory information, or a contextual information. In further embodiments, the at least one extra information include one or more of: an information on a digital picture, an information on an object in the digital picture, an information on the device's visual surrounding, an information on an instruction set, an information on an application, an information on an object of the application, an information on a processor circuit, an information on the device, or an information on an user. In further embodiments, the operations of the non-transitory computer storage medium and/or the method further comprise: learning the first digital picture correlated with the at least one extra information. The learning the first digital picture correlated with at least one extra information may include correlating the first digital picture with the at least one extra information. The learning the first digital picture correlated with at least one extra information may include storing the first digital picture correlated with the at least one extra information into a memory unit. In further embodiments, the anticipating the one or more instruction sets for operating the device correlated with the first digital picture based on at least a partial match between the new digital picture and the first digital picture includes anticipating the one or more instruction sets for operating the device correlated with the first digital picture based on at least a partial match between an extra information correlated with the new digital picture and an extra information correlated with the first digital picture. The anticipating the one or more instruction sets for operating the device correlated with the first digital picture based on at least a partial match between an extra information correlated with the new digital picture and an extra information correlated with the first digital picture may include comparing an extra information correlated with the new digital picture and an extra information correlated with the first digital picture. The anticipating the one or more instruction sets for operating the device correlated with the first digital picture based on at least a partial match between an extra information correlated with the new digital picture and an extra information correlated with the first digital picture may include determining that a similarity between an extra information correlated with the new digital picture and an extra information correlated with the first digital picture exceeds a similarity threshold.

In some embodiments, the operations of the non-transitory computer storage medium and/or the method further comprise: presenting, via a user interface, a user with an option to execute the one or more instruction sets for operating the device correlated with the first digital picture.

In certain embodiments, the operations of the non-transitory computer storage medium and/or the method further comprise: receiving, via a user interface, a user's selection to execute the one or more instruction sets for operating the device correlated with the first digital picture.

In some embodiments, the operations of the non-transitory computer storage medium and/or the method further comprise: rating the executed one or more instruction sets for operating the device correlated with the first digital picture. The rating the executed one or more instruction sets for operating the device correlated with the first digital picture may include displaying, on a display, the executed one or more instruction sets for operating the device correlated with the first digital picture along with one or more rating values as options to be selected by a user. The rating the executed one or more instruction sets for operating the device correlated with the first digital picture may include rating the executed one or more instruction sets for operating the device correlated with the first digital picture without a user input. The rating the executed one or more instruction sets for operating the device correlated with the first digital picture may include associating one or more rating values with the executed one or more instruction sets for operating the device correlated with the first digital picture and storing the one or more rating values into a memory unit.

In certain embodiments, the operations of the non-transitory computer storage medium and/or the method further comprise: presenting, via a user interface, a user with an option to cancel the execution of the executed one or more instruction sets for operating the device correlated with the first digital picture. In further embodiments, the canceling the execution of the executed one or more instruction sets for operating the device correlated with the first digital picture includes restoring a processor circuit or the device to a prior state. The restoring the processor circuit or the device to a prior state may include saving the state of the processor circuit or the device prior to executing the one or more instruction sets for operating the device correlated with the first digital picture.

In some embodiments, the operations of the non-transitory computer storage medium and/or the method further comprise: receiving, via an input device, a user's operating directions, the user's operating directions for instructing a processor circuit on how to operate the device.

In certain embodiments, the operations of the non-transitory computer storage medium and/or the method further comprise: receiving a second digital picture from the picture capturing apparatus; receiving additional one or more instruction sets for operating the device; and learning the second digital picture correlated with the additional one or more instruction sets for operating the device. In further embodiments, the second digital picture includes a second stream of digital pictures. In further embodiments, the learning the first digital picture correlated with the one or more instruction sets for operating the device and the learning the second digital picture correlated with the additional one or more instruction sets for operating the device include creating a connection between the first digital picture correlated with the one or more instruction sets for operating the device and the second digital picture correlated with the additional one or more instruction sets for operating the device. The connection may include or is associated with at least one of: an occurrence count, a weight, a parameter, or a data. In further embodiments, the learning the first digital picture correlated with the one or more instruction sets for operating the device and the learning the second digital picture correlated with the additional one or more instruction sets for operating the device include updating a connection between the first digital picture correlated with the one or more instruction sets for operating the device and the second digital picture correlated with the additional one or more instruction sets for operating the device. The updating the connection between the first digital picture correlated with the one or more instruction sets for operating the device and the second digital picture correlated with the additional one or more instruction sets for operating the device may include updating at least one of: an occurrence count, a weight, a parameter, or a data included in or associated with the connection. In further embodiments, the learning the first digital picture correlated with the one or more instruction sets for operating the device includes storing the first digital picture correlated with the one or more instruction sets for operating the device into a first node of a data structure, and wherein the learning the second digital picture correlated with the additional one or more instruction sets for operating the device may include storing the second digital picture correlated with the additional one or more instruction sets for operating the device into a second node of the data structure. The data structure may include a neural network, a graph, a collection of sequences, a sequence, a collection of knowledge cells, a knowledgebase, or a knowledge structure. The learning the first digital picture correlated with the one or more instruction sets for operating the device and the learning the second digital picture correlated with the additional one or more instruction sets for operating the device may include creating a connection between the first node and the second node. The learning the first digital picture correlated with the one or more instruction sets for operating the device and the learning the second digital picture correlated with the additional one or more instruction sets for operating the device may include updating a connection between the first node and the second node. In further embodiments, the first digital picture correlated with the one or more instruction sets for operating the device is stored into a first node of a neural network and the second digital picture correlated with the additional one or more instruction sets for operating the device is stored into a second node of the neural network. The first node and the second node may be connected by a connection. The first node may be part of a first layer of the neural network and the second node may be part of a second layer of the neural network. In further embodiments, the first digital picture correlated with the one or more instruction sets for operating the device is stored into a first node of a graph and the second digital picture correlated with the additional one or more instruction sets for operating the device is stored into a second node of the graph. The first node and the second node may be connected by a connection. In further embodiments, the first digital picture correlated with the one or more instruction sets for operating the device is stored into a first node of a sequence and the second digital picture correlated with the additional one or more instruction sets for operating the device is stored into a second node of the sequence.

In some aspects, the disclosure relates to a system for learning a visual surrounding for autonomous device operating. The system may be implemented at least in part on one or more computing devices. In some embodiments, the system comprises a processor circuit configured to execute instruction sets for operating a device. The system may further include a memory unit configured to store data. The system may further include a picture capturing apparatus configured to capture digital pictures. The system may further include an artificial intelligence unit. In some embodiments, the artificial intelligence unit may be configured to: receive a first digital picture from the picture capturing apparatus. The artificial intelligence unit may be further configured to: receive one or more instruction sets for operating the device from the processor circuit. The artificial intelligence unit may be further configured to: learn the first digital picture correlated with the one or more instruction sets for operating the device.

In some aspects, the disclosure relates to a non-transitory computer storage medium having a computer program stored thereon, the program including instructions that when executed by one or more processor circuits cause the one or more processor circuits to perform operations comprising: receiving a first digital picture from a picture capturing apparatus. The operations may further include: receiving one or more instruction sets for operating a device. The operations may further include: learning the first digital picture correlated with the one or more instruction sets for operating the device.

In some aspects, the disclosure relates to a method comprising: (a) receiving a first digital picture from a picture capturing apparatus by one or more processor circuits. The method may further include: (b) receiving one or more instruction sets for operating a device by the one or more processor circuits. The method may further include: (c) learning the first digital picture correlated with the one or more instruction sets for operating the device, the learning of (c) performed by the one or more processor circuits.

The operations or steps of the non-transitory computer storage medium and/or the method may be performed by any of the elements of the above described systems as applicable. The non-transitory computer storage medium and/or the method may include any of the operations, steps, and embodiments of the above described systems as applicable.

In some aspects, the disclosure relates to a system for using a visual surrounding for autonomous device operating. The system may be implemented at least in part on one or more computing devices. In some embodiments, the system comprises a processor circuit configured to execute instruction sets for operating a device. The system may further include a memory unit configured to store data. The system may further include a picture capturing apparatus configured to capture digital pictures. The system may further include an artificial intelligence unit. In some embodiments, the artificial intelligence unit may be configured to: access the memory unit that stores a plurality of digital pictures correlated with one or more instruction sets for operating the device, the plurality including a first digital picture correlated with one or more instruction sets for operating the device. The artificial intelligence unit may be further configured to: receive a new digital picture from the picture capturing apparatus. The artificial intelligence unit may be further configured to: anticipate the one or more instruction sets for operating the device correlated with the first digital picture based on at least a partial match between the new digital picture and the first digital picture. The artificial intelligence unit may be further configured to: cause the processor circuit to execute the one or more instruction sets for operating the device correlated with the first digital picture, the executing performed in response to the anticipating of the artificial intelligence unit, wherein the device performs one or more operations defined by the one or more instruction sets for operating the device correlated with the first digital picture, the one or more operations performed in response to the executing by the processor circuit.

In some aspects, the disclosure relates to a non-transitory computer storage medium having a computer program stored thereon, the program including instructions that when executed by one or more processor circuits cause the one or more processor circuits to perform operations comprising: accessing a memory unit that stores a plurality of digital pictures correlated with one or more instruction sets for operating a device, the plurality including a first digital picture correlated with one or more instruction sets for operating the device. The operations may further include: receiving a new digital picture from a picture capturing apparatus. The operations may further include: anticipating the one or more instruction sets for operating the device correlated with the first digital picture based on at least a partial match between the new digital picture and the first digital picture. The operations may further include: causing an execution of the one or more instruction sets for operating the device correlated with the first digital picture, the causing performed in response to the anticipating the one or more instruction sets for operating the device correlated with the first digital picture based on at least a partial match between the new digital picture and the first digital picture, wherein the device performs one or more operations defined by the one or more instruction sets for operating the device correlated with the first digital picture, the one or more operations performed in response to the executing.

In some aspects, the disclosure relates to a method comprising: (a) accessing a memory unit that stores a plurality of digital pictures correlated with one or more instruction sets for operating a device, the plurality including a first digital picture correlated with one or more instruction sets for operating the device, the accessing of (a) performed by the one or more processor circuits. The method may further include: (b) receiving a new digital picture from a picture capturing apparatus by the one or more processor circuits. The method may further include: (c) anticipating the one or more instruction sets for operating the device correlated with the first digital picture based on at least a partial match between the new digital picture and the first digital picture, the anticipating of (c) performed by the one or more processor circuits. The method may further include: (d) executing the one or more instruction sets for operating the device correlated with the first digital picture, the executing of (d) performed in response to the anticipating of (c). The method may further include: (e) performing, by the device, one or more operations defined by the one or more instruction sets for operating the device correlated with the first digital picture, the one or more operations performed in response to the executing of (d).

The operations or steps of the non-transitory computer storage medium and/or the method may be performed by any of the elements of the above described systems as applicable. The non-transitory computer storage medium and/or the method may include any of the operations, steps, and embodiments of the above described systems as applicable.

In some aspects, the disclosure relates to a system for learning and using a visual surrounding for autonomous device operating. The system may be implemented at least in part on one or more computing devices. In some embodiments, the system comprises a processor circuit configured to execute instruction sets for operating a device. The system may further include a memory unit configured to store data. The system may further include a picture capturing apparatus configured to capture digital pictures. The system may further include an artificial intelligence. In some embodiments, the artificial intelligence unit may be configured to: receive a first stream of digital pictures from the picture capturing apparatus. The artificial intelligence unit may be further configured to: receive one or more instruction sets for operating the device from the processor circuit. The artificial intelligence unit may be further configured to: learn the first stream of digital pictures correlated with the one or more instruction sets for operating the device. The artificial intelligence unit may be further configured to: receive a new stream of digital pictures from the picture capturing apparatus. The artificial intelligence unit may be further configured to: anticipate the one or more instruction sets for operating the device correlated with the first stream of digital pictures based on at least a partial match between the new stream of digital pictures and the first stream of digital pictures. The artificial intelligence unit may be further configured to: cause the processor circuit to execute the one or more instruction sets for operating the device correlated with the first stream of digital pictures, the executing performed in response to the anticipating of the artificial intelligence unit, wherein the device performs one or more operations defined by the one or more instruction sets for operating the device correlated with the first stream of digital pictures, the one or more operations performed in response to the executing by the processor circuit.

In certain embodiments, the first stream of digital pictures includes one or more digital pictures. In further embodiments, the new stream of digital pictures includes one or more digital pictures. In further embodiments, the first and the new streams of digital pictures portray the device's surrounding. In further embodiments, the first and the new streams of digital pictures portray a remote device's surrounding. In further embodiments, the first or the new stream of digital pictures includes a digital motion picture. The digital motion picture may include a MPEG motion picture, an AVI motion picture, a FLV motion picture, a MOV motion picture, a RM motion picture, a SWF motion picture, a WMV motion picture, a DivX motion picture, or a digitally encoded motion picture. In further embodiments, the first stream of digital pictures includes a comparative stream of digital pictures whose at least one portion can be used for comparisons with at least one portion of streams of digital pictures subsequent to the first stream of digital pictures, the streams of digital pictures subsequent to the first stream of digital pictures comprising the new stream of digital pictures. In further embodiments, the first stream of digital pictures includes a comparative stream of digital pictures that can be used for comparisons with the new stream of digital pictures. In further embodiments, the new stream of digital pictures includes an anticipatory stream of digital pictures whose correlated one or more instruction sets can be used for anticipation of one or more instruction sets to be executed by the processor circuit.

In some embodiments, the first stream of digital pictures correlated with the one or more instruction sets for operating the device includes a unit of knowledge of how the device operated in a visual surrounding. In further embodiments, the first stream of digital pictures correlated with the one or more instruction sets for operating the device is included in a neuron, a node, a vertex, or an element of a data structure. In further embodiments, the data structure includes a neural network, a graph, a collection of sequences, a sequence, a collection of knowledge cells, a knowledgebase, or a knowledge structure. Some of the neurons, nodes, vertices, or elements may be interconnected. In further embodiments, the first stream of digital pictures correlated with the one or more instruction sets for operating the device is structured into a knowledge cell. In further embodiments, the knowledge cell includes a unit of knowledge of how the device operated in a visual surrounding. In further embodiments, the knowledge cell is included in a neuron, a node, a vertex, or an element of a data structure. The data structure may include a neural network, a graph, a collection of sequences, a sequence, a collection of knowledge cells, a knowledgebase, or a knowledge structure. Some of the neurons, nodes, vertices, or elements may be interconnected.

In certain embodiments, the learning the first stream of digital pictures correlated with the one or more instruction sets for operating the device includes correlating the first stream of digital pictures with the one or more instruction sets for operating the device. The correlating the first stream of digital pictures with the one or more instruction sets for operating the device may include generating a knowledge cell, the knowledge cell comprising the first stream of digital pictures correlated with the one or more instruction sets for operating the device. The correlating the first stream of digital pictures with the one or more instruction sets for operating the device may include structuring a unit of knowledge of how the device operated in a visual surrounding. In further embodiments, the learning the first stream of digital pictures correlated with the one or more instruction sets for operating the device includes learning a user's knowledge, style, or methodology of operating the device in a visual surrounding. In further embodiments, the learning the first stream of digital pictures correlated with the one or more instruction sets for operating the device includes spontaneous learning the first stream of digital pictures correlated with the one or more instruction sets for operating the device.

In some embodiments, the learning the first stream of digital pictures correlated with the one or more instruction sets for operating the device includes storing, into the memory unit, the first stream of digital pictures correlated with the one or more instruction sets for operating the device, the first stream of digital pictures correlated with the one or more instruction sets for operating the device being part of a stored plurality of streams of digital pictures correlated with one or more instruction sets for operating the device. In further embodiments, the plurality of streams of digital pictures correlated with one or more instruction sets for operating the device include a neural network, a graph, a collection of sequences, a sequence, a collection of knowledge cells, a knowledgebase, a knowledge structure, or a data structure. In further embodiments, the plurality of streams of digital pictures correlated with one or more instruction sets for operating the device are organized into a neural network, a graph, a collection of sequences, a sequence, a collection of knowledge cells, a knowledgebase, a knowledge structure, or a data structure. In further embodiments, each of the plurality of streams of digital pictures correlated with one or more instruction sets for operating the device is included in a neuron, a node, a vertex, or an element of a data structure. The data structure may include a neural network, a graph, a collection of sequences, a sequence, a collection of knowledge cells, a knowledgebase, or a knowledge structure. Some of the neurons, nodes, vertices, or elements may be interconnected. In further embodiments, the plurality of streams of digital pictures correlated with one or more instruction sets for operating the device include a user's knowledge, style, or methodology of operating the device in visual surroundings. In further embodiments, the plurality of streams of digital pictures correlated with one or more instruction sets for operating the device are stored on a remote computing device. In further embodiments, the plurality of streams of digital pictures correlated with one or more instruction sets for operating the device include an artificial intelligence system for knowledge structuring, storing, or representation. The artificial intelligence system for knowledge structuring, storing, or representation may include at least one of: a deep learning system, a supervised learning system, an unsupervised learning system, a neural network, a search-based system, an optimization-based system, a logic-based system, a fuzzy logic-based system, a tree-based system, a graph-based system, a hierarchical system, a symbolic system, a sub-symbolic system, an evolutionary system, a genetic system, a multi-agent system, a deterministic system, a probabilistic system, or a statistical system.

In some embodiments, the anticipating the one or more instruction sets for operating the device correlated with the first stream of digital pictures based on at least a partial match between the new stream of digital pictures and the first stream of digital pictures includes comparing at least one portion of the new stream of digital pictures with at least one portion of the first stream of digital pictures. The at least one portion of the new stream of digital pictures may include at least one digital picture, at least one region, at least one feature, or at least one pixel of the new stream of digital pictures. The at least one portion of the first stream of digital pictures may include at least one digital picture, at least one region, at least one feature, or at least one pixel of the first stream of digital pictures. The comparing the at least one portion of the new stream of digital pictures with the at least one portion of the first stream of digital pictures may include comparing at least one digital picture of the new stream of digital pictures with at least one digital picture of the first stream of digital pictures. The at least one portion of the new stream of digital pictures with the at least one portion of the first stream of digital pictures may include comparing at least one region of at least one digital picture of the new stream of digital pictures with at least one region of at least one digital picture of the first stream of digital pictures. The comparing the at least one portion of the new stream of digital pictures with the at least one portion of the first stream of digital pictures may include comparing at least one feature of at least one digital picture of the new stream of digital pictures with at least one feature of at least one digital picture of the first stream of digital pictures. The comparing the at least one portion of the new stream of digital pictures with the at least one portion of the first stream of digital pictures may include comparing at least one pixel of at least one digital picture of the new stream of digital pictures with at least one pixel of at least one digital picture of the first stream of digital pictures. The comparing the at least one portion of the new stream of digital pictures with the at least one portion of the first stream of digital pictures may include at least one of: performing a color adjustment, performing a size adjustment, performing a content manipulation, performing temporal alignment, performing dynamic time warping, utilizing a transparency, or utilizing a mask on the new or the first stream of digital pictures. The comparing the at least one portion of the new stream of digital pictures with the at least one portion of the first stream of digital pictures may include recognizing at least one person or object in the new stream of digital pictures and at least one person or object in the first stream of digital pictures, and comparing the at least one person or object from the new stream of digital pictures with the at least one person or object from the first stream of digital pictures.

In certain embodiments, the anticipating the one or more instruction sets for operating the device correlated with the first stream of digital pictures based on at least a partial match between the new stream of digital pictures and the first stream of digital pictures includes determining that there is at least a partial match between the new stream of digital pictures and the first stream of digital pictures. In further embodiments, the determining that there is at least a partial match between the new stream of digital pictures and the first stream of digital pictures includes determining that there is at least a partial match between one or more portions of the new stream of digital pictures and one or more portions of the first stream of digital pictures. In further embodiments, the determining that there is at least a partial match between the new stream of digital pictures and the first stream of digital pictures includes determining that a similarity between at least one portion of the new stream of digital pictures and at least one portion of the first stream of digital pictures exceeds a similarity threshold. In further embodiments, the determining that there is at least a partial match between the new stream of digital pictures and the first stream of digital pictures includes determining a substantial similarity between at least one portion of the new stream of digital pictures and at least one portion of the first stream of digital pictures. The at least one portion of the new stream of digital pictures may include at least one digital picture, at least one region, at least one feature, or at least one pixel of the new stream of digital pictures. The at least one portion of the first stream of digital pictures may include at least one digital picture, at least one region, at least one feature, or at least one pixel of the first stream of digital pictures. The substantial similarity may be achieved when a similarity between the at least one portion of the new stream of digital pictures and the at least one portion of the first stream of digital pictures exceeds a similarity threshold. The substantial similarity may be achieved when a number or a percentage of matching or partially matching digital pictures from the new stream of digital pictures and from the first stream of digital pictures exceeds a threshold number or threshold percentage. The substantial similarity may be achieved when a number or a percentage of matching or partially matching regions of at least one digital picture from the new stream of digital pictures and from the first stream of digital pictures exceeds a threshold number or threshold percentage. The substantial similarity may be achieved when a number or a percentage of matching or partially matching features of at least one digital picture from the new stream of digital pictures and from the first stream of digital pictures exceeds a threshold number or threshold percentage. The substantial similarity may be achieved when a number or a percentage of matching or partially matching pixels of at least one digital picture from the new stream of digital pictures and from the first stream of digital pictures exceeds a threshold number or threshold percentage. The substantial similarity may be achieved when one or more same or similar objects are recognized in the new stream of digital pictures and the first stream of digital pictures. In further embodiments, the determining that there is at least a partial match between the new stream of digital pictures and the first stream of digital pictures includes determining that a number or a percentage of matching digital pictures from the new stream of digital pictures and from the first stream of digital pictures exceeds a threshold number or threshold percentage. The matching digital pictures from the new stream of digital pictures and from the first stream of digital pictures may be determined factoring in at least one of: an order of a digital picture in a stream of digital pictures, an importance of a digital picture, a threshold for a similarity in a digital picture, or a threshold for a difference in a digital picture. In further embodiments, the determining that there is at least a partial match between the new stream of digital pictures and the first stream of digital pictures includes determining that a number or a percentage of matching regions from at least one digital picture of the new stream of digital pictures and from at least one digital picture of the first stream of digital pictures exceeds a threshold number or threshold percentage. The matching regions from at least one digital picture of the new stream of digital pictures and from at least one digital picture of the first stream of digital pictures may be determined factoring in at least one of: a location of a region, an importance of a region, a threshold for a similarity in a region, or a threshold for a difference in a region. In further embodiments, the determining that there is at least a partial match between the new stream of digital pictures and the first stream of digital pictures includes determining that a number or a percentage of matching features from at least one digital picture of the new stream of digital pictures and from at least one digital picture of the first stream of digital pictures exceeds a threshold number or threshold percentage. The matching features from at least one digital picture of the new stream of digital pictures and from at least one digital picture of the first stream of digital pictures may be determined factoring in at least one of: a type of a feature, an importance of a feature, a location of a feature, a threshold for a similarity in a feature, or a threshold for a difference in a feature. In further embodiments, the determining that there is at least a partial match between the new stream of digital pictures and the first stream of digital pictures includes determining that a number or a percentage of matching pixels from at least one digital picture of the new stream of digital pictures and from at least one digital picture of the first stream of digital pictures exceeds a threshold number or threshold percentage. The matching pixels from at least one digital picture of the new stream of digital pictures and from at least one digital picture of the first stream of digital pictures may be determined factoring in at least one of: a location of a pixel, a threshold for a similarity in a pixel, or a threshold for a difference in a pixel. In further embodiments, the determining that there is at least a partial match between the new stream of digital pictures and the first stream of digital pictures includes recognizing a same person or object in the new and the first streams of digital pictures.

In certain embodiments, the causing the processor circuit to execute the one or more instruction sets for operating the device correlated with the first stream of digital pictures includes causing the processor circuit to execute the one or more instruction sets for operating the device correlated with the first stream of digital pictures instead of or prior to an instruction set that would have been executed next. In further embodiments, the causing the processor circuit to execute the one or more instruction sets for operating the device correlated with the first stream of digital pictures includes modifying one or more instruction sets of the processor circuit. In further embodiments, the causing the processor circuit to execute the one or more instruction sets for operating the device correlated with the first stream of digital pictures includes modifying a register or an element of the processor circuit. In further embodiments, the causing the processor circuit to execute the one or more instruction sets for operating the device correlated with the first stream of digital pictures includes inserting the one or more instruction sets for operating the device correlated with the first stream of digital pictures into a register or an element of the processor circuit. In further embodiments, the causing the processor circuit to execute the one or more instruction sets for operating the device correlated with the first stream of digital pictures includes redirecting the processor circuit to the one or more instruction sets for operating the device correlated with the first stream of digital pictures. In further embodiments, the causing the processor circuit to execute the one or more instruction sets for operating the device correlated with the first stream of digital pictures includes redirecting the processor circuit to one or more alternate instruction sets, the alternate instruction sets comprising the one or more instruction sets for operating the device correlated with the first stream of digital pictures. In further embodiments, the causing the processor circuit to execute the one or more instruction sets for operating the device correlated with the first stream of digital pictures includes transmitting, to the processor circuit for execution, the one or more instruction sets for operating the device correlated with the first stream of digital pictures. In further embodiments, the executing the one or more instruction sets for operating the device correlated with the first stream of digital pictures includes issuing an interrupt to the processor circuit and executing the one or more instruction sets for operating the device correlated with the first stream of digital pictures following the interrupt. In further embodiments, the causing the processor circuit to execute the one or more instruction sets for operating the device correlated with the first stream of digital pictures includes modifying an element that is part of, operating on, or coupled to the processor circuit.

In some embodiments, the processor circuit includes a logic circuit, and wherein the causing the processor circuit to execute the one or more instruction sets for operating the device correlated with the first stream of digital pictures includes causing the logic circuit to execute the one or more instruction sets for operating the device correlated with the first stream of digital pictures. The logic circuit may include a microcontroller. The causing the logic circuit to execute the one or more instruction sets for operating the device correlated with the first stream of digital pictures may include modifying an element of the logic circuit. The causing the logic circuit to execute the one or more instruction sets for operating the device correlated with the first stream of digital pictures may include inserting the one or more instruction sets for operating the device correlated with the first stream of digital pictures into an element of the logic circuit. The causing the logic circuit to execute the one or more instruction sets for operating the device correlated with the first stream of digital pictures may include redirecting the logic circuit to the one or more instruction sets for operating the device correlated with the first stream of digital pictures. The causing the logic circuit to execute the one or more instruction sets for operating the device correlated with the first stream of digital pictures may include replacing inputs into the logic circuit with the one or more instruction sets for operating the device correlated with the first stream of digital pictures. The causing the logic circuit to execute the one or more instruction sets for operating the device correlated with the first stream of digital pictures may include replacing outputs from the logic circuit with the one or more instruction sets for operating the device correlated with the first stream of digital pictures.

In certain embodiments, the causing the processor circuit to execute the one or more instruction sets for operating the device correlated with the first stream of digital pictures includes causing an application for operating the device to execute the one or more instruction sets for operating the device correlated with the first stream of digital pictures, the application running on the processor circuit.

In some embodiments, the system further comprises: an application including instruction sets for operating the device, the application running on the processor circuit, wherein the causing the processor circuit to execute the one or more instruction sets for operating the device correlated with the first stream of digital pictures includes modifying the application.

In certain embodiments, the causing the processor circuit to execute the one or more instruction sets for operating the device correlated with the first stream of digital pictures includes redirecting an application to the one or more instruction sets for operating the device correlated with the first stream of digital pictures, the application running on the processor circuit. In further embodiments, the causing the processor circuit to execute the one or more instruction sets for operating the device correlated with the first stream of digital pictures includes redirecting an application to one or more alternate instruction sets, the application running on the processor circuit, the alternate instruction sets comprising the one or more instruction sets for operating the device correlated with the first stream of digital pictures. In further embodiments, the causing the processor circuit to execute the one or more instruction sets for operating the device correlated with the first stream of digital pictures includes modifying one or more instruction sets of an application, the application running on the processor circuit. In further embodiments, the causing the processor circuit to execute the one or more instruction sets for operating the device correlated with the first stream of digital pictures includes modifying a source code, a bytecode, an intermediate code, a compiled code, an interpreted code, a translated code, a runtime code, an assembly code, or a machine code. In further embodiments, the causing the processor circuit to execute the one or more instruction sets for operating the device correlated with the first stream of digital pictures includes modifying at least one of: the memory unit, a register of the processor circuit, a storage, or a repository where instruction sets are stored or used. In further embodiments, the causing the processor circuit to execute the one or more instruction sets for operating the device correlated with the first stream of digital pictures includes modifying one or more instruction sets for operating an application or an object of the application, the application running on the processor circuit. In further embodiments, the causing the processor circuit to execute the one or more instruction sets for operating the device correlated with the first stream of digital pictures includes modifying at least one of: an element of the processor circuit, an element of the device, a virtual machine, a runtime engine, an operating system, an execution stack, a program counter, or a user input. In further embodiments, the causing the processor circuit to execute the one or more instruction sets for operating the device correlated with the first stream of digital pictures includes modifying one or more instruction sets at a source code write time, a compile time, an interpretation time, a translation time, a linking time, a loading time, or a runtime. In further embodiments, the causing the processor circuit to execute the one or more instruction sets for operating the device correlated with the first stream of digital pictures includes modifying one or more code segments, lines of code, statements, instructions, functions, routines, subroutines, or basic blocks. In further embodiments, the causing the processor circuit to execute the one or more instruction sets for operating the device correlated with the first stream of digital pictures includes a manual, an automatic, a dynamic, or a just in time (JIT) instrumentation of an application, the application running on the processor circuit. In further embodiments, the causing the processor circuit to execute the one or more instruction sets for operating the device correlated with the first stream of digital pictures includes utilizing one or more of a .NET tool, a .NET application programming interface (API), a Java tool, a Java API, an operating system tool, or an independent tool for modifying instruction sets. In further embodiments, the causing the processor circuit to execute the one or more instruction sets for operating the device correlated with the first stream of digital pictures includes utilizing at least one of: a dynamic, an interpreted, or a scripting programming language. In further embodiments, the causing the processor circuit to execute the one or more instruction sets for operating the device correlated with the first stream of digital pictures includes utilizing at least one of: a dynamic code, a dynamic class loading, or a reflection. In further embodiments, the causing the processor circuit to execute the one or more instruction sets for operating the device correlated with the first stream of digital pictures includes utilizing an assembly language. In further embodiments, the causing the processor circuit to execute the one or more instruction sets for operating the device correlated with the first stream of digital pictures includes utilizing at least one of: a metaprogramming, a self-modifying code, or an instruction set modification tool. In further embodiments, the causing the processor circuit to execute the one or more instruction sets for operating the device correlated with the first stream of digital pictures includes utilizing at least one of: just in time (JIT) compiling, JIT interpretation, JIT translation, dynamic recompiling, or binary rewriting. In further embodiments, the causing the processor circuit to execute the one or more instruction sets for operating the device correlated with the first stream of digital pictures includes utilizing at least one of: a dynamic expression creation, a dynamic expression execution, a dynamic function creation, or a dynamic function execution. In further embodiments, the causing the processor circuit to execute the one or more instruction sets for operating the device correlated with the first stream of digital pictures includes adding or inserting additional code into a code of an application, the application running on the processor circuit. In further embodiments, the causing the processor circuit to execute the one or more instruction sets for operating the device correlated with the first stream of digital pictures includes at least one of: modifying, removing, rewriting, or overwriting a code of an application, the application running on the processor circuit. In further embodiments, the causing the processor circuit to execute the one or more instruction sets for operating the device correlated with the first stream of digital pictures includes at least one of: branching, redirecting, extending, or hot swapping a code of an application, the application running on the processor circuit. The branching or redirecting the code may include inserting at least one of: a branch, a jump, or a means for redirecting an execution.

In some embodiments, the executing the one or more instruction sets for operating the device correlated with the first stream of digital pictures includes implementing a user's knowledge, style, or methodology of operating the device in a visual surrounding.

In certain embodiments, the system further comprises: an interface configured to cause execution of instruction sets, wherein the executing the one or more instruction sets for operating the device correlated with the first stream of digital pictures is caused by the interface. The interface may include a modification interface.

In some embodiments, the artificial intelligence unit is further configured to: receive at least one extra information. In further embodiments, the at least one extra information include one or more of: an information on a stream of digital pictures, an information on an object in the stream of digital pictures, an information on the device's visual surrounding, an information on an instruction set, an information on an application, an information on an object of the application, an information on the processor circuit, an information on the device, or an information on an user. In further embodiments, the artificial intelligence unit is further configured to: learn the first stream of digital pictures correlated with the at least one extra information. The learning the first stream of digital pictures correlated with at least one extra information may include correlating the first stream of digital pictures with the at least one extra information. The learning the first stream of digital pictures correlated with at least one extra information may include storing the first stream of digital pictures correlated with the at least one extra information into the memory unit. In further embodiments, the anticipating the one or more instruction sets for operating the device correlated with the first stream of digital pictures based on at least a partial match between the new stream of digital pictures and the first stream of digital pictures includes anticipating the one or more instruction sets for operating the device correlated with the first stream of digital pictures based on at least a partial match between an extra information correlated with the new stream of digital pictures and an extra information correlated with the first stream of digital pictures. The anticipating the one or more instruction sets for operating the device correlated with the first stream of digital pictures based on at least a partial match between an extra information correlated with the new stream of digital pictures and an extra information correlated with the first stream of digital pictures may include comparing an extra information correlated with the new stream of digital pictures and an extra information correlated with the first stream of digital pictures. The anticipating the one or more instruction sets for operating the device correlated with the first stream of digital pictures based on at least a partial match between an extra information correlated with the new stream of digital pictures and an extra information correlated with the first stream of digital pictures may include determining that a similarity between an extra information correlated with the new stream of digital pictures and an extra information correlated with the first stream of digital pictures exceeds a similarity threshold.

In certain embodiments, the artificial intelligence unit is further configured to: receive a second stream of digital pictures from the picture capturing apparatus; receive additional one or more instruction sets for operating the device from the processor circuit; and learn the second stream of digital pictures correlated with the additional one or more instruction sets for operating the device. In further embodiments, the learning the first stream of digital pictures correlated with the one or more instruction sets for operating the device and the learning the second stream of digital pictures correlated with the additional one or more instruction sets for operating the device include creating a connection between the first stream of digital pictures correlated with the one or more instruction sets for operating the device and the second stream of digital pictures correlated with the additional one or more instruction sets for operating the device. The connection includes or is associated with at least one of: an occurrence count, a weight, a parameter, or a data. In further embodiments, the learning the first stream of digital pictures correlated with the one or more instruction sets for operating the device and the learning the second stream of digital pictures correlated with the additional one or more instruction sets for operating the device include updating a connection between the first stream of digital pictures correlated with the one or more instruction sets for operating the device and the second stream of digital pictures correlated with the additional one or more instruction sets for operating the device. The updating the connection between the first stream of digital pictures correlated with the one or more instruction sets for operating the device and the second stream of digital pictures correlated with the additional one or more instruction sets for operating the device may include updating at least one of: an occurrence count, a weight, a parameter, or a data included in or associated with the connection. In further embodiments, the learning the first stream of digital pictures correlated with the one or more instruction sets for operating the device includes storing the first stream of digital pictures correlated with the one or more instruction sets for operating the device into a first node of a data structure, and wherein the learning the second stream of digital pictures correlated with the additional one or more instruction sets for operating the device includes storing the second stream of digital pictures correlated with the additional one or more instruction sets for operating the device into a second node of the data structure. The data structure may include a neural network, a graph, a collection of sequences, a sequence, a collection of knowledge cells, a knowledgebase, or a knowledge structure. The learning the first stream of digital pictures correlated with the one or more instruction sets for operating the device and the learning the second stream of digital pictures correlated with the additional one or more instruction sets for operating the device may include creating a connection between the first node and the second node. The learning the first stream of digital pictures correlated with the one or more instruction sets for operating the device and the learning the second stream of digital pictures correlated with the additional one or more instruction sets for operating the device may include updating a connection between the first node and the second node. In further embodiments, the first stream of digital pictures correlated with the one or more instruction sets for operating the device is stored into a first node of a neural network and the second stream of digital pictures correlated with the additional one or more instruction sets for operating the device is stored into a second node of the neural network. The first node and the second node may be connected by a connection. The first node may be part of a first layer of the neural network and the second node may be part of a second layer of the neural network. In further embodiments, the first stream of digital pictures correlated with the one or more instruction sets for operating the device is stored into a first node of a graph and the second stream of digital pictures correlated with the additional one or more instruction sets for operating the device is stored into a second node of the graph. The first node and the second node may be connected by a connection. In further embodiments, the first stream of digital pictures correlated with the one or more instruction sets for operating the device is stored into a first node of a sequence and the second stream of digital pictures correlated with the additional one or more instruction sets for operating the device is stored into a second node of the sequence.

In some aspects, the disclosure relates to a non-transitory computer storage medium having a computer program stored thereon, the program including instructions that when executed by one or more processor circuits cause the one or more processor circuits to perform operations comprising: receiving a first stream of digital pictures from a picture capturing apparatus. The operations may further include: receiving one or more instruction sets for operating a device. The operations may further include: learning the first stream of digital pictures correlated with the one or more instruction sets for operating the device. The operations may further include: receiving a new stream of digital pictures from the picture capturing apparatus. The operations may further include: anticipating the one or more instruction sets for operating the device correlated with the first stream of digital pictures based on at least a partial match between the new stream of digital pictures and the first stream of digital pictures. The operations may further include: causing an execution of the one or more instruction sets for operating the device correlated with the first stream of digital pictures, the causing performed in response to the anticipating the one or more instruction sets for operating the device correlated with the first stream of digital pictures based on at least a partial match between the new stream of digital pictures and the first stream of digital pictures, wherein the device performs one or more operations defined by the one or more instruction sets for operating the device correlated with the first stream of digital pictures, the one or more operations performed in response to the executing.

In some aspects, the disclosure relates to a method comprising: (a) receiving a first stream of digital pictures from a picture capturing apparatus by one or more processor circuits. The method may further include: (b) receiving one or more instruction sets for operating a device by the one or more processor circuits. The method may further include: (c) learning the first stream of digital pictures correlated with the one or more instruction sets for operating the device, the learning of (c) performed by the one or more processor circuits. The method may further include: (d) receiving a new stream of digital pictures from the picture capturing apparatus by the one or more processor circuits. The method may further include: (e) anticipating the one or more instruction sets for operating the device correlated with the first stream of digital pictures based on at least a partial match between the new stream of digital pictures and the first stream of digital pictures, the anticipating of (e) performed by the one or more processor circuits. The method may further include: (f) executing the one or more instruction sets for operating the device correlated with the first stream of digital pictures, the executing of (f) performed in response to the anticipating of (e). The method may further include: (g) performing, by the device, one or more operations defined by the one or more instruction sets for operating the device correlated with the first stream of digital pictures, the one or more operations performed in response to the executing of (f).

The operations or steps of the non-transitory computer storage medium and/or the method may be performed by any of the elements of the above described systems as applicable. The non-transitory computer storage medium and/or the method may include any of the operations, steps, and embodiments of the above described systems as applicable as well as the following embodiments.

In some embodiments, the first stream of digital pictures correlated with the one or more instruction sets for operating the device includes a unit of knowledge of how the device operated in a visual surrounding. In further embodiments, the first stream of digital pictures correlated with the one or more instruction sets for operating the device is included in a neuron, a node, a vertex, or an element of a data structure. The data structure may include a neural network, a graph, a collection of sequences, a sequence, a collection of knowledge cells, a knowledgebase, or a knowledge structure. Some of the neurons, nodes, vertices, or elements may be interconnected. In further embodiments, the first stream of digital pictures correlated with the one or more instruction sets for operating the device is structured into a knowledge cell. In further embodiments, the knowledge cell includes a unit of knowledge of how the device operated in a visual surrounding. In further embodiments, the knowledge cell is included in a neuron, a node, a vertex, or an element of a data structure. The data structure may include a neural network, a graph, a collection of sequences, a sequence, a collection of knowledge cells, a knowledgebase, or a knowledge structure. Some of the neurons, nodes, vertices, or elements may be interconnected.

In certain embodiments, the learning the first stream of digital pictures correlated with the one or more instruction sets for operating the device includes correlating the first stream of digital pictures with the one or more instruction sets for operating the device. The correlating the first stream of digital pictures with the one or more instruction sets for operating the device may include generating a knowledge cell, the knowledge cell comprising the first stream of digital pictures correlated with the one or more instruction sets for operating the device. The correlating the first stream of digital pictures with the one or more instruction sets for operating the device may include structuring a unit of knowledge of how the device operated in a visual surrounding. In further embodiments, the learning the first stream of digital pictures correlated with the one or more instruction sets for operating the device includes learning a user's knowledge, style, or methodology of operating the device in a visual surrounding. In further embodiments, the learning the first stream of digital pictures correlated with the one or more instruction sets for operating the device includes spontaneous learning the first stream of digital pictures correlated with the one or more instruction sets for operating the device.

In some embodiments, the learning the first stream of digital pictures correlated with the one or more instruction sets for operating the device includes storing, into a memory unit, the first stream of digital pictures correlated with the one or more instruction sets for operating the device, the first stream of digital pictures correlated with the one or more instruction sets for operating the device being part of a stored plurality of streams of digital pictures correlated with one or more instruction sets for operating the device. In further embodiments, the plurality of streams of digital pictures correlated with one or more instruction sets for operating the device include a neural network, a graph, a collection of sequences, a sequence, a collection of knowledge cells, a knowledgebase, a knowledge structure, or a data structure. In further embodiments, the plurality of streams of digital pictures correlated with one or more instruction sets for operating the device are organized into a neural network, a graph, a collection of sequences, a sequence, a collection of knowledge cells, a knowledgebase, a knowledge structure, or a data structure. In further embodiments, each of the plurality of streams of digital pictures correlated with one or more instruction sets for operating the device is included in a neuron, a node, a vertex, or an element of a data structure. The data structure may include a neural network, a graph, a collection of sequences, a sequence, a collection of knowledge cells, a knowledgebase, or a knowledge structure. Some of the neurons, nodes, vertices, or elements may be interconnected. In further embodiments, the plurality of streams of digital pictures correlated with one or more instruction sets for operating the device include a user's knowledge, style, or methodology of operating the device in visual surroundings. In further embodiments, the plurality of streams of digital pictures correlated with one or more instruction sets for operating the device are stored on a remote computing device. In further embodiments, the plurality of streams of digital pictures correlated with one or more instruction sets for operating the device include an artificial intelligence system for knowledge structuring, storing, or representation. The artificial intelligence system for knowledge structuring, storing, or representation may include at least one of: a deep learning system, a supervised learning system, an unsupervised learning system, a neural network, a search-based system, an optimization-based system, a logic-based system, a fuzzy logic-based system, a tree-based system, a graph-based system, a hierarchical system, a symbolic system, a sub-symbolic system, an evolutionary system, a genetic system, a multi-agent system, a deterministic system, a probabilistic system, or a statistical system.

In further embodiments, the anticipating the one or more instruction sets for operating the device correlated with the first stream of digital pictures based on at least a partial match between the new stream of digital pictures and the first stream of digital pictures includes comparing at least one portion of the new stream of digital pictures with at least one portion of the first stream of digital pictures. The at least one portion of the new stream of digital pictures may include at least one digital picture, at least one region, at least one feature, or at least one pixel of the new stream of digital pictures. The at least one portion of the first stream of digital pictures may include at least one digital picture, at least one region, at least one feature, or at least one pixel of the first stream of digital pictures. The comparing the at least one portion of the new stream of digital pictures with the at least one portion of the first stream of digital pictures may include comparing at least one digital picture of the new stream of digital pictures with at least one digital picture of the first stream of digital pictures. The comparing the at least one portion of the new stream of digital pictures with the at least one portion of the first stream of digital pictures may include comparing at least one region of at least one digital picture of the new stream of digital pictures with at least one region of at least one digital picture of the first stream of digital pictures. The comparing the at least one portion of the new stream of digital pictures with the at least one portion of the first stream of digital pictures may include comparing at least one feature of at least one digital picture of the new stream of digital pictures with at least one feature of at least one digital picture of the first stream of digital pictures. The comparing the at least one portion of the new stream of digital pictures with the at least one portion of the first stream of digital pictures may include comparing at least one pixel of at least one digital picture of the new stream of digital pictures with at least one pixel of at least one digital picture of the first stream of digital pictures. The comparing the at least one portion of the new stream of digital pictures with the at least one portion of the first stream of digital pictures may include at least one of: performing a color adjustment, performing a size adjustment, performing a content manipulation, performing temporal alignment, performing dynamic time warping, utilizing a transparency, or utilizing a mask on the new or the first stream of digital pictures. The comparing the at least one portion of the new stream of digital pictures with the at least one portion of the first stream of digital pictures may include recognizing at least one person or object in the new stream of digital pictures and at least one person or object in the first stream of digital pictures, and comparing the at least one person or object from the new stream of digital pictures with the at least one person or object from the first stream of digital pictures.

In some embodiments, the anticipating the one or more instruction sets for operating the device correlated with the first stream of digital pictures based on at least a partial match between the new stream of digital pictures and the first stream of digital pictures includes determining that there is at least a partial match between the new stream of digital pictures and the first stream of digital pictures. In further embodiments, the determining that there is at least a partial match between the new stream of digital pictures and the first stream of digital pictures includes determining that there is at least a partial match between one or more portions of the new stream of digital pictures and one or more portions of the first stream of digital pictures. In further embodiments, the determining that there is at least a partial match between the new stream of digital pictures and the first stream of digital pictures includes determining that a similarity between at least one portion of the new stream of digital pictures and at least one portion of the first stream of digital pictures exceeds a similarity threshold. In further embodiments, the determining that there is at least a partial match between the new stream of digital pictures and the first stream of digital pictures includes determining a substantial similarity between at least one portion of the new stream of digital pictures and at least one portion of the first stream of digital pictures. The at least one portion of the new stream of digital pictures may include at least one digital picture, at least one region, at least one feature, or at least one pixel of the new stream of digital pictures. The at least one portion of the first stream of digital pictures may include at least one digital picture, at least one region, at least one feature, or at least one pixel of the first stream of digital pictures. The substantial similarity may be achieved when a similarity between the at least one portion of the new stream of digital pictures and the at least one portion of the first stream of digital pictures exceeds a similarity threshold. The substantial similarity may be achieved when a number or a percentage of matching or partially matching digital pictures from the new stream of digital pictures and from the first stream of digital pictures exceeds a threshold number or threshold percentage. The substantial similarity may be achieved when a number or a percentage of matching or partially matching regions of at least one digital picture from the new stream of digital pictures and from the first stream of digital pictures exceeds a threshold number or threshold percentage. The substantial similarity may be achieved when a number or a percentage of matching or partially matching features of at least one digital picture from the new stream of digital pictures and from the first stream of digital pictures exceeds a threshold number or threshold percentage. The substantial similarity may be achieved when a number or a percentage of matching or partially matching pixels of at least one digital picture from the new stream of digital pictures and from the first stream of digital pictures exceeds a threshold number or threshold percentage. The substantial similarity may be achieved when one or more same or similar objects are recognized in the new stream of digital pictures and the first stream of digital pictures. In further embodiments, the determining that there is at least a partial match between the new stream of digital pictures and the first stream of digital pictures includes determining that a number or a percentage of matching digital pictures from the new stream of digital pictures and from the first stream of digital pictures exceeds a threshold number or threshold percentage. The matching digital pictures from the new stream of digital pictures and from the first stream of digital pictures may be determined factoring in at least one of: an order of a digital picture in a stream of digital pictures, an importance of a digital picture, a threshold for a similarity in a digital picture, or a threshold for a difference in a digital picture. In further embodiments, the determining that there is at least a partial match between the new stream of digital pictures and the first stream of digital pictures includes determining that a number or a percentage of matching regions from at least one digital picture of the new stream of digital pictures and from at least one digital picture of the first stream of digital pictures exceeds a threshold number or threshold percentage. The matching regions from at least one digital picture of the new stream of digital pictures and from at least one digital picture of the first stream of digital pictures may be determined factoring in at least one of: a location of a region, an importance of a region, a threshold for a similarity in a region, or a threshold for a difference in a region. In further embodiments, the determining that there is at least a partial match between the new stream of digital pictures and the first stream of digital pictures includes determining that a number or a percentage of matching features from at least one digital picture of the new stream of digital pictures and from at least one digital picture of the first stream of digital pictures exceeds a threshold number or threshold percentage. The matching features from at least one digital picture of the new stream of digital pictures and from at least one digital picture of the first stream of digital pictures may be determined factoring in at least one of: a type of a feature, an importance of a feature, a location of a feature, a threshold for a similarity in a feature, or a threshold for a difference in a feature. In further embodiments, the determining that there is at least a partial match between the new stream of digital pictures and the first stream of digital pictures includes determining that a number or a percentage of matching pixels from at least one digital picture of the new stream of digital pictures and from at least one digital picture of the first stream of digital pictures exceeds a threshold number or threshold percentage. The matching pixels from at least one digital picture of the new stream of digital pictures and from at least one digital picture of the first stream of digital pictures may be determined factoring in at least one of: a location of a pixel, a threshold for a similarity in a pixel, or a threshold for a difference in a pixel. In further embodiments, the determining that there is at least a partial match between the new stream of digital pictures and the first stream of digital pictures includes recognizing a same person or object in the new and the first streams of digital pictures.

In certain embodiments, the executing the one or more instruction sets for operating the device correlated with the first stream of digital pictures includes executing the one or more instruction sets for operating the device correlated with the first stream of digital pictures instead of or prior to an instruction set that would have been executed next. In further embodiments, the executing the one or more instruction sets for operating the device correlated with the first stream of digital pictures includes modifying one or more instruction sets. In further embodiments, the executing the one or more instruction sets for operating the device correlated with the first stream of digital pictures includes modifying a register or an element of a processor circuit. In further embodiments, the executing the one or more instruction sets for operating the device correlated with the first stream of digital pictures includes inserting the one or more instruction sets for operating the device correlated with the first stream of digital pictures into a register or an element of a processor circuit. In further embodiments, the executing the one or more instruction sets for operating the device correlated with the first stream of digital pictures includes redirecting a processor circuit to the one or more instruction sets for operating the device correlated with the first stream of digital pictures. In further embodiments, the executing the one or more instruction sets for operating the device correlated with the first stream of digital pictures includes redirecting a processor circuit to one or more alternate instruction sets, the alternate instruction sets comprising the one or more instruction sets for operating the device correlated with the first stream of digital pictures. In further embodiments, the executing the one or more instruction sets for operating the device correlated with the first stream of digital pictures includes transmitting, to a processor circuit for execution, the one or more instruction sets for operating the device correlated with the first stream of digital pictures. In further embodiments, the executing the one or more instruction sets for operating the device correlated with the first stream of digital pictures includes issuing an interrupt to a processor circuit and executing the one or more instruction sets for operating the device correlated with the first stream of digital pictures following the interrupt. In further embodiments, the executing the one or more instruction sets for operating the device correlated with the first stream of digital pictures includes modifying an element that is part of, operating on, or coupled to a processor circuit.

In some embodiments, the executing the one or more instruction sets for operating the device correlated with the first stream of digital pictures includes executing, by a logic circuit, the one or more instruction sets for operating the device correlated with the first stream of digital pictures. The logic circuit may include a microcontroller. The executing, by the logic circuit, the one or more instruction sets for operating the device correlated with the first stream of digital pictures may include modifying an element of the logic circuit. The executing, by the logic circuit, the one or more instruction sets for operating the device correlated with the first stream of digital pictures may include inserting the one or more instruction sets for operating the device correlated with the first stream of digital pictures into an element of the logic circuit. The executing, by the logic circuit, the one or more instruction sets for operating the device correlated with the first stream of digital pictures may include redirecting the logic circuit to the one or more instruction sets for operating the device correlated with the first stream of digital pictures. The executing, by the logic circuit, the one or more instruction sets for operating the device correlated with the first stream of digital pictures may include replacing inputs into the logic circuit with the one or more instruction sets for operating the device correlated with the first stream of digital pictures. The executing, by the logic circuit, the one or more instruction sets for operating the device correlated with the first stream of digital pictures my include replacing outputs from the logic circuit with the one or more instruction sets for operating the device correlated with the first stream of digital pictures.

In certain embodiments, the executing the one or more instruction sets for operating the device correlated with the first stream of digital pictures includes executing, by an application for operating the device, the one or more instruction sets for operating the device correlated with the first stream of digital pictures. In further embodiments, the executing the one or more instruction sets for operating the device correlated with the first stream of digital pictures includes modifying an application, the application including instruction sets for operating the device. In further embodiments, the executing the one or more instruction sets for operating the device correlated with the first stream of digital pictures includes redirecting an application to the one or more instruction sets for operating the device correlated with the first stream of digital pictures. In further embodiments, the executing the one or more instruction sets for operating the device correlated with the first stream of digital pictures includes redirecting an application to one or more alternate instruction sets, the alternate instruction sets comprising the one or more instruction sets for operating the device correlated with the first stream of digital pictures. In further embodiments, the executing the one or more instruction sets for operating the device correlated with the first stream of digital pictures includes modifying one or more instruction sets of an application. In further embodiments, the executing the one or more instruction sets for operating the device correlated with the first stream of digital pictures includes modifying a source code, a bytecode, an intermediate code, a compiled code, an interpreted code, a translated code, a runtime code, an assembly code, or a machine code. In further embodiments, the executing the one or more instruction sets for operating the device correlated with the first stream of digital pictures includes modifying at least one of: a memory unit, a register of a processor circuit, a storage, or a repository where instruction sets are stored or used. In further embodiments, the executing the one or more instruction sets for operating the device correlated with the first stream of digital pictures includes modifying one or more instruction sets for operating an application or an object of the application. In further embodiments, the executing the one or more instruction sets for operating the device correlated with the first stream of digital pictures includes modifying at least one of: an element of a processor circuit, an element of the device, a virtual machine, a runtime engine, an operating system, an execution stack, a program counter, or a user input. In further embodiments, the executing the one or more instruction sets for operating the device correlated with the first stream of digital pictures includes modifying one or more instruction sets at a source code write time, a compile time, an interpretation time, a translation time, a linking time, a loading time, or a runtime. In further embodiments, the executing the one or more instruction sets for operating the device correlated with the first stream of digital pictures includes modifying one or more code segments, lines of code, statements, instructions, functions, routines, subroutines, or basic blocks. In further embodiments, the executing the one or more instruction sets for operating the device correlated with the first stream of digital pictures includes a manual, an automatic, a dynamic, or a just in time (JIT) instrumentation of an application. In further embodiments, the executing the one or more instruction sets for operating the device correlated with the first stream of digital pictures includes utilizing one or more of a .NET tool, a .NET application programming interface (API), a Java tool, a Java API, an operating system tool, or an independent tool for modifying instruction sets. In further embodiments, the executing the one or more instruction sets for operating the device correlated with the first stream of digital pictures includes utilizing at least one of: a dynamic, an interpreted, or a scripting programming language. In further embodiments, the executing the one or more instruction sets for operating the device correlated with the first stream of digital pictures includes utilizing at least one of: a dynamic code, a dynamic class loading, or a reflection. In further embodiments, the executing the one or more instruction sets for operating the device correlated with the first stream of digital pictures includes utilizing an assembly language. In further embodiments, the executing the one or more instruction sets for operating the device correlated with the first stream of digital pictures includes utilizing at least one of: a metaprogramming, a self-modifying code, or an instruction set modification tool. In further embodiments, the executing the one or more instruction sets for operating the device correlated with the first stream of digital pictures includes utilizing at least one of: just in time (JIT) compiling, JIT interpretation, JIT translation, dynamic recompiling, or binary rewriting. In further embodiments, the executing the one or more instruction sets for operating the device correlated with the first stream of digital pictures includes utilizing at least one of: a dynamic expression creation, a dynamic expression execution, a dynamic function creation, or a dynamic function execution. In further embodiments, the executing the one or more instruction sets for operating the device correlated with the first stream of digital pictures includes adding or inserting additional code into a code of an application. In further embodiments, the executing the one or more instruction sets for operating the device correlated with the first stream of digital pictures includes at least one of: modifying, removing, rewriting, or overwriting a code of an application. In further embodiments, the executing the one or more instruction sets for operating the device correlated with the first stream of digital pictures includes at least one of: branching, redirecting, extending, or hot swapping a code of an application. The branching or redirecting the code may include inserting at least one of: a branch, a jump, or a means for redirecting an execution. In further embodiments, the executing the one or more instruction sets for operating the device correlated with the first stream of digital pictures includes implementing a user's knowledge, style, or methodology of operating the device in a visual surrounding. In further embodiments, the executing the one or more instruction sets for operating the device correlated with the first stream of digital pictures includes executing the one or more instruction sets for operating the device correlated with the first stream of digital pictures via an interface. The interface may include a modification interface.

In certain embodiments, the operations of the non-transitory computer storage medium and/or the method further comprise: receiving at least one extra information. In further embodiments, the at least one extra information include one or more of: an information on a stream of digital pictures, an information on an object in the stream of digital pictures, an information on the device's visual surrounding, an information on an instruction set, an information on an application, an information on an object of the application, an information on a processor circuit, an information on the device, or an information on an user. In further embodiments, the operations of the non-transitory computer storage medium and/or the method further comprise: learning the first stream of digital pictures correlated with the at least one extra information. The learning the first stream of digital pictures correlated with at least one extra information may include correlating the first stream of digital pictures with the at least one extra information. The learning the first stream of digital pictures correlated with at least one extra information may include storing the first stream of digital pictures correlated with the at least one extra information into a memory unit. In further embodiments, the anticipating the one or more instruction sets for operating the device correlated with the first stream of digital pictures based on at least a partial match between the new stream of digital pictures and the first stream of digital pictures includes anticipating the one or more instruction sets for operating the device correlated with the first stream of digital pictures based on at least a partial match between an extra information correlated with the new stream of digital pictures and an extra information correlated with the first stream of digital pictures. The anticipating the one or more instruction sets for operating the device correlated with the first stream of digital pictures based on at least a partial match between an extra information correlated with the new stream of digital pictures and an extra information correlated with the first stream of digital pictures may include comparing an extra information correlated with the new stream of digital pictures and an extra information correlated with the first stream of digital pictures. The anticipating the one or more instruction sets for operating the device correlated with the first stream of digital pictures based on at least a partial match between an extra information correlated with the new stream of digital pictures and an extra information correlated with the first stream of digital pictures may include determining that a similarity between an extra information correlated with the new stream of digital pictures and an extra information correlated with the first stream of digital pictures exceeds a similarity threshold.

In some embodiments, the operations of the non-transitory computer storage medium and/or the method further comprise: receiving a second stream of digital pictures from the picture capturing apparatus; receiving additional one or more instruction sets for operating the device; and learning the second stream of digital pictures correlated with the additional one or more instruction sets for operating the device. In further embodiments, the learning the first stream of digital pictures correlated with the one or more instruction sets for operating the device and the learning the second stream of digital pictures correlated with the additional one or more instruction sets for operating the device include creating a connection between the first stream of digital pictures correlated with the one or more instruction sets for operating the device and the second stream of digital pictures correlated with the additional one or more instruction sets for operating the device. The connection may include or be associated with at least one of: an occurrence count, a weight, a parameter, or a data. In further embodiments, the learning the first stream of digital pictures correlated with the one or more instruction sets for operating the device and the learning the second stream of digital pictures correlated with the additional one or more instruction sets for operating the device include updating a connection between the first stream of digital pictures correlated with the one or more instruction sets for operating the device and the second stream of digital pictures correlated with the additional one or more instruction sets for operating the device. The updating the connection between the first stream of digital pictures correlated with the one or more instruction sets for operating the device and the second stream of digital pictures correlated with the additional one or more instruction sets for operating the device may include updating at least one of: an occurrence count, a weight, a parameter, or a data included in or associated with the connection. In further embodiments, the learning the first stream of digital pictures correlated with the one or more instruction sets for operating the device includes storing the first stream of digital pictures correlated with the one or more instruction sets for operating the device into a first node of a data structure, and wherein the learning the second stream of digital pictures correlated with the additional one or more instruction sets for operating the device includes storing the second stream of digital pictures correlated with the additional one or more instruction sets for operating the device into a second node of the data structure. The data structure may include a neural network, a graph, a collection of sequences, a sequence, a collection of knowledge cells, a knowledgebase, or a knowledge structure. The learning the first stream of digital pictures correlated with the one or more instruction sets for operating the device and the learning the second stream of digital pictures correlated with the additional one or more instruction sets for operating the device may include creating a connection between the first node and the second node. The learning the first stream of digital pictures correlated with the one or more instruction sets for operating the device and the learning the second stream of digital pictures correlated with the additional one or more instruction sets for operating the device may include updating a connection between the first node and the second node. In further embodiments, the first stream of digital pictures correlated with the one or more instruction sets for operating the device is stored into a first node of a neural network and the second stream of digital pictures correlated with the additional one or more instruction sets for operating the device is stored into a second node of the neural network. The first node and the second node may be connected by a connection. The first node may be part of a first layer of the neural network and the second node may be part of a second layer of the neural network. In further embodiments, the first stream of digital pictures correlated with the one or more instruction sets for operating the device is stored into a first node of a graph and the second stream of digital pictures correlated with the additional one or more instruction sets for operating the device is stored into a second node of the graph. The first node and the second node may be connected by a connection. In further embodiments, the first stream of digital pictures correlated with the one or more instruction sets for operating the device is stored into a first node of a sequence and the second stream of digital pictures correlated with the additional one or more instruction sets for operating the device is stored into a second node of the sequence.

In some aspects, the disclosure relates to a system for learning a visual surrounding for autonomous device operating. The system may be implemented at least in part on one or more computing devices. In some embodiments, the system comprises a processor circuit configured to execute instruction sets for operating a device. The system may further include a memory unit configured to store data. The system may further include a picture capturing apparatus configured to capture digital pictures. The system may further include an artificial intelligence unit. In some embodiments, the artificial intelligence unit may be configured to: receive a first stream of digital pictures from the picture capturing apparatus. The artificial intelligence unit may be further configured to: receive one or more instruction sets for operating the device from the processor circuit. The artificial intelligence unit may be further configured to: learn the first stream of digital pictures correlated with the one or more instruction sets for operating the device.

In some aspects, the disclosure relates to a non-transitory computer storage medium having a computer program stored thereon, the program including instructions that when executed by one or more processor circuits cause the one or more processor circuits to perform operations comprising: receiving a first stream of digital pictures from a picture capturing apparatus. The operations may further include: receiving one or more instruction sets for operating a device. The operations may further include: learning the first stream of digital pictures correlated with the one or more instruction sets for operating the device.

In some aspects, the disclosure relates to a method comprising: (a) receiving a first stream of digital pictures from a picture capturing apparatus by one or more processor circuits. The method may further include: (b) receiving one or more instruction sets for operating a device by the one or more processor circuits. The method may further include: (c) learning the first stream of digital pictures correlated with the one or more instruction sets for operating the device, the learning of (c) performed by the one or more processor circuits.

The operations or steps of the non-transitory computer storage medium and/or the method may be performed by any of the elements of the above described systems as applicable. The non-transitory computer storage medium and/or the method may include any of the operations, steps, and embodiments of the above described systems as applicable.

In some aspects, the disclosure relates to a system for using a visual surrounding for autonomous device operating. The system may be implemented at least in part on one or more computing devices. In some embodiments, the system comprises a processor circuit configured to execute instruction sets for operating a device. The system may further include a memory unit configured to store data. The system may further include a picture capturing apparatus configured to capture digital pictures. The system may further include an artificial intelligence unit. In some embodiments, the artificial intelligence unit may be configured to: access the memory unit that stores a plurality of streams of digital pictures correlated with one or more instruction sets for operating the device, the plurality including a first stream of digital pictures correlated with one or more instruction sets for operating the device. The artificial intelligence unit may be further configured to: receive a new stream of digital pictures from the picture capturing apparatus. The artificial intelligence unit may be further configured to: anticipate the one or more instruction sets for operating the device correlated with the first stream of digital pictures based on at least a partial match between the new stream of digital pictures and the first stream of digital pictures. The artificial intelligence unit may be further configured to: cause the processor circuit to execute the one or more instruction sets for operating the device correlated with the first stream of digital pictures, the executing performed in response to the anticipating of the artificial intelligence unit, wherein the device performs one or more operations defined by the one or more instruction sets for operating the device correlated with the first stream of digital pictures, the one or more operations performed in response to the executing by the processor circuit.

In some aspects, the disclosure relates to a non-transitory computer storage medium having a computer program stored thereon, the program including instructions that when executed by one or more processor circuits cause the one or more processor circuits to perform operations comprising: accessing a memory unit that stores a plurality of streams of digital pictures correlated with one or more instruction sets for operating a device, the plurality including a first stream of digital pictures correlated with one or more instruction sets for operating the device. The operations may further include: receiving a new stream of digital pictures from a picture capturing apparatus. The operations may further include: anticipating the one or more instruction sets for operating the device correlated with the first stream of digital pictures based on at least a partial match between the new stream of digital pictures and the first stream of digital pictures. The operations may further include: causing an execution of the one or more instruction sets for operating the device correlated with the first stream of digital pictures, the causing performed in response to the anticipating the one or more instruction sets for operating the device correlated with the first stream of digital pictures based on at least a partial match between the new stream of digital pictures and the first stream of digital pictures, wherein the device performs one or more operations defined by the one or more instruction sets for operating the device correlated with the first stream of digital pictures, the one or more operations performed in response to the executing.

In some aspects, the disclosure relates to a method comprising: (a) accessing a memory unit that stores a plurality of streams of digital pictures correlated with one or more instruction sets for operating a device, the plurality including a first stream of digital pictures correlated with one or more instruction sets for operating the device, the accessing of (a) performed by the one or more processor circuits. The method may further include: (b) receiving a new stream of digital pictures from a picture capturing apparatus by the one or more processor circuits. The method may further include: (c) anticipating the one or more instruction sets for operating the device correlated with the first stream of digital pictures based on at least a partial match between the new stream of digital pictures and the first stream of digital pictures, the anticipating of (c) performed by the one or more processor circuits. The method may further include: (d) executing the one or more instruction sets for operating the device correlated with the first stream of digital pictures, the executing of (d) performed in response to the anticipating of (c). The method may further include: (e) performing, by the device, one or more operations defined by the one or more instruction sets for operating the device correlated with the first stream of digital pictures, the one or more operations performed in response to the executing of (d).

The operations or steps of the non-transitory computer storage medium and/or the method may be performed by any of the elements of the above described systems as applicable. The non-transitory computer storage medium and/or the method may include any of the operations, steps, and embodiments of the above described systems as applicable.

In some aspects, the disclosure relates to a system for learning and using a visual surrounding for autonomous device operating. The system may be implemented at least in part on one or more computing devices. In some embodiments, the system comprises a logic circuit configured to receive inputs and produce outputs, the outputs for operating a device. The system may further include a memory unit configured to store data. The system may further include a picture capturing apparatus configured to capture digital pictures. The system may further include an artificial intelligence unit. In some embodiments, the artificial intelligence unit may be configured to: receive a first digital picture from the picture capturing apparatus. The artificial intelligence unit may be further configured to: receive at least one input, wherein the at least one input is also received by the logic circuit. The artificial intelligence unit may be further configured to: learn the first digital picture correlated with the at least one input. The artificial intelligence unit may be further configured to: receive a new digital picture from the picture capturing apparatus. The artificial intelligence unit may be further configured to: anticipate the at least one input correlated with the first digital picture based on at least a partial match between the new digital picture and the first digital picture. The artificial intelligence unit may be further configured to: cause the logic circuit to receive the at least one input correlated with the first digital picture, the causing performed in response to the anticipating of the artificial intelligence unit, wherein the device performs at least one operation defined by at least one output for operating the device produced by the logic circuit.

In certain embodiments, the logic circuit configured to receive inputs and produce outputs includes a logic circuit configured to produce outputs based at least in part on logic operations performed on the inputs. In further embodiments, the learning the first digital picture correlated with the at least one input includes correlating the first digital picture with the at least one input. In further embodiments, the learning the first digital picture correlated with the at least one input includes storing, into the memory unit, the first digital picture correlated with the at least one input, the first digital picture correlated with the at least input being part of a stored plurality of digital pictures correlated with at least one input. In further embodiments, the anticipating the at least one input correlated with the first digital picture based on at least a partial match between the new digital picture and the first digital picture includes comparing at least one portion of the new digital picture with at least one portion of the first digital picture. In further embodiments, the anticipating the at least one input correlated with the first digital picture based on at least a partial match between the new digital picture and the first digital picture includes determining that there is at least a partial match between the new digital picture and the first digital picture. In further embodiments, the causing the logic circuit to receive the at least one input correlated with the first digital picture includes transmitting, to the logic circuit, the at least one input correlated with the first digital picture. In further embodiments, the causing the logic circuit to receive the at least one input correlated with the first digital picture includes replacing at least one input into the logic circuit with the at least one input correlated with the first digital picture.

In some aspects, the disclosure relates to a non-transitory computer storage medium having a computer program stored thereon, the program including instructions that when executed by one or more processor circuits cause the one or more processor circuits to perform operations comprising: receiving a first digital picture from a picture capturing apparatus. The operations may further include: receiving at least one input, wherein the at least one input is also received by a logic circuit, and wherein the logic circuit is configured to receive inputs and produce outputs, the outputs for operating a device. The operations may further include: learning the first digital picture correlated with the at least one input. The operations may further include: receiving a new digital picture from the picture capturing apparatus. The operations may further include: anticipating the at least one input correlated with the first digital picture based on at least a partial match between the new digital picture and the first digital picture. The operations may further include: causing the logic circuit to receive the at least one input correlated with the first digital picture, the causing performed in response to the anticipating the at least one input correlated with the first digital picture based on at least a partial match between the new digital picture and the first digital picture, wherein the device performs at least one operation defined by at least one output for operating the device produced by the logic circuit.

In some aspects, the disclosure relates to a method comprising: (a) receiving a first digital picture from a picture capturing apparatus by one or more processor circuits. The method may further include: (b) receiving at least one input by the one or more processor circuits, wherein the at least one input are also received by a logic circuit, and wherein the logic circuit is configured to receive inputs and produce outputs, the outputs for operating a device. The method may further include: (c) learning the first digital picture correlated with the at least one input, the learning of (c) performed by the one or more processor circuits. The method may further include: (d) receiving a new digital picture from the picture capturing apparatus by the one or more processor circuits. The method may further include: (e) anticipating the at least one input correlated with the first digital picture based on at least a partial match between the new digital picture and the first digital picture, the anticipating of (e) performed by the one or more processor circuits. The method may further include: (f) receiving, by the logic circuit, the at least one input correlated with the first digital picture, the receiving of (f) performed in response to the anticipating of (e). The method may further include: (g) performing, by the device, at least one operation defined by at least one output for operating the device produced by the logic circuit.

The operations or steps of the non-transitory computer storage medium and/or the method may be performed by any of the elements of the above described systems as applicable. The non-transitory computer storage medium and/or the method may include any of the operations, steps, and embodiments of the above described systems as applicable.

In some aspects, the disclosure relates to a system for learning and using a visual surrounding for autonomous device operating. The system may be implemented at least in part on one or more computing devices. In some embodiments, the system comprises a logic circuit configured to receive inputs and produce outputs, the outputs for operating a device. The system may further include a memory unit configured to store data. The system may further include a picture capturing apparatus configured to capture digital pictures. The system may further include an artificial intelligence unit. In some embodiments, the artificial intelligence unit may be configured to: receive a first digital picture from the picture capturing apparatus. The artificial intelligence unit may be further configured to: receive at least one output, the at least one output transmitted from the logic circuit. The artificial intelligence unit may be further configured to: learn the first digital picture correlated with the at least one output. The artificial intelligence unit may be further configured to: receive a new digital picture from the picture capturing apparatus. The artificial intelligence unit may be further configured to: anticipate the at least one output correlated with the first digital picture based on at least a partial match between the new digital picture and the first digital picture. The artificial intelligence unit may be further configured to: cause the device to perform at least one operation defined by the at least one output correlated with the first digital picture.

In certain embodiments, the logic circuit configured to receive inputs and produce outputs includes a logic circuit configured to produce outputs based at least in part on logic operations performed on the inputs. In further embodiments, the learning the first digital picture correlated with the at least one output includes correlating the first digital picture with the at least one output. In further embodiments, the learning the first digital picture correlated with the at least one output includes storing, into the memory unit, the first digital picture correlated with the at least one output, the first digital picture correlated with the at least output being part of a stored plurality of digital pictures correlated with at least one output. In further embodiments, the anticipating the at least one output correlated with the first digital picture based on at least a partial match between the new digital picture and the first digital picture includes comparing at least one portion of the new digital picture with at least one portion of the first digital picture. In further embodiments, the anticipating the at least one output correlated with the first digital picture based on at least a partial match between the new digital picture and the first digital picture includes determining that there is at least a partial match between the new digital picture and the first digital picture. In further embodiments, the causing the device to perform at least one operation defined by the at least one output correlated with the first digital picture includes replacing at least one output from the logic circuit with the at least one output correlated with the first digital picture.

In some aspects, the disclosure relates to a non-transitory computer storage medium having a computer program stored thereon, the program including instructions that when executed by one or more processor circuits cause the one or more processor circuits to perform operations comprising: receiving a first digital picture from the picture capturing apparatus. The operations may further include: receiving at least one output, the at least one output transmitted from a logic circuit, wherein the logic circuit is configured to receive inputs and produce outputs, the outputs for operating a device. The operations may further include: learning the first digital picture correlated with the at least one output. The operations may further include: receiving a new digital picture from the picture capturing apparatus. The operations may further include: anticipating the at least one output correlated with the first digital picture based on at least a partial match between the new digital picture and the first digital picture. The operations may further include: causing the device to perform at least one operation defined by the at least one output correlated with the first digital picture.

In some aspects, the disclosure relates to a method comprising: (a) receiving a first digital picture from the picture capturing apparatus by one or more processor circuits. The method may further include: (b) receiving at least one output by the one or more processor circuits, the at least one output transmitted from a logic circuit, wherein the logic circuit is configured to receive inputs and produce outputs, the outputs for operating a device. The method may further include: (c) learning the first digital picture correlated with the at least one output, the learning of (c) performed by the one or more processor circuits. The method may further include: (d) receiving a new digital picture from the picture capturing apparatus by the one or more processor circuits. The method may further include: (e) anticipating the at least one output correlated with the first digital picture based on at least a partial match between the new digital picture and the first digital picture, the anticipating of (e) performed by the one or more processor circuits. The method may further include: (f) performing, by the device, at least one operation defined by the at least one output correlated with the first digital picture.

The operations or steps of the non-transitory computer storage medium and/or the method may be performed by any of the elements of the above described systems as applicable. The non-transitory computer storage medium and/or the method may include any of the operations, steps, and embodiments of the above described systems as applicable.

In some aspects, the disclosure relates to a system for learning and using a visual surrounding for autonomous device operating. The system may be implemented at least in part on one or more computing devices. In some embodiments, the system comprises an actuator configured to receive inputs and perform motions. The system may further include a memory unit configured to store data. The system may further include a picture capturing apparatus configured to capture digital pictures. The system may further include an artificial intelligence unit. In some embodiments, the artificial intelligence unit may be configured to: receive a first digital picture from the picture capturing apparatus. The artificial intelligence unit may be further configured to: receive at least one input, wherein the at least one input is also received by the actuator. The artificial intelligence unit may be further configured to: learn the first digital picture correlated with the at least one input. The artificial intelligence unit may be further configured to: receive a new digital picture from the picture capturing apparatus. The artificial intelligence unit may be further configured to. The artificial intelligence unit may be further configured to: anticipate the at least one input correlated with the first digital picture based on at least a partial match between the new digital picture and the first digital picture. The artificial intelligence unit may be further configured to: cause the actuator to receive the at least one input correlated with the first digital picture, the causing performed in response to the anticipating of the artificial intelligence unit, wherein the actuator performs at least one motion defined by the at least one input correlated with the first digital picture.

In some aspects, the disclosure relates to a non-transitory computer storage medium having a computer program stored thereon, the program including instructions that when executed by one or more processor circuits cause the one or more processor circuits to perform operations comprising: receiving a first digital picture from a picture capturing apparatus. The operations may further include: receiving at least one input, wherein the at least one input is also received by an actuator, and wherein the actuator is configured to receive inputs and perform motions. The operations may further include: learning the first digital picture correlated with the at least one input. The operations may further include: receiving a new digital picture from the picture capturing apparatus. The operations may further include: anticipating the at least one input correlated with the first digital picture based on at least a partial match between the new digital picture and the first digital picture. The operations may further include: causing the actuator to receive the at least one input correlated with the first digital picture, the causing performed in response to the anticipating the at least one input correlated with the first digital picture based on at least a partial match between the new digital picture and the first digital picture, wherein the actuator performs at least one motion defined by the at least one input correlated with the first digital picture.

In some aspects, the disclosure relates to a method comprising: (a) receiving a first digital picture from a picture capturing apparatus by one or more processor circuits. The method may further include: (b) receiving at least one input by the one or more processor circuits, wherein the at least one input are also received by an actuator, and wherein the actuator is configured to receive inputs and perform motions. The method may further include: (c) learning the first digital picture correlated with the at least one input, the learning of (c) performed by the one or more processor circuits. The method may further include: (d) receiving a new digital picture from the picture capturing apparatus by the one or more processor circuits. The method may further include: (e) anticipating the at least one input correlated with the first digital picture based on at least a partial match between the new digital picture and the first digital picture, the anticipating of (e) performed by the one or more processor circuits. The method may further include: (f) receiving, by the actuator, the at least one input correlated with the first digital picture, the receiving of (f) performed in response to the anticipating of (e). The method may further include: (g) performing, by the actuator, at least one motion defined by the at least one input correlated with the first digital picture.

The operations or steps of the non-transitory computer storage medium and/or the method may be performed by any of the elements of the above described systems as applicable. The non-transitory computer storage medium and/or the method may include any of the operations, steps, and embodiments of the above described systems as applicable.

Other features and advantages of the disclosure will become apparent from the following description, including the claims and drawings.

BRIEF DESCRIPTION OF THE DRAWINGS

FIG. 19 illustrates an embodiment of learning Knowledge Cells 800 comprising one or more Digital Pictures 525 correlated with any Instruction Sets 526 and/or Extra Info 527 using Neural Network 530a.

FIG. 26 illustrates an embodiment of determining anticipatory Instruction Sets 526 using Neural Network 530a.

FIG. 37 illustrates an exemplary embodiment of Computing-enabled Machine 98a.

Figure 1:
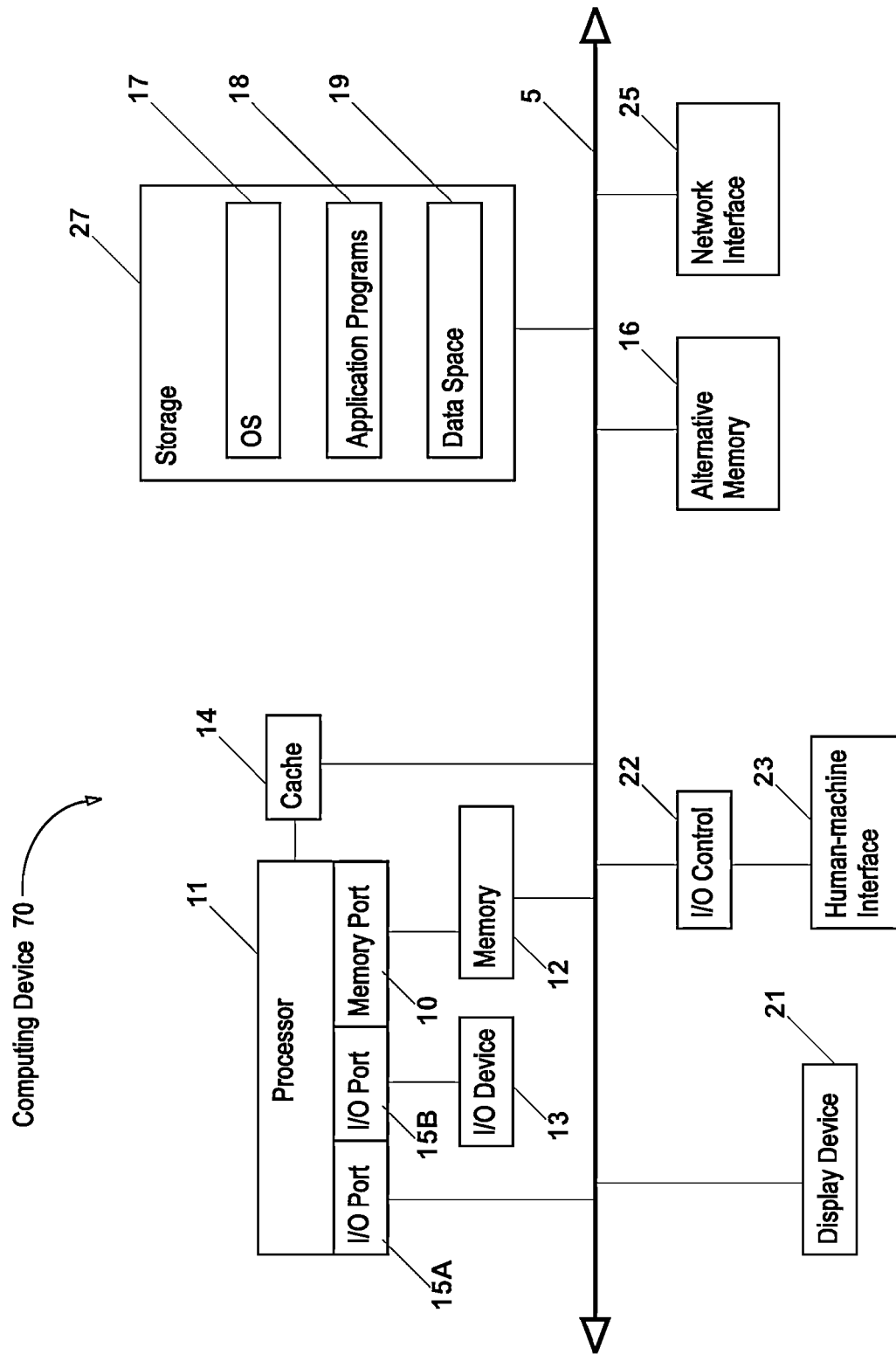
FIG. 1 illustrates a block diagram of Computing Device 70 that can provide processing capabilities used in some of the disclosed embodiments.

Like reference numerals in different figures indicate like elements. Horizontal or vertical " . . . " or other such indicia may be used to indicate additional instances of the same type of element n, m, x, or other such letters or indicia represent integers or other sequential numbers that follow the sequence where they are indicated. It should be noted that n, m, x, or other such letters or indicia may represent different numbers in different elements even where the elements are depicted in the same figure. In general, n, m, x, or other such letters or indicia may follow the sequence and/or context where they are indicated. Any of these or other such letters or indicia may be used interchangeably depending on the context and space available. The drawings are not necessarily to scale, with emphasis instead being placed upon illustrating the embodiments, principles, and concepts of the disclosure. A line or arrow between any of the disclosed elements comprises an interface that enables the coupling, connection, and/or interaction between the elements.

DETAILED DESCRIPTION

The disclosed artificially intelligent devices, systems, and methods for learning and/or using visual surrounding for autonomous device operation comprise apparatuses, systems, methods, features, functionalities, and/or applications that enable learning one or more digital pictures of a device's surrounding along with correlated instruction sets for operating the device, storing this knowledge in a knowledgebase (i.e. neural network, graph, sequences, etc.), and autonomously operating a device. The disclosed artificially intelligent devices, systems, and methods for learning and/or using visual surrounding for autonomous device operation, any of their elements, any of their embodiments, or a combination thereof can generally be referred to as VSADO, VSADO Unit, or as other similar name or reference.

Referring now to FIG. 1, an embodiment is illustrated of Computing Device 70 (also referred to simply as computing device or other similar name or reference, etc.) that can provide processing capabilities used in some embodiments of the forthcoming disclosure. Later described devices and systems, in combination with processing capabilities of Computing Device 70, enable learning and/or using a device's visual surrounding for autonomous device operation and/or other functionalities described herein. Various embodiments of the disclosed devices, systems, and/or methods include hardware, functions, logic, programs, and/or a combination thereof that can be provided or implemented on any type or form of computing, computing enabled, or other device such as a mobile device, a computer, a computing enabled telephone, a server, a cloud device, a gaming device, a television device, a digital camera, a GPS receiver, a media player, an embedded device, a supercomputer, a wearable device, an implantable device, or any other type or form of computing, computing enabled, or other device capable of performing the operations described herein.

In some designs, Computing Device 70 comprises hardware, processing techniques or capabilities, programs, or a combination thereof. Computing Device 70 includes one or more central processing units, which may also be referred to as processors 11. Processor 11 includes one or more memory ports 10 and/or one or more input-output ports, also referred to as I/O ports 15, such as I/O ports 15A and 15B. Processor 11 may be special or general purpose. Computing Device 70 may further include memory 12, which can be connected to the remainder of the components of Computing Device 70 via bus 5. Memory 12 can be connected to processor 11 via memory port 10. Computing Device 70 may also include display device 21 such as a monitor, projector, glasses, and/or other display device. Computing Device 70 may also include Human-machine Interface 23 such as a keyboard, a pointing device, a mouse, a touchscreen, a joystick, and/or other input device that can be connected with the remainder of the Computing Device 70 components via I/O control 22. In some implementations, Human-machine Interface 23 can be connected with bus 5 or directly connected with specific components of Computing Device 70. Computing Device 70 may include additional elements, such as one or more input/output devices 13. Processor 11 may include or be interfaced with cache memory 14. Storage 27 may include memory, which provides an operating system, also referred to as OS 17, additional application programs 18 operating on OS 17, and/or data space 19 in which additional data or information can be stored. Alternative memory device 16 can be connected to the remaining components of Computing Device 70 via bus 5. Network interface 25 can also be connected with bus 5 and be used to communicate with external computing devices via a network. Some or all described elements of Computing Device 70 can be directly or operatively connected or coupled with each other using any other connection means known in art. Other additional elements may be included as needed, or some of the disclosed ones may be excluded, or a combination thereof may be utilized in alternate implementations of Computing Device 70.

Processor 11 includes any logic circuitry that can respond to or process instructions fetched from memory 12 or other element. Processor 11 may also include any combination of hardware and/or processing techniques or capabilities for implementing or executing logic functions or programs. Processor 11 may include a single core or a multi core processor. Processor 11 includes the functionality for loading operating system 17 and operating any application programs 18 thereon. In some embodiments, Processor 11 can be provided in a microprocessing or a processing unit, such as, for example, Snapdragon processor produced by Qualcomm Inc., processor by Intel Corporation of Mountain View, Calif., processor manufactured by Motorola Corporation of Schaumburg, Ill.; processor manufactured by Transmeta Corporation of Santa Clara, Calif.; the RS/6000 processor, processor manufactured by International Business Machines of White Plains, N.Y.; processor manufactured by Advanced Micro Devices of Sunnyvale, Calif., or any computing unit for performing similar functions. In other embodiments, processor 11 can be provided in a graphics processing unit (GPU), visual processing unit (VPU), or other highly parallel processing unit or circuit such as, for example, nVidia GeForce line of GPUs, AMD Radeon line of GPUs, and/or others. Such GPUs or other highly parallel processing units may provide superior performance in processing operations on neural networks and/or other data structures. In further embodiments, processor 11 can be provided in a micro controller such as, for example, Texas instruments, Atmel, Microchip Technology, ARM, Silicon Labs, Intel, and/or other lines of micro controllers, and/or others. In further embodiments, processor 11 includes any circuit (i.e. logic circuit, etc.) or device for performing logic operations. Computing Device 70 can be based on one or more of the aforementioned or other processors capable of operating as described herein.

Memory 12 includes one or more memory chips capable of storing data and allowing any storage location to be accessed by processor 11 and/or other element. Examples of Memory 12 include static random access memory (SRAM), Flash memory, Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), Ferroelectric RAM (FRAM), and/or others. Memory 12 can be based on any of the above described memory chips, or any other available memory chips capable of operating as described herein. In some embodiments, processor 11 can communicate with memory 12 via a system bus 5. In other embodiments, processor 11 can communicate directly with memory 12 via a memory port 10.

Processor 11 can communicate directly with cache memory 14 via a connection means such as a secondary bus which may also sometimes be referred to as a backside bus. In some embodiments, processor 11 can communicate with cache memory 14 using the system bus 5. Cache memory 14 may typically have a faster response time than main memory 12 and can include a type of memory which is considered faster than main memory 12, such as for example SRAM, BSRAM, or EDRAM. Cache memory includes any structure such as multilevel caches, for example. In some embodiments, processor 11 can communicate with one or more I/O devices 13 via a system bus 5. Various busses can be used to connect processor 11 to any of the I/O devices 13, such as a VESA VL bus, an ISA bus, an EISA bus, a MicroChannel Architecture (MCA) bus, a PCI bus, a PCI-X bus, a PCI-Express bus, a NuBus, and/or others. In some embodiments, processor 11 can communicate directly with I/O device 13 via HyperTransport, Rapid I/O, or InfiniBand. In further embodiments, local busses and direct communication can be mixed. For example, processor 11 can communicate with an I/O device 13 using a local interconnect bus and communicate with another I/O device 13 directly. Similar configurations can be used for any other components described herein.

Computing Device 70 may further include alternative memory such as a SD memory slot, a USB memory stick, an optical drive such as a CD-ROM drive, a CD-R/RW drive, a DVD-ROM drive or a BlueRay disc, a hard-drive, and/or any other device comprising non-volatile memory suitable for storing data or installing application programs. Computing Device 70 may further include a storage device 27 comprising any type or form of non-volatile memory for storing an operating system (OS) such as any type or form of Windows OS, Mac OS, Unix OS, Linux OS, Android OS, iPhone OS, mobile version of Windows OS, an embedded OS, or any other OS that can operate on Computing Device 70. Computing Device 70 may also include application programs 18, and/or data space 19 for storing additional data or information. In some embodiments, alternative memory 16 can be used as or similar to storage device 27. Additionally, OS 17 and/or application programs 18 can be operable from a bootable medium, such as for example, a flash drive, a micro SD card, a bootable CD or DVD, and/or other bootable medium.

Application Program 18 (also referred to as program, computer program, application, script, code, or other similar name or reference) comprises instructions that can provide functionality when executed by processor 11. As such, Application Program 18 may be used to operate (i.e. perform operations on/with) or control a device or system. Application program 18 can be implemented in a high-level procedural or object-oriented programming language, or in a low-level machine or assembly language. Any language used can be compiled, interpreted, or otherwise translated into machine language. Application program 18 can be deployed in any form including as a stand-alone program or as a module, component, subroutine, or other unit suitable for use in a computing system. Application program 18 does not necessarily correspond to a file in a file system. A program can be stored in a portion of a file that may hold other programs or data, in a single file dedicated to the program, or in multiple files (i.e. files that store one or more modules, sub programs, or portions of code, etc.). Application Program 18 can be delivered in various forms such as, for example, executable file, library, script, plugin, addon, applet, interface, console application, web application, application service provider (ASP)-type application, operating system, and/or other forms. Application program 18 can be deployed to be executed on one computing device or on multiple computing devices (i.e. cloud, distributed, or parallel computing, etc.), or at one site or distributed across multiple sites interconnected by a communication network.

Network interface 25 can be utilized for interfacing Computing Device 70 with other devices via a network through a variety of connections including standard telephone lines, wired or wireless connections, LAN or WAN links (i.e. 802.11, T1, T3, 56 kb, X.25, etc.), broadband connections (i.e. ISDN, Frame Relay, ATM, etc.), or a combination thereof. Examples of networks include the Internet, an intranet, an extranet, a local area network (LAN), a wide area network (WAN), a personal area network (PAN), a home area network (HAN), a campus area network (CAN), a metropolitan area network (MAN), a global area network (GAN), a storage area network (SAN), virtual network, a virtual private network (VPN), Bluetooth network, a wireless network, a wireless LAN, a radio network, a HomePNA, a power line communication network, a G.hn network, an optical fiber network, an Ethernet network, an active networking network, a client-server network, a peer-to-peer network, a bus network, a star network, a ring network, a mesh network, a star-bus network, a tree network, a hierarchical topology network, and/or other networks. Network interface 25 may include a built-in network adapter, network interface card, PCMCIA network card, card bus network adapter, wireless network adapter, Bluetooth network adapter, WiFi network adapter, USB network adapter, modem, and/or any other device suitable for interfacing Computing Device 70 with any type of network capable of communication and/or operations described herein.

Still referring to FIG. 1, I/O devices 13 may be present in various shapes or forms in Computing Device 70. Examples of I/O device 13 capable of input include a joystick, a keyboard, a mouse, a trackpad, a trackpoint, a touchscreen, a trackball, a microphone, a drawing tablet, a glove, a tactile input device, a still or video camera, and/or other input device. Examples of I/O device 13 capable of output include a video display, a touchscreen, a projector, a glasses, a speaker, a tactile output device, and/or other output device. Examples of I/O device 13 capable of input and output include a disk drive, an optical storage device, a modem, a network card, and/or other input/output device. I/O device 13 can be interfaced with processor 11 via an I/O port 15, for example. I/O device 13 can also be controlled by I/O control 22 in some implementations. I/O control 22 may control one or more I/O devices such as Human-machine Interface 23 (i.e. keyboard, pointing device, touchscreen, joystick, mouse, optical pen, etc.). I/O control 22 enables any type or form of a device such as, for example, a video camera or microphone to be interfaced with other components of Computing Device 70. Furthermore, I/O device 13 may also provide storage such as or similar to storage 27, and/or alternative memory such as or similar to alternative memory 16 in some implementations.

An output interface such as a graphical user interface, an acoustic output interface, a tactile output interface, any device driver (i.e. audio, video, or other driver), and/or other output interface or system can be utilized to process output from elements of Computing Device 70 for conveyance on an output device such as Display 21. In some aspects, Display 21 or other output device itself may include an output interface for processing output from elements of Computing Device 70. Further, an input interface such as a keyboard listener, a touchscreen listener, a mouse listener, any device driver (i.e. audio, video, keyboard, mouse, touchscreen, or other driver), a speech recognizer, a video interpreter, and/or other input interface or system can be utilized to process input from Human-machine Interface 23 or other input device for use by elements of Computing Device 70. In some aspects, Human-machine Interface 23 or other input device itself may include an input interface for processing input for use by elements of Computing Device 70.

Computing Device 70 may include or be connected to multiple display devices 21. Display devices 21 can each be of the same or different type or form. Computing Device 70 and/or its elements comprise any type or form of suitable hardware, programs, or a combination thereof to support, enable, or provide for the connection and use of multiple display devices 21. In one example, Computing Device 70 includes any type or form of video adapter, video card, driver, and/or library to interface, communicate, connect, or otherwise use display devices 21. In some aspects, a video adapter may include multiple connectors to interface to multiple display devices 21. In other aspects, Computing Device 70 includes multiple video adapters, with each video adapter connected to one or more display devices 21. In some embodiments, Computing Device's 70 operating system can be configured for using multiple displays 21. In other embodiments, one or more display devices 21 can be provided by one or more other computing devices such as remote computing devices connected to Computing Device 70 via a network.

In some embodiments, I/O device 13 can be a bridge between system bus 5 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, a Serial Attached small computer system interface bus, and/or other bus.

Computing Device 70 can operate under the control of operating system 17, which may support Computing Device's 70 basic functions, interface with and manage hardware resources, interface with and manage peripherals, provide common services for application programs, schedule tasks, and/or perform other functionalities. A modern operating system enables features and functionalities such as a high resolution display, graphical user interface (GUI), touchscreen, cellular network connectivity (i.e. mobile operating system, etc.), Bluetooth connectivity, WiFi connectivity, global positioning system (GPS) capabilities, mobile navigation, microphone, speaker, still picture camera, video camera, voice recorder, speech recognition, music player, video player, near field communication, personal digital assistant (PDA), and/or other features, functionalities, or applications. For example, Computing Device 70 can use any conventional operating system, any embedded operating system, any real-time operating system, any open source operating system, any video gaming operating system, any proprietary operating system, any online operating system, any operating system for mobile computing devices, or any other operating system capable of running on Computing Device 70 and performing operations described herein. Example of operating systems include Windows XP, Windows 7, Windows 8, etc. manufactured by Microsoft Corporation of Redmond, Wash.; Mac OS, iPhone OS, etc. manufactured by Apple Computer of Cupertino, Calif.; OS/2 manufactured by International Business Machines of Armonk, N.Y.; Linux, a freely-available operating system distributed by Caldera Corp. of Salt Lake City, Utah; or any type or form of a Unix operating system, among others. Any operating systems such as the ones for Android devices can similarly be utilized.

Computing Device 70 can be implemented as or be part of various different model architectures such as web services, distributed computing, grid computing, cloud computing, and/or other architectures. For example, in addition to the traditional desktop, server, or mobile operating system architectures, a cloud-based operating system can be utilized to provide the structure on which embodiments of the disclosure can be implemented. Other aspects of Computing Device 70 can also be implemented in the cloud without departing from the spirit and scope of the disclosure. For example, memory, storage, processing, and/or other elements can be hosted in the cloud. In some embodiments, Computing Device 70 can be implemented on multiple devices. For example, a portion of Computing Device 70 can be implemented on a mobile device and another portion can be implemented on wearable electronics.

Computing Device 70 can be or include any mobile device, a mobile phone, a smartphone (i.e. iPhone, Windows phone, Blackberry, Android phone, etc.), a tablet, a personal digital assistant (PDA), wearable electronics, implantable electronics, or another mobile device capable of implementing the functionalities described herein. In other embodiments, Computing Device 70 can be or include an embedded device, which can be any device or system with a dedicated function within another device or system. Embedded systems range from the simplest ones dedicated to one task with no user interface to complex ones with advanced user interface that may resemble modern desktop computer systems. Examples of devices comprising an embedded device include a mobile telephone, a personal digital assistant (PDA), a gaming device, a media player, a digital still or video camera, a pager, a television device, a set-top box, a personal navigation device, a global positioning system (GPS) receiver, a portable storage device (i.e. a USB flash drive, etc.), a digital watch, a DVD player, a printer, a microwave oven, a washing machine, a dishwasher, a gateway, a router, a hub, an automobile entertainment system, an automobile navigation system, a refrigerator, a washing machine, a factory automation device, an assembly line device, a factory floor monitoring device, a thermostat, an automobile, a factory controller, a telephone, a network bridge, and/or other devices. An embedded device can operate under the control of an operating system for embedded devices such as MicroC/OS-II, QNX, VxWorks, eCos, TinyOS, Windows Embedded, Embedded Linux, and/or other embedded device operating systems.

Various implementations of the disclosed devices, systems, and/or methods can be realized in digital electronic circuitry, integrated circuitry, logic gates, specially designed application specific integrated circuits (ASICs), field programmable gate arrays (FPGAs), computer hardware, firmware, programs, virtual machines, and/or combinations thereof including their structural, logical, and/or physical equivalents.

The disclosed devices, systems, and/or methods may include clients and servers. A client and server are generally remote from each other and typically interact via a network. The relationship of a client and server may arise by virtue of computer programs running on their respective computers and having a client-server relationship to each other.

The disclosed devices, systems, and/or methods can be implemented in a computing system that includes a back end component, a middleware component, a front end component, or any combination thereof. The components of the system can be interconnected by any form or medium of digital data communication such as, for example, a network.

Computing Device 70 may include or be interfaced with a computer program product comprising instructions or logic encoded on a computer-readable medium. Such instructions or logic, when executed, may configure or cause a processor to perform the operations and/or functionalities disclosed herein. For example, a computer program can be provided or encoded on a computer-readable medium such as an optical medium (i.e. DVD-ROM, etc.), flash drive, hard drive, any memory, firmware, or other medium. Computer program can be installed onto a computing device to cause the computing device to perform the operations and/or functionalities disclosed herein. Machine-readable medium, computer-readable medium, or other such terms may refer to any computer program product, apparatus, and/or device for providing instructions and/or data to a programmable processor. As such, machine-readable medium includes any medium that can send or receive machine instructions as a machine-readable signal. Examples of a machine-readable medium include a volatile and/or non-volatile medium, a removable and/or non-removable medium, a communication medium, a storage medium, and/or other medium. A communication medium, for example, can transmit computer readable instructions and/or data in a modulated data signal such as a carrier wave or other transport technique, and may include any other form of information delivery medium known in art. A non-transitory machine-readable medium comprises all machine-readable media except for a transitory, propagating signal.

In some embodiments, the disclosed artificially intelligent devices, systems, and/or methods for learning and/or using visual surrounding for autonomous device operation, or elements thereof, can be implemented entirely or in part in a device (i.e. microchip, circuitry, logic gates, electronic device, computing device, special or general purpose processor, etc.) or system that comprises (i.e. hard coded, internally stored, etc.) or is provided with (i.e. externally stored, etc.) instructions for implementing VSADO functionalities. As such, the disclosed artificially intelligent devices, systems, and/or methods for learning and/or using visual surrounding for autonomous device operation, or elements thereof, may include the processing, memory, storage, and/or other features, functionalities, and embodiments of Computing Device 70 or elements thereof. Such device or system can operate on its own (i.e. standalone device or system, etc.), be embedded in another device or system (i.e. a television device, an oven, a refrigerator, a vehicle, an industrial machine, a robot, a smartphone, and/or any other device or system capable of housing the elements needed for VSADO functionalities), work in combination with other devices or systems, or be available in any other configuration. In other embodiments, the disclosed artificially intelligent devices, systems, and/or methods for learning and/or using visual surrounding for autonomous device operation, or elements thereof, may include Alternative Memory 16 that provides instructions for implementing VSADO functionalities to one or more Processors 11. In further embodiments, the disclosed artificially intelligent devices, systems, and/or methods for learning and/or using visual surrounding for autonomous device operation, or elements thereof, can be implemented entirely or in part as a computer program and executed by one or more Processors 11. Such program can be implemented in one or more modules or units of a single or multiple computer programs. Such program may be able to attach to or interface with, inspect, and/or take control of another application program to implement VSADO functionalities. In further embodiments, the disclosed artificially intelligent devices, systems, and/or methods for learning and/or using visual surrounding for autonomous device operation, or elements thereof, can be implemented as a network, web, distributed, cloud, or other such application accessed on one or more remote computing devices (i.e. servers, cloud, etc.) via Network Interface 25, such remote computing devices including processing capabilities and instructions for implementing VSADO functionalities. In further embodiments, the disclosed artificially intelligent devices, systems, and/or methods for learning and/or using visual surrounding for autonomous device operation, or elements thereof, can be (1) attached to or interfaced with any computing device or application program, (2) included as a feature of an operating system, (3) built (i.e. hard coded, etc.) into any computing device or application program, and/or (4) available in any other configuration to provide its functionalities.

In yet other embodiments, the disclosed artificially intelligent devices, systems, and/or methods for learning and/or using visual surrounding for autonomous device operation, or elements thereof, can be implemented at least in part in a computer program such as Java application or program. Java provides a robust and flexible environment for application programs including flexible user interfaces, robust security, built-in network protocols, powerful application programming interfaces, database or DBMS connectivity and interfacing functionalities, file manipulation capabilities, support for networked applications, and/or other features or functionalities. Application programs based on Java can be portable across many devices, yet leverage each device's native capabilities. Java supports the feature sets of most smartphones and a broad range of connected devices while still fitting within their resource constraints. Various Java platforms include virtual machine features comprising a runtime environment for application programs. Java platforms provide a wide range of user-level functionalities that can be implemented in application programs such as displaying text and graphics, playing and recording audio content, displaying and recording visual content, communicating with another computing device, and/or other functionalities. It should be understood that the disclosed artificially intelligent devices, systems, and/or methods for learning and/or using visual surrounding for autonomous device operation, or elements thereof, are programming language, platform, and operating system independent. Examples of programming languages that can be used instead of or in addition to Java include C, C++, Cobol, Python, Java Script, Tcl, Visual Basic, Pascal, VB Script, Perl, PHP, Ruby, and/or other programming languages capable of implementing the functionalities described herein.

Where a reference to a specific file or file type is used herein, other files, file types, or formats can be substituted.

Where a reference to a data structure is used herein, it should be understood that any variety of data structures can be used such as, for example, array, list, linked list, doubly linked list, queue, tree, heap, graph, map, grid, matrix, multi-dimensional matrix, table, database, database management system (DBMS), file, neural network, and/or any other type or form of a data structure including a custom one. A data structure may include one or more fields or data fields that are part of or associated with the data structure. A field or data field may include a data, an object, a data structure, and/or any other element or a reference/pointer thereto. A data structure can be stored in one or more memories, files, or other repositories. A data structure and/or any elements thereof, when stored in a memory, file, or other repository, may be stored in a different arrangement than the arrangement of the data structure and/or any elements thereof. For example, a sequence of elements can be stored in an arrangement other than a sequence in a memory, file, or other repository.

Where a reference to a repository is used herein, it should be understood that a repository may be or include one or more files or file systems, one or more storage locations or structures, one or more storage systems, one or more data structures or objects, one or more memory locations or structures, and/or other storage, memory, or data arrangements.

Where a reference to an interface is used herein, it should be understood that the interface comprises any hardware, device, system, program, method, and/or combination thereof that enable direct or operative coupling, connection, and/or interaction of the elements between which the interface is indicated. A line or arrow shown in the figures between any of the depicted elements comprises such interface. Examples of an interface include a direct connection, an operative connection, a wired connection (i.e. wire, cable, etc.), a wireless connection, a device, a network, a bus, a circuit, a firmware, a driver, a bridge, a program, a combination thereof, and/or others.

Where a reference to an element coupled or connected to another element is used herein, it should be understood that the element may be in communication or any other interactive relationship with the other element. Furthermore, an element coupled or connected to another element can be coupled or connected to any other element in alternate implementations. Terms coupled, connected, interfaced, or other such terms may be used interchangeably herein depending on context.

Where a reference to an element matching another element is used herein, it should be understood that the element may be equivalent or similar to the other element. Therefore, the term match or matching can refer to total equivalence or similarity depending on context.

Where a reference to a device is used herein, it should be understood that the device may include or be referred to as a system, and vice versa depending on context, since a device may include a system of elements and a system may be embodied in a device.

Where a mention of a function, method, routine, subroutine, or other such procedure is used herein, it should be understood that the function, method, routine, subroutine, or other such procedure comprises a call, reference, or pointer to the function, method, routine, subroutine, or other such procedure.

Where a mention of data, object, data structure, item, element, or thing is used herein, it should be understood that the data, object, data structure, item, element, or thing comprises a reference or pointer to the data, object, data structure, item, element, or thing.

The term collection of elements can refer to plurality of elements without implying that the collection is an element itself.

Figure 2:
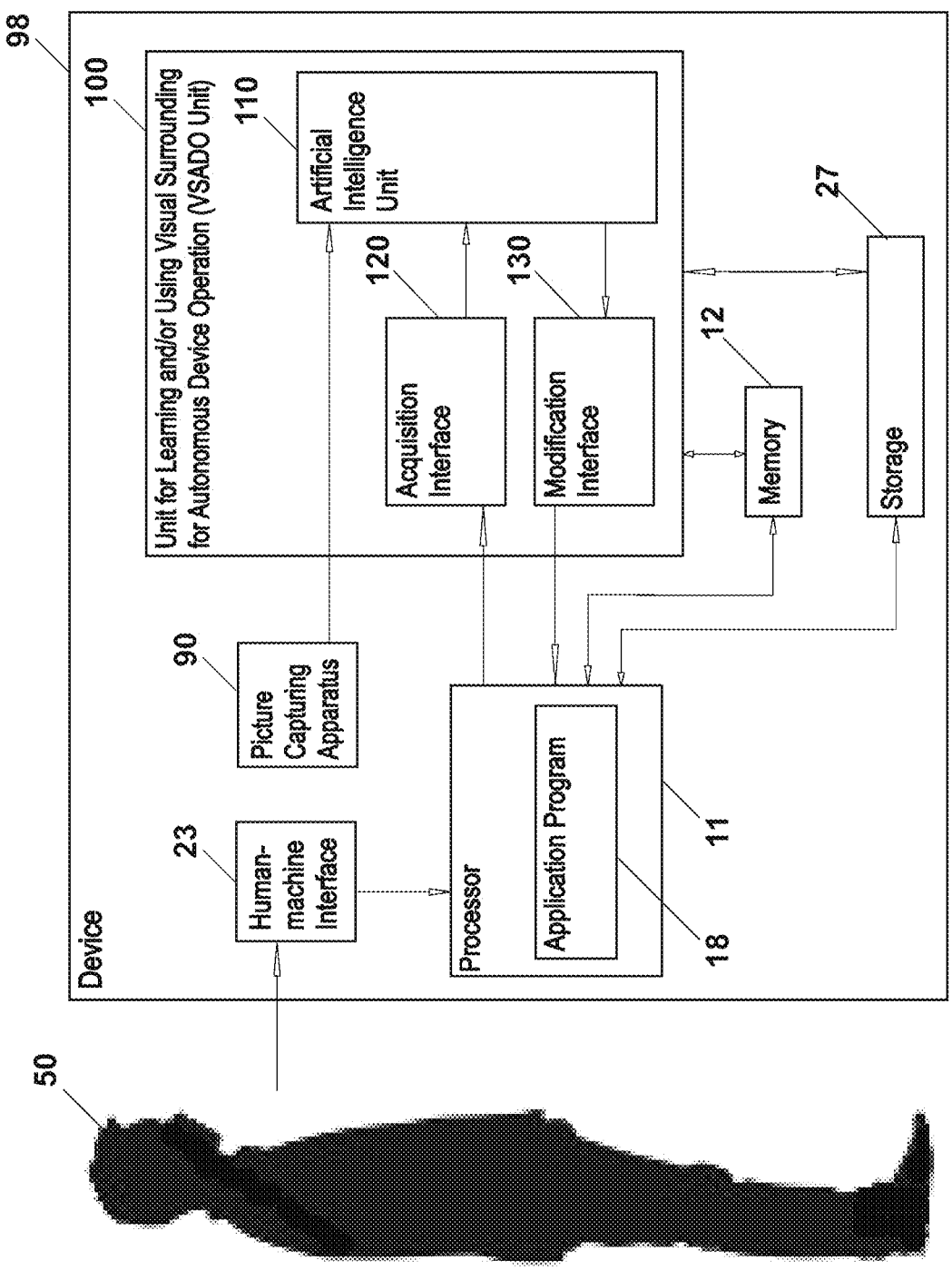
FIG. 2 illustrates an embodiment of Device 98 comprising Unit for Learning and/or Using Visual Surrounding for Autonomous Device Operation (VSADO Unit 100).

Referring to FIG. 2, an embodiment of Device 98 comprising Unit for Learning and/or Using Visual Surrounding for Autonomous Device Operation (VSADO Unit 100) is illustrated. Device 98 also comprises interconnected Processor 11, Human-machine Interface 23, Picture Capturing Apparatus 90, Memory 12, and Storage 27. Processor 11 includes or executes Application Program 18. VSADO Unit 100 comprises interconnected Artificial Intelligence Unit 110, Acquisition Interface 120, and Modification Interface 130. Other additional elements can be included as needed, or some of the disclosed ones can be excluded, or a combination thereof can be utilized in alternate embodiments.

In one example, the teaching presented by the disclosure can be implemented in a device or system for learning and/or using visual surrounding for autonomous device operation. The device or system may include a processor circuit (i.e. Processor 11, etc.) configured to execute instruction sets (i.e. Instruction Sets 526, etc.) for operating a device. The device or system may further include a memory unit (i.e. Memory 12, etc.) configured to store data. The device or system may further include a picture capturing apparatus (i.e. Picture Capturing Apparatus 90, etc.) configured to capture digital pictures (i.e. Digital Pictures 525, etc.). The device or system may further include an artificial intelligence unit (i.e. Artificial Intelligence Unit 110, etc.). The artificial intelligence unit may be configured to receive a first digital picture from the picture capturing apparatus. The artificial intelligence unit may also be configured to receive one or more instruction sets for operating the device from the processor circuit. The artificial intelligence unit may also be configured to learn the first digital picture correlated with the one or more instruction sets for operating the device. The artificial intelligence unit may also be configured to receive a new digital picture from the picture capturing apparatus. The artificial intelligence unit may also be configured to anticipate the one or more instruction sets for operating the device correlated with the first digital picture based on at least a partial match between the new digital picture and the first digital picture. The artificial intelligence unit may also be configured to cause the processor circuit to execute the one or more instruction sets for operating the device correlated with the first digital picture, the executing performed in response to the anticipating of the artificial intelligence unit, wherein the device performs one or more operations defined by the one or more instruction sets for operating the device correlated with the first digital picture, the one or more operations performed in response to the executing by the processor circuit. Any of the operations of the described elements can be performed repeatedly and/or in different orders in alternate embodiments. In some embodiments, a stream of digital pictures can be used instead of or in addition to any digital picture such as, for example, using a first stream of digital pictures instead of the first digital picture. In other embodiments, a logic circuit (i.e. Logic Circuit 250, etc.) may be used instead of the processor circuit. In such embodiments, the one or more instruction sets for operating the device may include or be substituted with one or more inputs into or one or more outputs from the logic circuit. In further embodiments, an actuator may be included instead of or in addition to the processor circuit. In such embodiments, the one or more instruction sets for operating the device may include or be substituted with one or more inputs into the actuator. Other additional elements can be included as needed, or some of the disclosed ones can be excluded, or a combination thereof can be utilized in alternate embodiments. The device or system for learning and/or using visual surrounding for autonomous device operation may include any actions or operations of any of the disclosed methods such as methods 6100, 6200, 6300, 6400, 6500, and/or 6600 (all later described).

Device 98 comprises any hardware, programs, or a combination thereof. Device 98 may include a system. Device 98 may include any features, functionalities, and embodiments of Computing Device 70, or elements thereof. Examples of Device 98 include a desktop or other computer, a smartphone or other mobile computer, a vehicle, an industrial machine, a toy, a robot, a microwave or other oven, and/or any other device or machine comprising processing capabilities. Such device or machine may be built for any function or purpose examples of which are described later.

User 50 (also referred to simply as user or other similar name or reference) comprises a human user or non-human user. A non-human User 50 includes any device, system, program, and/or other mechanism for operating or controlling Device 98 and/or elements thereof. In one example, User 50 may issue an operating direction to Application Program 18 responsive to which Application Program's 18 instructions or instruction sets may be executed by Processor 11 to perform a desired operation on Device 98. In another example, User 50 may issue an operating direction to Processor 11, Logic Circuit 250 (later described), and/or other processing element responsive to which Processor 11, Logic Circuit 250, and/or other processing element may implement logic to perform a desired operation on Device 98. User's 50 operating directions comprise any user inputted data (i.e. values, text, symbols, etc.), directions (i.e. move right, move up, move forward, copy an item, click on a link, etc.), instructions or instruction sets (i.e. manually inputted instructions or instruction sets, etc.), and/or other inputs or information. A non-human User 50 can utilize more suitable interfaces instead of, or in addition to, Human-machine Interface 23 and/or Display 21 for controlling Device 98 and/or elements thereof. Examples of such interfaces include an application programming interface (API), bridge (i.e. bridge between applications, devices, or systems, etc.), driver, socket, direct or operative connection, handle, function/routine/subroutine, and/or other interfaces.

In some embodiments, Processor 11, Logic Circuit 250, Application Program 18, and/or other processing element may control or affect an actuator (not shown). Actuator comprises the functionality for implementing movements, actions, behaviors, maneuvers, and/or other mechanical or physical operations. Device 98 may include one or more actuators to enable Device 98 to perform mechanical, physical, or other operations and/or to interact with its environment. For example, an actuator can be connected to or coupled to an element such as a wheel, arm, or other element to act upon the environment. Examples of an actuator include a motor, a linear motor, a servomotor, a hydraulic element, a pneumatic element, an electro-magnetic element, a spring element, and/or other actuators. Examples of types of actuators include a rotary actuator, a linear actuator, and/or other types of actuators. In other embodiments, Processor 11, Logic Circuit 250, Application Program 18, and/or other processing element may control or affect any other device or element instead of or in addition to an actuator.

Picture Capturing Apparatus 90 comprises the functionality for capturing one or more pictures, and/or other functionalities. As such, Picture Capturing Apparatus 90 can be used to capture pictures of Device's 98 surrounding. In some embodiments, Picture Capturing Apparatus 90 may be or comprises a motion picture camera that can capture streams of pictures (i.e. motion pictures, videos, etc.). In other embodiments, Picture Capturing Apparatus 90 may be or comprises a still picture camera that can capture still pictures (i.e. photographs, etc.). In further embodiments, Picture Capturing Apparatus 90 may be or comprises any other picture capturing apparatus. In general, Picture Capturing Apparatus 90 may capture any light (i.e. visible light, infrared light, ultraviolet light, x-ray light, etc.) across the electromagnetic spectrum onto a light-sensitive material. In one example, a digital Picture Capturing Apparatus 90 can utilize a charge coupled device (CCD), a CMOS sensor, and/or other electronic image sensor to capture digital pictures that can then be stored in a memory or storage, or transmitted to an element such as Artificial Intelligence Unit 110. In another example, analog Picture Capturing Apparatus 90 can utilize an analog-to-digital converter to produce digital pictures. In some embodiments, Picture Capturing Apparatus 90 can be built, embedded, or integrated in Device 98, VSADO Unit 100, and/or other disclosed element. In other embodiments, Picture Capturing Apparatus 90 can be an external Picture Capturing Apparatus 90 connected with Device 98, VSADO Unit 100, and/or other disclosed element. In further embodiments, Picture Capturing Apparatus 90 comprises Computing Device 70 or elements thereof. In general, Picture Capturing Apparatus 90 can be implemented in any suitable configuration to provide its functionalities. Picture Capturing Apparatus 90 may capture one or more Digital Pictures 525. Digital Picture 525 (also referred to simply as digital pictures, etc.) may include a collection of color encoded pixels or dots. Examples of file formats that can be utilized to store Digital Picture 525 include JPEG, GIF, TIFF, PNG, PDF, and/or other file formats. A stream of Digital Pictures 525 (i.e. motion picture, video, etc.) may include one or more Digital Pictures 525. Examples of file formats that can be utilized to store a stream of Digital Pictures 525 include MPEG, AVI, FLV, MOV, RM, SWF, WMV, DivX, and/or other file formats. In some aspects, Digital Picture 525 may include or be substituted with a stream of Digital Pictures 525, and vice versa. Therefore, the terms digital picture and stream of digital pictures may be used interchangeably herein depending on context. In some aspects, Device's 98 surrounding may include exterior of Device 98. In other aspects, Device's 98 surrounding may include interior of Device 98 in case of hollow Device 98, Device 98 comprising compartments or openings, and/or other variously shaped Device 98.

VSADO Unit 100 comprises any hardware, programs, or a combination thereof. VSADO Unit 100 comprises the functionality for learning the operation of Device 98 in various visual surroundings. VSADO Unit 100 comprises the functionality for structuring and/or storing this knowledge in a knowledgebase (i.e. neural network, graph, sequences, other repository, etc.). VSADO Unit 100 comprises the functionality for enabling autonomous operation of Device 98 in various visual surroundings. VSADO Unit 100 comprises the functionality for interfacing with or attaching to Application Program 18, Processor 11, Logic Circuit 250, and/or other processing element. VSADO Unit 100 comprises the functionality for obtaining instruction sets, data, and/or other information used, implemented, and/or executed by Application Program 18, Processor 11, Logic Circuit 250, and/or other processing element. VSADO Unit 100 comprises the functionality for modifying instruction sets, data, and/or other information used, implemented, and/or executed by Application Program 18, Processor 11, Logic Circuit 250, and/or other processing element. VSADO Unit 100 comprises learning, anticipating, decision making, automation, and/or other functionalities disclosed herein. Statistical, artificial intelligence, machine learning, and/or other models or techniques are utilized to implement the disclosed devices, systems, and methods.

When the disclosed VSADO Unit 100 functionalities are applied on Application Program 18, Processor 11, Logic Circuit 250 (later described), and/or other processing element of Device 98, Device 98 may become autonomous. VSADO Unit 100 may take control from, share control with, and/or release control to Application Program 18, Processor 11, Logic Circuit 250, and/or other processing element to implement autonomous operation of Device 98. VSADO Unit 100 may take control from, share control with, and/or release control to Application Program 18, Processor 11, Logic Circuit 250, and/or other processing element automatically or after prompting User 50 to allow it. In some aspects, Application Program 18, Processor 11, Logic Circuit 250, and/or other processing element of an autonomous Device 98 may include or be provided with anticipatory instructions or instruction sets that User 50 did not issue or cause to be executed. Such anticipatory instructions or instruction sets include instruction sets that User 50 may want or is likely to issue or cause to be executed. Anticipatory instructions or instruction sets can be generated by VSADO Unit 100 or elements thereof based on the visual surrounding of Device 98. As such, Application Program 18, Processor 11, Logic Circuit 250, and/or other processing element of an autonomous Device 98 may include or be provided with some or all original instructions or instruction sets and/or any anticipatory instructions or instruction sets generated by VSADO Unit 100. Therefore, autonomous Device 98 operating may include executing some or all original instructions or instruction sets and/or any anticipatory instructions or instruction sets generated by VSADO Unit 100. In one example, VSADO Unit 100 can overwrite or rewrite the original instructions or instruction sets of Application Program 18, Processor 11, Logic Circuit 250, and/or other processing element with VSADO Unit 100-generated instructions or instruction sets. In another example, VSADO Unit 100 can insert or embed VSADO Unit 100-generated instructions or instruction sets among the original instructions or instruction sets of Application Program 18, Processor 11, Logic Circuit 250, and/or other processing element. In a further example, VSADO Unit 100 can branch, redirect, or jump to VSADO Unit 100-generated instructions or instruction sets from the original instructions or instruction sets of Application Program 18, Processor 11, Logic Circuit 250, and/or other processing element.

In some embodiments, autonomous Device 98 operating comprises determining, by VSADO Unit 100, a next instruction or instruction set to be executed based on Device's 98 visual surrounding prior to the user issuing or causing to be executed the next instruction or instruction set. In yet other embodiments, autonomous application operating comprises determining, by VSADO Unit 100, a next instruction or instruction set to be executed based on Device's 98 visual surrounding prior to the system receiving the next instruction or instruction set.

In some embodiments, autonomous Device 98 operating includes a partially or fully autonomous operating. In an example involving partially autonomous Device 98 operating, a user confirms VSADO Unit 100-generated instructions or instruction sets prior to their execution. In an example involving fully autonomous application operating, VSADO Unit 100-generated instructions or instruction sets are executed without user or other system confirmation (i.e. automatically, etc.).

In some embodiments, a combination of VSADO Unit 100 and other systems and/or techniques can be utilized to implement Device's 98 operation. In one example, VSADO Unit 100 may be a primary or preferred system for implementing Device's 98 operation. While operating autonomously under the control of VSADO Unit 100, Device 98 may encounter a visual surrounding that has not been encountered or learned before. In such situations, User 50 and/or non-VSADO system may take control of Device's 98 operation. VSADO Unit 100 may take control again when Device 98 encounters a previously learned visual surrounding. Naturally, VSADO Unit 100 can learn Device's 98 operation in visual surroundings while User 50 and/or non-VSADO system is in control of Device 98, thereby reducing or eliminating the need for future involvement of User 50 and/or non-VSADO system. In another example, User 50 and/or non-VSADO system may be a primary or preferred system for control of Device's 98 operation. While operating under the control of User 50 and/or non-VSADO system, User 50 and/or non-VSADO system may release control to VSADO Unit 100 for any reason (i.e. User 50 gets tired or distracted, non-VSADO system gets stuck or cannot make a decision, etc.), at which point Device 98 can be controlled by VSADO Unit 100. In some designs, VSADO Unit 100 may take control in certain special visual surroundings where VSADO Unit 100 may offer superior performance even though User 50 and/or non-VSADO system may generally be preferred. Once Device 98 leaves such special visual surrounding, VSADO Unit 100 may release control to User 50 and/or a non-VSADO system. In general, VSADO Unit 100 can take control from, share control with, or release control to User 50, non-VSADO system, and/or other system or process at any time, under any circumstances, and remain in control for any period of time as needed.

In some embodiments, VSADO Unit 100 may control one or more sub-devices, sub-systems, or elements of Device 98 while User 50 and/or non-VSADO system may control other one or more sub-devices, sub-systems, or elements of Device 98.

It should be understood that a reference to autonomous operating of Device 98 may include autonomous operating of Application Program 18, Processor 11, Logic Circuit 250, and/or other processing element depending on context.

Acquisition Interface 120 comprises the functionality for obtaining or receiving instruction sets, data, and/or other information. Acquisition Interface 120 comprises the functionality for obtaining or receiving instruction sets, data, and/or other information from Processor 11, Application Program 18, Logic Circuit 250 (later described), and/or other processing element. Acquisition Interface 120 comprises the functionality for obtaining or receiving instruction sets, data, and/or other information at runtime. In some aspects, an instruction set may include any computer command, instruction, signal, or input used in Application Program 18, Processor 11, Logic Circuit 250, and/or other processing element. Therefore, the terms instruction set, command, instruction, signal, input, or other such terms may be used interchangeably herein depending on context. Acquisition Interface 120 also comprises the functionality for attaching to or interfacing with Application Program 18, Processor 11, Logic Circuit 250, and/or other processing element. In one example, Acquisition Interface 120 comprises the functionality to access and/or read runtime engine/environment, virtual machine, operating system, compiler, just-in-time (JIT) compiler, interpreter, translator, execution stack, file, object, data structure, and/or other computing system elements. In another example, Acquisition Interface 120 comprises the functionality to access and/or read memory, storage, bus, interfaces, and/or other computing system elements. In a further example, Acquisition Interface 120 comprises the functionality to access and/or read Processor 11 registers and/or other Processor 11 elements. In a further example, Acquisition Interface 120 comprises the functionality to access and/or read inputs and/or outputs of Application Program 18, Processor 11, Logic Circuit 250, and/or other processing element. In a further example, Acquisition Interface 120 comprises the functionality to access and/or read functions, methods, procedures, routines, subroutines, and/or other elements of Application Program 18. In a further example, Acquisition Interface 120 comprises the functionality to access and/or read source code, bytecode, compiled, interpreted, or otherwise translated code, machine code, and/or other code. In a further example, Acquisition Interface 120 comprises the functionality to access and/or read values, variables, parameters, and/or other data or information. Acquisition Interface 120 also comprises the functionality for transmitting the obtained instruction sets, data, and/or other information to Artificial Intelligence Unit 110 and/or other element. As such, Acquisition Interface 120 provides input into Artificial Intelligence Unit 110 for knowledge structuring, anticipating, decision making, and/or other functionalities later in the process. Acquisition Interface 120 also comprises other disclosed functionalities.

Acquisition Interface 120 can employ various techniques for obtaining instruction sets, data, and/or other information. In one example, Acquisition Interface 120 can attach to and/or obtain Processor's 11, Application Program's 18, Logic Circuit's 250, and/or other processing element's instruction sets, data, and/or other information through tracing or profiling techniques. Tracing or profiling may be used for outputting Processor's 11, Application Program's 18, Logic Circuit's 250, and/or other processing element's instruction sets, data, and/or other information at runtime. For instance, tracing or profiling may include adding trace code (i.e. instrumentation, etc.) to an application and/or outputting trace information to a specific target. The outputted trace information (i.e. instruction sets, data, and/or other information, etc.) can then be provided to or recorded into a file, data structure, repository, an application, and/or other system or target that may receive such trace information. As such, Acquisition Interface 120 can utilize tracing or profiling to obtain instruction sets, data, and/or other information and provide them as input into Artificial Intelligence Unit 110. In some aspects, instrumentation can be performed in source code, bytecode, compiled, interpreted, or otherwise translated code, machine code, and/or other code. In other aspects, instrumentation can be performed in various elements of a computing system such as memory, virtual machine, runtime engine/environment, operating system, compiler, interpreter, translator, processor registers, execution stack, program counter, and/or other elements. In yet other aspects, instrumentation can be performed in various abstraction layers of a computing system such as in software layer (i.e. Application Program 18, etc.), in virtual machine (if VM is used), in operating system, in Processor 11, and/or in other layers or areas that may exist in a particular computing system implementation. In yet other aspects, instrumentation can be performed at various time periods in an application's execution such as source code write time, compile time, interpretation time, translation time, linking time, loading time, runtime, and/or other time periods. In yet other aspects, instrumentation can be performed at various granularities or code segments such as some or all lines of code, some or all statements, some or all instructions or instruction sets, some or all basic blocks, some or all functions/routines/subroutines, and/or some or all other code segments.

In some embodiments, Application Program 18 can be automatically instrumented. In one example, Acquisition Interface 120 can access Application Program's 18 source code, bytecode, or machine code and select instrumentation points of interest. Selecting instrumentation points may include finding locations in the source code, bytecode, or machine code corresponding to function calls, function entries, function exits, object creations, object destructions, event handler calls, new lines (i.e. to instrument all lines of code, etc.), thread creations, throws, and/or other points of interest. Instrumentation code can then be inserted at the instrumentation points of interest to output Application Program's 18 instruction sets, data, and/or other information. In response to executing instrumentation code, Application Program's 18 instruction sets, data, and/or other information may be received by Acquisition Interface 120. In some aspects, Application Program's 18 source code, bytecode, or machine code can be dynamically instrumented. For example, instrumentation code can be dynamically inserted into Application Program 18 at runtime.

In other embodiments, Application Program 18 can be manually instrumented. In one example, a programmer can instrument a function call by placing an instrumenting instruction immediately after the function call as in the following example.

Object1.moveRight(73);
traceApplication('Object1.moveRight(73);');

In another example, an instrumenting instruction can be placed immediately before the function call, or at the beginning, end, or anywhere within the function itself. A programmer may instrument all function calls or only function calls of interest. In a further example, a programmer can instrument all lines of code or only code lines of interest. In a further example, a programmer can instrument other elements utilized or implemented within Application Program 18 such as objects and/or any of their functions, data structures and/or any of their functions, event handlers and/or any of their functions, threads and/or any of their functions, and/or other elements or functions. Similar instrumentation as in the preceding examples can be performed automatically or dynamically. In some designs where manual code instrumentation is utilized, Acquisition Interface 120 can optionally be omitted and Application Program's 18 instruction sets, data, and/or other information may be transmitted directly to Artificial Intelligence Unit 110.

In some embodiments, VSADO Unit 100 can be selective in learning instruction sets, data, and/or other information to those implemented, utilized, or related to an object, data structure, repository, thread, function, and/or other element of Application Program 18. In some aspects, Acquisition Interface 120 can obtain Application Program's 18 instruction sets, data, and/or other information implemented, utilized, or related to a certain object in an object oriented Application Program 18.

In some embodiments, various computing systems and/or platforms may provide native tools for obtaining instruction sets, data, and/or other information. Also, independent vendors may provide portable tools with similar functionalities that can be utilized across different computing systems and/or platforms. These native and portable tools may provide a wide range of functionalities to obtain runtime and other information such as instrumentation, tracing or profiling, logging application or system messages, outputting custom text messages, outputting objects or data structures, outputting functions/routines/subroutines or their invocations, outputting variable or parameter values, outputting thread or process behaviors, outputting call or other stacks, outputting processor registers, providing runtime memory access, providing inputs and/or outputs, performing live application monitoring, and/or other capabilities. One of ordinary skill in art will understand that, while all possible variations of the techniques to obtain instruction sets, data, and/or other information are too voluminous to describe, these techniques are within the scope of this disclosure.

In one example, obtaining instruction sets, data, and/or other information can be implemented through the .NET platform's native tools for application tracing or profiling such as System.Diagnostics.Trace, System.Diagnostics.Debug, and System.Diagnostics.TraceSource classes for tracing execution flow, and System. Diagnostics. Process, System.Diagnostics.EventLog, and System. Diagnostics. PerformanceCounter classes for profiling code, accessing local and remote processes, starting and stopping system processes, and interacting with Windows event logs, etc. For instance, a set of trace switches can be created that output an application's information. The switches can be configured using the .config file. For a Web application, this may typically be Web.config file associated with the project. In a Windows application, this file may typically be named applicationName.exe.config. Trace code can be added to application code automatically or manually as previously described. Appropriate listener can be created where the trace output is received. Trace code may output trace messages to a specific target such as a file, a log, a database, an object, a data structure, and/or other repository or system. Acquisition Interface 120 or Artificial Intelligence Unit 110 can then read or obtain the trace information from these targets. In some aspects, trace code may output trace messages directly to Acquisition Interface 120. In other aspects, trace code may output trace messages directly to Artificial Intelligence Unit 110. In the case of outputting trace messages to Acquisition Interface 120 or directly to Artificial Intelligence Unit 110, custom listeners can be built to accommodate these specific targets. Other platforms, tools, and/or techniques can provide equivalent or similar functionalities as the above described ones.

In another example, obtaining instruction sets, data, and/or other information can be implemented through the .NET platform's Profiling API that can be used to create a custom profiler application for tracing, monitoring, interfacing with, and/or managing a profiled application. The Profiling API provides an interface that includes methods to notify the profiler of events in the profiled application. The Profiling API may also provide an interface to enable the profiler to call back into the profiled application to obtain information about the state of the profiled application. The Profiling API may further provide call stack profiling functionalities. Call stack (also referred to as execution stack, control stack, runtime stack, machine stack, the stack, etc.) includes a data structure that can store information about active subroutines of an application. The Profiling API may provide a stack snapshot method, which enables a trace of the stack at a particular point in time. The Profiling API may also provide a shadow stack method, which tracks the call stack at every instant. A shadow stack can obtain function arguments, return values, and information about generic instantiations. A function such as FunctionEnter can be utilized to notify the profiler that control is being passed to a function and can provide information about the stack frame and function arguments. A function such as FunctionLeave can be utilized to notify the profiler that a function is about to return to the caller and can provide information about the stack frame and function return value. An alternative to call stack profiling includes call stack sampling in which the profiler can periodically examine the stack. In some aspects, the Profiling API enables the profiler to change the in-memory code stream for a routine before it is just-in-time (JIT) compiled where the profiler can dynamically add instrumentation code to all or particular routines of interest. Other platforms, tools, and/or techniques may provide equivalent or similar functionalities as the above described ones.

In a further example, obtaining instruction sets, data, and/or other information can be implemented through Java platform's APIs for application tracing or profiling such as Java Virtual Machine Profiling Interface (JVMPI), Java Virtual Machine Tool Interface (JVMTI), and/or other APIs or tools. These APIs can be used for instrumentation of an application, for notification of Java Virtual Machine (VM) events, and/or other functionalities. One of the tracing or profiling techniques that can be utilized includes bytecode instrumentation. The profiler can insert bytecodes into all or some of the classes. In application execution profiling, for example, these bytecodes may include methodEntry and methodExit calls. In memory profiling, for example, the bytecodes may be inserted after each new or after each constructor. In some aspects, insertion of instrumentation bytecode can be performed either by a post-compiler or a custom class loader. An alternative to bytecode instrumentation includes monitoring events generated by the JVMPI or JVMTI interfaces. Both APIs can generate events for method entry/exit, object allocation, and/or other events. In some aspects, JVMTI can be utilized for dynamic bytecode instrumentation where insertion of instrumentation bytecodes is performed at runtime. The profiler may insert the necessary instrumentation when a selected class is invoked in an application. This can be accomplished using the JVMTI's redefineClasses method, for example. This approach also enables changing of the level of profiling as the application is running. If needed, these changes can be made adaptively without restarting the application. Other platforms, tools, and/or techniques may provide equivalent or similar functionalities as the above described ones.

In a further example, obtaining instruction sets, data, and/or other information can be implemented through JVMTI's programming interface that enables creation of software agents that can monitor and control a Java application. An agent may use the functionality of the interface to register for notification of events as they occur in the application, and to query and control the application. A JVMTI agent may use JVMTI functions to extract information from a Java application. A JVMTI agent can be utilized to obtain an application's runtime information such as method calls, memory allocation, CPU utilization, lock contention, and/or other information. JVMTI may include functions to obtain information about variables, fields, methods, classes, and/or other information. JVMTI may also provide notification for numerous events such as method entry and exit, exception, field access and modification, thread start and end, and/or other events. Examples of JVMTI built-in methods include GetMethodName to obtain the name of an invoked method, GetThreadInfo to obtain information for a specific thread, GetClassSignature to obtain information about the class of an object, GetStackTrace to obtain information about the stack including information about stack frames, and/or other methods. Other platforms, tools, and/or techniques may provide equivalent or similar functionalities as the above described ones.

In a further example, obtaining instruction sets, data, and/or other information can be implemented through java.lang.Runtime class that provides an interface for application tracing or profiling. Examples of methods provided in java.lang.Runtime that can be used to obtain an application's instruction sets, data, and/or other information include tracemethodcalls, traceinstructions, and/or other methods. These methods prompt the Java Virtual Machine to output trace information for a method or instruction in the virtual machine as it is executed. The destination of trace output may be system dependent and include a file, a listener, and/or other destinations where Acquisition Interface 120, Artificial Intelligence Unit 110, and/or other disclosed elements can access needed information. In addition to tracing or profiling tools native to their respective computing systems and/or platforms, many independent tools exist that provide tracing or profiling functionalities on more than one computing system and/or platform. Examples of these tools include Pin, DynamoRIO, KernInst, DynInst, Kprobes, OpenPAT, DTrace, SystemTap, and/or others. Other platforms, tools, and/or techniques may provide equivalent or similar functionalities as the above described ones.

In a further example, obtaining instruction sets, data, and/or other information can be implemented through logging tools of the platform and/or operating system on which an application runs. Some logging tools may include nearly full feature sets of the tracing or profiling tools previously described. In one example, Visual Basic enables logging of runtime messages through its Microsoft.VisualBasic.Logging namespace that provides a log listener where the log listener may direct logging output to a file and/or other target. In another example, Java enables logging through its java.util.logging class. In some aspects, obtaining an application's instruction sets, data, and/or other information can be implemented through logging capabilities of the operating system on which an application runs. For example, Windows NT features centralized log service that applications and operating-system components can utilize to report their events including any messages. Windows NT provides functionalities for system, application, security, and/or other logging. An application log may include events logged by applications. Windows NT, for example, may include support for defining an event source (i.e. application that created the event, etc.). Windows Vista, for example, supports a structured XML log-format and designated log types to allow applications to more precisely log events and to help interpret the events. Examples of different types of event logs include administrative, operational, analytic, debug, and/or other log types including any of their subcategories. Examples of event attributes that can be utilized include eventID, level, task, opcode, keywords, and/or other event attributes. Windows wevtutil tool enables access to events, their structures, registered event publishers, and/or their configuration even before the events are fired. Wevtutil supports capabilities such as retrieval of the names of all logs on a computing device; retrieval of configuration information for a specific log; retrieval of event publishers on a computing device; reading events from an event log, from a log file, or using a structured query; exporting events from an event log, from a log file, or using a structured query to a specific target; and/or other capabilities. Operating system logs can be utilized solely if they contain sufficient information on an application's instruction sets, data, and/or other information. Alternatively, operating system logs can be utilized in combination with another source of information (i.e. trace information, call stack, processor registers, memory, etc.) to reconstruct the application's instruction sets, data, and/or other information needed for Artificial Intelligence Unit 110 and/or other elements. In addition to logging capabilities native to their respective platforms and/or operating systems, many independent tools exist that provide logging on different platforms and/or operating systems. Examples of these tools include Log4j, Logback, SmartInspect, NLog, log 4net, Microsoft Enterprise Library, ObjectGuy Framework, and/or others. Other platforms, tools, and/or techniques may provide equivalent or similar functionalities as the above described ones.

In a further example, obtaining instruction sets, data, and/or other information can be implemented through tracing or profiling the operating system on which an application runs. As in tracing or profiling an application, one of the techniques that can be utilized includes adding instrumentation code to the operating system's source code. Such instrumentation code can be added to the operating system's source code before kernel compilation or recompilation, for instance. This type of instrumentation may involve defining or finding locations in the operating system's source code where instrumentation code may be inserted. Kernel instrumentation can also be performed without the need for kernel recompilation or rebooting. In some aspects, instrumentation code can be added at locations of interest through binary rewriting of compiled kernel code. In other aspects, kernel instrumentation can be performed dynamically where instrumentation code is added and/or removed where needed at runtime. For instance, dynamic instrumentation may overwrite kernel code with a branch instruction that redirects execution to instrumentation code or instrumentation routine. In yet other aspects, kernel instrumentation can be performed using just-in-time (JIT) dynamic instrumentation where execution may be redirected to a copy of kernel's code segment that includes instrumentation code. This type of instrumentation may include a JIT compiler and creation of a copy of the original code segment having instrumentation code or calls to instrumentation routines embedded into the original code segment. Instrumentation of the operating system may enable total system visibility including visibility into an application's behavior by enabling generation of low level trace information. Other platforms, tools, and/or techniques may provide equivalent or similar functionalities as the above described ones.

In a further example, obtaining instruction sets, data, and/or other information can be implemented through tracing or profiling the processor on which an application runs. For example, some Intel processors provide Intel Processor Trace (i.e. Intel PT, etc.), a low-level tracing feature that enables recording executed instruction sets, and/or other data or information of one or more applications. Intel PT is facilitated by the Processor Trace Decoder Library along with its related tools. Intel PT is a low-overhead execution tracing feature that records information about application execution on each hardware thread using dedicated hardware facilities. The recorded execution/trace information is collected in data packets that can be buffered internally before being sent to a memory subsystem or another system or element (i.e. Acquisition Interface 120, Artificial Intelligence Unit 110, etc.). Intel PT also enables navigating the recorded execution/trace information via reverse stepping commands. Intel PT can be included in an operating system's core files and provided as a feature of the operating system. Intel PT can trace globally some or all applications running on an operating system. Acquisition Interface 120 or Artificial Intelligence Unit 110 can read or obtain the recorded execution/trace information from Intel PT. Other platforms, tools, and/or techniques may provide equivalent or similar functionalities as the above described ones.

In a further example, obtaining instruction sets, data, and/or other information can be implemented through branch tracing or profiling. Branch tracing may include an abbreviated instruction trace in which only the successful branch instruction sets are traced or recorded. Branch tracing can be implemented through utilizing dedicated processor commands, for example. Executed branches may be saved into special branch trace store area of memory. With the availability and reference to a compiler listing of the application together with branch trace information, a full path of executed instruction sets can be reconstructed. The full path can also be reconstructed with a memory dump (containing the program storage) and branch trace information. In some aspects, branch tracing can be utilized for pre-learning or automated learning of an application's instruction sets, data, and/or other information where a number of application simulations (i.e. simulations of likely/common operations, etc.) are performed. As such, the application's operation can be learned automatically saving the time that would be needed to learn the application's operation directed by a user. Other platforms, tools, and/or techniques may provide equivalent or similar functionalities as the above described ones.

In a further example, obtaining instruction sets, data, and/or other information can be implemented through assembly language. Assembly language is a low-level programming language for a computer or other programmable device in which there is a strong correlation between the language and the architecture's machine instruction sets. Syntax, addressing modes, operands, and/or other elements of an assembly language instruction set may translate directly into numeric (i.e. binary, etc.) representations of that particular instruction set. Because of this direct relationship with the architecture's machine instruction sets, assembly language can be a powerful tool for tracing or profiling an application's execution in processor registers, memory, and/or other computing system components. For example, using assembly language, memory locations of a loaded application can be accessed, instrumented, and/or otherwise manipulated. In some aspects, assembly language can be used to rewrite or overwrite original in-memory instruction sets of an application with instrumentation instruction sets. In other aspects, assembly language can be used to redirect application's execution to instrumentation routine/subroutine or other code segment elsewhere in memory by inserting a jump into the application's in-memory code, by redirecting program counter, or by other techniques. Some operating systems may implement protection from changes to applications loaded into memory. Operating system, processor, or other low level commands such as Linux mprotect command or similar commands in other operating systems may be used to unprotect the protected locations in memory before the change. In yet other aspects, assembly language can be used to obtain instruction sets, data, and/or other information through accessing and/or reading instruction register, program counter, other processor registers, memory locations, and/or other components of a computing system. In yet other aspects, high-level programming languages may call or execute an external assembly language program to facilitate obtaining instruction sets, data, and/or other information as previously described. In yet other aspects, relatively low-level programming languages such as C may allow embedding assembly language directly in their source code such as, for example, using asm keyword of C. Other platforms, tools, and/or techniques may provide equivalent or similar functionalities as the above described ones.

In a further example, it may be sufficient to obtain user or other inputs, variables, parameters, and/or other data in some procedural, simple object oriented, or other applications. In one instance, a simple procedural application executes a sequence of instruction sets until the end of the program. During its execution, the application may receive user or other input, store the input in a variable, and perform calculations using the variable to reach a result. The value of the variable can be obtained or traced. In another instance, a more complex procedural application comprises one or more functions/routines/subroutines each of which may include a sequence of instruction sets. The application may execute a main sequence of instruction sets with a branch to a function/routine/subroutine. During its execution, the application may receive user or other input, store the input in a variable, and pass the variable as a parameter to the function/routine/subroutine. The function/routine/subroutine may perform calculations using the parameter and return a value that the rest of the application can use to reach a result. The value of the variable or parameter passed to the function/routine/subroutine, and/or return value can be obtained or traced. Values of user or other inputs, variables, parameters, and/or other items of interest can be obtained through previously described tracing, instrumentation, and/or other techniques. Other platforms, tools, and/or techniques may provide equivalent or similar functionalities as the above described ones.

Figure 3:
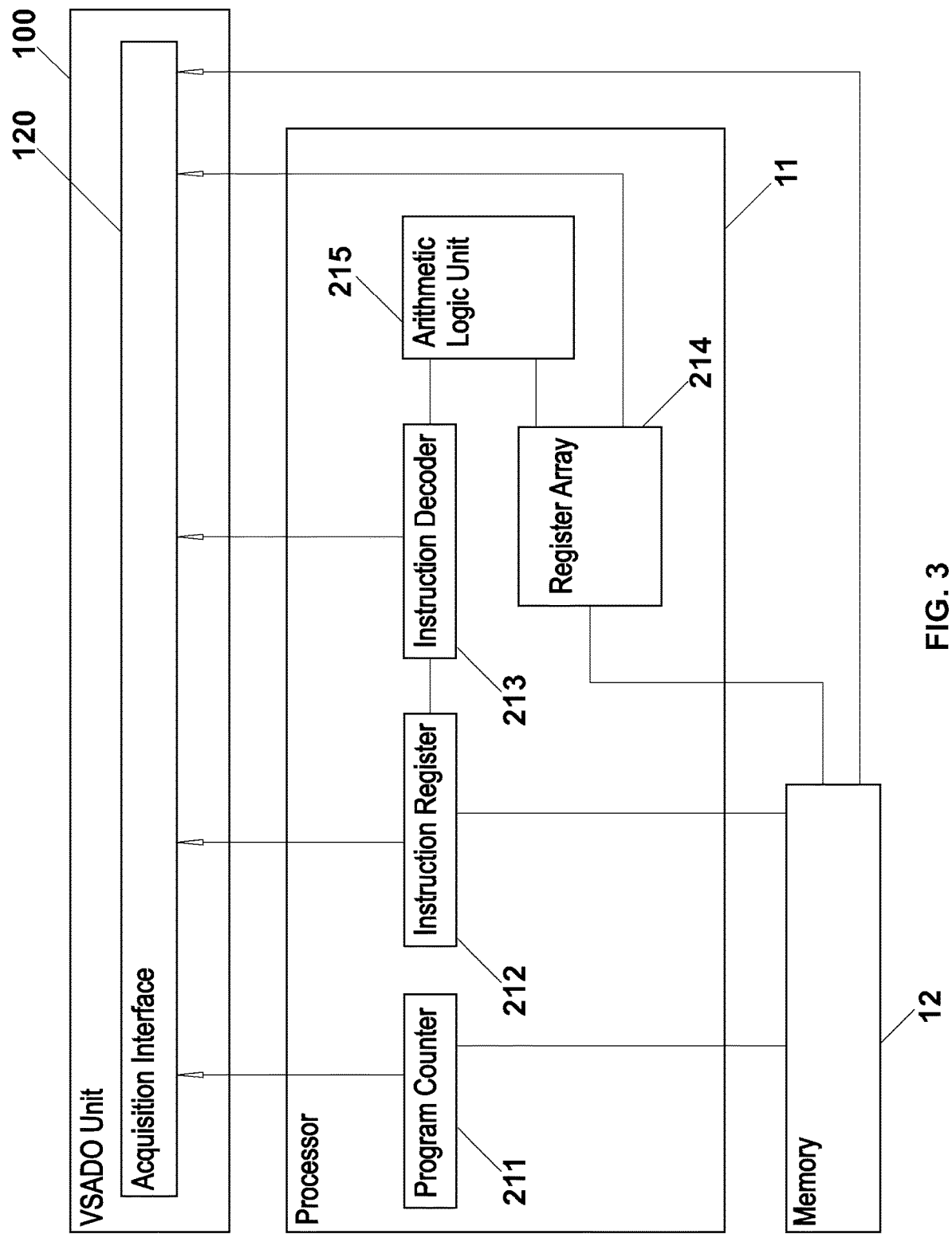
FIG. 3 illustrates some embodiments of obtaining instruction sets, data, and/or other information through tracing, profiling, or sampling of Processor 11 registers, memory, or other computing system components.

Referring to FIG. 3, in yet another example, obtaining instruction sets, data, and/or other information may be implemented through tracing, profiling, or sampling of instruction sets or data in processor registers, memory, or other computing system components where instruction sets, data, and/or other information may be stored or utilized. For example, Instruction Register 212 may be part of Processor 11 and it may store the instruction set currently being executed or decoded. In some processors, Program Counter 211 (also referred to as instruction pointer, instruction address register, instruction counter, or part of instruction sequencer) may be incremented after fetching an instruction set, and it may hold or point to the memory address of the next instruction set to be executed. In a processor where the incrementation precedes the fetch, Program Counter 211 may point to the current instruction set being executed. In the instruction cycle, an instruction set may be loaded into Instruction Register 212 after Processor 11 fetches it from location in Memory 12 pointed to by Program Counter 211. Instruction Register 212 may hold the instruction set while it is decoded by Instruction Decoder 213, prepared, and executed. In some aspects, data (i.e. operands, etc.) needed for instruction set execution may be loaded from Memory 12 into a register within Register Array 214. In other aspects, the data may be loaded directly into Arithmetic Logic Unit 215. For instance, as instruction sets pass through Instruction Register 212 during application execution, they may be transmitted to Acquisition Interface 120 as shown. Examples of the steps in execution of a machine instruction set may include decoding the opcode (i.e. portion of a machine instruction set that may specify the operation to be performed), determining where the operands may be located (depending on architecture, operands may be in registers, the stack, memory, I/O ports, etc.), retrieving the operands, allocating processor resources to execute the instruction set (needed in some types of processors), performing the operation indicated by the instruction set, saving the results of execution, and/or other execution steps. Examples of the types of machine instruction sets that can be utilized include arithmetic, data handling, logical, program control, as well as special and/or other instruction set types. In addition to the ones described or shown, examples of other computing system or processor components that can be used during an instruction cycle include memory address register (MAR) that may hold the address of a memory block to be read from or written to; memory data register (MDR) that may hold data fetched from memory or data waiting to be stored in memory; data registers that may hold numeric values, characters, small bit arrays, or other data; address registers that may hold addresses used by instruction sets that indirectly access memory; general purpose registers (GPRs) that may store both data and addresses; conditional registers that may hold truth values often used to determine whether some instruction set should or should not be executed; floating point registers (FPRs) that may store floating point numbers; constant registers that may hold read-only values such as zero, one, or pi; special purpose registers (SPRs) such as status register, program counter, or stack pointer that may hold information on program state; machine-specific registers that may store data and settings related to a particular processor; Register Array 214 that may include an array of any number of processor registers; Arithmetic Logic Unit 215 that may perform arithmetic and logic operations; control unit that may direct processor's operation; and/or other circuits or components. Tracing, profiling, or sampling of processor registers, memory, or other computing system components can be implemented in a program, combination of hardware and program, or purely hardware system. Dedicated hardware may be built to perform tracing, profiling, or sampling of processor registers or any computing system components with marginal or no impact to computing overhead.

One of ordinary skill in art will recognize that FIG. 3 depicts one of many implementations of processor or computing system components, and that various additional components can be included, or some of the disclosed ones can be excluded, or a combination thereof can be utilized in alternate implementations. Processor or computing system components may be arranged or connected differently in alternate implementations. Processor or computing system components may also be connected with external elements using various connections. For instance, the connection between Instruction Register 212 and Acquisition Interface 120 may include any number or types of connections such as, for example, a dedicated connection for each bit of Instruction Register 212 (i.e. 32 connections for a 32 bit Instruction Register 212, etc.). Any of the described or other connections or interfaces may be implemented among any processor or computing system components and Acquisition Interface 120 or other elements.

Figure 4A:
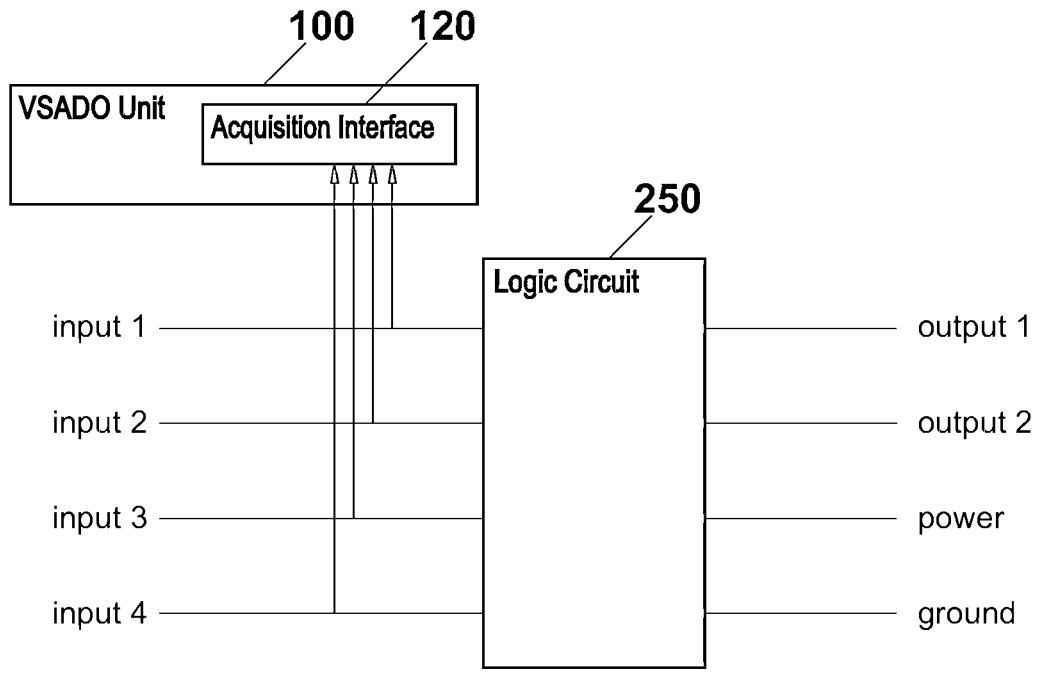
FIGS. 4A-4B illustrate some embodiments of obtaining instruction sets, data, and/or other information through tracing, profiling, or sampling of Logic Circuit 250.
Figure 4B:
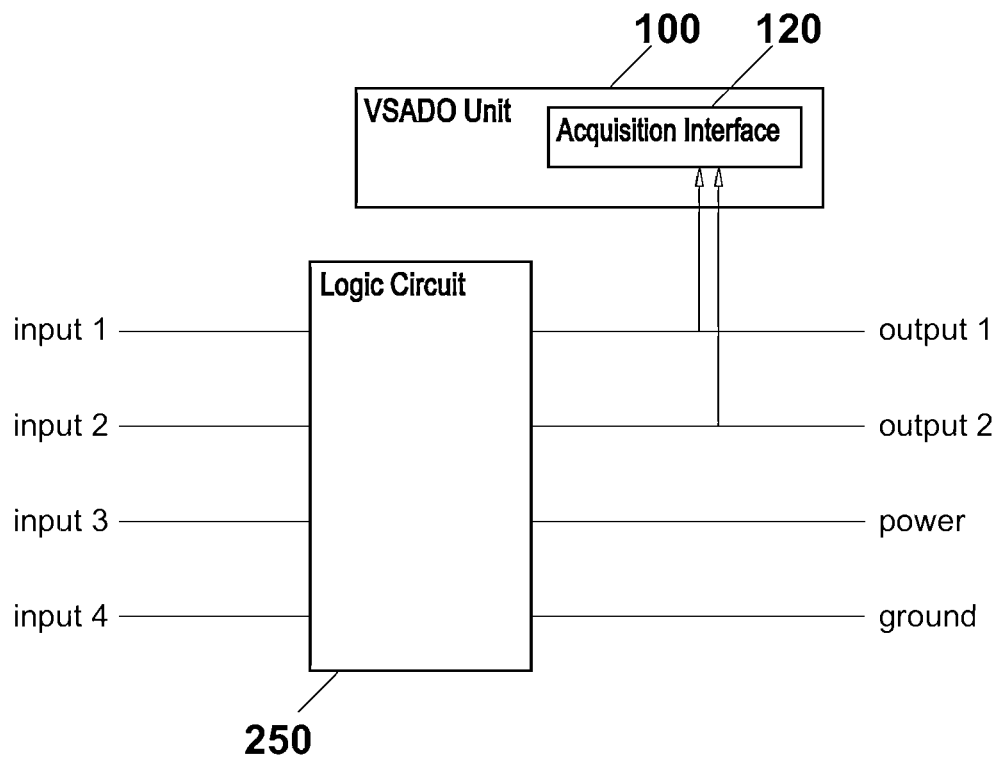

Referring to FIGS. 4A-4B, in yet another example, obtaining instruction sets, data, and/or other information may be implemented through tracing, profiling, or sampling of Logic Circuit 250. While Processor 11 includes any type or embodiment of logic circuit, Logic Circuit 250 is described separately here to offer additional detail on its functioning. Some Devices 98 may not need the processing capabilities of an entire Processor 11, but instead a more tailored Logic Circuit 250. Examples of such Devices 98 include home appliances, audio or video electronics, vehicle systems, toys, industrial machines, robots, and/or others. Logic Circuit 250 comprises the functionality for performing logic operations. Logic Circuit 250 comprises the functionality for performing logic operations using the circuit's inputs and producing outputs based on the logic operations performed on the inputs. Logic Circuit 250 may generally be implemented using transistors, diodes, and/or other electronic switches, but can also be constructed using vacuum tubes, electromagnetic relays (relay logic), fluidic logic, pneumatic logic, optics, molecules, or even mechanical elements. In some aspects, Logic Circuit 250 may be or include a microcontroller, field-programmable gate array (FPGA), application-specific integrated circuit (ASIC), and/or other computing circuit or device. In other aspects, Logic Circuit 250 may be or include any circuit or device comprising one or more logic gates, one or more transistors, one or more switches, and/or one or more other logic components. In further aspects, Logic Circuit 250 may be or include any integrated or other circuit or device that can perform logic operations. Logic may generally refer to Boolean logic utilized in binary operations, but other logics can also be used. Input into Logic Circuit 250 may include or refer to a value inputted into the Logic Circuit 250, therefore, these terms may be used interchangeably herein depending on context. In one example, Logic Circuit 250 may perform some logic operations using four input values and produce two output values. As the four input values are delivered to or received by Logic Circuit 250, they may be obtained by Acquisition Interface 120 through the four hardwired connections as shown in FIG. 4A. In another example, Logic Circuit 250 may perform some logic operations using four input values and produce two output values. As the two output values are generated by or transmitted out of Logic Circuit 250, they may be obtained by Acquisition Interface 120 through the two hardwired connections as shown in FIG. 4B. In a further example, instead of or in addition to obtaining input and/or output values of Logic Circuit 250, the state of Logic Circuit 250 may be obtained by reading or accessing values from one or more Logic Circuit's 250 internal components such as registers, memories, buses, and/or others (i.e. similar to the previously described tracing, profiling, and/or sampling of Processor 11 components, etc.). Tracing, profiling, or sampling of Logic Circuit 250 can be implemented in a program, combination of hardware and program, or purely hardware system. Dedicated hardware may be built to perform tracing, profiling or sampling of Logic Circuit 250 with marginal or no impact to computing overhead. Any of the elements and/or techniques for tracing, profiling, or sampling of Logic Circuit 250 can similarly be implemented with Processor 11 and/or other processing elements. In some designs, VSADO Unit 100 may include clamps and/or other elements to attach VSADO Unit 100 to inputs (i.e. input wires, etc.) into and/or outputs (i.e. output wires, etc.) from Logic Circuit 250. Such clamps and/or attachment elements enable seamless attachment of VSADO Unit 100 to any circuit or computing device without the need to redesign or alter the circuit or computing device.

In some embodiments, VSADO Unit 100 may learn input values directly from an actuator (previously described, not shown). For example, Logic Circuit 250 or other processing element may control an actuator that enables Device 98 to perform mechanical, physical, and/or other operations. An actuator may receive one or more input values or control signals from Logic Circuit 250 or other processing element directing the actuator to perform specific operations. As one or more input values or control signals are delivered to or received by the actuator, they may be obtained by Acquisition Interface 120 as previously described with respect to obtaining input values of Logic Circuit 250. Specifically, for instance, one or more input values or control signals of an actuator may be obtained by Acquisition Interface 120 via hardwired or other connections.

One of ordinary skill in art will recognize that FIGS. 4A-4B depict one of many implementations of Logic Circuit 250 and that any number of input and/or output values can be utilized in alternate implementations. One of ordinary skill in art will also recognize that Logic Circuit 250 may include any number and/or combination of logic components to implement any logic operations.

Other additional techniques or elements may be utilized as needed for obtaining instruction sets, data, and/or other information, or some of the disclosed techniques or elements may be excluded, or a combination thereof may be utilized in alternate embodiments.

Figure 5A:
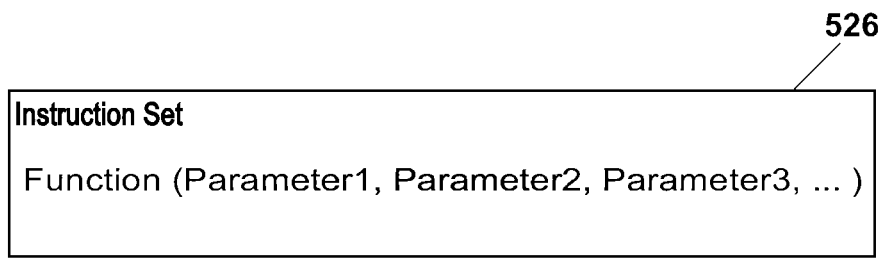
FIGS. 5A-5E illustrate some embodiments of Instruction Sets 526.
Figure 5B:
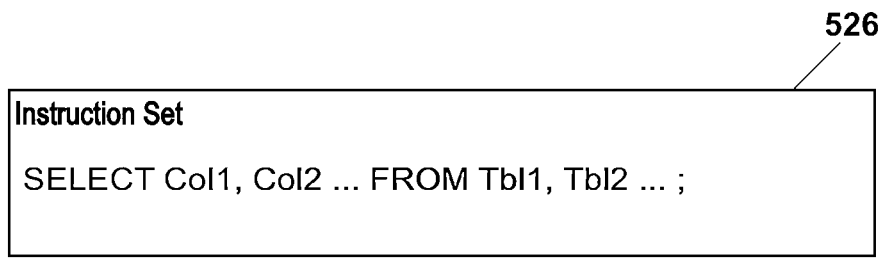
Figure 5C:
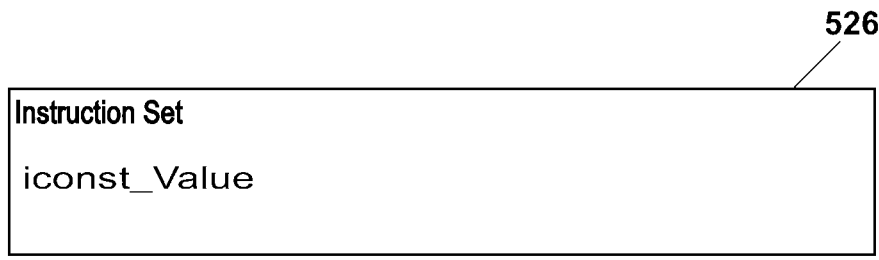

Referring to FIGS. 5A-5C, some embodiments of Instruction Sets 526 are illustrated. In some aspects, Instruction Set 526 includes one or more instructions or commands of Application Program 18. For example, Instruction Set 526 may include one or more instructions or commands of a high-level programming language such as Java or SQL, a low-level language such as assembly or machine language, an intermediate language or construct such as bytecode, and/or any other language or construct. In other aspects, Instruction Set 526 includes one or more inputs into and/or outputs from Logic Circuit 250, Processor 11, Application Program 18, and/or other processing element. In further aspects, Instruction Set 526 includes one or more values or states of registers and/or other components of Logic Circuit 250, Processor 11, and/or other processing element. In general, Instruction Set 526 may include one or more instructions, commands, keywords, symbols (i.e. parentheses, brackets, commas, semicolons, etc.), operators (i.e. =, <, >, etc.), variables, values, objects, data structures, functions (i.e. Function1( ), FIRST( ), MIN( ), SQRT( ), etc.), parameters, states, signals, inputs, outputs, characters, digits, references thereto, and/or other components for performing an operation.

Figure 5D:
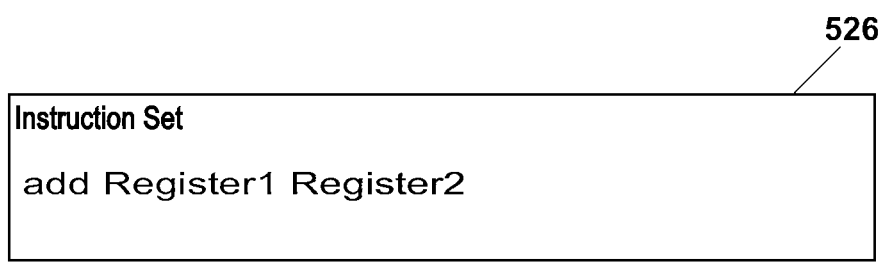
Figure 5E:
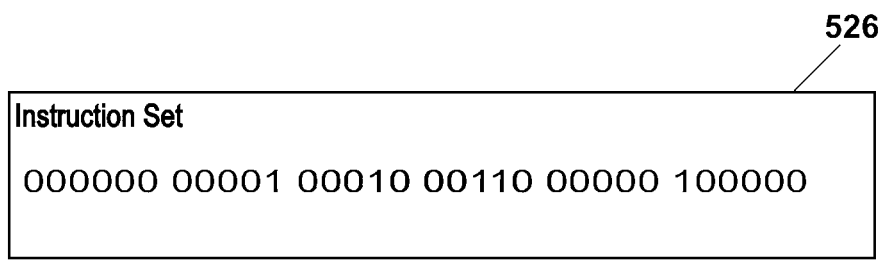

In an embodiment shown in FIG. 5A, Instruction Set 526 includes code of a high-level programming language (i.e. Java, C++, etc.) comprising the following function call construct: Function1 (Parameter1, Parameter2, Parameter3, . . . ). An example of a function call applying the above construct includes the following Instruction Set 526: moveTo(Object1, 29, 17). The function or reference thereto "moveTo(Object1, 29, 17)" may be an Instruction Set 526 directing Object1 to move to a location with coordinates 29 and 17, for example. In another embodiment shown in FIG. 5B, Instruction Set 526 includes structured query language (SQL). In a further embodiment shown in FIG. 5C, Instruction Set 526 includes bytecode (i.e. Java bytecode, Python bytecode, CLR bytecode, etc.). In a further embodiment shown in FIG. 5D, Instruction Set 526 includes assembly code. In a further embodiment shown in FIG. 5E, Instruction Set 526 includes machine code.

Figure 6A:
FIGS. 6A-6B illustrate some embodiments of Extra Information 527.
Figure 6B:

Referring to FIGS. 6A-6B, some embodiments of Extra Information 527 (also referred to as Extra Info 527) are illustrated. In an embodiment shown in FIG. 6A, Digital Picture 525 may include or be associated with Extra Info 527. In an embodiment shown in FIG. 6B, Instruction Set 526 may include or be associated with Extra Info 527.

Extra Info 527 comprises the functionality for storing any information useful in comparisons or decision making performed in autonomous device operation, and/or other functionalities. One or more Extra Infos 527 can be stored in, appended to, or associated with a Digital Picture 525, Instruction Set 526, and/or other element. In some embodiments, the system can obtain Extra Info 527 at a time of capturing or receiving of Digital Picture 525. In other embodiments, the system can obtain Extra Info 527 at a time of acquisition of Instruction Set 526. In general, the system or any element thereof can obtain Extra Info 527 at any time. Examples of Extra Info 527 include time information, location information, computed information, observed information, sensory information, contextual information, and/or other information. Any information can be utilized that can provide information for enhanced comparisons or decision making performed in autonomous device operation. Which information is utilized and/or stored in Extra Info 527 can be set by a user, by VSADO system administrator, or automatically by the system. Extra Info 527 may include or be referred to as contextual information, and vice versa. Therefore, these terms may be used interchangeably herein depending on context.

In some aspects, time information (i.e. time stamp, etc.) can be utilized and/or stored in Extra Info 527. Time information can be useful in comparisons or decision making performed in autonomous device operation related to a specific time period as Device 98 may be required to perform specific operations at certain parts of day, month, year, and/or other time periods. Time information can be obtained from the system clock, online clock, oscillator, or other time source. In one example, a thermostat device may be directed to turn heat on in the morning and/or turn heat off during the day. In a further example, a personal computer device may be directed to start or stop an application program or process on a particular day of the month. In general, Extra Info 527 may include time information related to when Device 98 performed an operation. In other aspects, location information (i.e. coordinates, address, etc.) can be utilized and/or stored in Extra Info 527. Location information can be useful in comparisons or decision making performed in autonomous device operation related to a specific place as Device 98 may be required to perform specific operations at certain places. Location information can be obtained from a positioning system (i.e. radio signal triangulation in smartphones or tablets, GPS capabilities, etc.) if one is available. In one example, a smartphone device may be directed to engage in a vibrate mode in a school or house of worship. In another example, a vehicle may be directed to turn right at a particular road crossing. In general, Extra Info 527 may include location information related to where Device 98 performed an operation. In further aspects, computed information can be utilized and/or stored in Extra Info 527. Computed information can be useful in comparisons or decision making performed in autonomous device operation where information can be calculated, inferred, or derived from other available information. VSADO Unit 100 may include computational functionalities to create Extra Info 527 by performing calculations or inferences using other information. In one example, Device's 98 speed can be computed or estimated from the Device's 98 location and/or time information. In another example, Device's 98 bearing (i.e. angle or direction of movement, etc.) can be computed or estimated from the Device's 98 location information by utilizing Pythagorean theorem, trigonometry, and/or other theorems, formulas, or disciplines. In a further example, speeds, bearings, distances, and/or other properties of objects around Device 98 can similarly be computed or inferred, thereby providing geo-spatial and situational awareness and/or capabilities to the Device 98. In further aspects, observed information can be utilized and/or stored in Extra Info 527. Observed information can be useful in comparisons or decision making performed in autonomous device operation related to a specific object or environment as Device 98 may be required to perform certain operations around specific objects or in specific environments. For example, an object or environment can be recognized by processing one or more Digital Pictures 525 from Picture Capturing Apparatus 90. Any features, functionalities, and embodiments of Picture Recognizer 350 (later described) can be utilized for such recognizing. In one example, book shelves recognized in the background of one or more Digital Pictures 525 from Picture Capturing Apparatus 90 may indicate a library or book store. In another example, trees recognized in the background of one or more Digital Pictures 525 from Picture Capturing Apparatus 90 may indicate a park. In a further example, a pedestrian recognized in one or more Digital Pictures 525 from Picture Capturing Apparatus 90 may indicate a street. In further aspects, sensory information can be utilized and/or stored in Extra Info 527. Examples of sensory information include acoustic information, visual information, tactile information, and/or others. Sensory information can be useful in comparisons or decision making performed in autonomous device operation related to a specific object or environment as Device 98 may be required to perform certain operations around specific objects or in specific environments. For example, an object or environment can be recognized by processing digital sound from a sound capturing apparatus (i.e. microphone, etc., not shown). Any features, functionalities, and embodiments of a speech or sound recognizer (not shown) can be utilized for such recognizing. In one example, sound of waves recognized in digital sound from a sound capturing apparatus may indicate a beach. In another example, sound of a horn recognized in digital sound from a sound capturing apparatus may indicate a proximal vehicle. In some designs where acoustic information includes one or more digital sound samples of Device's 98 surrounding captured by a sound capturing apparatus, the digital sound samples can be learned and/or used similar to Digital Pictures 525 of Device's 98 visual surrounding. In such designs, both Digital Pictures 525 and digital sound samples of a device's surrounding can be learned and/or used for autonomous device operation. In further aspects, other information can be utilized and/or stored in Extra Info 527. Examples of such other information include user specific information (i.e. skill level, age, gender, etc.), group user information (i.e. access level, etc.), version of Application Program 18, the type of Application Program 18, the type of Processor 11, the type of Logic Circuit 250, the type of Device 98, and/or other information.

Figure 7:
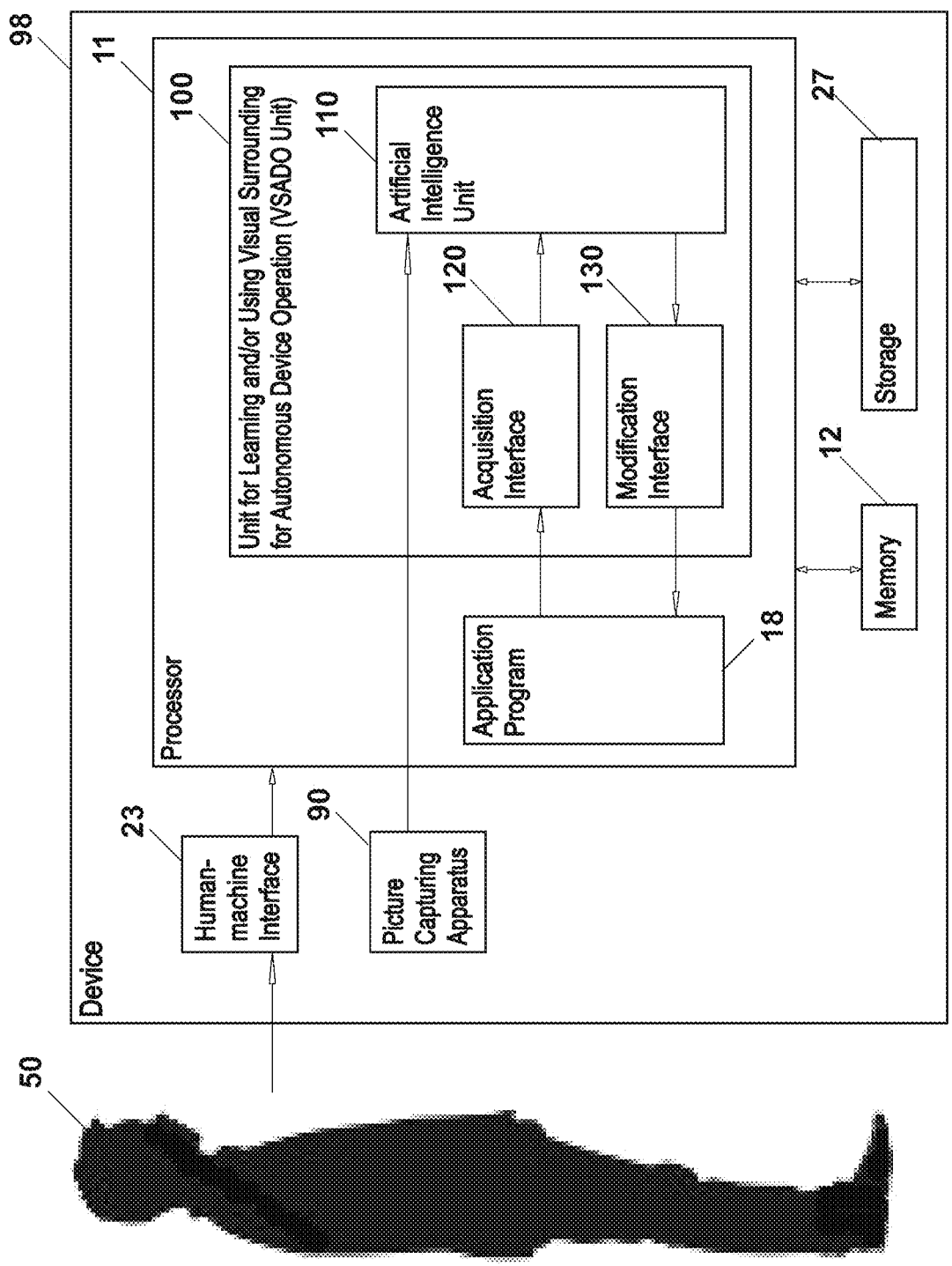
FIG. 7 illustrates an embodiment where VSADO Unit 100 is part of or operating on Processor 11.

Referring to FIG. 7, an embodiment where VSADO Unit 100 is part of or operating on Processor 11 is illustrated. In one example, VSADO Unit 100 may be a hardware element or circuit embedded or built into Processor 11. In another example, VSADO Unit 100 may be a program operating on Processor 11.

Figure 8:
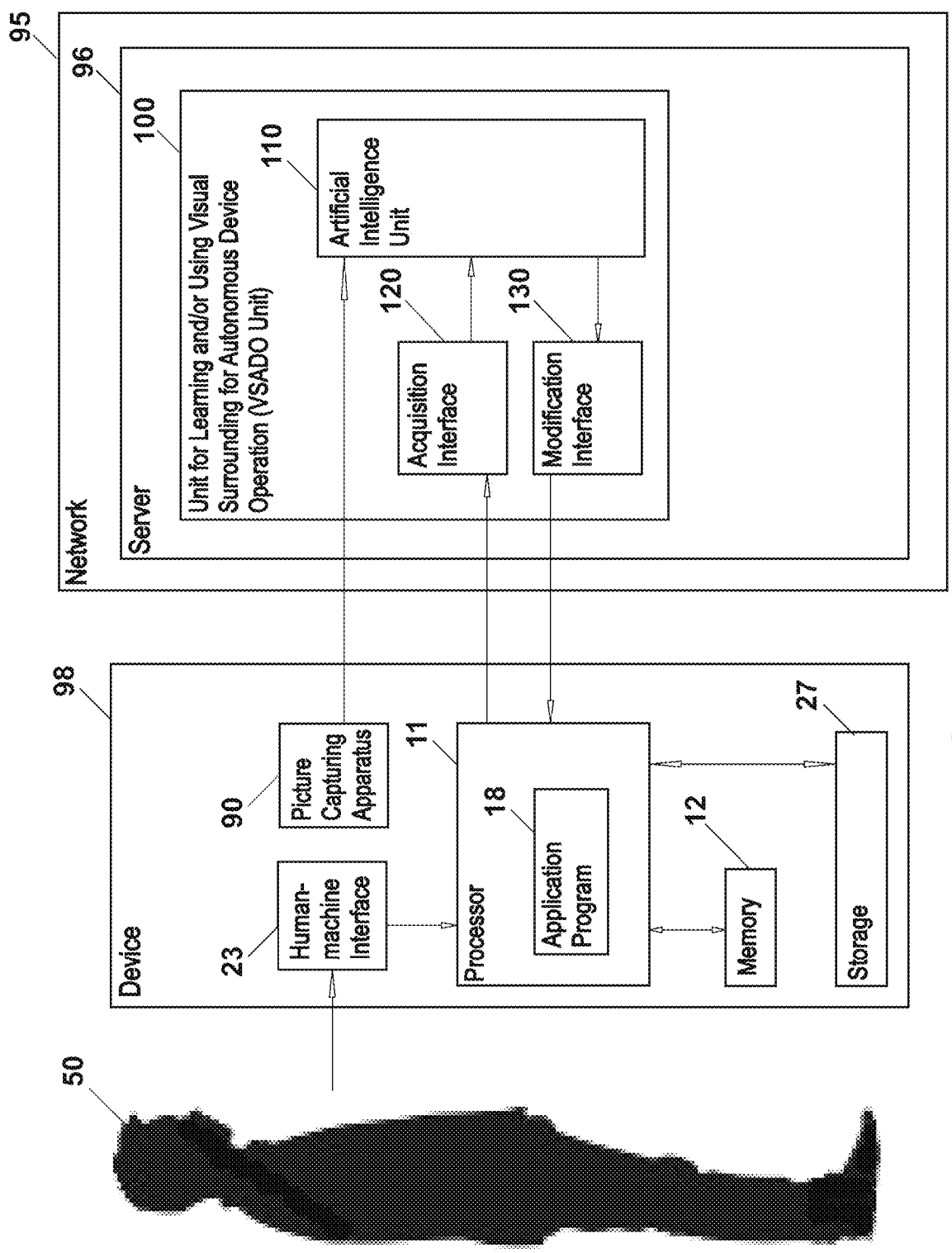
FIG. 8 illustrates an embodiment where VSADO Unit 100 resides on Server 96 accessible over Network 95.

Referring to FIG. 8, an embodiment where VSADO Unit 100 resides on Server 96 accessible over Network 95 is illustrated. Any number of Devices 98 may connect to such remote VSADO Unit 100 and the remote VSADO Unit 100 may learn their operations in various visual surroundings. In turn, any number of Devices 98 can utilize the remote VSADO Unit 100 for autonomous operation. A remote VSADO Unit 100 can be offered as a network service (i.e. online application, etc.). In some aspects, a remote VSADO Unit 100 (i.e. global VSADO Unit 100, etc.) may reside on the Internet and be available to all the world's Devices 98 configured to transmit their operations in various visual surroundings and/or configured to utilize the remote VSADO Unit 100 for autonomous operation. Server 96 may be or include any type or form of a remote computing device such as an application server, a network service server, a cloud server, a cloud, and/or other remote computing device. Server 96 may include any features, functionalities, and embodiments of the previously described Computing Device 70. It should be understood that Server 96 does not have to be a separate computing device and that Server 96, its elements, or its functionalities can be implemented on Device 98. Network 95 may include various networks, connection types, protocols, interfaces, APIs, and/or other elements or techniques known in art all of which are within the scope of this disclosure. Any of the previously described networks, network or connection types, networking interfaces, and/or other networking elements or techniques can similarly be utilized. Any of the disclosed elements may reside on Server 96 in alternate implementations. In one example, Artificial Intelligence Unit 110 can reside on Server 96 and Acquisition Interface 120 and/or Modification Interface 130 can reside on Device 98. In another example, Knowledgebase 530 can reside on Server 96 and the rest of the elements of VSADO Unit 100 can reside on Device 98. Any other combination of local and remote elements can be implemented.

Figure 9:
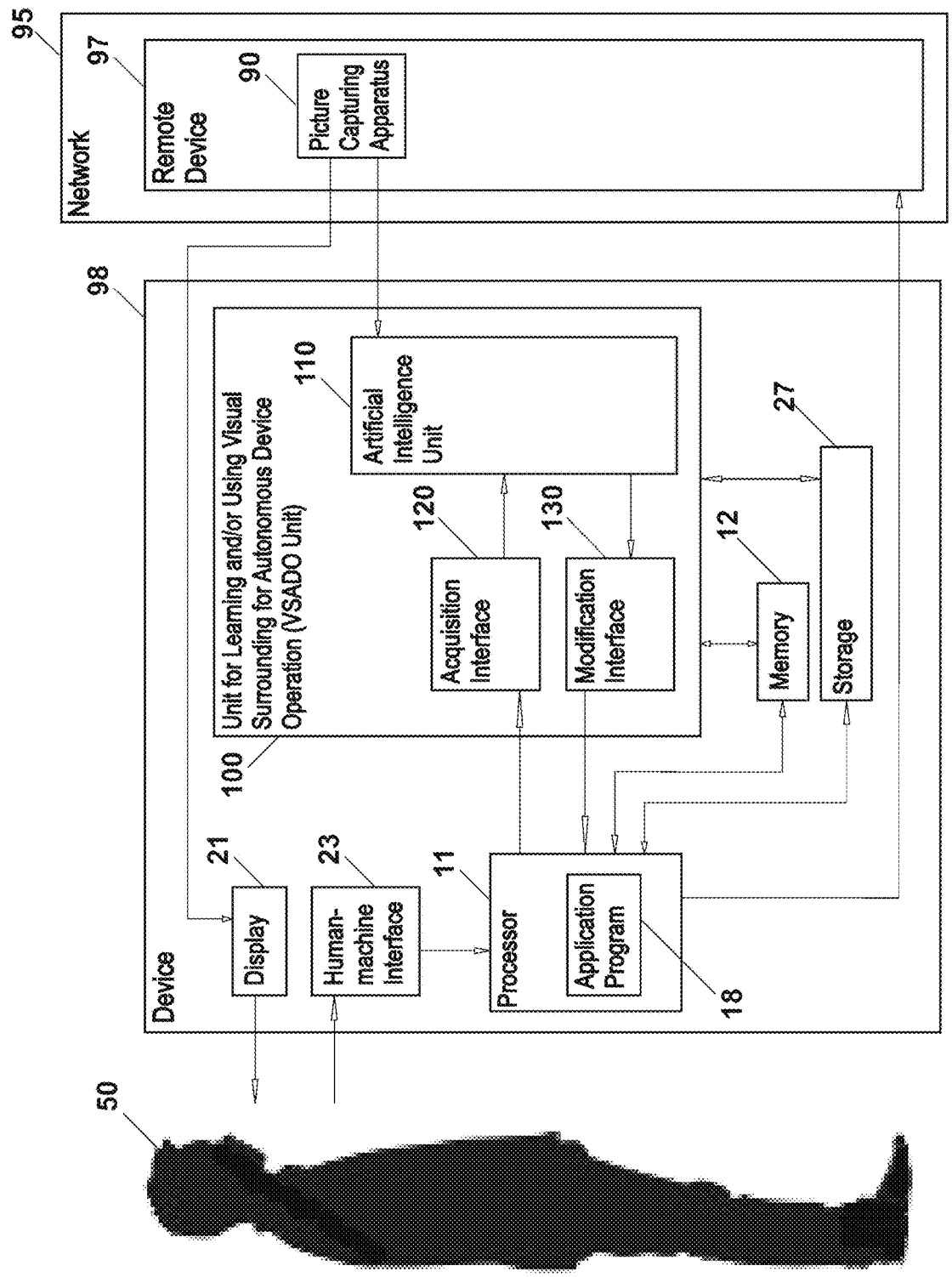
FIG. 9 illustrates an embodiment where Picture Capturing Apparatus 90 is part of Remote Device 97 accessible over Network 95.

Referring to FIG. 9, an embodiment where Picture Capturing Apparatus 90 is part of Remote Device 97 accessible over Network 95 is illustrated. In such embodiments, VSADO Unit 100 may learn Device's 98 operation based on another device's visual surrounding. Such embodiments can be utilized, for instance, in any situation where one device controls (i.e. remote control, etc.) another device, any situation where some or all of the processing is on one device and picture capturing capabilities are on another device, and/or other situations. In one example, a drone controlling device (i.e. Device 98) may receive its visual input from a camera on the drone (i.e. Remote Device 97). In another example, a toy controlling device (i.e. Device 98) may receive its visual input from a camera on the toy (i.e. Remote Device 97). In a further example, a people or crowd analyzing computing device (i.e. Device 98) may receive its visual input from a camera of a monitoring device (i.e. Remote Device 97). Any of the disclosed elements in addition to Picture Capturing Apparatus 90 may reside on Remote Device 97 in alternate implementations as previously described with respect to Server 96.

Figure 10:
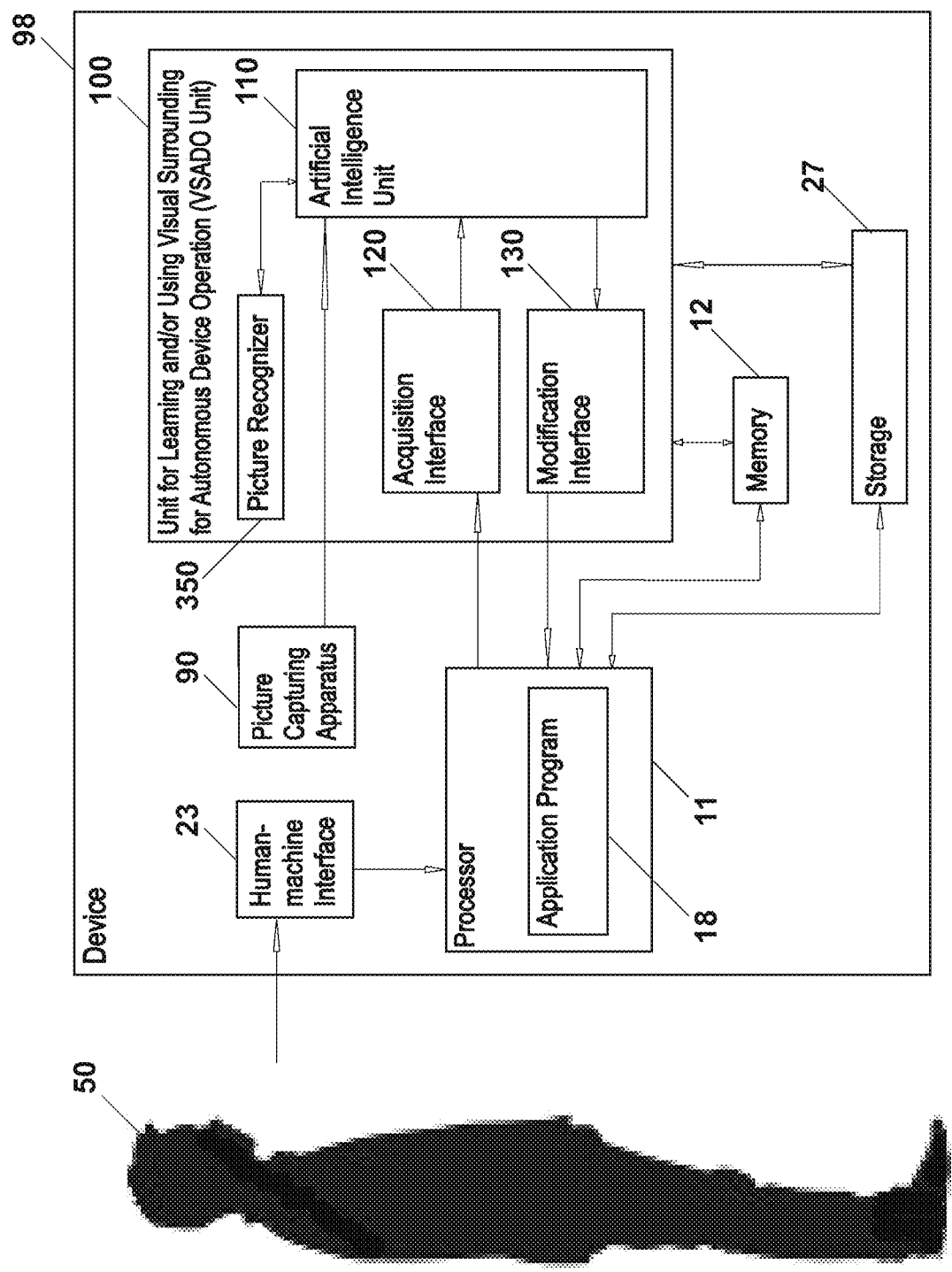
FIG. 10 illustrates an embodiment of VSADO Unit 100 comprising Picture Recognizer 350.

Referring to FIG. 10, an embodiment of VSADO Unit 100 comprising Picture Recognizer 350 is illustrated. VSADO Unit 100 can utilize Picture Recognizer 350 to detect or recognize persons, objects, and/or their activities in one or more digital pictures from Picture Capturing Apparatus 90. In general, VSADO Unit 100 and/or other disclosed elements can use Picture Recognizer 350 for any operation supported by Picture Recognizer 350. Picture Recognizer 350 comprises the functionality for detecting or recognizing persons or objects in visual data. Picture Recognizer 350 comprises the functionality for detecting or recognizing activities in visual data. Picture Recognizer 350 comprises the functionality for tracking persons, objects, and/or their activities in visual data. Picture Recognizer 350 comprises other disclosed functionalities. Visual data includes digital motion pictures, digital still pictures (i.e. bitmaps, etc.), and/or other visual data. Examples of file formats that can be utilized to store visual data include AVI, DivX, MPEG, JPEG, GIF, TIFF, PNG, PDF, and/or other file formats.

Picture Recognizer 350 may detect or recognize a person and/or his/her activities as well as track the person and/or his/her activities in one or more digital pictures or streams of digital pictures (i.e. motion pictures, video, etc.). Picture Recognizer 350 may detect or recognize a human head or face, upper body, full body, or portions/combinations thereof. In some aspects, Picture Recognizer 350 may detect or recognize persons, objects, and/or their activities from a digital picture by comparing regions of pixels from the digital picture with collections of pixels comprising known persons, objects, and/or their activities. The collections of pixels comprising known persons, objects, and/or their activities can be learned or manually, programmatically, or otherwise defined. The collections of pixels comprising known persons, objects, and/or their activities can be stored in any data structure or repository (i.e. one or more files, database, etc.) that resides locally on Device 98, or remotely on a remote computing device (i.e. server, cloud, etc.) accessible over a network. In other aspects, Picture Recognizer 350 may detect or recognize persons, objects, and/or their activities from a digital picture by comparing features (i.e. lines, edges, ridges, corners, blobs, regions, etc.) of the digital picture with features of known persons, objects, and/or their activities. The features of known persons, objects, and/or their activities can be learned or manually, programmatically, or otherwise defined. The features of known persons, objects, and/or their activities can be stored in any data structure or repository (i.e. neural network, one or more files, database, etc.) that resides locally on Device 98, or remotely on a remote computing device (i.e. server, cloud, etc.) accessible over a network. Typical steps or elements in a feature oriented picture recognition include pre-processing, feature extraction, detection/segmentation, decision-making, and/or others, or a combination thereof, each of which may include its own sub-steps or sub-elements depending on the application. In further aspects, Picture Recognizer 350 may detect or recognize multiple persons, objects, and/or their activities from a digital picture using the aforementioned pixel or feature comparisons, and/or other detection or recognition techniques. For example, a picture may depict two persons in two of its regions both of whom Picture Recognizer 350 can detect simultaneously. In further aspects, where persons, objects, and/or their activities span multiple pictures, Picture Recognizer 350 may detect or recognize persons, objects, and/or their activities by applying the aforementioned pixel or feature comparisons and/or other detection or recognition techniques over a stream of digital pictures (i.e. motion picture, video, etc.). For example, once a person is detected in a digital picture (i.e. frame, etc.) of a stream of digital pictures (i.e. motion picture, video, etc.), the region of pixels comprising the detected person or the person's features can be searched in other pictures of the stream of digital pictures, thereby tracking the person through the stream of digital pictures. In further aspects, Picture Recognizer 350 may detect or recognize a person's activities by identifying and/or analyzing differences between a detected region of pixels of one picture (i.e. frame, etc.) and detected regions of pixels of other pictures in a stream of digital pictures. For example, a region of pixels comprising a person's face can be detected in multiple consecutive pictures of a stream of digital pictures (i.e. motion picture, video, etc.). Differences among the detected regions of the consecutive pictures may be identified in the mouth part of the person's face to indicate smiling or speaking activity. Any technique for recognizing speech from mouth/lip movements can be used in this and other examples. In further aspects, Picture Recognizer 350 may detect or recognize persons, objects, and/or their activities using one or more artificial neural networks, which may include statistical techniques. Examples of artificial neural networks that can be used in Picture Recognizer 350 include convolutional neural networks (CNNs), time delay neural networks (TDNNs), deep neural networks, and/or others. In one example, picture recognition techniques and/or tools involving convolutional neural networks may include identifying and/or analyzing tiled and/or overlapping regions or features of a digital picture, which may then be used to search for pictures with matching regions or features. In another example, features of different convolutional neural networks responsible for spatial and temporal streams can be fused to detect persons, objects, and/or their activities in streams of digital pictures (i.e. motion pictures, videos, etc.). In general, Picture Recognizer 350 may include any machine learning, deep learning, and/or other artificial intelligence techniques. Any other techniques known in art can be utilized in Picture Recognizer 350. For example, thresholds for similarity, statistical, and/or optimization techniques can be utilized to determine a match in any of the above-described detection or recognition techniques. Picture Recognizer 350 comprises any features, functionalities, and embodiments of Similarity Comparison 125 (later described).

In some exemplary embodiments, object recognition techniques and/or tools such as OpenCV (Open Source Computer Vision) library, CamFind API, Kooaba, 6px API, Dextro API, and/or others can be utilized for detecting or recognizing objects (i.e. objects, animals, people, etc.) in digital pictures. In some aspects, object recognition techniques and/or tools involve identifying and/or analyzing object features such as lines, edges, ridges, corners, blobs, regions, and/or their relative positions, sizes, shapes, etc., which may then be used to search for pictures with matching features. For example, OpenCV library can detect an object (i.e. car, pedestrian, door, building, animal, person, etc.) in one or more digital pictures captured by Picture Capturing Apparatus 90 or stored in an electronic repository, which can then be utilized in VSADO Unit 100, Artificial Intelligence Unit 110, and/or other elements.

In other exemplary embodiments, facial recognition techniques and/or tools such as OpenCV (Open Source Computer Vision) library, Animetrics FaceR API, Lambda Labs Facial Recognition API, Face++ SDK, Neven Vision (also known as N-Vision) Engine, and/or others can be utilized for detecting or recognizing faces in digital pictures. In some aspects, facial recognition techniques and/or tools involve identifying and/or analyzing facial features such as the relative position, size, and/or shape of the eyes, nose, cheekbones, jaw, etc., which may then be used to search for pictures with matching features. For example, FaceR API can detect a person's face in one or more digital pictures captured by Picture Capturing Apparatus 90 or stored in an electronic repository, which can then be utilized in VSADO Unit 100, Artificial Intelligence Unit 110, and/or other elements.

Figure 11:
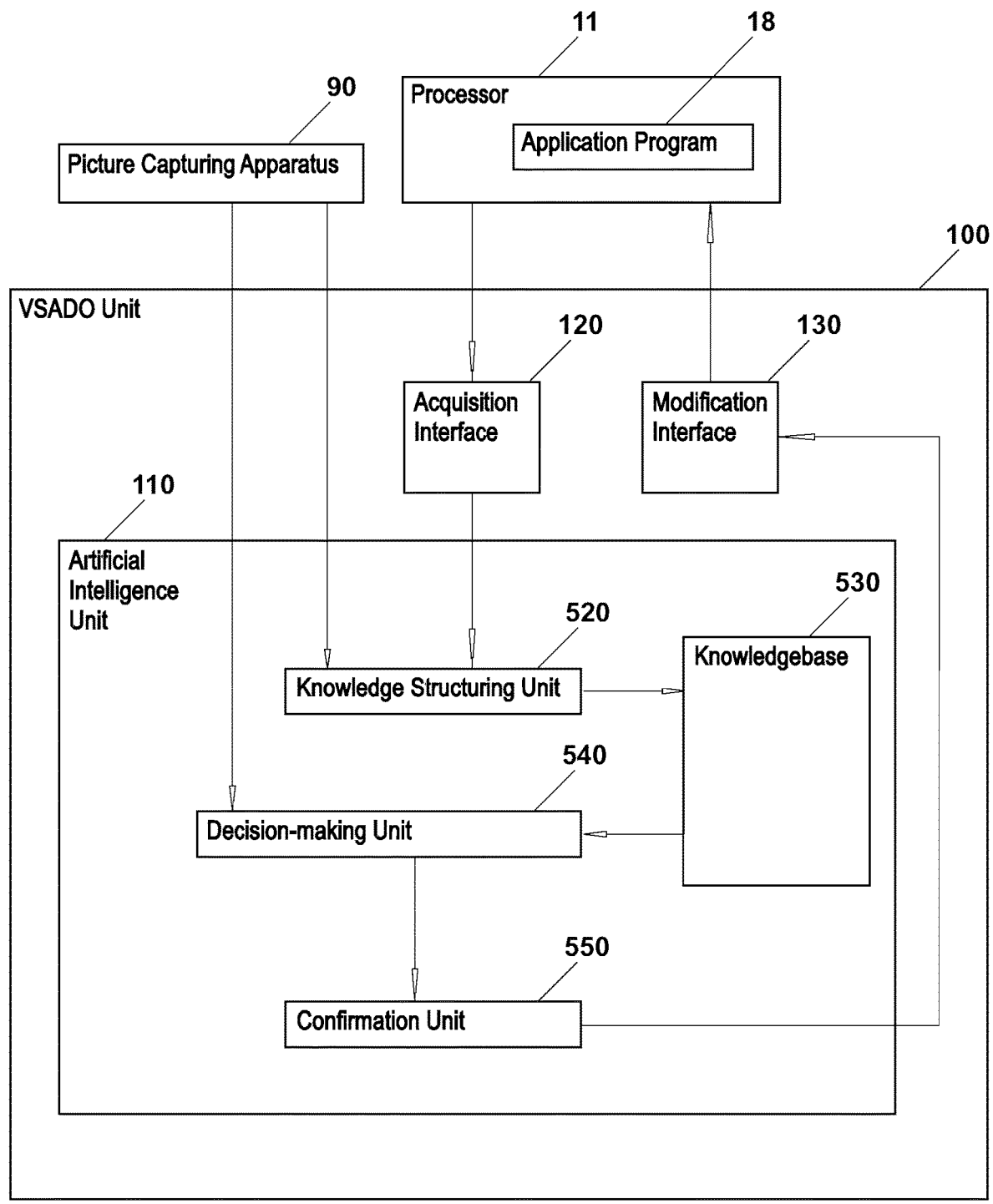
FIG. 11 illustrates an embodiment of Artificial Intelligence Unit 110.

Referring to FIG. 11, an embodiment of Artificial Intelligence Unit 110 is illustrated. Artificial Intelligence Unit 110 comprises interconnected Knowledge Structuring Unit 520, Knowledgebase 530, Decision-making Unit 540, and Confirmation Unit 550. Other additional elements can be included as needed, or some of the disclosed ones can be excluded, or a combination thereof can be utilized in alternate embodiments.

Artificial Intelligence Unit 110 comprises the functionality for learning Device's 98 operation in various visual surroundings. Artificial Intelligence Unit 110 comprises the functionality for learning one or more digital pictures correlated with any instruction sets, data, and/or other information. In some aspects, Artificial Intelligence Unit 110 comprises the functionality for learning one or more Digital Pictures 525 of Device's 98 surrounding correlated with any Instruction Sets 526 and/or Extra Info 527. In other aspects, Artificial Intelligence Unit 110 comprises the functionality for learning one or more Digital Pictures 525 of Device's 98 surrounding some of which may not be correlated with any Instruction Sets 526 and/or Extra Info 527. Further, Artificial Intelligence Unit 110 comprises the functionality for anticipating Device's 98 operation in various visual surroundings. Artificial Intelligence Unit 110 comprises the functionality for anticipating one or more instruction sets, data, and/or other information. Artificial Intelligence Unit 110 comprises the functionality for anticipating one or more Instruction Sets 526 based on one or more incoming Digital Pictures 525 of Device's 98 surrounding. Artificial Intelligence Unit 110 comprises the functionality for anticipating one or more Instruction Sets 526 to be used or executed in Device's 98 autonomous operation. Artificial Intelligence Unit 110 also comprises other disclosed functionalities.

Knowledge Structuring Unit 520, Knowledgebase 530, and Decision-making Unit 540 are described later.

Confirmation Unit 550 comprises the functionality for confirming, modifying, evaluating (i.e. rating, etc.), and/or canceling one or more anticipatory Instruction Sets 526, and/or other functionalities. Confirmation Unit 550 is an optional element that can be omitted depending on implementation. In some embodiments, Confirmation Unit 550 can serve as a means of confirming anticipatory Instruction Sets 526. For example, Decision-making Unit 540 may determine one or more anticipatory Instruction Sets 526 and provide them to User 50 for confirmation. User 50 may be provided with an interface (i.e. graphical user interface, selectable list of anticipatory Instruction Sets 526, etc.) to approve or confirm execution of the anticipatory Instruction Sets 526. In some aspects, Confirmation Unit 550 can automate User 50 confirmation. In one example, if one or more incoming Digital Pictures 525 from Picture Capturing Apparatus 90 and one or more Digital Pictures 525 from a Knowledge Cell 800 were found to be a perfect or highly similar match, anticipatory Instruction Sets 526 correlated with the one or more Digital Pictures 525 from the Knowledge Cell 800 can be automatically executed without User's 50 confirmation. Conversely, if one or more incoming Digital Pictures 525 from Picture Capturing Apparatus 90 and one or more Digital Pictures 525 from a Knowledge Cell 800 were found to be less than a highly similar match, anticipatory Instruction Sets 526 correlated with the one or more Digital Pictures 525 from the Knowledge Cell 800 can be presented to User 50 for confirmation and/or modifying. A threshold that defines a highly or otherwise similar match can be utilized in such implementations. Such threshold can be defined by a user, by VSADO system administrator, or automatically by the system based on experience, testing, inquiry, analysis, synthesis, or other techniques, knowledge, or input. In other embodiments, Confirmation Unit 550 can serve as a means of modifying or editing anticipatory Instruction Sets 526. For example, Decision-making Unit 540 may determine one or more anticipatory Instruction Sets 526 and provide them to User 50 for modification. User 50 may be provided with an interface (i.e. graphical user interface, etc.) to modify the anticipatory Instruction Sets 526 before their execution. In further embodiments, Confirmation Unit 550 can serve as a means of evaluating or rating anticipatory Instruction Sets 526 if they matched User's 50 intended operation. For example, Decision-making Unit 540 may determine one or more anticipatory Instruction Sets 526, which the system may automatically execute. User 50 may be provided with an interface (i.e. graphical user interface, etc.) to rate (i.e. on a scale from 0 to 1, etc.) how well Decision-making Unit 540 predicted the executed anticipatory Instruction Sets 526. In some aspects, rating can be automatic and based on a particular function or method that rates how well the anticipatory Instruction Sets 526 matched the desired operation. In one example, a rating function or method can assign a higher rating to anticipatory Instruction Sets 526 that were least modified in the confirmation process. In another example, a rating function or method can assign a higher rating to anticipatory Instruction Sets 526 that were canceled least number of times by User 50. Any other automatic rating function or method can be utilized. In yet other embodiments, Confirmation Unit 550 can serve as a means of canceling anticipatory Instruction Sets 526 if they did not match User's 50 intended operation. For example, Decision-making Unit 540 may determine one or more anticipatory Instruction Sets 526, which the system may automatically execute. The system may save the state of Device 98, Processor 11 (save its register values, etc.), Logic Circuit 250, Application Program 18 (i.e. save its variables, data structures, objects, location of its current instruction, etc.), and/or other processing elements before executing anticipatory Instruction Sets 526. User 50 may be provided with an interface (i.e. graphical user interface, selectable list of prior executed anticipatory Instruction Sets 526, etc.) to cancel one or more of the prior executed anticipatory Instruction Sets 526, and restore Device 98, Processor 11, Logic Circuit 250, Application Program 18, and/or other processing elements to a prior state. In some aspects, Confirmation Unit 550 can optionally be disabled or omitted in order to provide an uninterrupted operation of Device 98, Processor 11, Logic Circuit 250, and/or Application Program 18. For example, a microwave oven may be suitable for implementing the user confirmation step, whereas, a robot or vehicle may be less suitable for implementing such interrupting step due to the real time nature of robot or vehicle operation.

Figure 12:
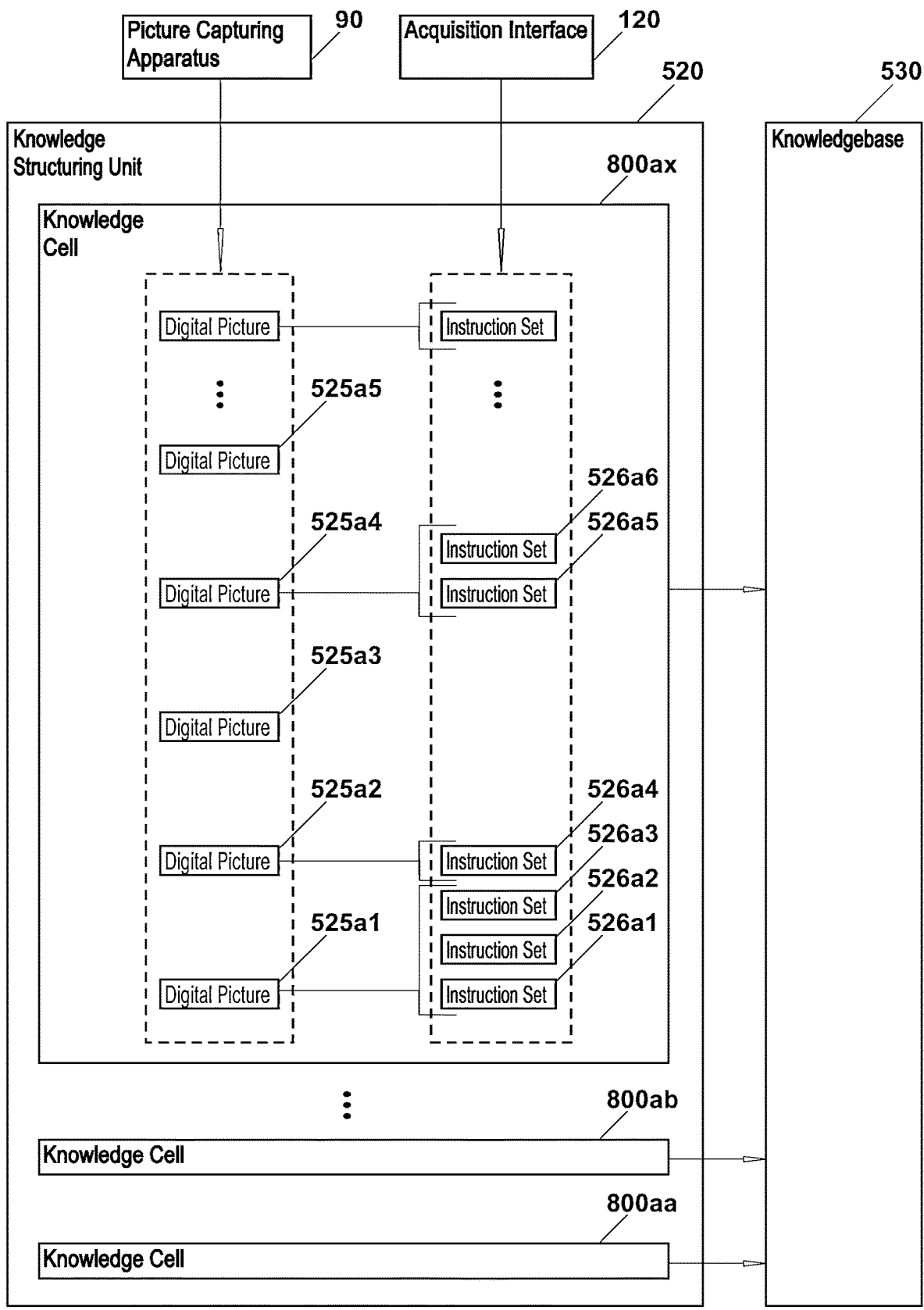
FIG. 12 illustrates an embodiment of Knowledge Structuring Unit 520 correlating individual Digital Pictures 525 with any Instruction Sets 526 and/or Extra Info 527.

Referring to FIG. 12, an embodiment of Knowledge Structuring Unit 520 correlating individual Digital Pictures 525 with any Instruction Sets 526 and/or Extra Info 527 is illustrated. Knowledge Structuring Unit 520 comprises the functionality for structuring the knowledge of a device's operation in various visual surroundings, and/or other functionalities. Knowledge Structuring Unit 520 comprises the functionality for correlating one or more Digital Pictures 525 of Device's 98 surrounding with any Instruction Sets 526 and/or Extra Info 527. Knowledge Structuring Unit 520 comprises the functionality for creating or generating Knowledge Cell 800 and storing one or more Digital Pictures 525 correlated with any Instruction Sets 526 and/or Extra Info 527 into the Knowledge Cell 800. As such, Knowledge Cell 800 comprises the functionality for storing one or more Digital Pictures 525 correlated with any Instruction Sets 526 and/or Extra Info 527. Knowledge Cell 800 includes a unit of knowledge of how Device 98 operated in a visual surrounding. Once created or generated, Knowledge Cells 800 can be used in/as neurons, nodes, vertices, or other elements in any of the data structures or arrangements (i.e. neural networks, graphs, sequences, etc.) used for storing the knowledge of Device's 98 operation in various visual surroundings, thereby facilitating learning functionalities herein. It should be noted that Extra Info 527 may be optionally used in some implementations to enable enhanced comparisons or decision making in autonomous device operation where applicable, and that Extra Info 527 can be omitted in alternate implementations.

In some embodiments, Knowledge Structuring Unit 520 receives one or more Digital Pictures 525 from Picture Capturing Apparatus 90. Knowledge Structuring Unit 520 may also receive one or more Instruction Sets 526 from Acquisition Interface 120. Knowledge Structuring Unit 520 may further receive any Extra Info 527. Although, Extra Info 527 is not shown in this and/or other figures for clarity of illustration, it should be noted that any Digital Picture 525, Instruction Set 526, and/or other element may include or be associated with Extra Info 527. Knowledge Structuring Unit 520 may correlate one or more Digital Pictures 525 with any Instruction Sets 526 and/or Extra Info 527. Knowledge Structuring Unit 520 may then create Knowledge Cell 800 and store the one or more Digital Pictures 525 correlated with Instruction Sets 526 and/or Extra Info 527 into the Knowledge Cell 800. Knowledge Cell 800 may include any data structure or arrangement that can facilitate such storing. For example, Knowledge Structuring Unit 520 may create Knowledge Cell 800$ax$ and structure within it Digital Picture 525$a$1 correlated with Instruction Sets 526$a$1-526$a$3 and/or any Extra Info 527 (not shown). Knowledge Structuring Unit 520 may further structure within Knowledge Cell 800$ax$ a Digital Picture 525$a$2 correlated with Instruction Set 526$a$4 and/or any Extra Info 527 (not shown). Knowledge Structuring Unit 520 may further structure within Knowledge Cell 800$ax$ a Digital Picture 525$a$3 without a correlated Instruction Set 526 and/or Extra Info 527. Knowledge Structuring Unit 520 may further structure within Knowledge Cell 800$ax$ a Digital Picture 525$a$4 correlated with Instruction Sets 526$a$5-526$a$6 and/or any Extra Info 527 (not shown). Knowledge Structuring Unit 520 may further structure within Knowledge Cell 800$ax$ a Digital Picture 525$a$5 without a correlated Instruction Set 526 and/or Extra Info 527. Knowledge Structuring Unit 520 may structure within Knowledge Cell 800$ax$ additional Digital Pictures 525 correlated with any number (including zero [i.e. uncorrelated]) of Instruction Sets 526 and/or Extra Info 527 by following the same logic as described above.

In some embodiments, Knowledge Structuring Unit 520 may correlate a Digital Picture 525 with one or more temporally corresponding Instruction Sets 526 and/or Extra Info 527. This way, Knowledge Structuring Unit 520 can structure the knowledge of Device's 98 operation at or around the time of the capturing of Digital Pictures 525 of Device's 98 surrounding. Such functionality enables spontaneous or seamless learning of Device's 98 operation in various visual surroundings as user operates the device in real life situations. In some designs, Knowledge Structuring Unit 520 may receive a stream of Instruction Sets 526 used or executed to effect Device's 98 operations as well as a stream of Digital Pictures 525 of Device's 98 surrounding as the operations are performed. Knowledge Structuring Unit 520 can then correlate Digital Pictures 525 from the stream of Digital Pictures 525 with temporally corresponding Instruction Sets 526 from the stream of Instruction Sets 526 and/or any Extra Info 527. Digital Pictures 525 without a temporally corresponding Instruction Set 526 may be uncorrelated, for instance. In some aspects, Instruction Sets 526 and/or Extra Info 527 that temporally correspond to a Digital Picture 525 may include Instruction Sets 526 used and/or Extra Info 527 obtained at the time of capturing the Digital Picture 525. In other aspects, Instruction Sets 526 and/or Extra Info 527 that temporally correspond to a Digital Picture 525 may include Instruction Sets 526 used and/or Extra Info 527 obtained within a certain time period before and/or after capturing the Digital Picture 525. For example, Instruction Sets 526 and/or Extra Info 527 that temporally correspond to a Digital Picture 525 may include Instruction Sets 526 used and/or Extra Info 527 obtained within 50 milliseconds, 1 second, 3 seconds, 20 seconds, 1 minute, 41 minutes, 2 hours, or any other time period before and/or after capturing the Digital Picture 525. Such time periods can be defined by a user, by VSADO system administrator, or automatically by the system based on experience, testing, inquiry, analysis, synthesis, or other techniques, knowledge, or input. In other aspects, Instruction Sets 526 and/or Extra Info 527 that temporally correspond to a Digital Picture 525 may include Instruction Sets 526 used and/or Extra Info 527 obtained from the time of capturing of the Digital Picture 525 to the time of capturing of a next Digital Picture 525. In further aspects, Instruction Sets 526 and/or Extra Info 527 that temporally correspond to a Digital Picture 525 may include Instruction Sets 526 used and/or Extra Info 527 obtained from the time of capturing of a previous Digital Picture 525 to the time of capturing of the Digital Picture 525. Any other temporal relationship or correspondence between Digital Pictures 525 and correlated Instruction Sets 526 and/or Extra Info 527 can be implemented.

In some embodiments, Knowledge Structuring Unit 520 can structure the knowledge of Device's 98 operation in a visual surrounding into any number of Knowledge Cells 800. In some aspects, Knowledge Structuring Unit 520 can structure into a Knowledge Cell 800 a single Digital Picture 525 correlated with any Instruction Sets 526 and/or Extra Info 527. In other aspects, Knowledge Structuring Unit 520 can structure into a Knowledge Cell 800 any number (i.e. 2, 3, 5, 8, 19, 33, 99, 1715, 21822, 393477, 6122805, etc.) of Digital Pictures 525 correlated with any Instruction Sets 526 and/or Extra Info 527. In a special case, Knowledge Structuring Unit 520 can structure all Digital Pictures 525 correlated with any Instruction Sets 526 and/or Extra Info 527 into a single long Knowledge Cell 800. In further aspects, Knowledge Structuring Unit 520 can structure Digital Pictures 525 correlated with any Instruction Sets 526 and/or Extra Info 527 into a plurality of Knowledge Cells 800. In a special case, Knowledge Structuring Unit 520 can store periodic streams of Digital Pictures 525 correlated with any Instruction Sets 526 and/or Extra Info 527 into a plurality of Knowledge Cells 800 such as hourly, daily, weekly, monthly, yearly, or other periodic Knowledge Cells 800.

In some embodiments, Knowledge Structuring Unit 520 may be responsive to a triggering object, action, event, time, and/or other stimulus. In some aspects, the system can detect or recognize an object in Device's 98 visual surrounding, and Knowledge Structuring Unit 520 can structure into a Knowledge Cell 800 one or more Digital Pictures 525 correlated with any Instruction Sets 526 and/or Extra Info 527 related to the object. For example, Knowledge Structuring Unit 520 can structure into a Knowledge Cell 800 one or more Digital Pictures 525 of a pizza from a microwave oven (i.e. Device 98, etc.) correlated with any Instruction Sets 526 (i.e. inputs, outputs, or states of the microwave oven's microcontroller, etc.) causing the microwave oven to bake the pizza. Knowledge Structuring Unit 520 can also structure into the Knowledge Cell 800 any Extra Info 527 (i.e. time, location, computed, observed, sensory, and/or other information, etc.). In other aspects, the system can detect or recognize a specific action or operation performed by Device 98, and Knowledge Structuring Unit 520 can structure into a Knowledge Cell 800 one or more Digital Pictures 525 correlated with any Instruction Sets 526 and/or Extra Info 527 related to the action or operation. For example, Knowledge Structuring Unit 520 can structure into a Knowledge Cell 800 one or more Digital Pictures 525 depicting screwing of a screw by a robotic arm (i.e. Device 98, etc.) correlated with any Instruction Sets 526 causing the robotic arm to screw the screw. Knowledge Structuring Unit 520 can also structure into the Knowledge Cell 800 any Extra Info 527 (i.e. time, location, computed, observed, sensory, and/or other information, etc.). In further aspects, the system can detect a person in Device's 98 visual surrounding, and Knowledge Structuring Unit 520 can structure into a Knowledge Cell 800 one or more Digital Pictures 525 correlated with any Instruction Sets 526 and/or Extra Info 527 related to the person. For example, Knowledge Structuring Unit 520 can structure into a Knowledge Cell 800 one or more Digital Pictures 525 of a pedestrian in front of a vehicle (i.e. Device 98, etc.) correlated with any Instruction Sets 526 causing the vehicle to stop. Knowledge Structuring Unit 520 can also structure into the Knowledge Cell 800 any Extra Info 527 (i.e. time, location, computed, observed, sensory, and/or other information, etc.). In further aspects, the system can detect or recognize a significant change in Device's 98 visual surrounding, and Knowledge Structuring Unit 520 can structure into a Knowledge Cell 800 one or more Digital Pictures 525 correlated with any Instruction Sets 526 and/or Extra Info 527 related to the change in visual surrounding. For example, the system can detect a vehicle's (i.e. Device 98, etc.) changing direction (i.e. turning left, right, etc.) and Knowledge Structuring Unit 520 can structure into a Knowledge Cell 800 one or more Digital Pictures 525 correlated with any Instruction Sets 526 causing the change of direction. Knowledge Structuring Unit 520 can also structure into the Knowledge Cell 800 any Extra Info 527 (i.e. time, location, computed, observed, sensory, and/or other information, etc.). A vehicle's changing direction may be detected as a significant change in the vehicle's visual surrounding as the view of the vehicle's scenery changes significantly. Any features, functionalities, and embodiments of Picture Recognizer 350 can be utilized in the aforementioned detecting or recognizing. In general, Knowledge Structuring Unit 520 can structure into a Knowledge Cell 800 any Digital Pictures 525 correlated with any Instruction Sets 526 and/or Extra Info 527 related to any triggering object, action, event, time, and/or other stimulus.

In some embodiments, Device 98 may include a plurality of Picture Capturing Apparatuses 90. In one example, different Picture Capturing Apparatuses 90 may capture Digital Pictures 525 of different angles or sides of Device 98. In another example, different Picture Capturing Apparatuses 90 may be placed on different sub-devices, sub-systems, or elements of Device 98. Using multiple Picture Capturing Apparatuses 90 may provide additional visual detail in learning and/or using Device's 98 surrounding for autonomous Device 98 operation. In some designs where multiple Picture Capturing Apparatuses 90 are utilized, multiple VSADO Units 100 can also be utilized (i.e. one VSADO Unit 100 for each Picture Capturing Apparatus 90, etc.). Digital Pictures 525 of Device's 98 surrounding can be correlated with any Instruction Sets 526 and/or Extra Info 527 as previously described. In other designs where multiple Picture Capturing Apparatuses 90 are utilized, collective Digital Pictures 525 of Device's 98 surrounding from multiple Picture Capturing Apparatuses 90 can be correlated with any Instruction Sets 526 and/or Extra Info 527.

In some embodiments, Device 98 may include a plurality of Logic Circuits 250, Processors 11, Application Programs 18, and/or other processing elements. For example, each processing element may control a sub-device, sub-system, or an element of Device 98. Using multiple processing elements may provide enhanced control over Device's 98 operation. In some designs where multiple processing elements are utilized, multiple VSADO Units 100 can also be utilized (i.e. one VSADO Unit 100 for each processing element, etc.). Digital Pictures 525 of Device's 98 surrounding can be correlated with any Instruction Sets 526 and/or Extra Info 527 as previously described. In other designs where multiple processing elements are utilized, Digital Pictures 525 of Device's 98 surrounding can be correlated with any collective Instruction Sets 526 and/or Extra Info 527 used or executed by a plurality of processing elements.

Any combination of the aforementioned multiple Picture Capturing Apparatuses 90, multiple processing elements, and/or other elements can be implemented in alternate embodiments.

Figure 13:
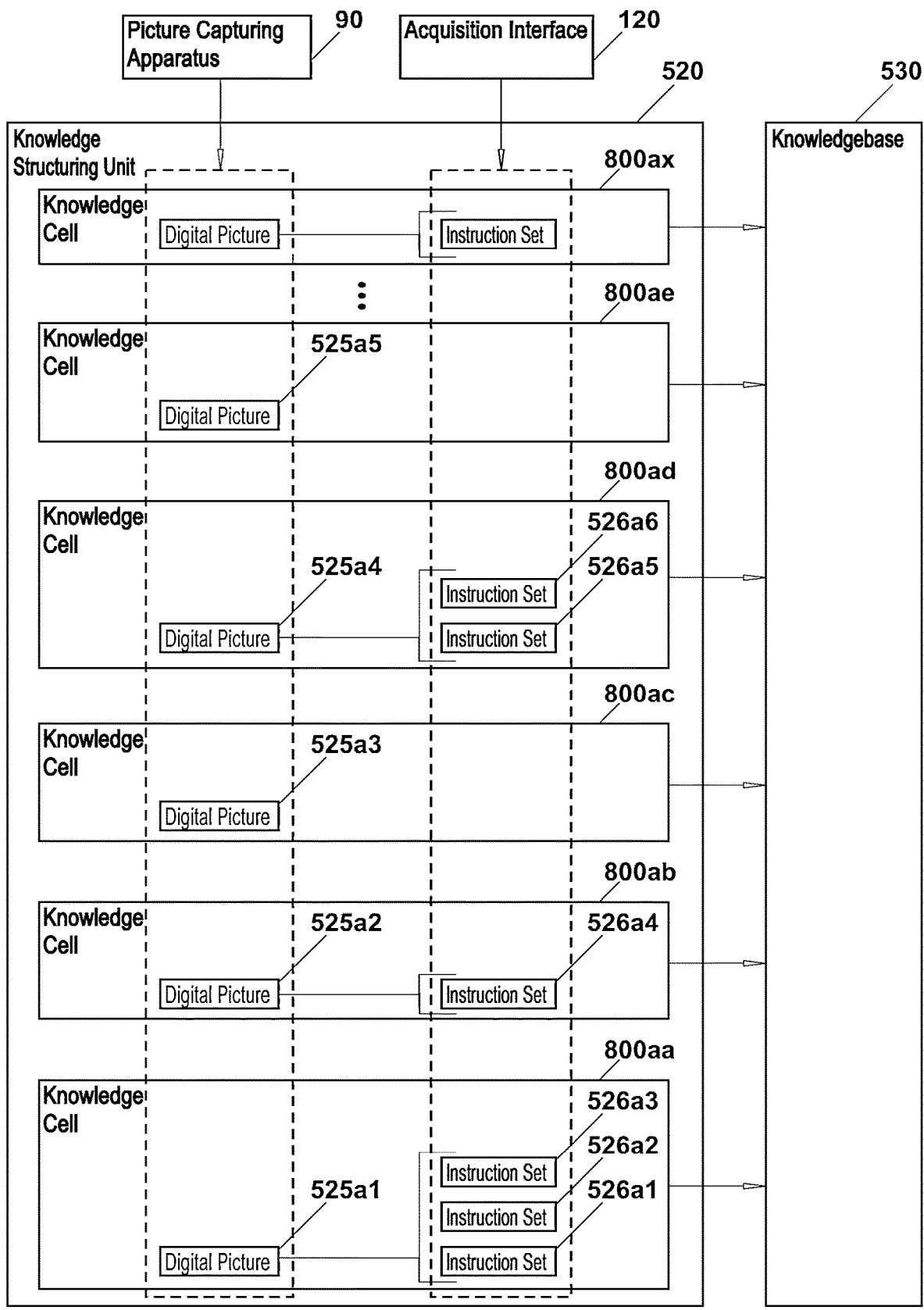
FIG. 13 illustrates another embodiment of Knowledge Structuring Unit 520 correlating individual Digital Pictures 525 with any Instruction Sets 526 and/or Extra Info 527.

Referring to FIG. 13, another embodiment of Knowledge Structuring Unit 520 correlating individual Digital Pictures 525 with any Instruction Sets 526 and/or Extra Info 527 is illustrated. In such embodiments, Knowledge Structuring Unit 520 may generate Knowledge Cells 800 each comprising a single Digital Picture 525 correlated with any Instruction Sets 526 and/or Extra Info 527.

Figure 14:
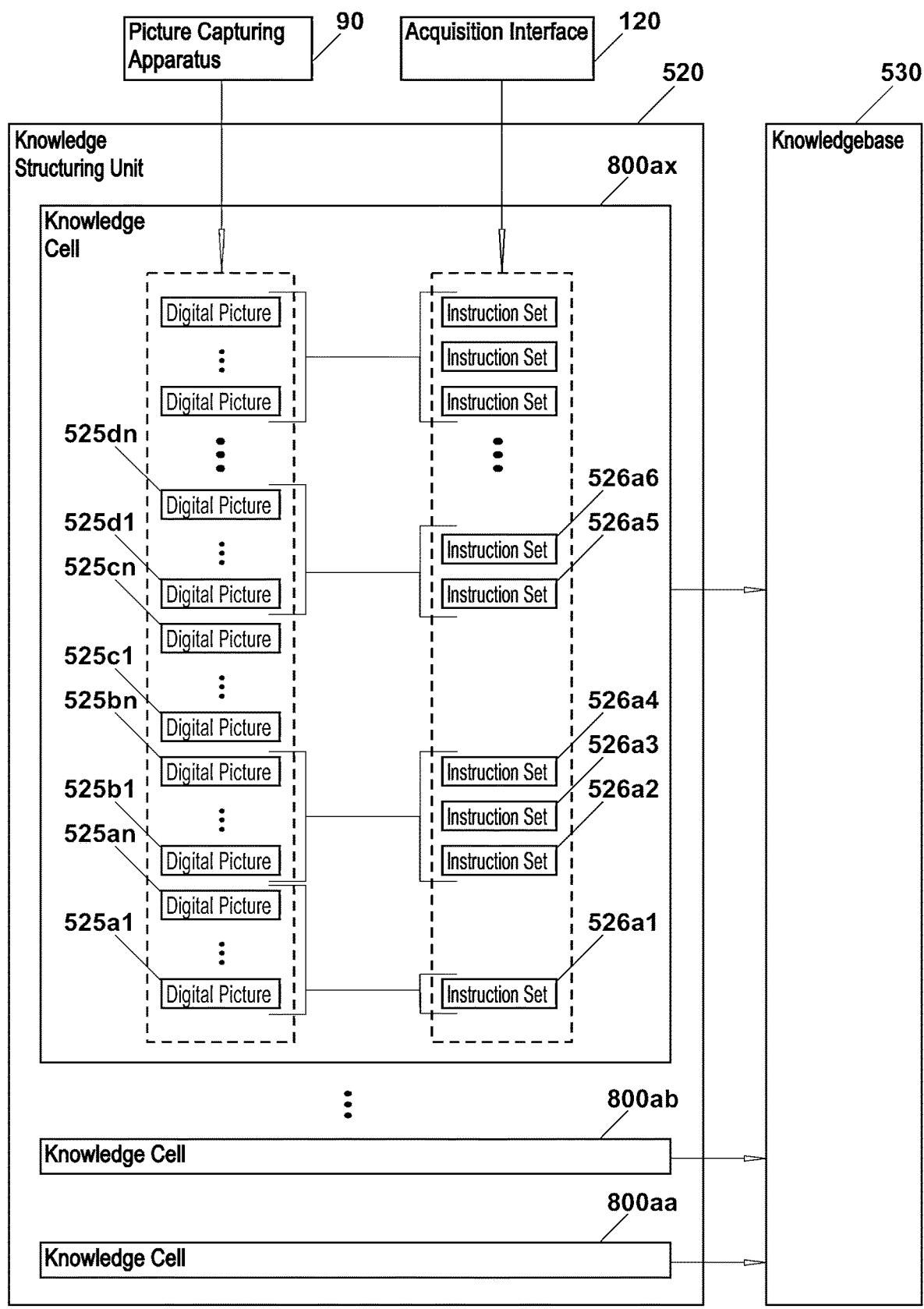
FIG. 14 illustrates an embodiment of Knowledge Structuring Unit 520 correlating streams of Digital Pictures 525 with any Instruction Sets 526 and/or Extra Info 527.

Referring to FIG. 14, an embodiment of Knowledge Structuring Unit 520 correlating streams of Digital Pictures 525 with any Instruction Sets 526 and/or Extra Info 527 is illustrated. In some aspects, a stream of Digital Pictures 525 may include a collection, a group, a sequence, or other plurality of Digital Pictures 525. In other aspects, a stream of Digital Pictures 525 may include one or more Digital Pictures 525. In further aspects, a stream of Digital Pictures 525 may include a digital motion picture (i.e. digital video, etc.) or portion thereof. For example, Knowledge Structuring Unit 520 may create Knowledge Cell 800$ax$ and structure within it a stream of Digital Pictures 525$a$1-525$an$ correlated with Instruction Set 526$a$1 and/or any Extra Info 527 (not shown). Knowledge Structuring Unit 520 may further structure within Knowledge Cell 800$ax$ a stream of Digital Pictures 525$b$1-525$bn$ correlated with Instruction Sets 526$a$2-526$a$4 and/or and Extra Info 527 (not shown). Knowledge Structuring Unit 520 may further structure within Knowledge Cell 800$ax$ a stream of Digital Pictures 525$c$1-525$cn$ without correlated Instruction Sets 526 and/or Extra Info 527. Knowledge Structuring Unit 520 may further structure within Knowledge Cell 800$ax$ a stream of Digital Pictures 525$d$1-525$dn$ correlated with Instruction Sets 526$a$5-526$a$6 and/or any Extra Info 527 (not shown). Knowledge Structuring Unit 520 may further structure within Knowledge Cell 800$ax$ additional streams of Digital Pictures 525 correlated with any number (including zero [i.e. uncorrelated]) of Instruction Sets 526 and/or Extra Info 527 by following the same logic as described above. The number of Digital Pictures 525 in some or all streams of Digital Pictures 525$a$1-525$an$, 525$b$1-525$bn$, etc. may be equal or different. It should be noted that n or other such letters or indicia may follow the sequence and/or context where they are indicated. Also, a same letter or indicia such as n may represent a different number in different elements of a drawing.

Figure 15:
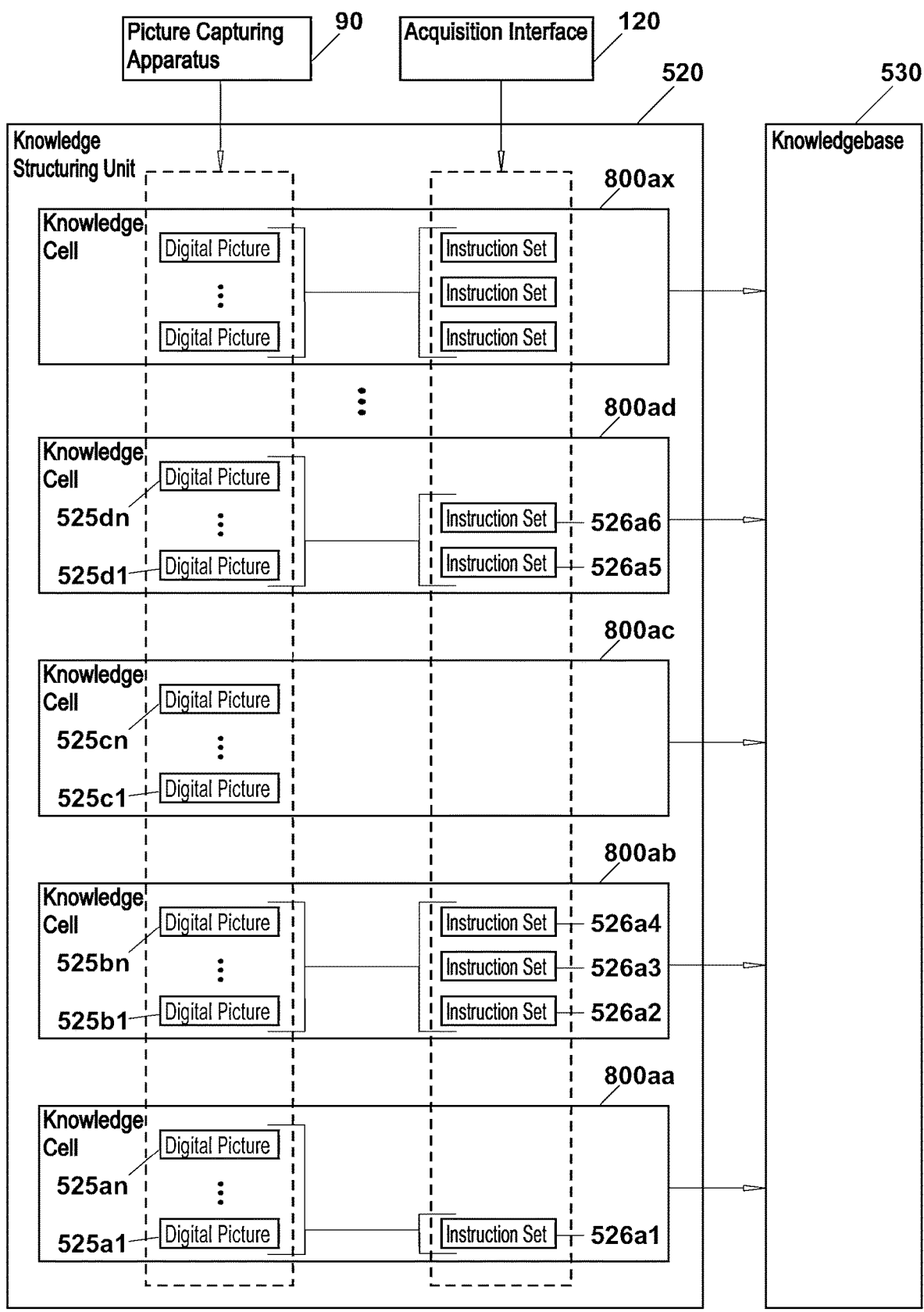
FIG. 15 illustrates another embodiment of Knowledge Structuring Unit 520 correlating streams of Digital Pictures 525 with any Instruction Sets 526 and/or Extra Info 527.

Referring to FIG. 15, another embodiment of Knowledge Structuring Unit 520 correlating streams of Digital Pictures 525 with any Instruction Sets 526 and/or Extra Info 527 is illustrated. In such embodiments, Knowledge Structuring Unit 520 may generate Knowledge Cells 800 each comprising a single stream of Digital Pictures 525 correlated with any Instruction Sets 526 and/or Extra Info 527.

Knowledgebase 530 comprises the functionality for storing the knowledge of a device's operation in various visual surroundings, and/or other functionalities. Knowledgebase 530 comprises the functionality for storing one or more Digital Pictures 525 of Device's 98 surrounding correlated with any Instruction Sets 526 and/or Extra Info 527. Knowledgebase 530 comprises the functionality for storing one or more Knowledge Cells 800 each including one or more Digital Pictures 525 of Device's 98 surrounding correlated with any Instruction Sets 526 and/or Extra Info 527. In some aspects, Digital Pictures 525 correlated with Instruction Sets 526 and/or Extra Info 527 can be stored directly within Knowledgebase 530 without using Knowledge Cells 800 as the intermediary data structures. In some embodiments, Knowledgebase 530 may be or include Neural Network 530*a* (later described). In other embodiments, Knowledgebase 530 may be or include Graph 530*b* (later described). In further embodiments, Knowledgebase 530 may be or include Collection of Sequences 530*c* (later described). In further embodiments, Knowledgebase 530 may be or include Sequence 533 (later described). In further embodiments, Knowledgebase 530 may be or include Collection of Knowledge Cells 530*d* (later described). In general, Knowledgebase 530 may be or include any data structure or arrangement capable of storing the knowledge of a device's operation in various visual surroundings. Knowledgebase 530 may reside locally on Device 98, or remotely (i.e. remote Knowledgebase 530, etc.) on a remote computing device (i.e. server, cloud, etc.) accessible over a network.

Knowledgebase 530 from one Device 98 or VSADO Unit 100 can be transferred to one or more other Devices 98 or VSADO Units 100. Therefore, the knowledge of Device's 98 operation in various visual surroundings learned on one Device 98 or VSADO Unit 100 can be transferred to one or more other Devices 98 or VSADO Units 100. In one example, Knowledgebase 530 can be copied or downloaded to a file or other repository from one Device 98 or VSADO Unit 100 and loaded or inserted into another Device 98 or VSADO Unit 100. In another example, Knowledgebase 530 from one Device 98 or VSADO Unit 100 can be available on a server accessible by other Devices 98 or VSADO Units 100 over a network. Once loaded into or accessed by a receiving Device 98 or VSADO Unit 100, the receiving Device 98 or VSADO Unit 100 can then implement the knowledge of Device's 98 operation in various visual surroundings learned on the originating Device 98 or VSADO Unit 100. This functionality enables User 50 such as a professional Device 98 operator to record his/her knowledge, methodology, or style of operating Device 98 in various visual surroundings and/or sell his/her knowledge to other users.

Figure 16:
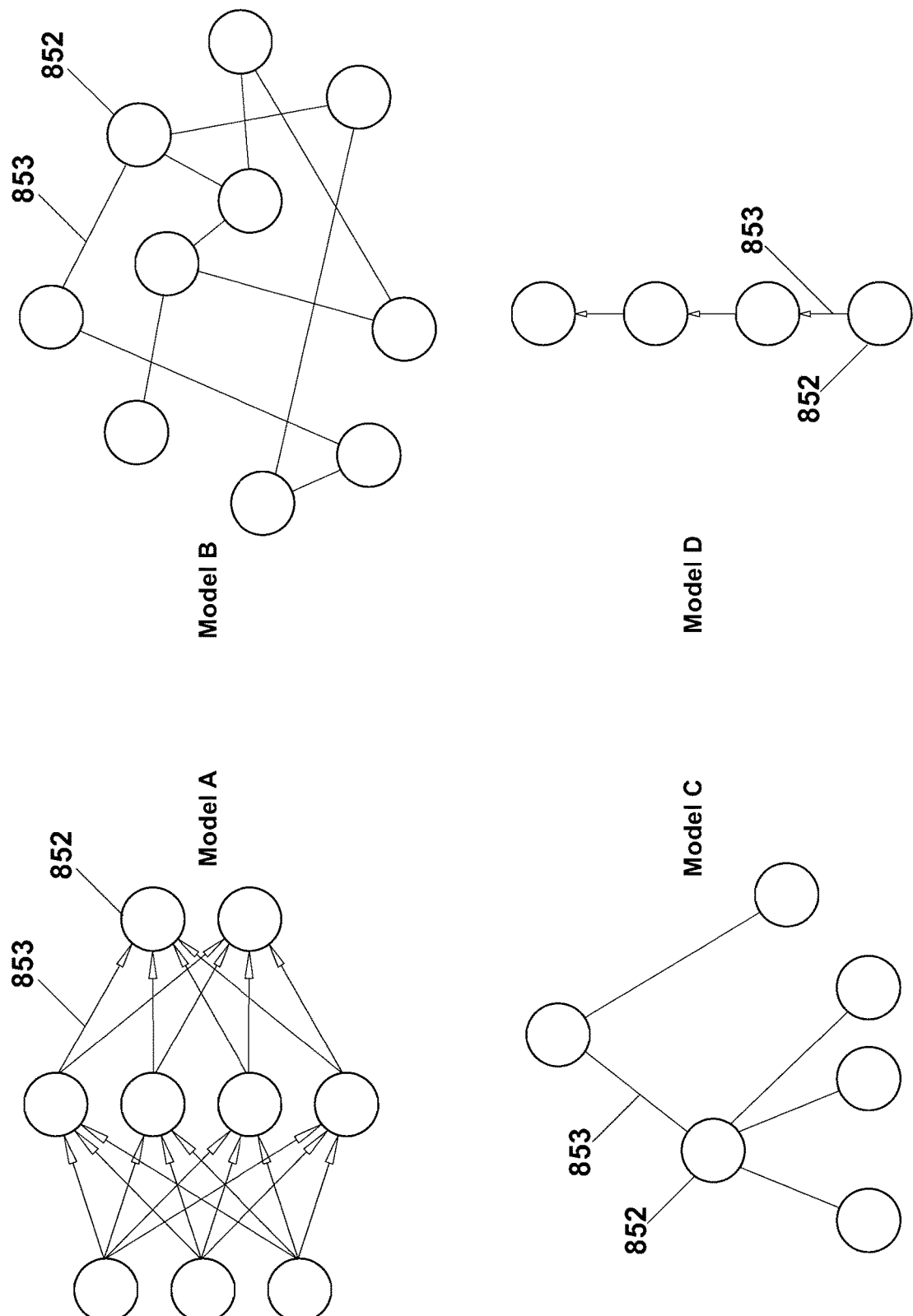
FIG. 16 illustrates various artificial intelligence methods, systems, and/or models that can be utilized in VSADO Unit 100 embodiments.

Referring to FIG. 16, the disclosed artificially intelligent systems, devices, and methods for learning and/or using visual surrounding for autonomous device operation may include various artificial intelligence models and/or techniques. The disclosed systems, devices, and methods are independent of the artificial intelligence model and/or technique used and any model and/or technique can be utilized to facilitate the functionalities described herein. Examples of these models and/or techniques include deep learning, supervised learning, unsupervised learning, neural networks (i.e. convolutional neural network, recurrent neural network, deep neural network, etc.), search-based, logic and/or fuzzy logic-based, optimization-based, tree/graph/other data structure-based, hierarchical, symbolic and/or sub-symbolic, evolutionary, genetic, multi-agent, deterministic, probabilistic, statistical, and/or other models and/or techniques.

In one example shown in Model A, the disclosed artificially intelligent systems, devices, and methods for learning and/or using visual surrounding for autonomous device operation may include a neural network (also referred to as artificial neural network, etc.). As such, machine learning, knowledge structuring or representation, decision making, pattern recognition, and/or other artificial intelligence functionalities may include a network of Nodes 852 (also referred to as neurons, etc.) and Connections 853 similar to that of a brain. Node 852 can store any data, object, data structure, and/or other item, or reference thereto. Node 852 may also include a function for transforming or manipulating any data, object, data structure, and/or other item. Examples of such transformation functions include mathematical functions (i.e. addition, subtraction, multiplication, division, sin, cos, log, derivative, integral, etc.), object manipulation functions (i.e. creating an object, modifying an object, deleting an object, appending objects, etc.), data structure manipulation functions (i.e. creating a data structure, modifying a data structure, deleting a data structure, creating a data field, modifying a data field, deleting a data field, etc.), and/or other transformation functions. Connection 853 may include or be associated with a value such as a symbolic label or numeric attribute (i.e. weight, cost, capacity, length, etc.). A computational model can be utilized to compute values from inputs based on a pre-programmed or learned function or method. For example, a neural network may include one or more input neurons that can be activated by inputs. Activations of these neurons can then be passed on, weighted, and transformed by a function to other neurons. Neural networks may range from those with only one layer of single direction logic to multi-layer of multi-directional feedback loops. A neural network can use weights to change the parameters of the network's throughput. A neural network can learn by input from its environment or from self-teaching using written-in rules. A neural network can be utilized as a predictive modeling approach in machine learning. An exemplary embodiment of a neural network (i.e. Neural Network 530*a*, etc.) is described later.

In another example shown in Model B, the disclosed artificially intelligent systems, devices, and methods for learning and/or using visual surrounding for autonomous device operation may include a graph or graph-like data structure. As such, machine learning, knowledge structuring or representation, decision making, pattern recognition, and/or other artificial intelligence functionalities may include Nodes 852 (also referred to as vertices or points, etc.) and Connections 853 (also referred to as edges, arrows, lines, arcs, etc.) organized as a graph. In general, any Node 852 in a graph can be connected to any other Node 852. A Connection 853 may include unordered pair of Nodes 852 in an undirected graph or ordered pair of Nodes 852 in a directed graph. Nodes 852 can be part of the graph structure or external entities represented by indices or references. A graph can be utilized as a predictive modeling approach in machine learning. Nodes 852, Connections 853, and/or other elements or operations of a graph may include any features, functionalities, and embodiments of the aforementioned Nodes 852, Connections 853, and/or other elements or operations of a neural network, and vice versa. An exemplary embodiment of a graph (i.e. Graph 530*b*, etc.) is described later.

In a further example shown in Model C, the disclosed artificially intelligent systems, devices, and methods for learning and/or using visual surrounding for autonomous device operation may include a tree or tree-like data structure. As such, machine learning, knowledge structuring or representation, decision making, pattern recognition, and/or other artificial intelligence functionalities may include Nodes 852 and Connections 853 (also referred to as references, edges, etc.) organized as a tree. In general, a Node 852 in a tree can be connected to any number (i.e. including zero, etc.) of children Nodes 852. A tree can be utilized as a predictive modeling approach in machine learning. Nodes 852, Connections 853, and/or other elements or operations of a tree may include any features, functionalities, and embodiments of the aforementioned Nodes 852, Connections 853, and/or other elements or operations of a neural network and/or graph, and vice versa.

In a further example shown in Model D, the disclosed artificially intelligent systems, devices, and methods for learning and/or using visual surrounding for autonomous device operation may include a sequence or sequence-like data structure. As such, machine learning, knowledge structuring or representation, decision making, pattern recognition, and/or other artificial intelligence functionalities may include a structure of Nodes 852 and/or Connections 853 organized as a sequence. In some aspects, Connections 853 may be optionally omitted from a sequence as the sequential order of Nodes 852 in a sequence may be implied in the structure. A sequence can be utilized as a predictive modeling approach in machine learning. Nodes 852, Connections 853, and/or other elements or operations of a sequence may include any features, functionalities, and embodiments of the aforementioned Nodes 852, Connections 853, and/or other elements or operations of a neural network, graph, and/or tree, and vice versa. An exemplary embodiment of a sequence (i.e. Collection of Sequences 530*c*, Sequence 533, etc.) is described later.

In yet another example, the disclosed artificially intelligent systems, devices, and methods for learning and/or using visual surrounding for autonomous device operation may include a search-based model and/or technique. As such, machine learning, knowledge structuring or representation, decision making, pattern recognition, and/or other artificial intelligence functionalities may include searching through a collection of possible solutions. For example, a search method can search through a neural network, graph, tree, sequence, or other data structure that includes data elements of interest. A search may use heuristics to limit the search for solutions by eliminating choices that are unlikely to lead to the goal. Heuristic techniques may provide a best guess solution. A search can also include optimization. For example, a search may begin with a guess and then refine the guess incrementally until no more refinements can be made. In a further example, the disclosed systems, devices, and methods may include logic-based model and/or technique. As such, machine learning, knowledge structuring or representation, decision making, pattern recognition, and/or other artificial intelligence functionalities can use formal or other type of logic. Logic based models may involve making inferences or deriving conclusions from a set of premises. As such, a logic based system can extend existing knowledge or create new knowledge automatically using inferences. Examples of the types of logic that can be utilized include propositional or sentential logic that comprises logic of statements which can be true or false; first-order logic that allows the use of quantifiers and predicates and that can express facts about objects, their properties, and their relations with each other; fuzzy logic that allows degrees of truth to be represented as a value between 0 and 1 rather than simply 0 (false) or 1 (true), which can be used for uncertain reasoning; subjective logic that comprises a type of probabilistic logic that may take uncertainty and belief into account, which can be suitable for modeling and analyzing situations involving uncertainty, incomplete knowledge and different world views; and/or other types of logic. In a further example, the disclosed systems, devices, and methods may include a probabilistic model and/or technique. As such, machine learning, knowledge structuring or representation, decision making, pattern recognition, and/or other artificial intelligence functionalities can be implemented to operate with incomplete or uncertain information where probabilities may affect outcomes. Bayesian network, among other models, is an example of a probabilistic tool used for purposes such as reasoning, learning, planning, perception, and/or others. One of ordinary skill in art will understand that the aforementioned artificial intelligence models and/or techniques are described merely as examples of a variety of possible implementations, and that while all possible artificial intelligence models and/or techniques are too voluminous to describe, other artificial intelligence models and/or techniques known in art are within the scope of this disclosure. One of ordinary skill in art will also recognize that an intelligent system may solve a specific problem by using any model and/or technique that works such as, for example, some systems can be symbolic and logical, some can be sub-symbolic neural networks, some can be deterministic or probabilistic, some can be hierarchical, some may include searching techniques, some may include optimization techniques, while others may use other or a combination of models and/or techniques. In general, any artificial intelligence model and/or technique can be utilized that can facilitate the functionalities described herein.

Figure 17A:
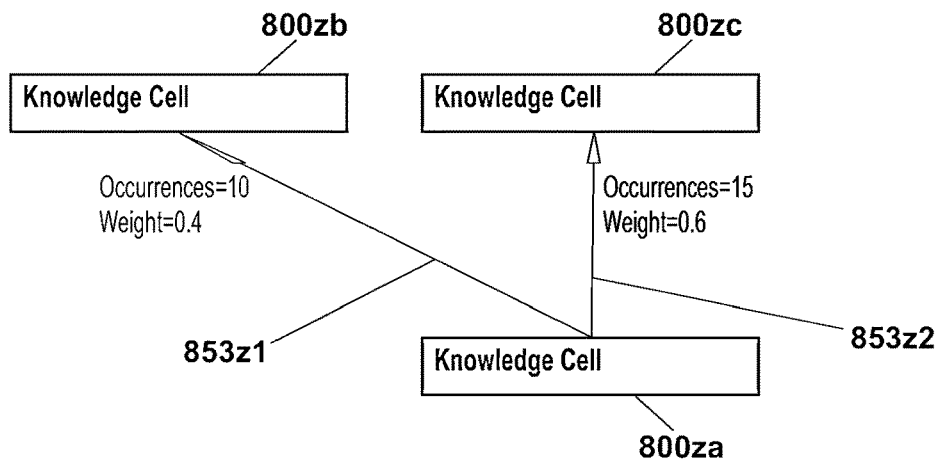
FIGS. 17A-17C illustrate embodiments of interconnected Knowledge Cells 800 and updating weights of Connections 853.
Figure 17B:
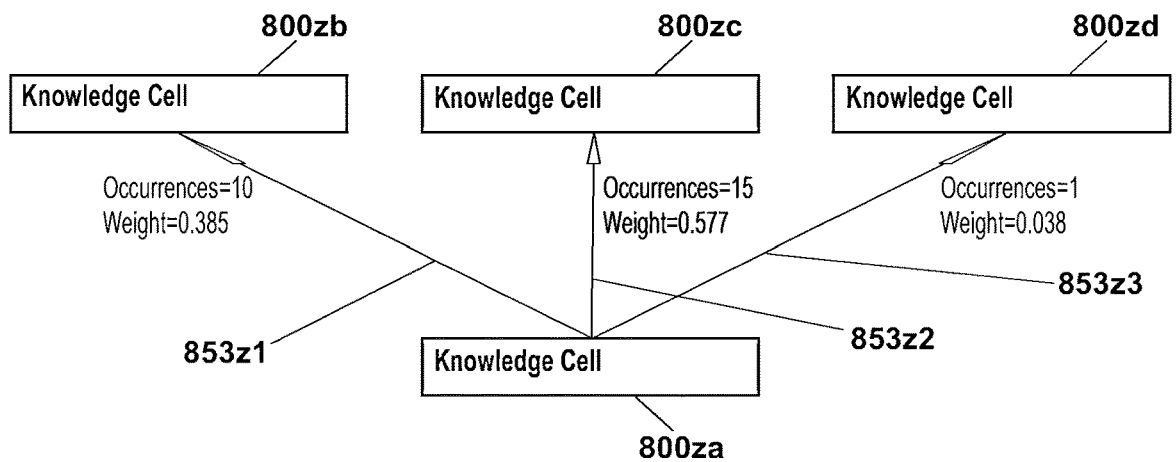
Figure 17C:
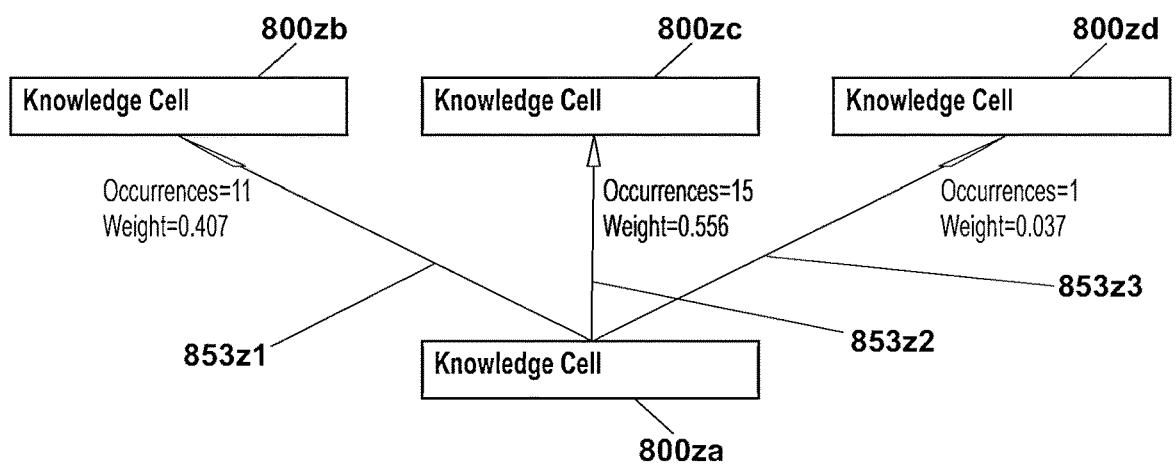

Referring to FIGS. 17A-17C, embodiments of interconnected Knowledge Cells 800 and updating weights of Connections 853 are illustrated. As shown for example in FIG. 17A, Knowledge Cell 800*za* is connected to Knowledge Cell 800*zb* and Knowledge Cell 800*zc* by Connection 853*z*1 and Connection 853*z*2, respectively. Each of Connection 853*z*1 and Connection 853*z*2 may include or be associated with occurrence count, weight, and/or other parameter or data. The number of occurrences may track or store the number of observations that a Knowledge Cell 800 was followed by another Knowledge Cell 800 indicating a connection or relationship between them. For example, Knowledge Cell 800*za* was followed by Knowledge Cell 800*zb* 10 times as indicated by the number of occurrences of Connection 853*z*1. Also, Knowledge Cell 800*za* was followed by Knowledge Cell 800*zc* 15 times as indicated by the number of occurrences of Connection 853*z*2. The weight of Connection 853*z*1 can be calculated or determined as the number of occurrences of Connection 853*z*1 divided by the sum of occurrences of all connections (i.e. Connection 853*z*1 and Connection 853*z*2, etc.) originating from Knowledge Cell 800*za*. Therefore, the weight of Connection 853*z*1 can be calculated or determined as $10/(10+15)=0.4$, for example. Also, the weight of Connection 853*z*2 can be calculated or determined as $15/(10+15)=0.6$, for example. Therefore, the sum of weights of Connection 853*z*1, Connection 853*z*2, and/or any other Connections 853 originating from Knowledge Cell 800*za* may equal to 1 or 100%. As shown for example in FIG. 17B, in the case that Knowledge Cell 800*zd* is inserted and an observation is made that Knowledge Cell 800*zd* follows Knowledge Cell 800*za*, Connection 853*z*3 can be created between Knowledge Cell 800*za* and Knowledge Cell 800*zd*. The occurrence count of Connection 853*z*3 can be set to 1 and weight determined as 1/(10+15+1)=0.038. The weights of all other connections (i.e. Connection 853z1, Connection 853z2, etc.) originating from Knowledge Cell 800za may be updated to account for the creation of Connection 853z3. Therefore, the weight of Connection 853z1 can be updated as 10/(10+15+1)=0.385. The weight of Connection 853z2 can also be updated as 15/(10+15+1)=0.577. As shown for example in FIG. 17C, in the case that an additional occurrence of Connection 853z1 is observed (i.e. Knowledge Cell 800zb followed Knowledge Cell 800za, etc.), occurrence count of Connection 853z1 and weights of all connections (i.e. Connection 853z1, Connection 853z2, and Connection 853z3, etc.) originating from Knowledge Cell 800za may be updated to account for this observation. The occurrence count of Connection 853z1 can be increased by 1 and its weight updated as 11/(11+15+1)=0.407. The weight of Connection 853z2 can also be updated as 15/(11+15+1)=0.556. The weight of Connection 853z3 can also be updated as 1/(11+15+1)=0.037.

Figure 18:
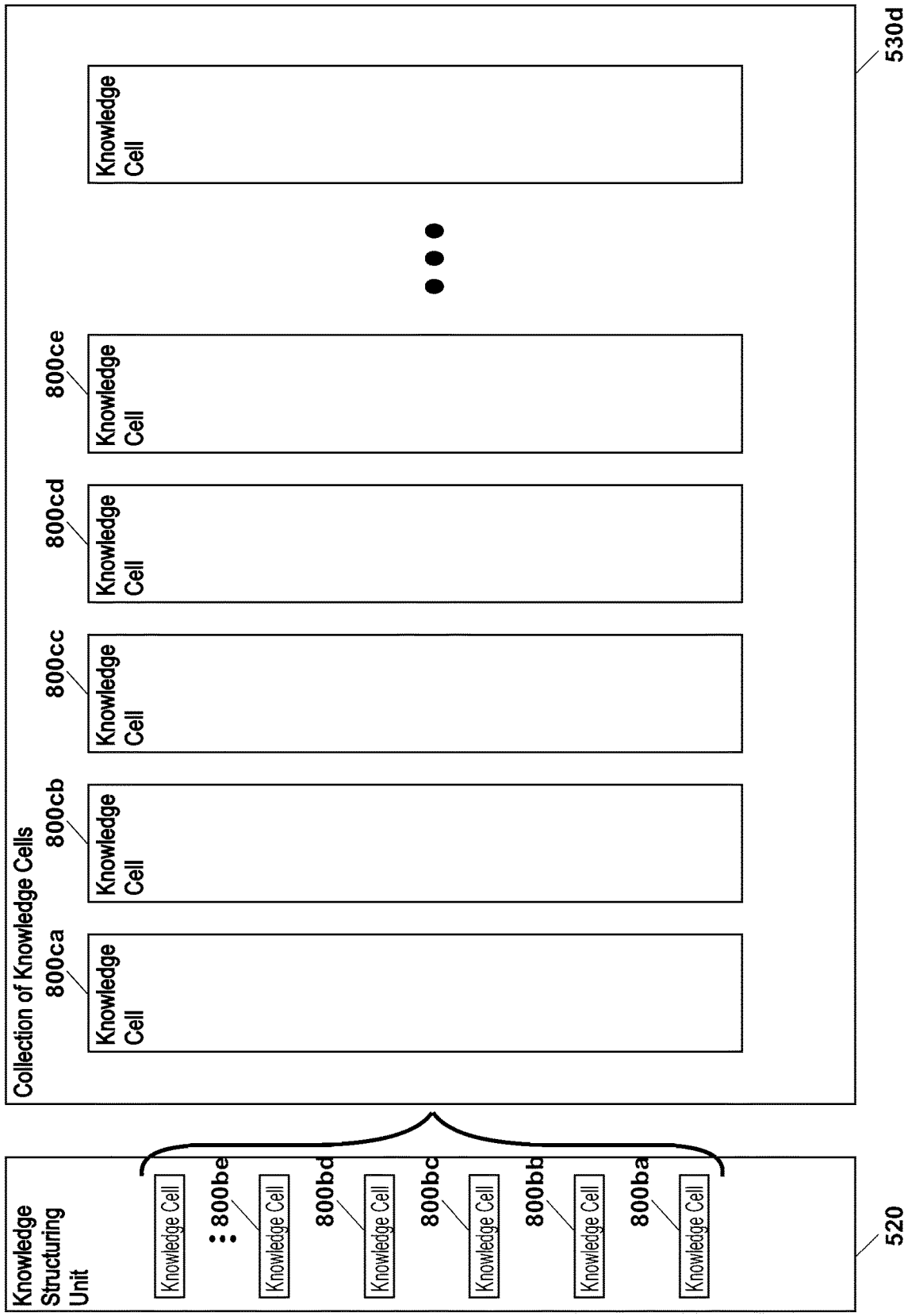
FIG. 18 illustrates an embodiment of learning Knowledge Cells 800 comprising one or more Digital Pictures 525 correlated with any Instruction Sets 526 and/or Extra Info 527 using Collection of Knowledge Cells 530d.

Referring to FIG. 18, an embodiment of learning Knowledge Cells 800 comprising one or more Digital Pictures 525 correlated with any Instruction Sets 526 and/or Extra Info 527 using Collection of Knowledge Cells 530d is illustrated. Collection of Knowledge Cells 530d comprises the functionality for storing any number of Knowledge Cells 800. In some aspects, Knowledge Cells 800 may be stored into or applied onto Collection of Knowledge Cells 530d in a learning or training process. In effect, Collection of Knowledge Cells 530d may store Knowledge Cells 800 that can later be used to enable autonomous Device 98 operation. In some embodiments, Knowledge Structuring Unit 520 structures or generates Knowledge Cells 800 as previously described and the system applies them onto Collection of Knowledge Cells 530d, thereby implementing learning Device's 98 operation in various visual surroundings. The term apply or applying may refer to storing, copying, inserting, updating, or other similar action, therefore, these terms may be used interchangeably herein depending on context. The system can perform Similarity Comparisons 125 (later described) of a newly structured Knowledge Cell 800 from Knowledge Structuring Unit 520 with Knowledge Cells 800 in Collection of Knowledge Cells 530d. If a substantially similar Knowledge Cell 800 is not found in Collection of Knowledge Cells 530d, the system may insert (i.e. copy, store, etc.) the Knowledge Cell 800 from Knowledge Structuring Unit 520 into Collection of Knowledge Cells 530d, for example. On the other hand, if a substantially similar Knowledge Cell 800 is found in Collection of Knowledge Cells 530d, the system may optionally omit inserting the Knowledge Cell 800 from Knowledge Structuring Unit 520 as inserting a substantially similar Knowledge Cell 800 may not add much or any additional knowledge to the Collection of Knowledge Cells 530d, for example. Also, inserting a substantially similar Knowledge Cell 800 can optionally be omitted to save storage resources and limit the number of Knowledge Cells 800 that may later need to be processed or compared. Any features, functionalities, and embodiments of Similarity Comparison 125, importance index (later described), similarity index (later described), and/or other disclosed elements can be utilized to facilitate determination of substantial or other similarity and whether to insert a newly structured Knowledge Cell 800 into Collection of Knowledge Cells 530d.

For example, the system can perform Similarity Comparisons 125 (later described) of Knowledge Cell 800ba from Knowledge Structuring Unit 520 with Knowledge Cells 800 in Collection of Knowledge Cells 530d. In the case that a substantially similar match is found between Knowledge Cell 800ba and any of the Knowledge Cells 800 in Collection of Knowledge Cells 530d, the system may perform no action. The system can then perform Similarity Comparisons 125 of Knowledge Cell 800bb from Knowledge Structuring Unit 520 with Knowledge Cells 800 in Collection of Knowledge Cells 530d. In the case that a substantially similar match is not found, the system may insert a new Knowledge Cell 800 into Collection of Knowledge Cells 530d and copy Knowledge Cell 800bb into the inserted new Knowledge Cell 800. The system can then perform Similarity Comparisons 125 of Knowledge Cell 800bc from Knowledge Structuring Unit 520 with Knowledge Cells 800 in Collection of Knowledge Cells 530d. In the case that a substantially similar match is found between Knowledge Cell 800bc and any of the Knowledge Cells 800 in Collection of Knowledge Cells 530d, the system may perform no action. The system can then perform Similarity Comparisons 125 of Knowledge Cell 800bd from Knowledge Structuring Unit 520 with Knowledge Cells 800 in Collection of Knowledge Cells 530d. In the case that a substantially similar match is not found, the system may insert a new Knowledge Cell 800 into Collection of Knowledge Cells 530d and copy Knowledge Cell 800bd into the inserted new Knowledge Cell 800. The system can then perform Similarity Comparisons 125 of Knowledge Cell 800be from Knowledge Structuring Unit 520 with Knowledge Cells 800 in Collection of Knowledge Cells 530d. In the case that a substantially similar match is not found, the system may insert a new Knowledge Cell 800 into Collection of Knowledge Cells 530d and copy Knowledge Cell 800be into the inserted new Knowledge Cell 800. Applying any additional Knowledge Cells 800 from Knowledge Structuring Unit 520 onto Collection of Knowledge Cells 530d follows similar logic or process as the above-described.

Figure 19:
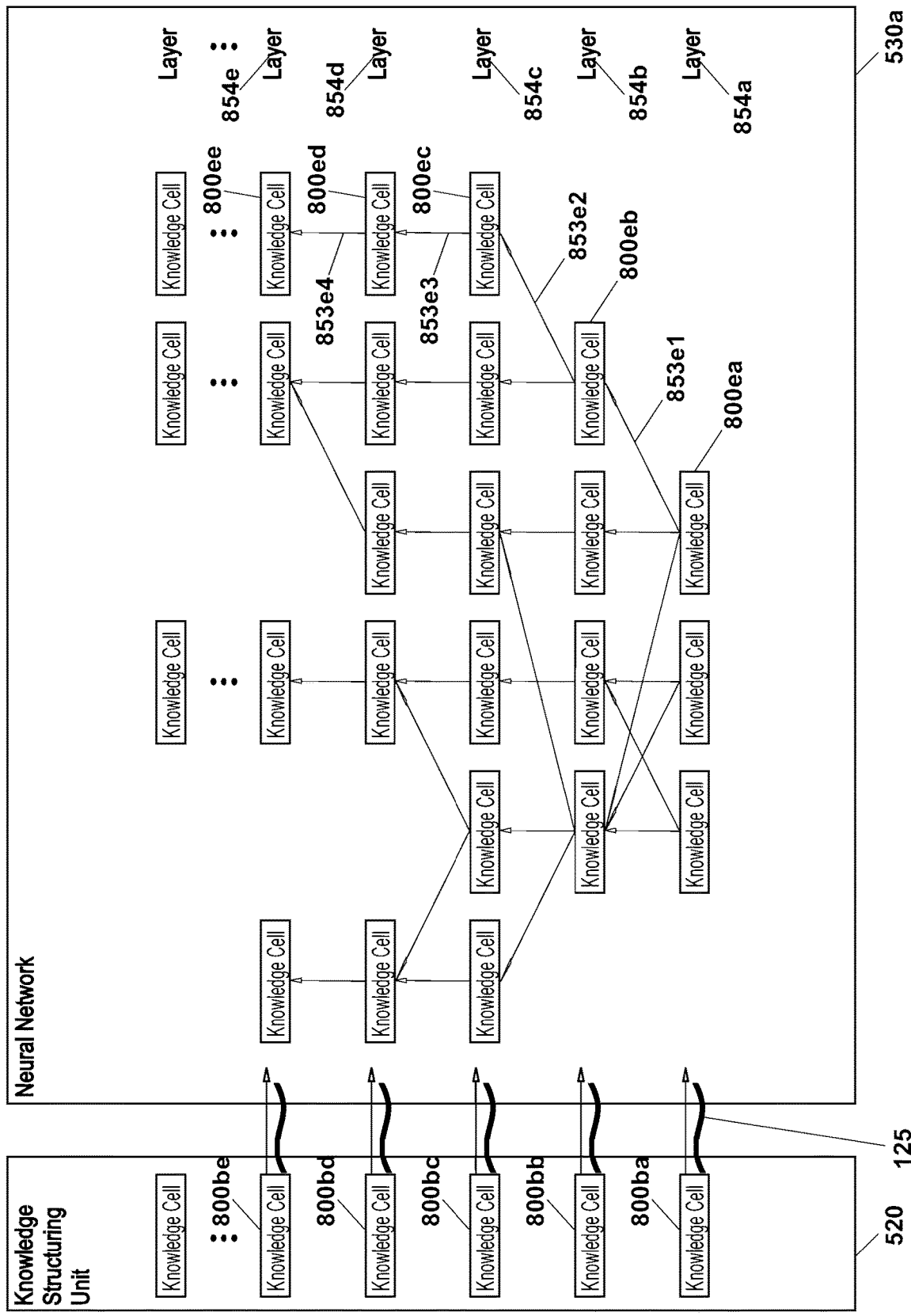

Referring to FIG. 19, an embodiment of learning Knowledge Cells 800 comprising one or more Digital Pictures 525 correlated with any Instruction Sets 526 and/or Extra Info 527 using Neural Network 530a is illustrated. Neural Network 530a includes a number of neurons or Nodes 852 interconnected by Connections 853 as previously described. Knowledge Cells 800 are shown instead of Nodes 852 to simplify the illustration as Node 852 includes a Knowledge Cell 800, for example. Therefore, Knowledge Cells 800 and Nodes 852 can be used interchangeably herein depending on context. It should be noted that Node 852 may include other elements and/or functionalities instead of or in addition to Knowledge Cell 800. In some aspects, Knowledge Cells 800 may be stored into or applied onto Neural Network 530a individually or collectively in a learning or training process. In some designs, Neural Network 530a comprises a number of Layers 854 each of which may include one or more Knowledge Cells 800. Knowledge Cells 800 in successive Layers 854 can be connected by Connections 853. Connection 853 may include or be associated with occurrence count, weight, and/or other parameter or data as previously described. Neural Network 530a may include any number of Layers 854 comprising any number of Knowledge Cells 800. In some aspects, Neural Network 530a may store Knowledge Cells 800 interconnected by Connections 853 where following a path through the Neural Network 530a can later be used to enable autonomous Device 98 operation. It should be understood that, in some embodiments, Knowledge Cells 800 in one Layer 854 of Neural Network 530a need not be connected only with Knowledge Cells 800 in a successive Layer 854, but also in any other Layer 854, thereby creating shortcuts (i.e. shortcut Connections 853, etc.) through Neural Network 530a. A Knowledge Cell 800 can also be connected to itself such as, for example, in recurrent neural networks. In general, any Knowledge Cell 800 can be connected with any other Knowledge Cell 800 anywhere else in Neural Network 530a. In further embodiments, back-propagation of any data or information can be implemented. In one example, back-propagation of similarity (i.e. similarity index, etc.) of compared Knowledge Cells 800 in a path through Neural Network 530a can be implemented. In another example, back-propagation of errors can be implemented. Such back-propagations can then be used to adjust occurrence counts and/or weights of Connections 853 for better future predictions, for example. Any other back-propagation can be implemented for other purposes. Any combination of Nodes 852 (i.e. Nodes 852 comprising Knowledge Cells 800, etc.), Connections 853, Layers 854, and/or other elements or techniques can be implemented in alternate embodiments. Neural Network 530a may include any type or form of a neural network known in art such as a feed-forward neural network, a back-propagating neural network, a recurrent neural network, a convolutional neural network, deep neural network, and/or others including a custom neural network.

In some embodiments, Knowledge Structuring Unit 520 structures or generates Knowledge Cells 800 and the system applies them onto Neural Network 530a, thereby implementing learning Device's 98 operation in various visual surroundings. The system can perform Similarity Comparisons 125 (later described) of a Knowledge Cell 800 from Knowledge Structuring Unit 520 with Knowledge Cells 800 in a corresponding Layer 854 of Neural Network 530a. If a substantially similar Knowledge Cell 800 is not found in the corresponding Layer 854 of Neural Network 530a, the system may insert (i.e. copy, store, etc.) the Knowledge Cell 800 from Knowledge Structuring Unit 520 into the corresponding Layer 854 of Neural Network 530a, and create a Connection 853 to the inserted Knowledge Cell 800 from a Knowledge Cell 800 in a prior Layer 854 including assigning an occurrence count to the new Connection 853, calculating a weight of the new Connection 853, and updating any other Connections 853 originating from the Knowledge Cell 800 in the prior Layer 854. On the other hand, if a substantially similar Knowledge Cell 800 is found in the corresponding Layer 854 of Neural Network 530a, the system may update occurrence count and weight of Connection 853 to that Knowledge Cell 800 from a Knowledge Cell 800 in a prior Layer 854, and update any other Connections 853 originating from the Knowledge Cell 800 in the prior Layer 854.

For example, the system can perform Similarity Comparisons 125 (later described) of Knowledge Cell 800ba from Knowledge Structuring Unit 520 with Knowledge Cells 800 in Layer 854a of Neural Network 530a. In the case that a substantially similar match is found between Knowledge Cell 800ba and Knowledge Cell 800ea, the system may perform no action since Knowledge Cell 800ea is the initial Knowledge Cell 800. The system can then perform Similarity Comparisons 125 of Knowledge Cell 800bb from Knowledge Structuring Unit 520 with Knowledge Cells 800 in Layer 854b of Neural Network 530a. In the case that a substantially similar match is found between Knowledge Cell 800bb and Knowledge Cell 800eb, the system may update occurrence count and weight of Connection 853e1 between Knowledge Cell 800ea and Knowledge Cell 800eb, and update weights of other Connections 853 originating from Knowledge Cell 800ea as previously described. The system can then perform Similarity Comparisons 125 of Knowledge Cell 800bc from Knowledge Structuring Unit 520 with Knowledge Cells 800 in Layer 854c of Neural Network 530a. In the case that a substantially similar match is not found, the system may insert Knowledge Cell 800ec into Layer 854c and copy Knowledge Cell 800bc into the inserted Knowledge Cell 800ec. The system may also create Connection 853e2 between Knowledge Cell 800eb and Knowledge Cell 800ec with occurrence count of 1 and weight calculated based on the occurrence count as previously described. The system may also update weights of other Connections 853 (one in this example) originating from Knowledge Cell 800eb as previously described. The system can then perform Similarity Comparisons 125 of Knowledge Cell 800bd from Knowledge Structuring Unit 520 with Knowledge Cells 800 in Layer 854d of Neural Network 530a. In the case that a substantially similar match is not found, the system may insert Knowledge Cell 800ed into Layer 854d and copy Knowledge Cell 800bd into the inserted Knowledge Cell 800ed. The system may also create Connection 853e3 between Knowledge Cell 800ec and Knowledge Cell 800ed with occurrence count of 1 and weight of 1. The system can then perform Similarity Comparisons 125 of Knowledge Cell 800be from Knowledge Structuring Unit 520 with Knowledge Cells 800 in Layer 854e of Neural Network 530a. In the case that a substantially similar match is not found, the system may insert Knowledge Cell 800ee into Layer 854e and copy Knowledge Cell 800be into the inserted Knowledge Cell 800ee. The system may also create Connection 853e4 between Knowledge Cell 800ed and Knowledge Cell 800ee with occurrence count of 1 and weight of 1. Applying any additional Knowledge Cells 800 from Knowledge Structuring Unit 520 onto Neural Network 530a follows similar logic or process as the above-described.

Similarity Comparison 125 comprises the functionality for comparing or matching Knowledge Cells 800 or portions thereof, and/or other functionalities. Similarity Comparison 125 comprises the functionality for comparing or matching Digital Pictures 525 or portions thereof. Similarity Comparison 125 comprises the functionality for comparing or matching streams of Digital Pictures 525 or portions thereof. Similarity Comparison 125 comprises the functionality for comparing or matching Instruction Sets 526, Extra Info 527, text (i.e. characters, words, phrases, etc.), pictures, sounds, data, and/or other elements or portions thereof. Similarity Comparison 125 may include functions, rules, and/or logic for performing matching or comparisons and for determining that while a perfect match is not found, a similar or partial match has been found. In some aspects, Similarity Comparison 125 may include determining substantial similarity or substantial match of compared elements. In other aspects, a partial match may include a substantial or otherwise similar match, and vice versa. Although, substantial similarity or substantial match is frequently used herein, it should be understood that any level of similarity, however high or low, may be utilized as defined by the rules (i.e. thresholds, etc.) for similarity. The rules for similarity or similar match can be defined by a user, by VSADO system administrator, or automatically by the system based on experience, testing, inquiry, analysis, synthesis, or other techniques, knowledge, or input. In some designs, Similarity Comparison 125 comprises the functionality to automatically define appropriately strict rules for determining similarity of the compared elements. Similarity Comparison 125 can therefore set, reset, and/or adjust the strictness of the rules for finding or determining similarity of the compared elements, thereby fine tuning Similarity Comparison 125 so that the rules for determining similarity are appropriately strict. In some aspects, the rules for determining similarity may include a similarity threshold. As such, Similarity Comparison 125 can determine similarity of compared elements if their similarity exceeds a similarity threshold. In other aspects, the rules for determining similarity may include a difference threshold. As such, Similarity Comparison 125 can determine similarity of compared elements if their difference is lower than a difference threshold. In further aspects, the rules for determining similarity may include other thresholds.

In some embodiments, in determining similarity of Knowledge Cells 800, Similarity Comparison 125 can compare one or more Digital Pictures 525 or portions (i.e. regions, features, pixels, etc.) thereof from one Knowledge Cell 800 with one or more Digital Pictures 525 or portions thereof from another Knowledge Cell 800. In some aspects, total equivalence is achieved when all Digital Pictures 525 or portions thereof of the compared Knowledge Cells 800 match. If total equivalence is not found, Similarity Comparison 125 may attempt to determine substantial or other similarity. Any features, functionalities, and embodiments of the previously described Picture Recognizer 350 can be used in determining such substantial similarity.

In some embodiments where compared Knowledge Cells 800 include a single Digital Picture 525, Similarity Comparison 125 can compare Digital Picture 525 from one Knowledge Cell 800 with Digital Picture 525 from another Knowledge Cell 800 using comparison techniques for individual pictures described below. In some embodiments where compared Knowledge Cells 800 include streams of Digital Pictures 525 (i.e. motion pictures, videos, etc.), Similarity Comparison 125 can compare a stream of Digital Pictures 525 from one Knowledge Cell 800 with a stream of Digital Pictures 525 from another Knowledge Cell 800. Such comparison may include comparing Digital Pictures 525 from one Knowledge Cell 800 with corresponding (i.e. similarly positioned, temporally related, etc.) Digital Pictures 525 from another Knowledge Cell 800. In one example, a 67th Digital Picture 525 from one Knowledge Cell 800 can be compared with a 67th Digital Picture 525 from another Knowledge Cell 800. In another example, a 67th Digital Picture 525 from one Knowledge Cell 800 can be compared with a number of Digital Picture 525 around (i.e. preceding and/or following) a 67th Digital Picture 525 from another Knowledge Cell 800. This way, flexibility can be implemented in finding a substantially similar Digital Picture 525 if the Digital Pictures 525 in the compared Knowledge Cells 800 are not perfectly aligned. In other aspects, Similarity Comparison 125 can utilize Dynamic Time Warping (DTW) and/or other techniques know in art for comparing and/or aligning temporal sequences (i.e. streams of Digital Pictures 525, etc.) that may vary in time or speed. Once the corresponding (i.e. similarly positioned, temporally related, time warped/aligned, etc.) Digital Pictures 525 in the compared streams of Digital Pictures 525 are compared and their substantial similarity determined using comparison techniques for individual pictures described below, Similarity Comparison 125 can utilize a threshold for the number or percentage of matching or substantially matching Digital Pictures 525 for determining substantial similarity of the compared Knowledge Cells 800. In some aspects, substantial similarity can be achieved when most of the Digital Pictures 525 or portions (i.e. regions, features, pixels, etc.) thereof of the compared Knowledge Cells 800 match or substantially match. In other aspects, substantial similarity can be achieved when at least a threshold number or percentage of Digital Pictures 525 or portions thereof of the compared Knowledge Cells 800 match or substantially match. Similarly, substantial similarity can be achieved when a number or percentage of matching or substantially matching Digital Pictures 525 or portions thereof of the compared Knowledge Cells 800 exceeds a threshold. In further aspects, substantial similarity can be achieved when all but a threshold number or percentage of Digital Pictures 525 or portions thereof of the compared Knowledge Cells 800 match or substantially match. Such thresholds can be defined by a user, by VSADO system administrator, or automatically by the system based on experience, testing, inquiry, analysis, synthesis, or other techniques, knowledge, or input. In one example, substantial similarity can be achieved when at least 1, 2, 3, 4, or any other threshold number of Digital Pictures 525 or portions thereof of the compared Knowledge Cells 800 match or substantially match. Similarly, substantial similarity can be achieved when the number of matching or substantially matching Digital Pictures 525 or portions thereof of the compared Knowledge Cells 800 exceeds 1, 2, 3, 4, or any other threshold number. In another example, substantial similarity can be achieved when at least 10%, 21%, 30%, 49%, 66%, 89%, 93%, or any other percentage of Digital Pictures 525 or portions thereof of the compared Knowledge Cells 800 match or substantially match. Similarly, substantial similarity can be achieved when the percentage of matching or substantially matching Digital Pictures 525 or portions thereof of the compared Knowledge Cells 800 exceeds 10%, 21%, 30%, 49%, 66%, 89%, 93%, or any other threshold percentage. In other embodiments, substantial similarity of the compared Knowledge Cells 800 can be achieved in terms of matches or substantial matches in more important (i.e. as indicated by importance index [later described], etc.) Digital Pictures 525 or portions thereof, thereby tolerating mismatches in less important Digital Pictures 525 or portions thereof. In one example, substantial similarity can be achieved when matches or substantial matches are found with respect to more substantive Digital Pictures 525 (i.e. pictures comprising content of interest [i.e. persons, objects, etc.], etc.) or portions thereof of the compared Knowledge Cells 800, thereby tolerating mismatches in less substantive Digital Pictures 525 (i.e. pictures comprising background, insignificant content, etc.) or portions thereof. In another example, substantial similarity can be achieved when matches or substantial matches are found in earlier Digital Pictures 525 or portions thereof of the compared Knowledge Cells 800, thereby tolerating mismatches in later Digital Pictures 525 or portions thereof. In general, any importance or weight can be assigned to any Digital Picture 525 or portion thereof, and/or other elements. In some designs, Similarity Comparison 125 can be configured to omit any Digital Picture 525 or portion thereof from the comparison. In one example, less substantive Digital Pictures 525 or portions thereof can be omitted. In another example, some or all Digital Pictures 525 or portions thereof related to a specific time period can be omitted. In a further example, later Digital Pictures 525 or portions thereof can be omitted. In further embodiments, substantial similarity can be achieved taking into account the number of Digital Pictures 525 of the compared Knowledge Cells 800. For example, substantial similarity can be achieved if the number, in addition to the content, of Digital Pictures 525 of the compared Knowledge Cells 800 match or substantially match. In further embodiments, substantial similarity can be achieved taking into account the objects detected within Digital Pictures 525 and/or other features of Digital Pictures 525 of the compared Knowledge Cells 800. For example, substantial similarity can be achieved if same or similar objects are detected in Digital Pictures 525 of the compared Knowledge Cells 800. Any features, functionalities, and embodiments of Picture Recognizer 350 can be used in such detection. In some aspects, Similarity Comparison 125 can compare the number, objects detected, and/or other features of Digital Pictures 525 as an initial check before proceeding to further detailed comparisons.

Similarity Comparison 125 can automatically adjust (i.e. increase or decrease) the strictness of the rules for determining substantial similarity of Knowledge Cells 800. In some aspects, such adjustment in strictness can be done by Similarity Comparison 125 in response to determining that total equivalence of compared Knowledge Cells 800 had not been found. Similarity Comparison 125 can keep adjusting the strictness of the rules until substantially similarity is found. All the rules or settings of substantial similarity can be set, reset, or adjusted by Similarity Comparison 125 in response to another strictness level determination. For example, Similarity Comparison 125 may attempt to find a match or substantial match in a certain percentage (i.e. 95%, etc.) of Digital Pictures 525 or portions thereof from the compared Knowledge Cells 800. If the comparison does not determine substantial similarity of compared Knowledge Cells 800, Similarity Comparison 125 may decide to decrease the strictness of the rules. In response, Similarity Comparison 125 may attempt to find fewer matching or substantially matching Digital Pictures 525 or portions thereof than in the previous attempt using stricter rules. If the comparison still does not determine substantial similarity of compared Knowledge Cells 800, Similarity Comparison 125 may further decrease (i.e. down to a certain minimum strictness or threshold, etc.) the strictness by requiring fewer Digital Pictures 525 or portions thereof to match or substantially match, thereby further increasing a chance of finding substantial similarity in compared Knowledge Cells 800. In further aspects, an adjustment in strictness can be done by Similarity Comparison 125 in response to determining that multiple substantially similar Knowledge Cells 800 had been found. Similarity Comparison 125 can keep adjusting the strictness of the rules until a best of the substantially similar Knowledge Cells 800 is found. For example, Similarity Comparison 125 may attempt to find a match or substantial match in a certain percentage (i.e. 70%, etc.) of Digital Pictures 525 or portions thereof from the compared Knowledge Cells 800. If the comparison determines a number of substantially similar Knowledge Cells 800, Similarity Comparison 125 may decide to increase the strictness of the rules to decrease the number of substantially similar Knowledge Cells 800. In response, Similarity Comparison 125 may attempt to find more matching or substantially matching Digital Pictures 525 or portions thereof in addition to the earlier found Digital Pictures 525 or portions thereof to limit the number of substantially similar Knowledge Cells 800. If the comparison still provides more than one substantially similar Knowledge Cell 800, Similarity Comparison 125 may further increase the strictness by requiring additional Digital Pictures 525 or portions thereof to match or substantially match, thereby further narrowing the number of substantially similar Knowledge Cells 800 until a best substantially similar Knowledge Cells 800 is found.

In some embodiments, in determining substantial similarity of individual Digital Pictures 525 (i.e. Digital Pictures 525 from the compared Knowledge Cells 800, etc.), Similarity Comparison 125 can compare one or more regions of one Digital Picture 525 with one or more regions of another Digital Picture 525. A region may include a collection of pixels. In some aspects, a region may include detected or recognized content of interest such as an object or person. Such region may be detected using any features, functionalities, and embodiments of Picture Recognizer 350. In other aspects, a region may include content defined using a picture segmentation technique. Examples of picture segmentation techniques include thresholding, clustering, region-growing, edge detection, curve propagation, level sets, graph partitioning, model-based segmentation, trainable segmentation (i.e. artificial neural networks, etc.), and/or others. In further aspects, a region may include content defined using any technique. In further aspects, a region may include any arbitrary region comprising any arbitrary content. Once regions of the compared Digital Pictures 525 are known, Similarity Comparison 125 can compare the regions to determine substantial similarity of the compared Digital Pictures 525. In some aspects, total equivalence is found when all regions of one Digital Picture 525 match all regions of another Digital Picture 525. In other aspects, if total equivalence is not found, Similarity Comparison 125 may attempt to determine substantial similarity of compared Digital Pictures 525. In one example, substantial similarity can be achieved when most of the regions of the compared Digital Picture 525 match or substantially match. In another example, substantial similarity can be achieved when at least a threshold number (i.e. 1, 2, 5, 11, 39, etc.) or percentage (i.e. 38%, 63%, 77%, 84%, 98%, etc.) of regions of the compared Digital Pictures 525 match or substantially match. Similarly, substantial similarity can be achieved when the number or percentage of matching or substantially matching regions of the compared Digital Pictures 525 exceeds a threshold number (i.e. 1, 2, 5, 11, 39, etc.) or a threshold percentage (i.e. 48%, 63%, 77%, 84%, 98%, etc.). In a further example, substantial similarity can be achieved when all but a threshold number or percentage of regions of the compared Digital Pictures 525 match or substantially match. Such thresholds can be defined by a user, by VSADO system administrator, or automatically by the system based on experience, testing, inquiry, analysis, synthesis, and/or other techniques, knowledge, or input. In further aspects, Similarity Comparison 125 can utilize the type of regions for determining substantial similarity of Digital Pictures 525. For example, substantial similarity can be achieved when matches or substantial matches are found with respect to more substantive, larger, and/or other regions, thereby tolerating mismatches in less substantive, smaller, and/or other regions. In further aspects, Similarity Comparison 125 can utilize the importance (i.e. as indicated by importance index [later described], etc.) of regions for determining substantial similarity of Digital Pictures 525. For example, substantial similarity can be achieved when matches or substantial matches are found with respect to more important regions such as the above described more substantive, larger, and/or other regions, thereby tolerating mismatches in less important regions such as less substantive, smaller, and/or other regions. In further aspects, Similarity Comparison 125 can omit some of the regions from the comparison in determining substantial similarity of Digital Pictures 525. In one example, isolated regions can be omitted from comparison. In another example, less substantive or smaller regions can be omitted from comparison. In general, any region can be omitted from comparison. In further aspects, Similarity Comparison 125 can focus on certain regions of interest from the compared Digital Pictures 525. For example, substantial similarity can be achieved when matches or substantial matches are found with respect to regions comprising persons or parts (i.e. head, arm, leg, etc.) thereof, large objects, close objects, and/or other content of interest, thereby tolerating mismatches in regions comprising the background, insignificant content, and/or other content. In further aspects, Similarity Comparison 125 can detect or recognize persons or objects in the compared Digital Pictures 525 using regions. Any features, functionalities, and embodiments of Picture Recognizer 350 can be used in such detection or recognition. Once a person or object is detected in a Digital Picture 525, Similarity Comparison 125 may attempt to detect the person or object in the compared Digital Picture 525. In one example, substantial similarity can be achieved when the compared Digital Pictures 525 comprise one or more same persons or objects. In another example concerning streams of Digital Pictures 525, substantial similarity can be achieved when the compared streams of Digital Pictures 525 comprise a detected person or object in at least a threshold number or percentage of their pictures.

Similarity Comparison 125 can automatically adjust (i.e. increase or decrease) the strictness of the rules for determining substantial similarity of Digital Pictures 525 using regions. In some aspects, such adjustment in strictness can be done by Similarity Comparison 125 in response to determining that total equivalence of compared Digital Pictures 525 had not been found. Similarity Comparison 125 can keep adjusting the strictness rules until a substantial similarity is found. All the rules or settings of substantial similarity can be set, reset, or adjusted by Similarity Comparison 125 in response to another strictness level determination. For example, Similarity Comparison 125 may attempt to find a match or substantial match in a certain percentage (i.e. 74%, etc.) of regions from the compared Digital Pictures 525. If the comparison does not determine substantial similarity of compared Digital Pictures 525, Similarity Comparison 125 may decide to decrease the strictness of the rules. In response, Similarity Comparison 125 may attempt to find fewer matching or substantially matching regions than in the previous attempt using stricter rules. If the comparison still does not determine substantial similarity of compared Digital Pictures 525, Similarity Comparison 125 may further decrease the strictness (i.e. down to a certain minimum strictness or threshold, etc.) by requiring fewer regions to match or substantially match, thereby further increasing a chance of finding substantial similarity in compared Digital Pictures 525.

Where a reference to a region is used herein it should be understood that a portion of a region or a collection of regions can be used instead of or in addition to the region. In one example, instead of or in addition to regions, individual pixels and/or features that constitute a region can be compared. In another example, instead of or in addition to regions, collections of regions can be compared. As such, any operations, rules, logic, and/or functions operating on regions similarly apply to any portion of a region and/or any collection of regions. In general, whole regions, portions of a region, and/or collections of regions, including any operations thereon, can be combined to arrive at desired results. Some or all of the above-described rules, logic, and/or techniques can be utilized alone or in combination with each other or with other rules, logic, and/or techniques. One of ordinary skill in art will recognize that other techniques known in art for determining similarity of digital pictures, streams of digital pictures, and/or other data that would be too voluminous to describe are within the scope of this disclosure.

In some embodiments, in determining substantial similarity of individual Digital Pictures 525 (i.e. Digital Pictures 525 from the compared Knowledge Cells 800, etc.), Similarity Comparison 125 can compare one or more features of one Digital Picture 525 with one or more features of another Digital Picture 525. A feature may include a collection of pixels. Some of the steps or elements in a feature oriented technique include pre-processing, feature extraction, detection/segmentation, decision-making, and/or others, or a combination thereof, each of which may include its own sub-steps or sub-elements depending on the application. Examples of features that can be used include lines, edges, ridges, corners, blobs, and/or others. Examples of feature extraction techniques include Canny, Sobe, Kayyali, Harris & Stephens et al, SUSAN, Level Curve Curvature, FAST, Laplacian of Gaussian, Difference of Gaussians, Determinant of Hessian, MSER, PCBR, Grey-level Blobs, and/or others. Once features of the compared Digital Pictures 525 are known, Similarity Comparison 125 can compare the features to determine substantial similarity. In some aspects, total equivalence is found when all features of one Digital Picture 525 match all features of another Digital Picture 525. In other aspects, if total equivalence is not found, Similarity Comparison 125 may attempt to determine substantial similarity of compared Digital Pictures 525. In one example, substantial similarity can be achieved when most of the features of the compared Digital Picture 525 match or substantially match. In another example, substantial similarity can be achieved when at least a threshold number (i.e. 3, 22, 47, 93, 128, 431, etc.) or percentage (i.e. 49%, 53%, 68%, 72%, 95%, etc.) of features of the compared Digital Pictures 525 match or substantially match. Similarly, substantial similarity can be achieved when the number or percentage of matching or substantially matching features of the compared Digital Pictures 525 exceeds a threshold number (i.e. 3, 22, 47, 93, 128, 431, etc.) or a threshold percentage (i.e. 49%, 53%, 68%, 72%, 95%, etc.). In a further example, substantial similarity can be achieved when all but a threshold number or percentage of features of the compared Digital Pictures 525 match or substantially match. Such thresholds can be defined by a user, by VSADO system administrator, or automatically by the system based on experience, testing, inquiry, analysis, synthesis, and/or other techniques, knowledge, or input. In further aspects, Similarity Comparison 125 can utilize the type of features for determining substantial similarity of Digital Pictures 525. In one example, substantial similarity can be achieved when matches or substantial matches are found with respect to edges, thereby tolerating mismatches in blobs. In another example, substantial similarity can be achieved when matches or substantial matches are found with respect to more substantive, larger, and/or other features, thereby tolerating mismatches in less substantive, smaller, and/or other features. In further aspects, Similarity Comparison 125 can utilize the importance (i.e. as indicated by importance index [later described], etc.) of features for determining substantial similarity of Digital Pictures 525. For example, substantial similarity can be achieved when matches or substantial matches are found with respect to more important features such as the above described more substantive, larger, and/or other features, thereby tolerating mismatches in less important features such as less substantive, smaller, and/or other features. In further aspects, Similarity Comparison 125 can omit some of the features from the comparison in determining substantial similarity of Digital Pictures 525. In one example, isolated features can be omitted from comparison. In another example, less substantive or smaller features can be omitted from comparison. In general, any feature can be omitted from comparison. In further aspects, Similarity Comparison 125 can focus on features in certain regions of interest of the compared Digital Pictures 525. For example, substantial similarity can be achieved when matches or substantial matches are found with respect to features in regions comprising persons or parts (i.e. head, arm, leg, etc.) thereof, large objects, close objects, and/or other objects, thereby tolerating mismatches in features of regions comprising the background, insignificant content, and/or other regions. In further aspects, Similarity Comparison 125 can detect or recognize persons or objects in the compared Digital Pictures 525. Any features, functionalities, and embodiments of Picture Recognizer 350 can be used in such detection or recognition. Once a person or object is detected in a Digital Picture 525, Similarity Comparison 125 may attempt to detect the person or object in the compared Digital Picture 525. In one example, substantial similarity can be achieved when the compared Digital Pictures 525 comprise one or more same persons or objects. In another example concerning streams of Digital Pictures 525, substantial similarity can be achieved when the compared streams of Digital Pictures 525 comprise a detected person or object in at least a threshold number or percentage of their pictures. In further aspects, Similarity Comparison 125 may include identifying and/or analyzing tiled and/or overlapping features, which can then be combined (i.e. similar to some process steps in convolutional neural networks, etc.) and compared to determine substantial similarity of Digital Pictures 525.

Similarity Comparison 125 can automatically adjust (i.e. increase or decrease) the strictness of the rules for determining substantial similarity of Digital Pictures 525 using features. In some aspects, such adjustment in strictness can be done by Similarity Comparison 125 in response to determining that total equivalence of compared Digital Pictures 525 had not been found. Similarity Comparison 125 can keep adjusting the strictness rules until a substantial similarity is found. All the rules or settings of substantial similarity can be set, reset, or adjusted by Similarity Comparison 125 in response to another strictness level determination. For example, Similarity Comparison 125 may attempt to find a match or substantial match in a certain percentage (i.e. 89%, etc.) of features from the compared Digital Pictures 525. If the comparison does not determine substantial similarity of compared Digital Pictures 525, Similarity Comparison 125 may decide to decrease the strictness of the rules. In response, Similarity Comparison 125 may attempt to find fewer matching or substantially matching features than in the previous attempt using stricter rules. If the comparison still does not determine substantial similarity of compared Digital Pictures 525, Similarity Comparison 125 may further decrease the strictness (i.e. down to a certain minimum strictness or threshold, etc.) by requiring fewer features to match or substantially match, thereby further increasing a chance of finding substantial similarity in compared Digital Pictures 525.

Where a reference to a feature is used herein it should be understood that a portion of a feature or a collection of features can be used instead of or in addition to the feature. In one example, instead of or in addition to features, individual pixels that constitute a feature can be compared. In another example, instead of or in addition to features, collections of features can be compared. In a further example, levels of features where a feature on one level includes one or more features from another level (i.e. prior level, etc.) can be compared. As such, any operations, rules, logic, and/or functions operating on features similarly apply to any portion of a feature and/or any collection of features. In general, whole features, portions of a feature, and/or collections of features, including any operations thereon, can be combined to arrive at desired results. Some or all of the above-described rules, logic, and/or techniques can be utilized alone or in combination with each other or with other rules, logic, and/or techniques. One of ordinary skill in art will recognize that other techniques known in art for determining similarity of digital pictures, streams of digital pictures, and/or other data that would be too voluminous to describe are within the scope of this disclosure.

In some embodiments, in determining substantial similarity of individual Digital Pictures 525 (i.e. Digital Pictures 525 from the compared Knowledge Cells 800, etc.), Similarity Comparison 125 can compare pixels of one Digital Picture 525 with pixels of another Digital Picture 525. In some aspects, total equivalence is found when all pixels of one Digital Picture 525 match all pixels of another Digital Picture 525. In other aspects, if total equivalence is not found, Similarity Comparison 125 may attempt to determine substantial similarity. In one example, substantial similarity can be achieved when most of the pixels from the compared Digital Pictures 525 match or substantially match. In another example, substantial similarity can be achieved when at least a threshold number (i.e. 449, 2219, 92229, 442990, 1000028, etc.) or percentage (i.e. 39%, 45%, 58%, 72%, 92%, etc.) of pixels from the compared Digital Pictures 525 match or substantially match. Similarly, substantial similarity can be achieved when the number or percentage of matching or substantially matching pixels from the compared Digital Pictures 525 exceeds a threshold number (i.e. 449, 2219, 92229, 442990, 1000028, etc.) or a threshold percentage (i.e. 39%, 45%, 58%, 72%, 92%, etc.). In a further example, substantial similarity can be achieved when all but a threshold number or percentage of pixels from the compared Digital Pictures 525 match or substantially match. Such thresholds can be defined by a user, by VSADO system administrator, or automatically by the system based on experience, testing, inquiry, analysis, synthesis, and/or other techniques, knowledge, or input. In further aspects, Similarity Comparison 125 can omit some of the pixels from the comparison in determining substantial similarity of Digital Pictures 525. In one example, pixels composing the background or any insignificant content can be omitted from comparison. In general, any pixel can be omitted from comparison. In further aspects, Similarity Comparison 125 can focus on pixels in certain regions of interest in determining substantial similarity of Digital Pictures 525. For example, substantial similarity can be achieved when matches or substantial matches are found with respect to pixels in regions comprising persons or parts (i.e. head, arm, leg, etc.) thereof, large objects, close objects, and/or other content of interest, thereby tolerating mismatches in pixels in regions comprising the background, insignificant content, and/or other content.

Similarity Comparison 125 can automatically adjust (i.e. increase or decrease) the strictness of the rules for determining substantial similarity of Digital Pictures 525 using pixels. In some aspects, such adjustment in strictness can be done by Similarity Comparison 125 in response to determining that total equivalence of compared Digital Pictures 525 had not been found. Similarity Comparison 125 can keep adjusting the strictness rules until a substantial similarity is found. All the rules or settings of substantial similarity can be set, reset, or adjusted by Similarity Comparison 125 in response to another strictness level determination. For example, Similarity Comparison 125 may attempt to find a match or substantial match in a certain percentage (i.e. 77%, etc.) of pixels from the compared Digital Pictures 525. If the comparison does not determine substantial similarity of compared Digital Pictures 525, Similarity Comparison 125 may decide to decrease the strictness of the rules. In response, Similarity Comparison 125 may attempt to find fewer matching or substantially matching pixels than in the previous attempt using stricter rules. If the comparison still does not determine substantial similarity of compared Digital Pictures 525, Similarity Comparison 125 may further decrease the strictness (i.e. down to a certain minimum strictness or threshold, etc.) by requiring fewer pixels to match or substantially match, thereby further increasing a chance of finding substantial similarity in compared Digital Pictures 525.

Where a reference to a pixel is used herein it should be understood that a collection of pixels can be used instead of or in addition to the pixel. For example, instead of or in addition to pixels, collections of pixels can be compared. As such, any operations, rules, logic, and/or functions operating on pixels similarly apply to any collection of pixels. In general, pixels and/or collections of pixels, including any operations thereon, can be combined to arrive at desired results. Some or all of the above-described rules, logic, and/or techniques can be utilized alone or in combination with each other or with other rules, logic, and/or techniques. Any of the previously described features, functionalities, and embodiments of Similarity Comparison 125 for determining substantial similarity of Digital Pictures 525 using regions and/or features can similarly be used for pixels. One of ordinary skill in art will recognize that other techniques known in art for determining similarity of digital pictures, streams of digital pictures, and/or other data that would be too voluminous to describe are within the scope of this disclosure.

Other aspects or properties of digital pictures or pixels can be taken into account by Similarity Comparison 125 in digital picture comparisons. Examples of such aspects or properties include color adjustment, size adjustment, content manipulation, transparency (i.e. alpha channel, etc.), use of mask, and/or others. In some implementations, as digital pictures can be captured by various picture taking equipment, in various environments, and under various lighting conditions, Similarity Comparison 125 can adjust lighting or color of pixels or otherwise manipulate pixels before or during comparison. Lighting or color adjustment (also referred to as gray balance, neutral balance, white balance, etc.) may generally include manipulating or rebalancing the intensities of the colors (i.e. red, green, and/or blue if RGB color model is used, etc.) of one or more pixels. For example, Similarity Comparison 125 can adjust lighting or color of all pixels of one picture to make it more comparable to another picture. Similarity Comparison 125 can also incrementally adjust the pixels such as increasing or decreasing the red, green, and/or blue pixel values by a certain amount in each cycle of comparisons in order to find a substantially similar match at one of the incremental adjustment levels. Any of the publically available, custom, or other lighting or color adjustment techniques or programs can be utilized such as color filters, color balancing, color correction, and/or others. In other implementations, Similarity Comparison 125 can resize or otherwise transform a digital picture before or during comparison. Such resizing or transformation may include increasing or decreasing the number of pixels of a digital picture. For example, Similarity Comparison 125 can increase or decrease the size of a digital picture proportionally (i.e. increase or decrease length and/or width keeping aspect ratio constant, etc.) to equate its size with the size of another digital picture. Similarity Comparison 125 can also incrementally resize a digital picture such as increasing or decreasing the size of the digital picture proportionally by a certain amount in each cycle of comparisons in order to find a substantially similar match at one of the incremental sizes. Any of the publically available, custom, or other digital picture resizing techniques or programs can be utilized such as nearest-neighbor interpolation, bilinear interpolation, bicubic interpolation, and/or others. In further implementations, Similarity Comparison 125 can manipulate content (i.e. all pixels, one or more regions, one or more depicted objects/persons, etc.) of a digital picture before or during comparison. Such content manipulation may include moving, centering, aligning, resizing, transforming, and/or otherwise manipulating content of a digital picture. For example, Similarity Comparison 125 can move, center, or align content of one picture to make it more comparable to another picture. Any of the publically available, custom, or other digital picture manipulation techniques or programs can be utilized such as pixel moving, warping, distorting, aforementioned interpolations, and/or others. In further implementations, in digital pictures comprising transparency features or functionalities, Similarity Comparison 125 can utilize a threshold for acceptable number or percentage transparency difference similar to the below-described threshold for the acceptable color difference. Alternatively, transparency can be applied to one or more pixels of a digital picture and color difference may then be determined between compared pixels taking into account the transparency related color effect. Alternatively, transparent pixels can be excluded from comparison. In further implementations, certain regions or subsets of pixels can be ignored or excluded during comparison using a mask. In general, any region or subset of a picture determined to contain no content of interest can be excluded from comparison using a mask. Examples of such regions or subsets include background, transparent or partially transparent regions, regions comprising insignificant content, or any arbitrary region or subset. Similarity Comparison 125 can perform any other pre-processing or manipulation of digital pictures or pixels before or during comparison.

In any of the comparisons involving digital pictures or pixels, Similarity Comparison 125 can utilize a threshold for acceptable number or percentage difference in determining a match for each compared pixel. A pixel in a digital picture can be encoded using various techniques such as RGB (i.e. red, green, blue), CMYK (i.e. cyan, magenta, yellow, and key [black]), binary value, hexadecimal value, numeric value, and/or others. For instance, in RGB color scheme, each of red, green, and blue colors is encoded with a value 0-255 or its binary equivalent. In one example, a threshold for acceptable difference (i.e. absolute difference, etc.) can be set at 10 for each of the three colors. Therefore, a pixel encoded as R130, G240, B50 matches or is sufficiently similar to a compared pixel encoded as R135, G231, B57 because the differences in all three colors fall within the acceptable difference threshold (i.e. 10 in this example, etc.). Furthermore, a pixel encoded as R130, G240, B50 does not match or is not sufficiently similar to a compared pixel encoded as R143, G231, B57 because the difference in red value falls outside the acceptable difference threshold. Any other number threshold can be used such as 1, 3, 8, 15, 23, 77, 132, 197, 243, and/or others. A threshold for acceptable percentage difference can similarly be utilized such as 0.12%, 2%, 7%, 14%, 23%, 36%, 65%, and/or others. In some aspects, a threshold for acceptable number or percentage difference in red, green, and blue can be set to be different for each color. A similar difference determination can be utilized in pixels encoded in any other color scheme. The aforementioned thresholds can be defined by a user, by VSADO system administrator, or automatically by the system based on experience, testing, inquiry, analysis, synthesis, or other techniques, knowledge, or input.

In some embodiments, Similarity Comparison 125 can compare one or more Extra Info 527 (i.e. time information, location information, computed information, observed information, sensory information, contextual information, and/or other information, etc.) in addition to or instead of comparing Digital Pictures 525 or portions thereof in determining substantial similarity of Knowledge Cells 800. Extra Info 527 can be set to be less, equally, or more important (i.e. as indicated by importance index [later described], etc.) than Digital Pictures 525, regions, features, pixels, and/or other elements in the comparison. Since Extra Info 527 may include any contextual or other information that can be useful in determining similarity of any compared elements, Extra Info 527 can be used to enhance any of the aforementioned similarity determinations.

In some embodiments, Similarity Comparison 125 can also compare one or more Instruction Sets 526 in addition to or instead of comparing Digital Pictures 525 or portions thereof in determining substantial similarity of Knowledge Cells 800. In some aspects, Similarity Comparison 125 can compare portions of Instruction Sets 526 to determine substantial similarity of Instruction Sets 526. Similar thresholds for the number or percentage of matching portions of the compared Instruction Sets 526 can be utilized in Instruction Set 526 comparisons. Such thresholds can be defined by a user, by VSADO system administrator, or automatically by the system based on experience, testing, inquiry, analysis, synthesis, and/or other techniques, knowledge, or input. In other aspects, Similarity Comparison 125 can compare text (i.e. character comparison, word/phrase search/comparison, semantic comparison, etc.) or other data (i.e. bit comparison, object or data structure comparison, etc.) to determine substantial similarity of Instruction Sets 526. Any other comparison technique can be utilized in comparing Instruction Sets 526 in alternate implementations. Instruction Sets 526 can be set to be less, equally, or more important (i.e. as indicated by importance index [later described], etc.) than Digital Pictures 525, regions, features, pixels, Extra Info 527, and/or other elements in the comparison.

In some embodiments, an importance index (not shown) or other importance ranking technique can be used in any of the previously described comparisons or other processing involving elements of different importance. Importance index indicates importance of the element to or with which the index is assigned or associated. For example, importance index may indicate importance of a Knowledge Cell 800, Digital Picture 525, Instruction Set 526, Extra Info 527, region, feature, and/or other element to or with which the index is assigned or associated. In some aspects, importance index on a scale from 0 to 1 can be utilized, although, any other range can also be utilized. Importance index can be stored in or associated with the element to which the index pertains. Association of importance indexes can be implemented using a table where one column comprises elements and another column comprises their associated importance indexes, for example. Importance indexes of various elements can be defined by a user, by VSADO system administrator, or automatically by the system based on experience, testing, inquiry, analysis, synthesis, or other techniques, knowledge, or input. In one example, a higher Importance index can be assigned to more substantive Digital Pictures 525 (i.e. pictures comprising content of interest [i.e. persons, objects, etc.], etc.). In another example, a higher importance index can be assigned to Digital Pictures 525 that are correlated with Instruction Sets 526. Any importance index can be assigned to or associated with any element described herein. Any importance ranking technique can be utilized as or instead of importance index in alternate embodiments.

In some embodiments, Similarity Comparison 125 may generate a similarity index (not shown) for any compared elements. Similarity index indicates how well an element is matched with another element. For example, similarity index indicates how well a Knowledge Cell 800, Digital Picture 527, Instruction Set 526, Extra Info 527, region, feature, and/or other element is matched with a compared element. In some aspects, similarity index on a scale from 0 to 1 can be utilized, although, any other range can also be utilized. Similarity index can be generated by Similarity Comparison 125 whether substantial or other similarity between the compared elements is achieved or not. In one example, similarity index can be determined for a Knowledge Cell 800 based on a ratio/percentage of matched or substantially matched Digital Pictures 525 relative to the number of Digital Pictures 525 in the compared Knowledge Cell 800. Specifically, similarity index of 0.93 is determined if 93% of Digital Pictures 525 of one Knowledge Cell 800 match or substantially match Digital Pictures 525 of another Knowledge Cell 800. In some designs, importance (i.e. as indicated by importance index, etc.) of one or more Digital Pictures 525 can be included in the calculation of a weighted similarity index. Similar determination of similarity index can be implemented with Digital Pictures 525, Instruction Sets 526, Extra Info 527, regions, features, pixels, and/or other elements or portions thereof. Any combination of the aforementioned similarity index determinations or calculations can be utilized in alternate embodiments. Any similarity ranking technique can be utilized to determine or calculate similarity index in alternate embodiments.

Figure 20:
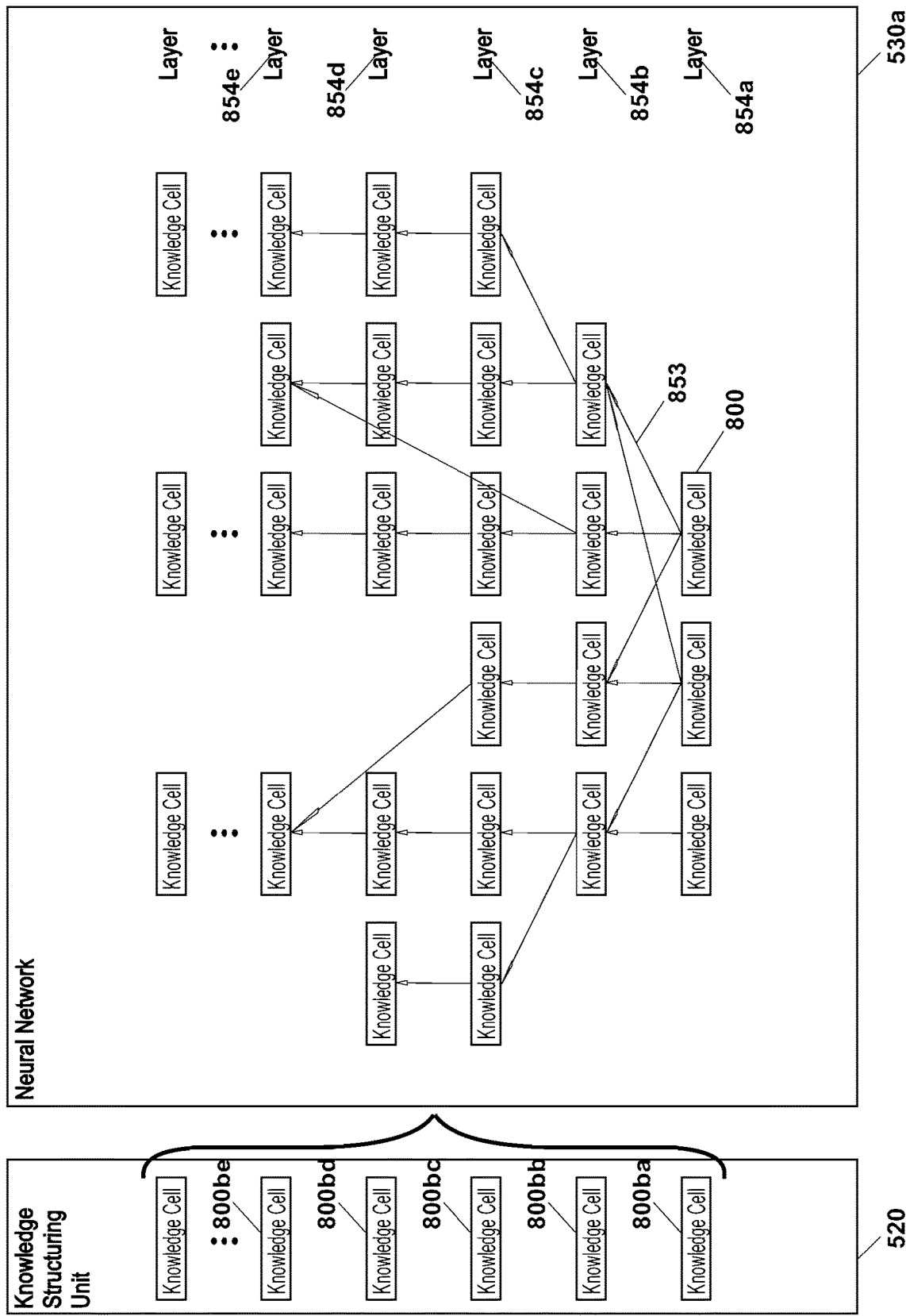
FIG. 20 illustrates an embodiment of learning Knowledge Cells 800 comprising one or more Digital Pictures 525 correlated with any Instruction Sets 526 and/or Extra Info 527 using Neural Network 530a comprising shortcut Connections 853.

Referring to FIG. 20, an embodiment of learning Knowledge Cells 800 comprising one or more Digital Pictures 525 correlated with any Instruction Sets 526 and/or Extra Info 527 using Neural Network 530a comprising shortcut Connections 853 is illustrated. In some designs, Knowledge Cells 800 in one Layer 854 of Neural Network 530a can be connected with Knowledge Cells 800 in any Layer 854, not only in a successive Layer 854, thereby creating shortcuts (i.e. shortcut Connections 853, etc.) through Neural Network 530a. In some aspects, creating a shortcut Connection 853 can be implemented by performing Similarity Comparisons 125 of a Knowledge Cell 800 from Knowledge Structuring Unit 520 with Knowledge Cells 800 in any Layer 854 when applying (i.e. storing, copying, etc.) the Knowledge Cell 800 from Knowledge Structuring Unit 520 onto Neural Network 530a. Once created, shortcut Connections 853 enable a wider variety of Knowledge Cells 800 to be considered when selecting a path through Neural Network 530a. In some embodiments, Knowledge Structuring Unit 520 structures or generates Knowledge Cells 800 and the system applies them onto Neural Network 530a, thereby implementing learning Device's 98 operation in various visual surroundings. The system can perform Similarity Comparisons 125 of a Knowledge Cell 800 from Knowledge Structuring Unit 520 with Knowledge Cells 800 in a corresponding and/or other Layers 854 of Neural Network 530a. If a substantially similar Knowledge Cell 800 is not found in the corresponding or other Layers 854 of Neural Network 530a, the system may insert (i.e. copy, store, etc.) the Knowledge Cell 800 from Knowledge Structuring Unit 520 into the corresponding (or another) Layer 854 of Neural Network 530*a*, and create a Connection 853 to the inserted Knowledge Cell 800 from a prior Knowledge Cell 800 including assigning an occurrence count to the new Connection 853, calculating a weight of the new Connection 853, and updating any other Connections 853 originating from the prior Knowledge Cell 800. On the other hand, if a substantially similar Knowledge Cell 800 is found in the corresponding or other Layers 854 of Neural Network 530*a*, the system may update occurrence count and weight of Connection 853 to that Knowledge Cell 800 from a prior Knowledge Cell 800, and update any other Connections 853 originating from the prior Knowledge Cell 800. Any of the previously described and/or other techniques for comparing, inserting, updating, and/or other operations on Knowledge Cells 800, Connections 853, Layers 854, and/or other elements can similarly be utilized in Neural Network 530*a* that comprises shortcut Connections 853.

Figure 21:
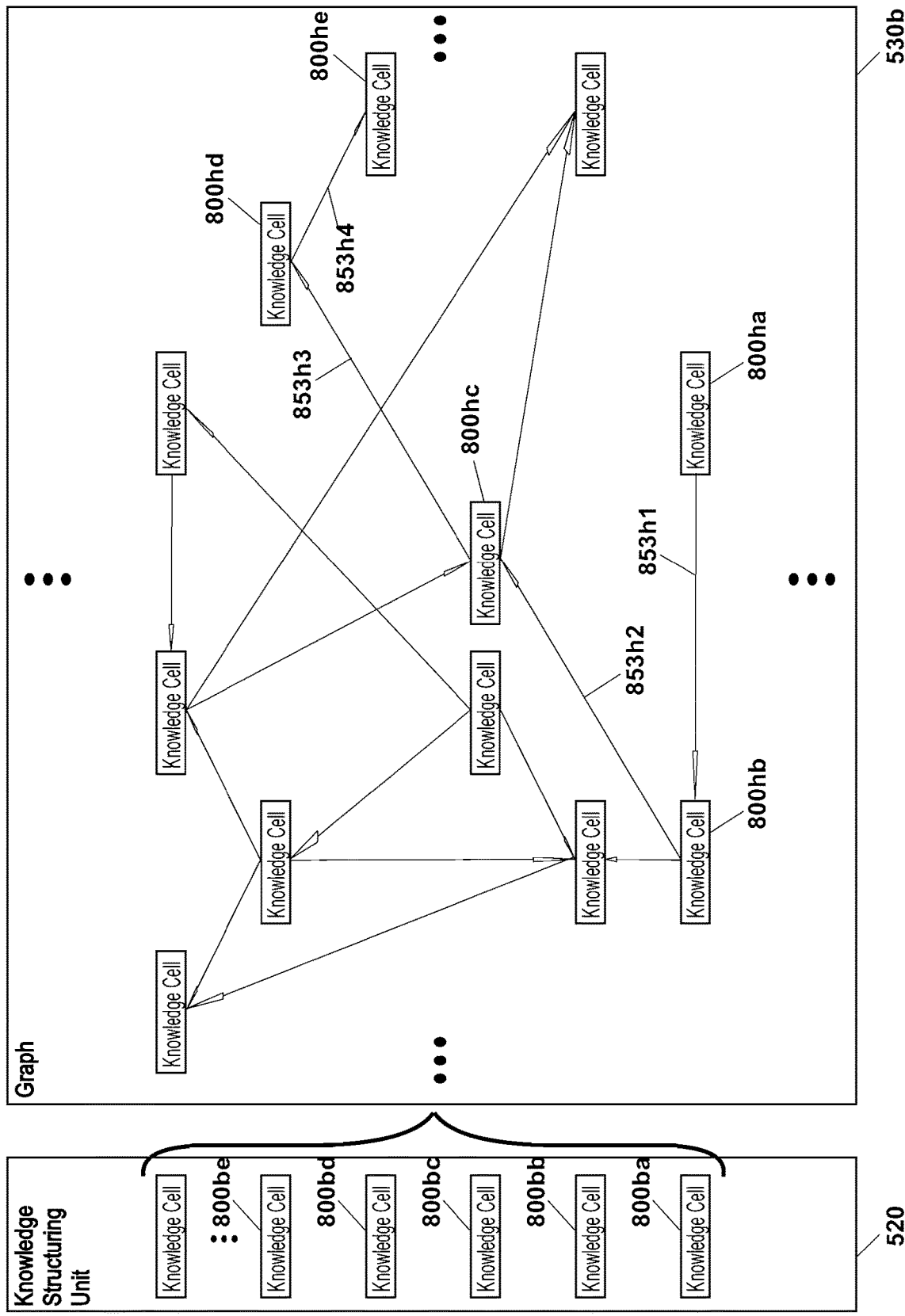
FIG. 21 illustrates an embodiment of learning Knowledge Cells 800 comprising one or more Digital Pictures 525 correlated with any Instruction Sets 526 and/or Extra Info 527 using Graph 530b.

Referring to FIG. 21, an embodiment of learning Knowledge Cells 800 comprising one or more Digital Pictures 525 correlated with any Instruction Sets 526 and/or Extra Info 527 using Graph 530*b* is illustrated. In some aspects, any Knowledge Cell 800 can be connected with any other Knowledge Cell 800 in Graph 530*b*. In other aspects, any Knowledge Cell 800 can be connected with itself and/or any other Knowledge Cell 800 in Graph 530*b*. In some embodiments, Knowledge Structuring Unit 520 structures or generates Knowledge Cells 800 and the system applies (i.e. store, copy, etc.) them onto Graph 530*b*, thereby implementing learning Device's 98 operation in various visual surroundings. The system can perform Similarity Comparisons 125 of a Knowledge Cell 800 from Knowledge Structuring Unit 520 with Knowledge Cells 800 in Graph 530*b*. If a substantially similar Knowledge Cell 800 is not found in Graph 530*b*, the system may insert (i.e. copy, store, etc.) the Knowledge Cell 800 from Knowledge Structuring Unit 520 into Graph 530*b*, and create a Connection 853 to the inserted Knowledge Cell 800 from a prior Knowledge Cell 800 including assigning an occurrence count to the new Connection 853, calculating a weight of the new Connection 853, and updating any other Connections 853 originating from the prior Knowledge Cell 800. On the other hand, if a substantially similar Knowledge Cell 800 is found in Graph 530*b*, the system may update occurrence count and weight of Connection 853 to that Knowledge Cell 800 from a prior Knowledge Cell 800, and update any other Connections 853 originating from the prior Knowledge Cell 800. Any of the previously described and/or other techniques for comparing, inserting, updating, and/or other operations on Knowledge Cells 800, Connections 853, and/or other elements can similarly be utilized in Graph 530*b*.

For example, the system can perform Similarity Comparisons 125 of Knowledge Cell 800*ba* from Knowledge Structuring Unit 520 with Knowledge Cells 800 in Graph 530*b*. In the case that a substantially similar match is not found, the system may insert Knowledge Cell 800*ha* into Graph 530*b* and copy Knowledge Cell 800*ba* into the inserted Knowledge Cell 800*ha*. The system can then perform Similarity Comparisons 125 of Knowledge Cell 800*bb* from Knowledge Structuring Unit 520 with Knowledge Cells 800 in Graph 530*b*. In the case that a substantially similar match is found between Knowledge Cell 800*bb* and Knowledge Cell 800*hb*, the system may create Connection 853*h*1 between Knowledge Cell 800*ha* and Knowledge Cell 800*hb* with occurrence count of 1 and weight of 1. The system can then perform Similarity Comparisons 125 of Knowledge Cell 800*bc* from Knowledge Structuring Unit 520 with Knowledge Cells 800 in Graph 530*b*. In the case that a substantially similar match is found between Knowledge Cell 800*bc* and Knowledge Cell 800*hc*, the system may update occurrence count and weight of Connection 853*h*2 between Knowledge Cell 800*hb* and Knowledge Cell 800*hc*, and update weights of other outgoing Connections 853 (one in this example) originating from Knowledge Cell 800*hb* as previously described. The system can then perform Similarity Comparisons 125 of Knowledge Cell 800*bd* from Knowledge Structuring Unit 520 with Knowledge Cells 800 in Graph 530*b*. In the case that a substantially similar match is not found, the system may insert Knowledge Cell 800*hd* into Graph 530*b* and copy Knowledge Cell 800*bd* into the inserted Knowledge Cell 800*hd*. The system may also create Connection 853*h*3 between Knowledge Cell 800*hc* and Knowledge Cell 800*hd* with occurrence count of 1 and weight calculated based on the occurrence count as previously described. The system may also update weights of other outgoing Connections 853 (one in this example) originating from Knowledge Cell 800*hc* as previously described. The system can then perform Similarity Comparisons 125 of Knowledge Cell 800*be* from Knowledge Structuring Unit 520 with Knowledge Cells 800 in Graph 530*b*. In the case that a substantially similar match is not found, the system may insert Knowledge Cell 800*he* into Graph 530*b* and copy Knowledge Cell 800*be* into the inserted Knowledge Cell 800*he*. The system may also create Connection 853*h*4 between Knowledge Cell 800*hd* and Knowledge Cell 800*he* with occurrence count of 1 and weight of 1. Applying any additional Knowledge Cells 800 from Knowledge Structuring Unit 520 onto Graph 530*b* follows similar logic or process as the above-described.

Figure 22:
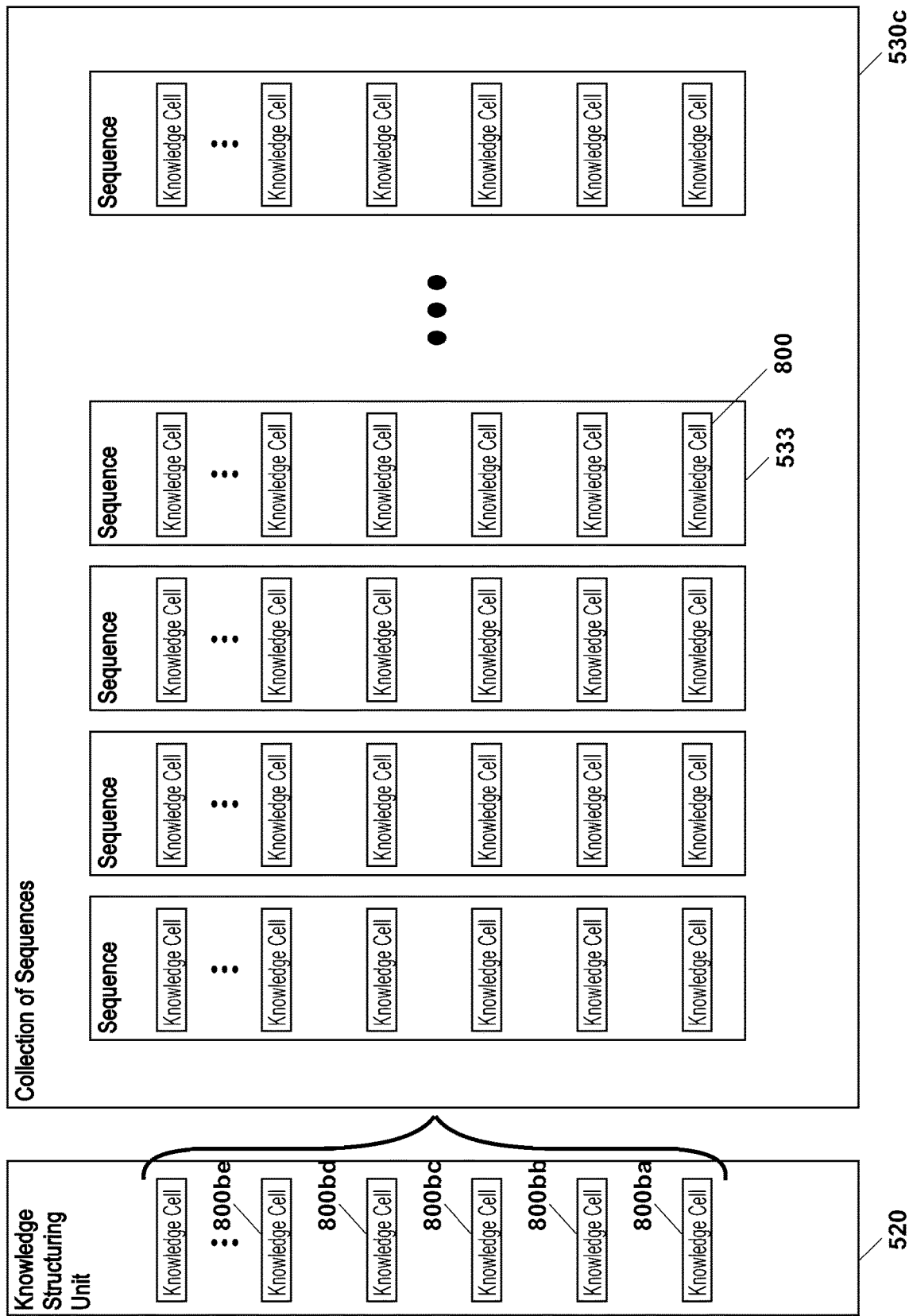
FIG. 22 illustrates an embodiment of learning Knowledge Cells 800 comprising one or more Digital Pictures 525 correlated with any Instruction Sets 526 and/or Extra Info 527 using Collection of Sequences 530c.

Referring to FIG. 22, an embodiment of learning Knowledge Cells 800 comprising one or more Digital Pictures 525 correlated with any Instruction Sets 526 and/or Extra Info 527 using Collection of Sequences 530*c* is illustrated. Collection of Sequences 530*c* comprises the functionality for storing one or more Sequences 533. Sequence 533 comprises the functionality for storing multiple Knowledge Cells 800. In some aspects, a Sequence 533 may include Knowledge Cells 800 relating to a single operation of Device 98. For example, Knowledge Structuring Unit 520 structures or generates Knowledge Cells 800 and the system applies them onto Collection of Sequences 530*c*, thereby implementing learning Device's 98 operation in various visual surroundings. The system can perform Similarity Comparisons 125 of Knowledge Cells 800 from Knowledge Structuring Unit 520 with corresponding Knowledge Cells 800 in Sequences 533 of Collection of Sequences 530*c* to find a Sequence 533 comprising Knowledge Cells 800 that are substantially similar to the Knowledge Cells 800 from Knowledge Structuring Unit 520. If Sequence 533 comprising such substantially similar Knowledge Cells 800 is not found in Collection of Sequences 530*c*, the system may create a new Sequence 533 comprising the Knowledge Cells 800 from Knowledge Structuring Unit 520 and insert (i.e. copy, store, etc.) the new Sequence 533 into Collection of Sequences 530*c*. On the other hand, if Sequence 533 comprising substantially similar Knowledge Cells 800 is found in Collection of Sequences 530*c*, the system may optionally omit inserting the Knowledge Cells 800 from Knowledge Structuring Unit 520 into Collection of Sequences 530*c* as inserting a similar Sequence 533 may not add much or any additional knowledge. This approach can save storage resources and limit the number of Knowledge Cells 800 that may later need to be processed or compared. In other aspects, a Sequence 533 may include Knowledge Cells 800 relating to a part of an operation of Device 98. Similar learning process as the above described can be utilized in such implementations. In further aspects, one or more long Sequences 533 each including Knowledge Cells 800 of multiple operations of Device 98 can be utilized. In one example, Knowledge Cells 800 of all operations can be stored in a single long Sequence 533 in which case Collection of Sequences 530c as a separate element can be omitted. In another example, Knowledge Cells 800 of multiple operations can be included in a plurality of long Sequences 533 such as hourly, daily, weekly, monthly, yearly, or other periodic or other Sequences 533. Similarity Comparisons 125 can be performed by traversing the one or more long Sequences 533 to find a match or substantially similar match. For instance, the system can perform Similarity Comparisons 125 of Knowledge Cells 800 from Knowledge Structuring Unit 520 with corresponding Knowledge Cells 800 in subsequences of a long Sequence 533 in incremental or other traversing pattern to find a subsequence comprising Knowledge Cells 800 that are substantially similar to the Knowledge Cells 800 from Knowledge Structuring Unit 520. The incremental traversing pattern may start from one end of a long Sequence 533 and move the comparison subsequence up or down one or any number of incremental Knowledge Cells 800 at a time. Other traversing patterns or methods can be employed such as starting from the middle of the Sequence 533 and subdividing the resulting subsequences in a recursive pattern, or any other traversing pattern or method. If a subsequence comprising substantially similar Knowledge Cells 800 is not found in the long Sequence 533, the system may concatenate or append the Knowledge Cells 800 from Knowledge Structuring Unit 520 to the long Sequence 533. In further aspects, Connections 853 can optionally be used in Sequence 533 to connect Knowledge Cells 800. For example, a Knowledge Cell 800 can be connected not only with a next Knowledge Cell 800 in the Sequence 533, but also with any other Knowledge Cell 800 in the Sequence 533, thereby creating alternate routes or shortcuts through the Sequence 533. Any number of Connections 853 connecting any Knowledge Cells 800 can be utilized. Any of the previously described and/or other techniques for comparing, inserting, updating, and/or other operations on Knowledge Cells 800, Connections 853, and/or other elements can similarly be utilized in Sequences 533 and/or Collection of Sequences 530c.

Any of the previously described data structures or arrangements of Knowledge Cells 800 such as Neural Network 530a, Graph 530b, Collection of Sequences 530c, Sequence 533, Collection of Knowledge Cells 530d, and/or others can be used alone, or in combination with each other or with other elements, in alternate embodiments. In one example, a path in Neural Network 530a or Graph 530b may include its own separate sequence of Knowledge Cells 800 that are not interconnected with Knowledge Cells 800 in other paths. In another example, a part of a path in Neural Network 530a or Graph 530b may include a sequence of Knowledge Cells 800 interconnected with Knowledge Cells 800 in other paths, whereas, another part of the path may include its own separate sequence of Knowledge Cells 800 that are not interconnected with Knowledge Cells 800 in other paths. Any other combinations or arrangements of Knowledge Cells 800 can be implemented.

Figure 23:
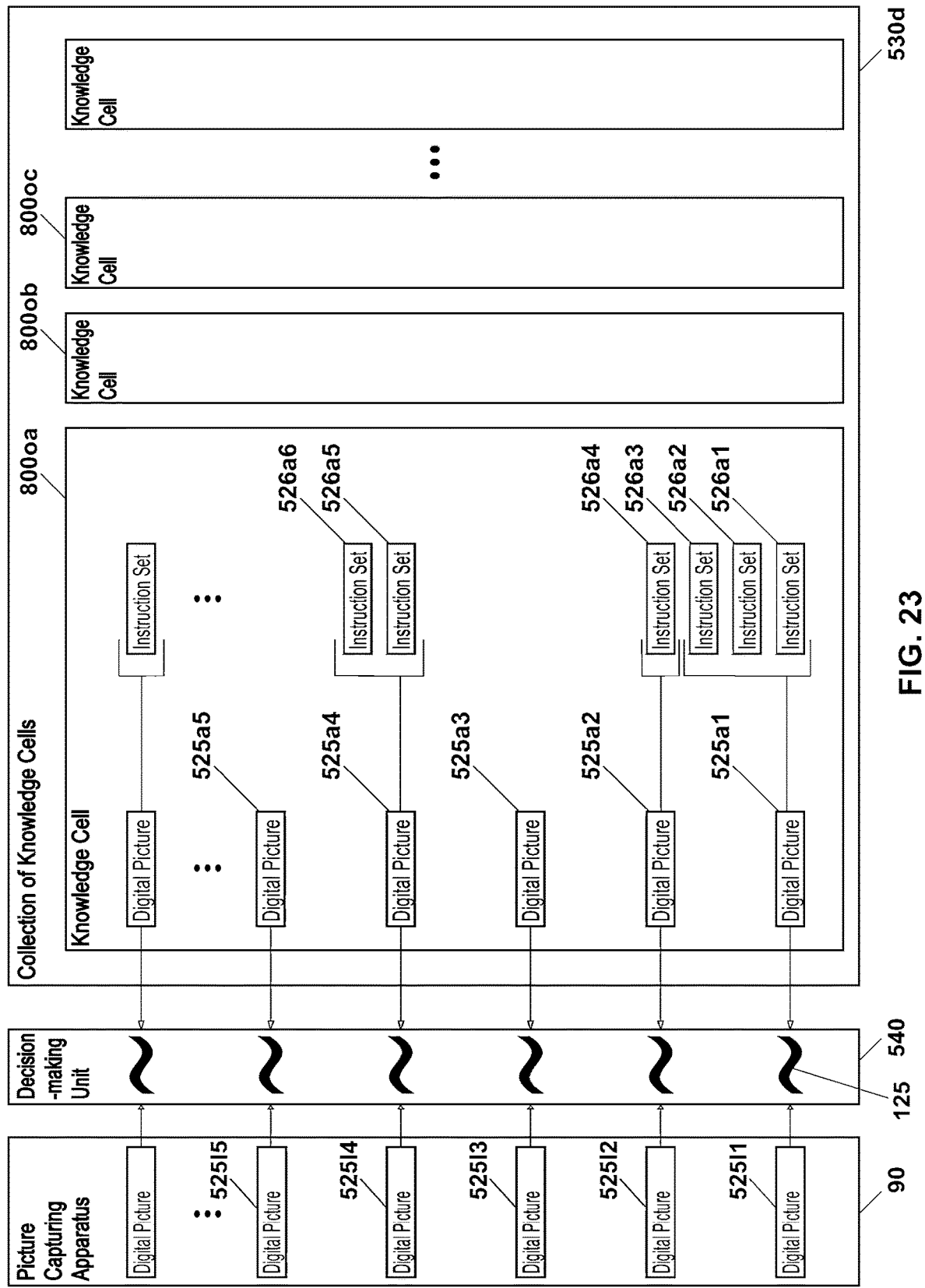
FIG. 23 illustrates an embodiment of determining anticipatory Instruction Sets 526 from a single Knowledge Cell 800.

Referring to FIG. 23, an embodiment of determining anticipatory Instruction Sets 526 from a single Knowledge Cell 800 is illustrated. Knowledge Cell 800 may be part of a Knowledgebase 530 (i.e. Neural Network 530a, Graph 530b, Collection of Sequences 530c, Sequence 533, Collection of Knowledge Cells 530d, etc.) such as Collection of Knowledge Cells 530d. Decision-making Unit 540 comprises the functionality for anticipating or determining a device's operation in various visual surroundings. Decision-making Unit 540 comprises the functionality for anticipating or determining Instruction Sets 526 (i.e. anticipatory Instruction Sets 526, etc.) to be used or executed in Device's 98 autonomous operation based on incoming Digital Pictures 525 of Device's 98 visual surrounding. Decision-making Unit 540 also comprises other disclosed functionalities.

In some aspects, Decision-making Unit 540 may anticipate or determine Instruction Sets 526 (i.e. anticipatory Instruction Sets 526, etc.) for autonomous Device 98 operation by performing Similarity Comparisons 125 of incoming Digital Pictures 525 or portions thereof from Picture Capturing Apparatus 90 with Digital Pictures 525 or portions thereof from Knowledge Cells 800 in Knowledgebase 530 (i.e. Neural Network 530a, Graph 530b, Collection of Sequences 530c, Sequence 533, Collection of Knowledge Cells 530d, etc.). A Knowledge Cell 800 includes a unit of knowledge (i.e. one or more Digital Pictures 525 correlated with any Instruction Sets 526 and/or Extra Info 527, etc.) of how Device 98 operated in a visual surrounding as previously described. When Digital Pictures 525 or portions thereof of a similar visual surrounding are detected in the future, Decision-making Unit 540 can anticipate the Instruction Sets 526 (i.e. anticipatory Instruction Sets 526, etc.) previously learned in a similar visual surrounding, thereby enabling autonomous Device 98 operation. In some aspects, Decision-making Unit 540 can perform Similarity Comparisons 125 of incoming Digital Pictures 525 from Picture Capturing Apparatus 90 with Digital Pictures 525 from Knowledge Cells 800 in Knowledgebase 530 (i.e. Neural Network 530a, Graph 530b, Collection of Sequences 530c, Sequence 533, Collection of Knowledge Cells 530d, etc.). If one or more substantially similar Digital Pictures 525 or portions thereof are found in a Knowledge Cell 800 from Knowledgebase 530, Instruction Sets 526 (i.e. anticipatory Instruction Sets 526, etc.) for autonomous Device 98 operation can be anticipated in Instruction Sets 526 correlated with the one or more Digital Pictures 525 from the Knowledge Cell 800. In some designs, subsequent one or more Instruction Sets 526 for autonomous Device 98 operation can be anticipated in Instruction Sets 526 correlated with subsequent Digital Pictures 525 from the Knowledge Cell 800 (or other Knowledge Cells 800), thereby anticipating not only current, but also additional future Instruction Sets 526. Although, Extra Info 527 is not shown in this and/or other figures for clarity of illustration, it should be noted that any Digital Picture 525, Instruction Set 526, and/or other element may include or be associated with Extra Info 527 and that Decision-making Unit 540 can utilize Extra Info 527 for enhanced decision making.

For example, Decision-making Unit 540 can perform Similarity Comparisons 125 of Digital Picture 525l1 or portion thereof from Picture Capturing Apparatus 90 with Digital Picture 525a1 or portion thereof from Knowledge Cell 800oa. Digital Picture 525a1 or portion thereof from Knowledge Cell 800oa may be found substantially similar. Decision-making Unit 540 can anticipate Instruction Sets 526a1-526a3 correlated with Digital Picture 525a1, thereby enabling autonomous Device 98 operation. Decision-making Unit 540 can then perform Similarity Comparisons 125 of Digital Picture 525l2 or portion thereof from Picture Capturing Apparatus 90 with Digital Picture 525a2 or portion thereof from Knowledge Cell 800*oa*. Digital Picture 525*a*2 or portion thereof from Knowledge Cell 800*oa* may be found substantially similar. Decision-making Unit 540 can anticipate Instruction Set 526*a*4 correlated with Digital Picture 525*a*2, thereby enabling autonomous Device 98 operation. Decision-making Unit 540 can then perform Similarity Comparisons 125 of Digital Picture 52513 or portion thereof from Picture Capturing Apparatus 90 with Digital Picture 525*a*3 or portion thereof from Knowledge Cell 800*oa*. Digital Picture 525*a*3 or portion thereof from Knowledge Cell 800*oa* may be found substantially similar. Decision-making Unit 540 may not anticipate any Instruction Sets 526 since none are correlated with Digital Picture 525*a*3. Decision-making Unit 540 can then perform Similarity Comparisons 125 of Digital Picture 52514 or portion thereof from Picture Capturing Apparatus 90 with Digital Picture 525*a*4 or portion thereof from Knowledge Cell 800*oa*. Digital Picture 525*a*4 or portion thereof from Knowledge Cell 800*oa* may not be found substantially similar. Decision-making Unit 540 can then perform Similarity Comparisons 125 of Digital Picture 52515 or portion thereof from Picture Capturing Apparatus 90 with Digital Picture 525*a*5 or portion thereof from Knowledge Cell 800*oa*. Digital Picture 525*a*5 or portion thereof from Knowledge Cell 800*oa* may not be found substantially similar. Decision-making Unit 540 can implement similar logic or process for any additional Digital Picture 525 from Picture Capturing Apparatus 90, and so on.

It should be understood that any of the described elements and/or techniques in the foregoing example can be omitted, used in a different combination, or used in combination with other elements and/or techniques, in which case the selection of Knowledge Cells 800 or elements (i.e. Digital Pictures 525, Instruction Sets 526, etc.) thereof would be affected accordingly. In one example, Extra Info 527 can be included in the Similarity Comparisons 125 as previously described. In another example, as history of incoming Digital Pictures 525 becomes available, Decision-making Unit 540 can perform collective Similarity Comparisons 125 of the history of Digital Pictures 525 or portions thereof from Picture Capturing Apparatus 90 with subsequences of Digital Pictures 525 or portions thereof from Knowledge Cell 800. In a further example, the described comparisons in a single Knowledge Cell 800 may be performed on any number of Knowledge Cells 800 sequentially or in parallel. Parallel processors such as a plurality of Processors 11 or cores thereof can be utilized for such parallel processing. In a further example, various arrangements of Digital Pictures 525 and/or other elements in a Knowledge Cell 800 can be utilized as previously described. One of ordinary skill in art will understand that the foregoing exemplary embodiment is described merely as an example of a variety of possible implementations, and that while all of its variations are too voluminous to describe, they are within the scope of this disclosure.

Figure 24:
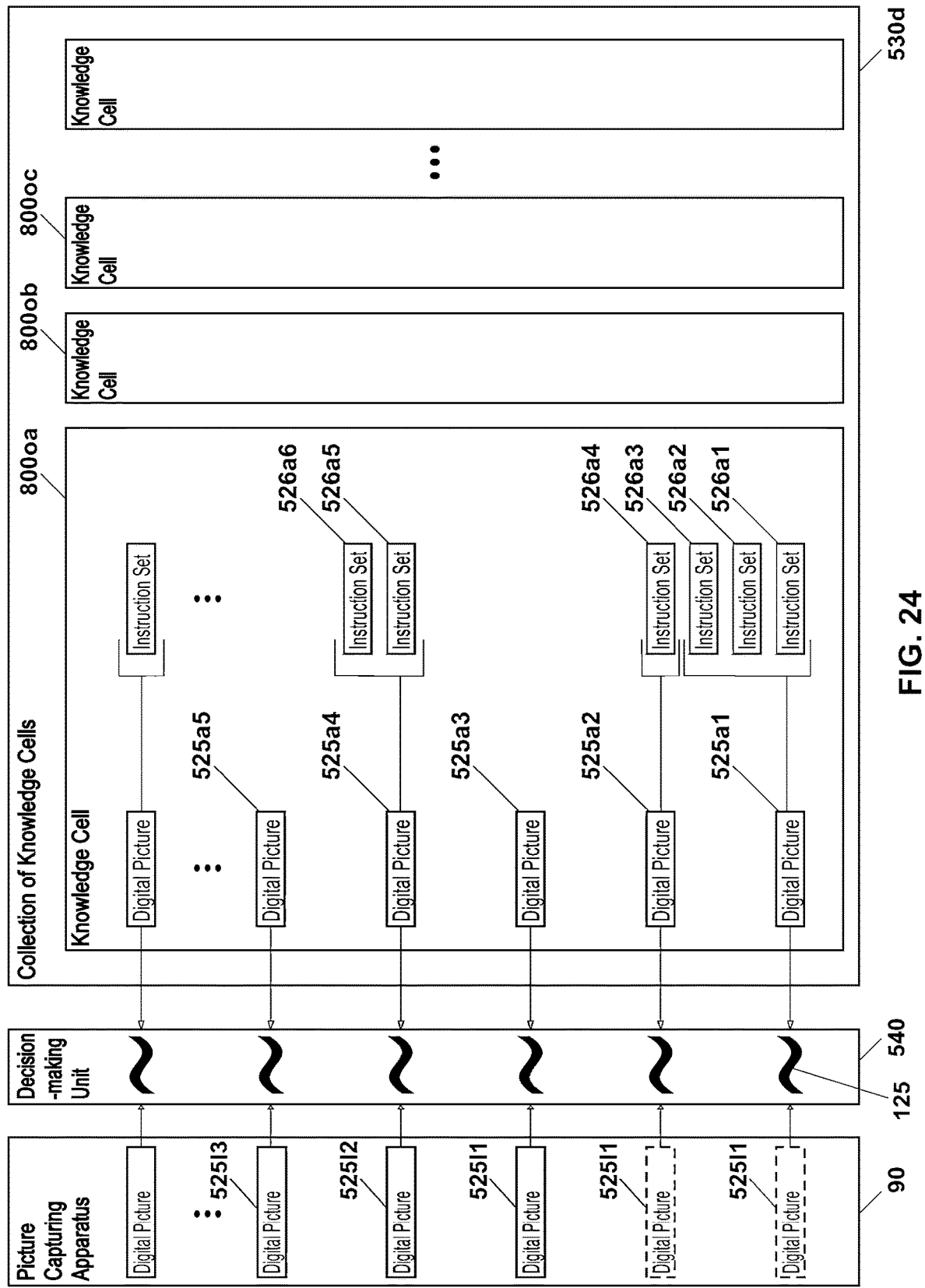
FIG. 24 illustrates an embodiment of determining anticipatory Instruction Sets 526 by traversing a single Knowledge Cell 800.

Referring to FIG. 24, an embodiment of determining anticipatory Instruction Sets 526 by traversing a single Knowledge Cell 800 is illustrated. Knowledge Cell 800 may be part of a Knowledgebase 530 (i.e. Neural Network 530*a*, Graph 530*b*, Collection of Sequences 530*c*, Sequence 533, Collection of Knowledge Cells 530*d*, etc.) such as Collection of Knowledge Cells 530*d*. For example, Decision-making Unit 540 can perform Similarity Comparisons 125 of Digital Picture 52511 or portion thereof from Picture Capturing Apparatus 90 with Digital Picture 525*a*1 or portion thereof from Knowledge Cell 800*oa*. Digital Picture 525*a*1 or portion thereof from Knowledge Cell 800*oa* may not be found substantially similar. Decision-making Unit 540 can then perform Similarity Comparisons 125 of Digital Picture 52511 or portion thereof from Picture Capturing Apparatus 90 with Digital Picture 525*a*2 or portion thereof from Knowledge Cell 800*oa*. Digital Picture 525*a*2 or portion thereof from Knowledge Cell 800*oa* may not be found substantially similar. Decision-making Unit 540 can then perform Similarity Comparisons 125 of Digital Picture 52511 or portion thereof from Picture Capturing Apparatus 90 with Digital Picture 525*a*3 or portion thereof from Knowledge Cell 800*oa*. Digital Picture 525*a*3 or portion thereof from Knowledge Cell 800*oa* may be found substantially similar. Decision-making Unit 540 may not anticipate any Instruction Sets 526 since none are correlated with Digital Picture 525*a*3. Decision-making Unit 540 can then perform Similarity Comparisons 125 of Digital Picture 52512 or portion thereof from Picture Capturing Apparatus 90 with Digital Picture 525*a*4 or portion thereof from Knowledge Cell 800*oa*. Digital Picture 525*a*4 or portion thereof from Knowledge Cell 800*oa* may be found substantially similar. Decision-making Unit 540 can anticipate Instruction Sets 526*a*5-526*a*6 correlated with Digital Picture 525*a*4, thereby enabling autonomous Device 98 operation. Decision-making Unit 540 can then perform Similarity Comparisons 125 of Digital Picture 52513 or portion thereof from Picture Capturing Apparatus 90 with Digital Picture 525*a*5 or portion thereof from Knowledge Cell 800*oa*. Digital Picture 525*a*5 or portion thereof from Knowledge Cell 800*oa* may be found substantially similar. Decision-making Unit 540 may not anticipate any Instruction Sets 526 since none are correlated with Digital Picture 525*a*5. Decision-making Unit 540 can implement similar logic or process for any additional Digital Pictures 525 from Picture Capturing Apparatus 90, and so on.

It should be understood that any of the described elements and/or techniques in the foregoing example can be omitted, used in a different combination, or used in combination with other elements and/or techniques, in which case the selection of Knowledge Cells 800 or elements (i.e. Digital Pictures 525, Instruction Sets 526, etc.) thereof would be affected accordingly. In one example, Extra Info 527 can be included in the Similarity Comparisons 125 as previously described. In another example, as history of incoming Digital Pictures 525 becomes available, Decision-making Unit 540 can perform collective Similarity Comparisons 125 of the history of Digital Pictures 525 or portions thereof from Picture Capturing Apparatus 90 with subsequences of Digital Pictures 525 or portions thereof from Knowledge Cell 800. In a further example, traversing may be performed in incremental traversing pattern such as starting from one end of Knowledge Cell 800 and moving the comparison subsequence up or down the list one or any number of incremental Digital Pictures 525 at a time. Other traversing patterns or methods can be employed such as starting from the middle of the Knowledge Cell 800 and subdividing the resulting subsequence in a recursive pattern, or any other traversing pattern or method. In a further example, the described traversing of a single Knowledge Cell 800 may be performed on any number of Knowledge Cells 800 sequentially or in parallel. Parallel processors such as a plurality of Processors 11 or cores thereof can be utilized for such parallel processing. In a further example, various arrangements of Digital Pictures 525 and/or other elements in a Knowledge Cell 800 can be utilized as previously described. One of ordinary skill in art will understand that the foregoing exemplary embodiment is described merely as an example of a variety of possible implementations, and that while all of its variations are too voluminous to describe, they are within the scope of this disclosure.

Figure 25:
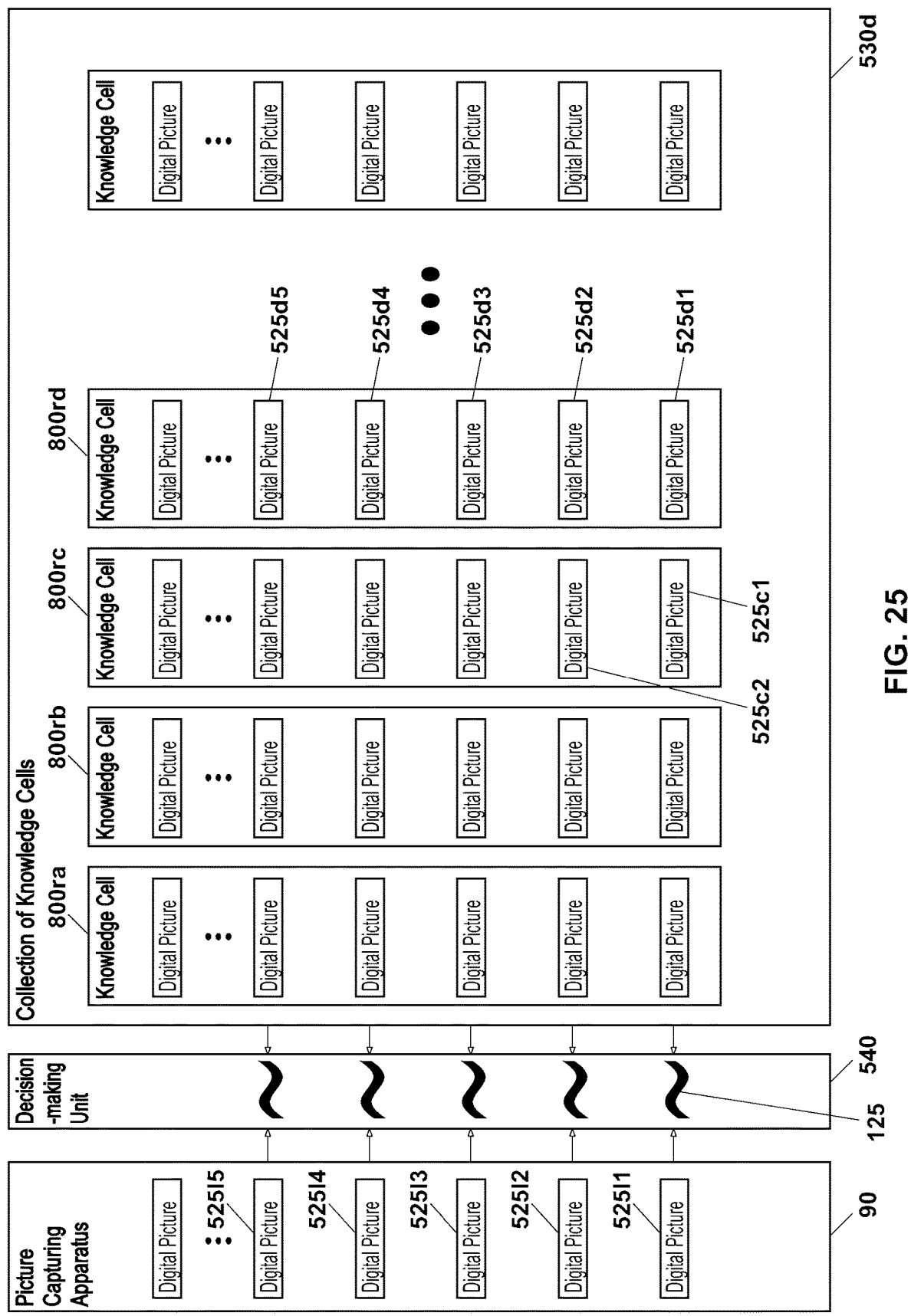
FIG. 25 illustrates an embodiment of determining anticipatory Instruction Sets 526 using collective similarity comparisons.

Referring to FIG. 25, an embodiment of determining anticipatory Instruction Sets 526 using collective similarity comparisons is illustrated. For example, Decision-making Unit 540 can perform Similarity Comparisons 125 of Digital Picture 525/1 or portion thereof from Picture Capturing Apparatus 90 with corresponding Digital Pictures 525 or portions thereof from Knowledge Cells 800 in Collection of Knowledge Cells 530d. Digital Picture 525c1 or portion thereof from Knowledge Cell 800rc may be found substantially similar with highest similarity. Decision-making Unit 540 can anticipate any Instruction Sets 526 (not shown) correlated with Digital Picture 525c1, thereby enabling autonomous Device 98 operation. Decision-making Unit 540 can then perform collective Similarity Comparisons 125 of Digital Pictures 525/1-525/2 or portions thereof from Picture Capturing Apparatus 90 with corresponding Digital Pictures 525 or portions thereof from Knowledge Cells 800 in Collection of Knowledge Cells 530d. Digital Pictures 525c1-525c2 or portions thereof from Knowledge Cell 800rc may be found substantially similar with highest similarity. Decision-making Unit 540 can anticipate any Instruction Sets 526 (not shown) correlated with Digital Picture 525c2, thereby enabling autonomous Device 98 operation. Decision-making Unit 540 can then perform collective Similarity Comparisons 125 of Digital Pictures 525l1-525l3 or portions thereof from Picture Capturing Apparatus 90 with corresponding Digital Pictures 525 or portions thereof from Knowledge Cells 800 in Collection of Knowledge Cells 530d. Digital Pictures 525d1-525d3 or portions thereof from Knowledge Cell 800rd may be found substantially similar with highest similarity. Decision-making Unit 540 can anticipate any Instruction Sets 526 (not shown) correlated with Digital Picture 525d3, thereby enabling autonomous Device 98 operation. Decision-making Unit 540 can then perform collective Similarity Comparisons 125 of Digital Pictures 525l1-525l4 or portions thereof from Picture Capturing Apparatus 90 with corresponding Digital Pictures 525 or portions thereof from Knowledge Cells 800 in Collection of Knowledge Cells 530d. Digital Pictures 525d1-525d4 or portions thereof from Knowledge Cell 800rd may be found substantially similar with highest similarity. Decision-making Unit 540 can anticipate any Instruction Sets 526 (not shown) correlated with Digital Picture 525d4, thereby enabling autonomous Device 98 operation. Decision-making Unit 540 can then perform collective Similarity Comparisons 125 of Digital Pictures 525l1-525l5 or portions thereof from Picture Capturing Apparatus 90 with corresponding Digital Pictures 525 or portions thereof from Knowledge Cells 800 in Collection of Knowledge Cells 530d. Digital Pictures 525d1-525d5 or portions thereof from Knowledge Cell 800rd may be found substantially similar with highest similarity. Decision-making Unit 540 can anticipate any Instruction Sets 526 (not shown) correlated with Digital Picture 525d5, thereby enabling autonomous Device 98 operation. Decision-making Unit 540 can implement similar logic or process for any additional Digital Picture 525 from Picture Capturing Apparatus 90, and so on.

In some embodiments, various elements and/or techniques can be utilized in the aforementioned similarity determinations with respect to collectively compared Digital Pictures 525 and/or other elements. In some aspects, similarity of collectively compared Digital Pictures 525 can be determined based on similarities or similarity indexes of the individually compared Digital Pictures 525. In one example, an average of similarities or similarity indexes of individually compared Digital Pictures 525 can be used to determine similarity of collectively compared Digital Pictures 525. In another example, a weighted average of similarities or similarity indexes of individually compared Digital Pictures 525 can be used to determine similarity of collectively compared Digital Pictures 525. For instance, to affect the weighting of collective similarity, a higher weight or importance (i.e. importance index, etc.) can be assigned to the similarities or similarity indexes of some (i.e. more substantive, etc.) Digital Pictures 525 and lower for other (i.e. less substantive, etc.) Digital Pictures 525. Any other higher or lower weight or importance assignment can be implemented. In other aspects, any of the previously described or other thresholds for substantial similarity of individually compared elements can be similarly utilized for collectively compared elements. In one example, substantial similarity of collectively compared Digital Pictures 525 can be achieved when their collective similarity or similarity index exceeds a similarity threshold. In another example, substantial similarity of collectively compared Digital Pictures 525 can be achieved when at least a threshold number or percentage of Digital Pictures 525 or portions thereof of the collectively compared Digital Pictures 525 match or substantially match. Similarly, substantial similarity of collectively compared Digital Pictures 525 can be achieved when a number or percentage of matching or substantially matching Digital Pictures 525 or portions thereof of the collectively compared Digital Pictures 525 exceeds a threshold. Such thresholds can be defined by a user, by VSADO system administrator, or automatically by the system based on experience, testing, inquiry, analysis, synthesis, or other techniques, knowledge, or input. Similar elements and/or techniques as the aforementioned can be used for similarity determinations of other collectively compared elements such as Instruction Sets 526, Extra Info 527, Knowledge Cells 800, and/or others. Similarity determinations of collectively compared elements may include any features, functionalities, and embodiments of Similarity Comparison 125, and vice versa.

It should be understood that any of the described elements and/or techniques in the foregoing example can be omitted, used in a different combination, or used in combination with other elements and/or techniques, in which case the selection of Knowledge Cells 800 or elements (i.e. Digital Pictures 525, Instruction Sets 526, etc.) thereof would be affected accordingly. Any of the elements and/or techniques utilized in other examples or embodiments described herein such as using Extra Info 527 in Similarity Comparisons 125, traversing of Knowledge Cells 800 or other elements, using history of Digital Pictures 525 or Knowledge Cells 800 for collective Similarity Comparisons 125, using various arrangements of Digital Pictures 525 and/or other elements in a Knowledge Cell 800, and/or others can similarly be utilized in this example. One of ordinary skill in art will understand that the foregoing exemplary embodiment is described merely as an example of a variety of possible implementations, and that while all of its variations are too voluminous to describe, they are within the scope of this disclosure.

Figure 26:
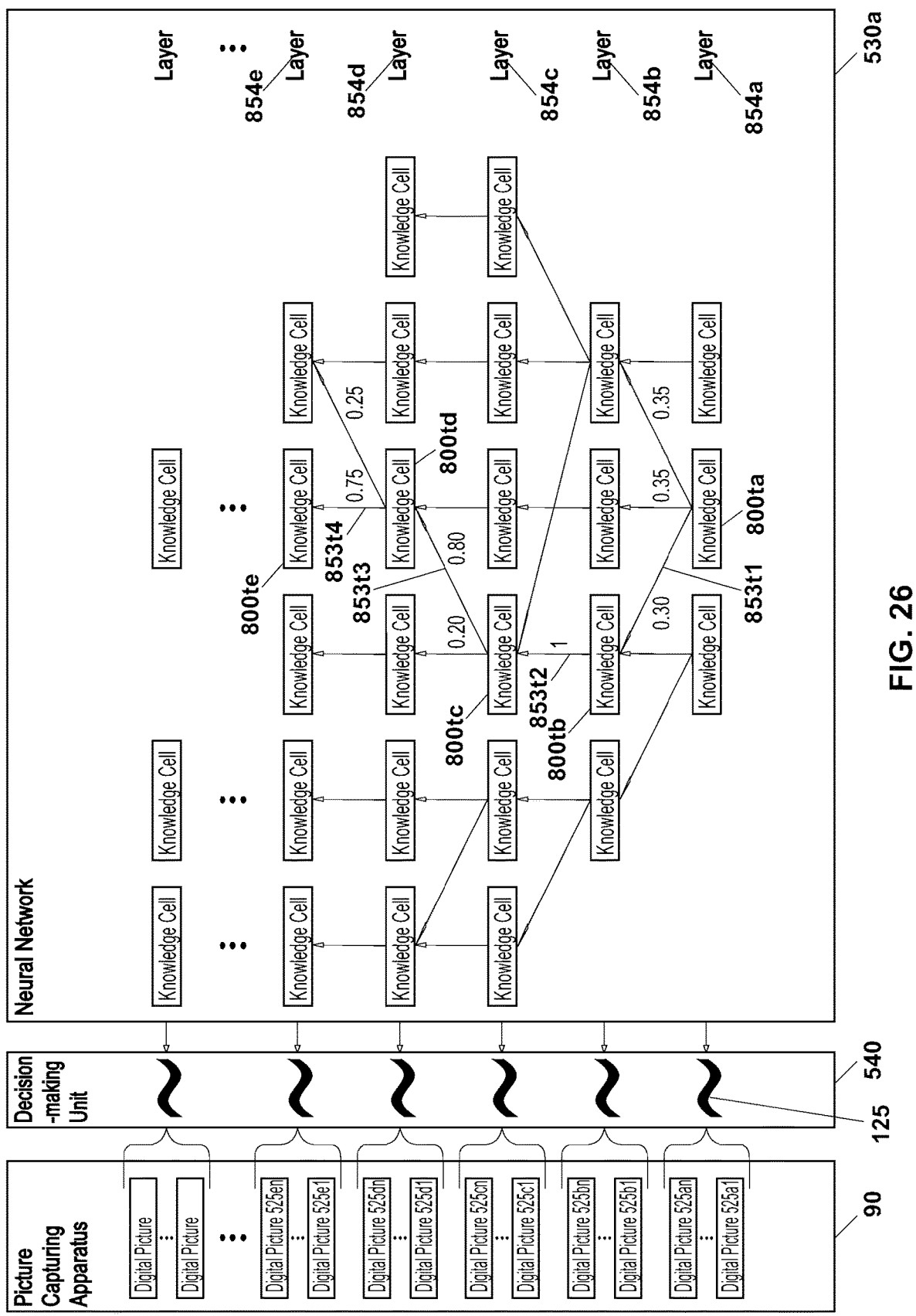

Referring to FIG. 26, an embodiment of determining anticipatory Instruction Sets 526 using Neural Network 530a is illustrated. In some aspects, determining anticipatory Instruction Sets 526 using Neural Network 530a may include selecting a path of Knowledge Cells 800 or elements (i.e. Digital Pictures 525, Instruction Sets 526, etc.) thereof through Neural Network 530a. Decision-making Unit 540 can utilize various elements and/or techniques for selecting a path through Neural Network 530a. Although, these elements and/or techniques are described using Neural Network 530a below, they can similarly be used in any Knowledgebase 530 (i.e. Graph 530b, Collection of Sequences 530c, Sequence 533, Collection of Knowledge Cells 530d, etc.) where applicable.

In some embodiments, Decision-making Unit 540 can utilize similarity index in selecting Knowledge Cells 800 or elements (i.e. Digital Pictures 525, Instruction Sets 526, etc.) thereof in a path through Neural Network 530a. For instance, similarity index may indicate how well one or more Digital Pictures 525 or portions thereof are matched with one or more other Digital Pictures 525 or portions thereof as previously described. In one example, Decision-making Unit 540 may select a Knowledge Cell 800 comprising one or more Digital Pictures 525 with highest similarity index even if Connection 853 pointing to that Knowledge Cell 800 has less than the highest weight. Therefore, similarity index or other such element or parameter can override or disregard the weight of a Connection 853 or other element. In another example, Decision-making Unit 540 may select a Knowledge Cell 800 comprising one or more Digital Pictures 525 whose similarity index is higher than or equal to a weight of Connection 853 pointing to that Knowledge Cell 800. In a further example, Decision-making Unit 540 may select a Knowledge Cell 800 comprising one or more Digital Pictures 525 whose similarity index is lower than or equal to a weight of Connection 853 pointing to that Knowledge Cell 800. Similarity index can be set to be more, less, or equally important than a weight of a Connection 853.

In other embodiments, Decision-making Unit 540 can utilize Connections 853 in selecting Knowledge Cells 800 or elements (i.e. Digital Pictures 525, Instruction Sets 526, etc.) thereof in a path through Neural Network 530a. In some aspects, Decision-making Unit 540 can take into account weights of Connections 853 among the interconnected Knowledge Cells 800 in choosing from which Knowledge Cell 800 to compare one or more Digital Pictures 525 first, second, third, and so on. Specifically, for instance, Decision-making Unit 540 can perform Similarity Comparison 125 with one or more Digital Pictures 525 from Knowledge Cell 800 pointed to by the highest weight Connection 853 first, Digital Pictures 525 from Knowledge Cell 800 pointed to by the second highest weight Connection 853 second, and so on. In other aspects, Decision-making Unit 540 can stop performing Similarity Comparisons 125 as soon as it finds one or more substantially similar Digital Pictures 525 in an interconnected Knowledge Cell 800. In further aspects, Decision-making Unit 540 may only follow the highest weight Connection 853 to arrive at a Knowledge Cell 800 comprising one or more Digital Pictures 525 to be compared, thereby disregarding Connections 853 with less than the highest weight. In further aspects, Decision-making Unit 540 may ignore Connections 853 and/or their weights.

In further embodiments, Decision-making Unit 540 can utilize a bias to adjust similarity index, weight of a Connection 853, and/or other element or parameter used in selecting Knowledge Cells 800 or elements (i.e. Digital Pictures 525, Instruction Sets 526, etc.) thereof in a path through Neural Network 530a. In one example, Decision-making Unit 540 may select a Knowledge Cell 800 comprising one or more Digital Pictures 525 whose similarity index multiplied by or adjusted for a bias is higher than or equal to a weight of Connection 853 pointing to that Knowledge Cell 800. In another example, Decision-making Unit 540 may select a Knowledge Cell 800 comprising one or more Digital Pictures 525 whose similarity index multiplied by or adjusted for a bias is lower than or equal to a weight of Connection 853 pointing to that Knowledge Cell 800. In a further example, bias can be used to resolve deadlock situations where similarity index is equal to a weight of a Connection 853. In some aspects, bias can be expressed in percentages such as 0.3 percent, 1.2 percent, 25.7 percent, 79.8 percent, 99.9 percent, 100.1 percent, 155.4 percent, 298.6 percent, 1105.5 percent, and so on. For example, a bias below 100 percent decreases an element or parameter to which it is applied, a bias equal to 100 percent does not change the element or parameter to which it is applied, and a bias higher than 100 percent increases the element or parameter to which it is applied. In general, any amount of bias can be utilized. Bias can be applied to one or more of a weight of a Connection 853, similarity index, any other element or parameter, and/or all or any combination of them. Also, different biases can be applied to each of a weight of a Connection 853, similarity index, or any other element or parameter. For example, 30 percent bias can be applied to similarity index and 15 percent bias can be applied to a weight of a Connection 853. Also, different biases can be applied to various Layers 854 of Neural Network 530a, and/or other disclosed elements. Bias can be defined by a user, by VSADO system administrator, or automatically by the system based on experience, testing, inquiry, analysis, synthesis, or other techniques, knowledge, or input.

Any other element and/or technique can be utilized in selecting Knowledge Cells 800 or elements (i.e. Digital Pictures 525, Instruction Sets 526, etc.) thereof in a path through Neural Network 530a.

In some embodiments, Neural Network 530a may include knowledge (i.e. interconnected Knowledge Cells 800 comprising one or more Digital Pictures 525 correlated with any Instruction Sets 526 and/or Extra Info 527, etc.) of how Device 98 operated in various visual surroundings. In some aspects, determining anticipatory Instruction Sets 526 using Neural Network 530a may include selecting a path of Knowledge Cells 800 or elements (i.e. Digital Pictures 525, Instruction Sets 526, etc.) thereof through Neural Network 530a. Individual and/or collective Similarity Comparisons 125 can be used to determine substantial similarity of the individually and/or collectively compared Digital Pictures 525 or portions thereof. Substantial similarity may be used primarily for selecting a path through Neural Network 530a, whereas, weight of any Connection 853 may be used secondarily or not at all.

For example, Decision-making Unit 540 can perform Similarity Comparisons 125 of Digital Pictures 525a1-525an or portions thereof from Picture Capturing Apparatus 90 with Digital Pictures 525 or portions thereof from one or more Knowledge Cells 800 in Layer 854a (or any other one or more Layers 854, etc.). Digital Pictures 525 or portions thereof from Knowledge Cell 800ta may be found collectively substantially similar with highest similarity. As the comparisons of individual Digital Pictures 525 are performed to determine collective similarity, Decision-making Unit 540 can anticipate Instruction Sets 526 correlated with substantially similar individual Digital Pictures 525 as previously described, thereby enabling autonomous Device 98 operation. Decision-making Unit 540 can then perform Similarity Comparisons 125 of Digital Pictures 525b1-525bn or portions thereof from Picture Capturing Apparatus 90 with Digital Pictures 525 or portions thereof from one or more Knowledge Cells 800 in Layer 854b interconnected with Knowledge Cell 800ta. Digital Pictures 525 or portions thereof from Knowledge Cell 800tb may be found collectively substantially similar with highest similarity, thus, Decision-making Unit 540 may follow Connection 853*t*1 disregarding its less than highest weight. As the comparisons of individual Digital Pictures 525 are performed to determine collective similarity, Decision-making Unit 540 can anticipate Instruction Sets 526 correlated with substantially similar individual Digital Pictures 525 as previously described, thereby enabling autonomous Device 98 operation. Since Connection 853*t*2 is the only connection from Knowledge Cell 800*tb*, Decision-making Unit 540 may follow Connection 853*t*2 and perform Similarity Comparisons 125 of Digital Pictures 525*c*1-525*cn* or portions thereof from Picture Capturing Apparatus 90 with Digital Pictures 525 or portions thereof from Knowledge Cell 800*tc* in Layer 854*c*. Digital Pictures 525 or portions thereof from Knowledge Cell 800*tc* may be found collectively substantially similar. As the comparisons of individual Digital Pictures 525 are performed to determine collective similarity, Decision-making Unit 540 can anticipate Instruction Sets 526 correlated with substantially similar individual Digital Pictures 525 as previously described, thereby enabling autonomous Device 98 operation. Decision-making Unit 540 can then perform Similarity Comparisons 125 of Digital Pictures 525*d*1-525*dn* or portions thereof from Picture Capturing Apparatus 90 with Digital Pictures 525 or portions thereof from one or more Knowledge Cells 800 in Layer 854*d* interconnected with Knowledge Cell 800*tc*. Digital Pictures 525 or portions thereof from Knowledge Cell 800*td* may be found collectively substantially similar with highest similarity, thus, Decision-making Unit 540 may follow Connection 853*t*3. As the comparisons of individual Digital Pictures 525 are performed to determine collective similarity, Decision-making Unit 540 can anticipate Instruction Sets 526 correlated with substantially similar individual Digital Pictures 525 as previously described, thereby enabling autonomous Device 98 operation. Decision-making Unit 540 can then perform Similarity Comparisons 125 of Digital Pictures 525*e*1-525*en* or portions thereof from Picture Capturing Apparatus 90 with Digital Pictures 525 or portions thereof from one or more Knowledge Cells 800 in Layer 854*e* interconnected with Knowledge Cell 800*td*. Digital Pictures 525 or portions thereof from Knowledge Cell 800*te* may be found collectively substantially similar with highest similarity, thus, Decision-making Unit 540 may follow Connection 853*t*4. As the comparisons of individual Digital Pictures 525 are performed to determine collective similarity, Decision-making Unit 540 can anticipate Instruction Sets 526 correlated with substantially similar individual Digital Pictures 525 as previously described, thereby enabling autonomous Device 98 operation. Decision-making Unit 540 can implement similar logic or process for any additional Digital Pictures 525 from Picture Capturing Apparatus 90, and so on.

The foregoing exemplary embodiment provides an example of utilizing a combination of collective Similarity Comparisons 125, individual Similarity Comparisons 125, Connections 853, and/or other elements or techniques. It should be understood that any of these elements and/or techniques can be omitted, used in a different combination, or used in combination with other elements and/or techniques, in which case the selection of Knowledge Cells 800 or elements (i.e. Digital Pictures 525, Instruction Sets 526, etc.) thereof in a path through Neural Network 530*a* would be affected accordingly. Any of the elements and/or techniques utilized in other examples or embodiments described herein such as using Extra Info 527 in Similarity Comparisons 125, traversing of Knowledge Cells 800 or other elements, using history of Digital Pictures 525 or Knowledge Cells 800 for collective Similarity Comparisons 125, using various arrangements of Digital Pictures 525 and/or other elements in a Knowledge Cell 800, and/or others can similarly be utilized in this example. These elements and/or techniques can similarly be utilized in Graph 530*b*, Collection of Sequences 530*c*, Sequence 533, Collection of Knowledge Cells 530*d*, and/or other data structures or arrangements. In some aspects, instead of anticipating Instruction Sets 526 correlated with substantially similar individual Digital Pictures 525, Decision-making Unit 540 can anticipate instruction Sets 526 correlated with substantially similar streams of Digital Pictures 525. In other aspects, any time that substantial similarity or other similarity threshold is not achieved in compared Digital Pictures 525 or portions thereof of any of the Knowledge Cells 800, Decision-making Unit 540 can decide to look for a substantially or otherwise similar Digital Pictures 525 or portions thereof in Knowledge Cells 800 elsewhere in Neural Network 530*a* such as in any Layer 854 subsequent to a current Layer 854, in the first Layer 854, in the entire Neural Network 530*a*, and/or others, even if such Knowledge Cell 800 may be unconnected with a prior Knowledge Cell 800. It should be noted that any of Digital Pictures 525*a*1-525*an*, Digital Pictures 525*b*1-525*bn*, Digital Pictures 525*c*1-525*cn*, Digital Pictures 525*d*1-525*dn*, Digital Pictures 525*e*1-525*en*, etc. may include one Digital Picture 525 or a stream of Digital Pictures 525. It should also be noted that any Knowledge Cell 800 may include one Digital Picture 525 or a stream of Digital Pictures 525 as previously described. One of ordinary skill in art will understand that the foregoing exemplary embodiment is described merely as an example of a variety of possible implementations, and that while all of its variations are too voluminous to describe, they are within the scope of this disclosure.

Figure 27:
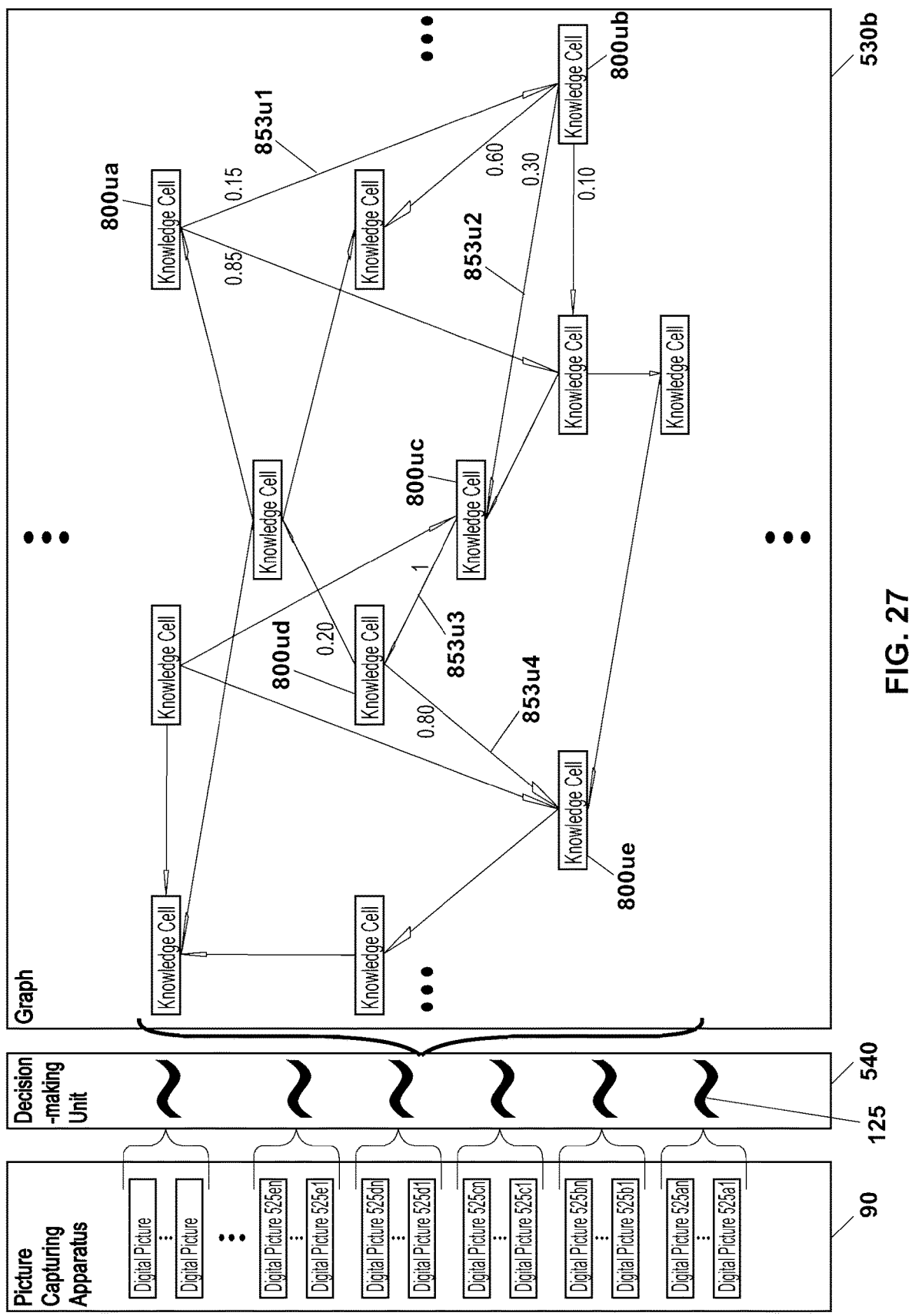
FIG. 27 illustrates an embodiment of determining anticipatory Instruction Sets 526 using Graph 530b.

Referring to FIG. 27, an embodiment of determining anticipatory Instruction Sets 526 using Graph 530*b* is illustrated. Graph 530*b* may include knowledge (i.e. interconnected Knowledge Cells 800 comprising one or more Digital Pictures 525 correlated with any Instruction Sets 526 and/or Extra Info 527, etc.) of how Device 98 operated in various visual surroundings. In some aspects, determining anticipatory Instruction Sets 526 using Graph 530*b* may include selecting a path of Knowledge Cells 800 or elements (i.e. Digital Pictures 525, Instruction Sets 526, etc.) thereof through Graph 530*b*. Individual and/or collective Similarity Comparisons 125 can be used to determine substantial similarity of the individually and/or collectively compared Digital Pictures 525 or portions thereof. Substantial similarity may be used primarily for selecting a path through Graph 530*b*, whereas, weight of any Connection 853 may be used secondarily or not at all.

For example, Decision-making Unit 540 can perform Similarity Comparisons 125 of Digital Pictures 525*a*1-525*an* or portions thereof from Picture Capturing Apparatus 90 with Digital Pictures 525 or portions thereof from one or more Knowledge Cells 800 in Graph 530*b*. Digital Pictures 525 or portions thereof from Knowledge Cell 800*ua* may be found collectively substantially similar with highest similarity. As the comparisons of individual Digital Pictures 525 are performed to determine collective similarity, Decision-making Unit 540 can anticipate Instruction Sets 526 correlated with substantially similar individual Digital Pictures 525 as previously described, thereby enabling autonomous Device 98 operation. Decision-making Unit 540 can then perform Similarity Comparisons 125 of Digital Pictures 525*b*1-525*bn* or portions thereof from Picture Capturing Apparatus 90 with Digital Pictures 525 or portions thereof from one or more Knowledge Cells 800 in Graph 530b interconnected with Knowledge Cell 800ua by outgoing Connections 853. Digital Pictures 525 or portions thereof from Knowledge Cell 800ub may be found collectively substantially similar with highest similarity, thus, Decision-making Unit 540 may follow Connection 853u1 disregarding its less than highest weight. As the comparisons of individual Digital Pictures 525 are performed to determine collective similarity, Decision-making Unit 540 can anticipate Instruction Sets 526 correlated with substantially similar individual Digital Pictures 525 as previously described, thereby enabling autonomous Device 98 operation. Decision-making Unit 540 can then perform Similarity Comparisons 125 of Digital Pictures 525c1-525cn or portions thereof from Picture Capturing Apparatus 90 with Digital Pictures 525 or portions thereof from one or more Knowledge Cells 800 in Graph 530b interconnected with Knowledge Cell 800ub by outgoing Connections 853. Digital Pictures 525 or portions thereof from Knowledge Cell 800uc may be found collectively substantially similar with highest similarity, thus, Decision-making Unit 540 may follow Connection 853u2 disregarding its less than highest weight. As the comparisons of individual Digital Pictures 525 are performed to determine collective similarity, Decision-making Unit 540 can anticipate Instruction Sets 526 correlated with substantially similar individual Digital Pictures 525 as previously described, thereby enabling autonomous Device 98 operation. Since Connection 853u3 is the only connection from Knowledge Cell 800uc, Decision-making Unit 540 may follow Connection 853u3 and perform Similarity Comparisons 125 of Digital Pictures 525d1-525dn or portions thereof from Picture Capturing Apparatus 90 with Digital Pictures 525 or portions thereof from Knowledge Cell 800ud in Graph 530b. Digital Pictures 525 or portions thereof from Knowledge Cell 800ud may be found collectively substantially similar. As the comparisons of individual Digital Pictures 525 are performed to determine collective similarity, Decision-making Unit 540 can anticipate Instruction Sets 526 correlated with substantially similar individual Digital Pictures 525 as previously described, thereby enabling autonomous Device 98 operation. Decision-making Unit 540 can then perform Similarity Comparisons 125 of Digital Pictures 525e1-525en or portions thereof from Picture Capturing Apparatus 90 with Digital Pictures 525 or portions thereof from one or more Knowledge Cells 800 in Graph 530b interconnected with Knowledge Cell 800ud by outgoing Connections 853. Digital Pictures 525 or portions thereof from Knowledge Cell 800ue may be found collectively substantially similar with highest similarity, thus, Decision-making Unit 540 may follow Connection 853u4. As the comparisons of individual Digital Pictures 525 are performed to determine collective similarity, Decision-making Unit 540 can anticipate Instruction Sets 526 correlated with substantially similar individual Digital Pictures 525 as previously described, thereby enabling autonomous Device 98 operation. Decision-making Unit 540 can implement similar logic or process for any additional Digital Pictures 525 from Activity Detector 160, and so on.

The foregoing exemplary embodiment provides an example of utilizing a combination of collective Similarity Comparisons 125, individual Similarity Comparisons 125, Connections 853, and/or other elements or techniques. It should be understood that any of these elements and/or techniques can be omitted, used in a different combination, or used in combination with other elements and/or techniques, in which case the selection of Knowledge Cells 800 or elements (i.e. Digital Pictures 525, Instruction Sets 526, etc.) thereof in a path through Graph 530b would be affected accordingly. Any of the elements and/or techniques utilized in other examples or embodiments described herein such as using Extra Info 527 in Similarity Comparisons 125, traversing of Knowledge Cells 800 or other elements, using history of Digital Pictures 525 or Knowledge Cells 800 in collective Similarity Comparisons 125, using various arrangements of Digital Pictures 525 and/or other elements in a Knowledge Cell 800, and/or others can similarly be utilized in this example. These elements and/or techniques can similarly be utilized in Neural Network 530a, Collection of Sequences 530c, Sequence 533, Collection of Knowledge Cells 530d, and/or other data structures or arrangements. In some aspects, instead of anticipating Instruction Sets 526 correlated with substantially similar individual Digital Pictures 525, Decision-making Unit 540 can anticipate instruction Sets 526 correlated with substantially matching streams of Digital Pictures 525. In other aspects, any time that substantial similarity or other similarity threshold is not achieved in compared Digital Pictures 525 or portions thereof of any of the Knowledge Cells 800, Decision-making Unit 540 can decide to look for a substantially or otherwise similar Digital Pictures 525 or portions thereof in Knowledge Cells 800 elsewhere in Graph 530b even if such Knowledge Cell 800 may be unconnected with a prior Knowledge Cell 800. It should be noted that any of Digital Pictures 525a1-525an, Digital Pictures 525b1-525bn, Digital Pictures 525c1-525cn, Digital Pictures 525d1-525dn, Digital Pictures 525e1-525en, etc. may include one Digital Picture 525 or a stream of Digital Pictures 525. It should also be noted that any Knowledge Cell 800 may include one Digital Picture 525 or a stream of Digital Pictures 525 as previously described. One of ordinary skill in art will understand that the foregoing exemplary embodiment is described merely as an example of a variety of possible implementations, and that while all of its variations are too voluminous to describe, they are within the scope of this disclosure.

Figure 28:
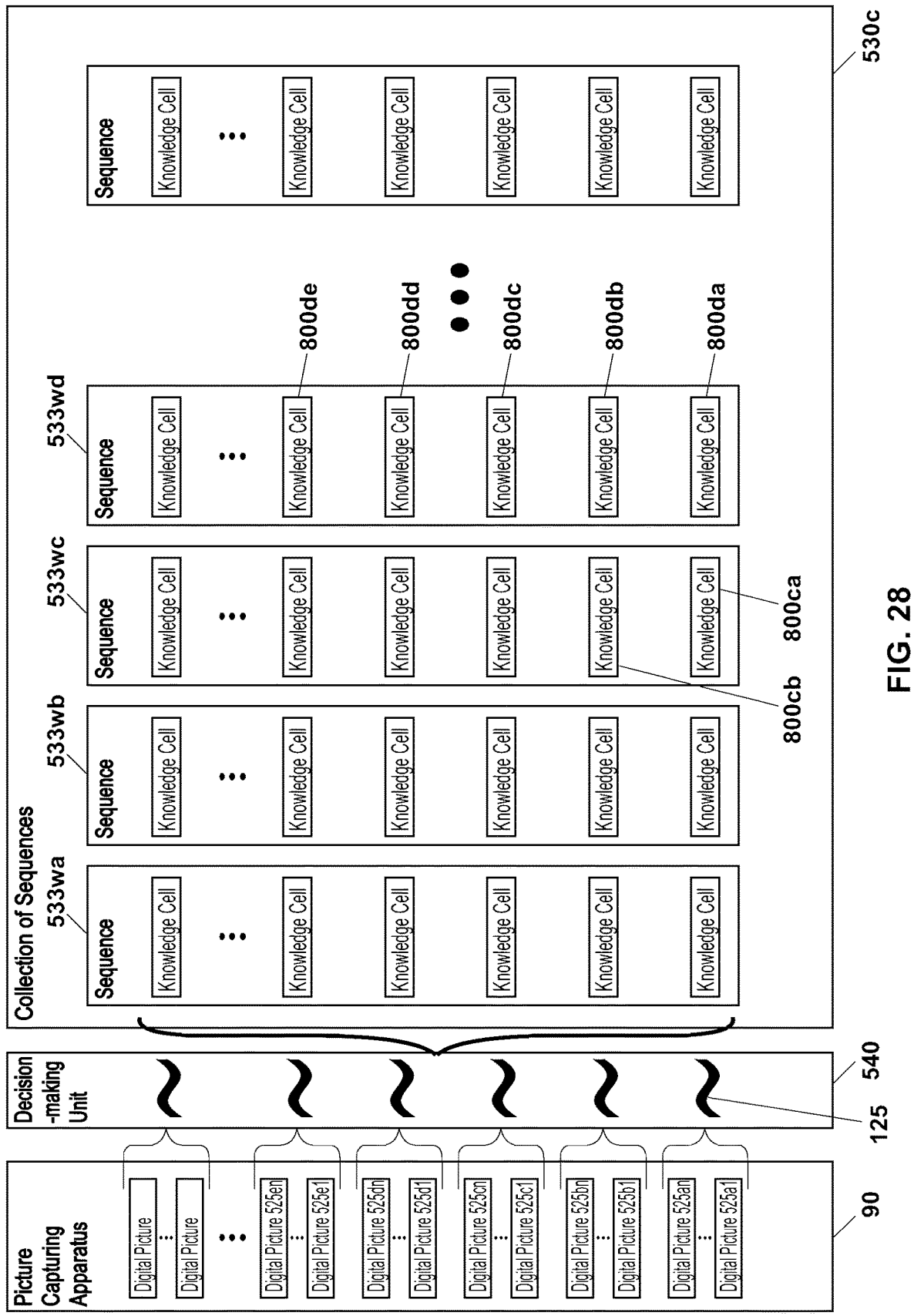
FIG. 28 illustrates an embodiment of determining anticipatory Instruction Sets 526 using Collection of Sequences 530c.

Referring to FIG. 28, an embodiment of determining anticipatory Instruction Sets 526 using Collection of Sequences 530c is illustrated. Collection of Sequences 530c may include knowledge (i.e. sequences of Knowledge Cells 800 comprising one or more Digital Pictures 525 correlated with any Instruction Sets 526 and/or Extra Info 527, etc.) of how Device 98 operated in various visual surroundings. In some aspects, determining anticipatory Instruction Sets 526 for autonomous Device 98 operation using Collection of Sequences 530c may include selecting a Sequence 533 of Knowledge Cells 800 or elements (i.e. Digital Pictures 525, Instruction Sets 526, etc.) thereof from Collection of Sequences 530c. Individual and/or collective Similarity Comparisons 125 can be used to determine substantial similarity of the individually and/or collectively compared Digital Pictures 525 or portions thereof.

For example, Decision-making Unit 540 can perform Similarity Comparisons 125 of Digital Pictures 525a1-525an or portions thereof from Picture Capturing Apparatus 90 with Digital Pictures 525 or portions thereof from corresponding Knowledge Cells 800 in one or more Sequences 533 of Collection of Sequences 530c. Digital Pictures 525 or portions thereof from Knowledge Cell 800ca in Sequence 533wc may be found collectively substantially similar with highest similarity. As the comparisons of individual Digital Pictures 525 are performed to determine collective similarity, Decision-making Unit 540 can anticipate Instruction Sets 526 correlated with substantially similar individual Digital Pictures 525 as previously described, thereby enabling autonomous Device 98 operation. Decision-making Unit 540 can then perform Similarity Comparisons 125 of Digital Pictures 525a1-525an and 525b1-525bn or portions thereof from Picture Capturing Apparatus 90 with Digital Pictures 525 or portions thereof from corresponding Knowledge Cells 800 in Sequences 533 of Collection of Sequences 530c. Digital Pictures 525 or portions thereof from Knowledge Cells 800ca-800cb in Sequence 533wc may be found collectively substantially similar with highest similarity. As the comparisons of individual Digital Pictures 525 are performed to determine collective similarity, Decision-making Unit 540 can anticipate Instruction Sets 526 correlated with substantially similar individual Digital Pictures 525 as previously described, thereby enabling autonomous Device 98 operation. Decision-making Unit 540 can then perform Similarity Comparisons 125 of Digital Pictures 525a1-525an, 525b1-525bn, and 525c1-525cn or portions thereof from Picture Capturing Apparatus 90 with Digital Pictures 525 or portions thereof from corresponding Knowledge Cells 800 in Sequences 533 of Collection of Sequences 530c. Digital Pictures 525 or portions thereof from Knowledge Cells 800da-800dc in Sequence 533wd may be found substantially similar with highest similarity. As the comparisons of individual Digital Pictures 525 are performed to determine collective similarity, Decision-making Unit 540 can anticipate Instruction Sets 526 correlated with substantially similar individual Digital Pictures 525 as previously described, thereby enabling autonomous Device 98 operation. Decision-making Unit 540 can then perform Similarity Comparisons 125 of Digital Pictures 525a1-525an, 525b1-525bn, 525c1-525cn, and 525d1-525dn or portions thereof from Picture Capturing Apparatus 90 with Digital Pictures 525 or portions thereof from corresponding Knowledge Cells 800 in Sequences 533 of Collection of Sequences 530c. Digital Pictures 525 or portions thereof from Knowledge Cells 800da-800dd in Sequence 533wd may be found substantially similar with highest similarity. As the comparisons of individual Digital Pictures 525 are performed to determine collective similarity, Decision-making Unit 540 can anticipate Instruction Sets 526 correlated with substantially similar individual Digital Pictures 525 as previously described, thereby enabling autonomous Device 98 operation. Decision-making Unit 540 can then perform Similarity Comparisons 125 of Digital Pictures 525a1-525an, 525b1-525bn, 525c1-525cn, 525d1-525dn, and 525e1-525en or portions thereof from Picture Capturing Apparatus 90 with Digital Pictures 525 or portions thereof from corresponding Knowledge Cells 800 in Sequences 533 of Collection of Sequences 530c. Digital Pictures 525 or portions thereof from Knowledge Cells 800da-800de in Sequence 533wd may be found substantially similar with highest similarity. As the comparisons of individual Digital Pictures 525 are performed to determine collective similarity, Decision-making Unit 540 can anticipate Instruction Sets 526 correlated with substantially similar individual Digital Pictures 525 as previously described, thereby enabling autonomous Device 98 operation. Decision-making Unit 540 can implement similar logic or process for any additional Digital Pictures 525 from Picture Capturing Apparatus 90, and so on.

In some embodiments, various elements and/or techniques can be utilized in the aforementioned substantial similarity determinations with respect to collectively compared Knowledge Cells 800 or elements (i.e. Digital Pictures 525, Extra Info 527, etc.) thereof. In some aspects, substantial similarity of collectively compared Knowledge Cells 800 or elements (i.e. Digital Pictures 525, Extra Info 527, etc.) thereof can be determined based on similarities or similarity indexes of the individually compared Knowledge Cells 800 or elements (i.e. Digital Pictures 525, Extra Info 527, etc.) thereof. In one example, an average of similarities or similarity indexes of individually compared Knowledge Cells 800 or elements (i.e. Digital Pictures 525, Extra Info 527, etc.) thereof can be used to determine similarity of collectively compared Knowledge Cells 800 or elements (i.e. Digital Pictures 525, Extra Info 527, etc.) thereof. In another example, a weighted average of similarities or similarity indexes of individually compared Knowledge Cells 800 or elements (i.e. Digital Pictures 525, Extra Info 527, etc.) thereof can be used to determine similarity of collectively compared Knowledge Cells 800 or elements (i.e. Digital Pictures 525, Extra Info 527, etc.) thereof. For instance, to affect the weighting of collective similarity, a higher weight or importance (i.e. importance index, etc.) can be assigned to the similarities or similarity indexes of some Knowledge Cells 800 or elements (i.e. Digital Pictures 525, Extra Info 527, etc.) thereof and lower for other Knowledge Cells 800 or elements (i.e. Digital Pictures 525, Extra Info 527, etc.) thereof. Any higher or lower weight or importance assignment can be implemented. In other aspects, any of the previously described or other thresholds for substantial similarity of individually compared elements can similarly be utilized for collectively compared elements. In one example, substantial similarity of collectively compared Knowledge Cells 800 or elements (i.e. Digital Pictures 525, Extra Info 527, etc.) thereof can be achieved when their collective similarity or similarity index exceeds a similarity threshold. In another example, substantial similarity of collectively compared Knowledge Cells 800 can be achieved when at least a threshold number or percentage of Digital Pictures 525 or portions thereof of the collectively compared Knowledge Cells 800 match or substantially match. Similarly, substantial similarity of collectively compared Knowledge Cells 800 can be achieved when a number or percentage of matching or substantially matching Digital Pictures 525 or portions thereof of the collectively compared Knowledge Cells 800 exceeds a threshold. Such thresholds can be defined by a user, by VSADO system administrator, or automatically by the system based on experience, testing, inquiry, analysis, synthesis, or other techniques, knowledge, or input. Collective similarity determinations may include any features, functionalities, and embodiments of Similarity Comparison 125, and vice versa.

The foregoing exemplary embodiment provides an example of utilizing a combination of collective Similarity Comparisons 125, individual Similarity Comparisons 125, and/or other elements or techniques. It should be understood that any of these elements and/or techniques can be omitted, used in a different combination, or used in combination with other elements and/or techniques, in which case the selection of Sequence 533 of Knowledge Cells 800 or elements (i.e. Digital Pictures 525, Instruction Sets 526, etc.) thereof would be affected accordingly. Any of the elements and/or techniques utilized in other examples or embodiments described herein such as using Extra Info 527 in Similarity Comparisons 125, traversing of Knowledge Cells 800 or other elements, using history of Digital Pictures 525 or Knowledge Cells 800 in collective Similarity Comparisons 125, using various arrangements of Digital Pictures 525 and/or other elements in a Knowledge Cell 800, and/or others can similarly be utilized in this example. These elements and/or techniques can similarly be utilized in Neural Network 530a, Graph 530b, Collection of Knowledge Cells 530d, and/or other data structures or arrangements. In some aspects, instead of anticipating Instruction Sets 526 correlated with substantially similar individual Digital Pictures 525, Decision-making Unit 540 can anticipate Instruction Sets 526 correlated with substantially matching streams of Digital Pictures 525. In other aspects, any time that substantial similarity or other similarity threshold is not achieved in compared Digital Pictures 525 or portions thereof of any of the Knowledge Cells 800, Decision-making Unit 540 can decide to look for a substantially or otherwise similar Digital Pictures 525 or portions thereof in Knowledge Cells 800 elsewhere in Collection of Sequences 530*c* such as in different Sequences 533. It should be noted that any of Digital Pictures 525*a*1-525*an*, Digital Pictures 525*b*1-525*bn*, Digital Pictures 525*c*1-525*cn*, Digital Pictures 525*d*1-525*dn*, Digital Pictures 525*e*1-525*en*, etc. may include one Digital Picture 525 or a stream of Digital Pictures 525. It should also be noted that any Knowledge Cell 800 may include one Digital Picture 525 or a stream of Digital Pictures 525 as previously described. One of ordinary skill in art will understand that the foregoing exemplary embodiment is described merely as an example of a variety of possible implementations, and that while all of its variations are too voluminous to describe, they are within the scope of this disclosure.

Referring now to Modification Interface 130. Modification Interface 130 comprises the functionality for modifying execution and/or functionality of Application Program 18, Processor 11, Logic Circuit 250, and/or other processing element. Modification Interface 130 comprises the functionality for modifying execution and/or functionality of Application Program 18, Processor 11, Logic Circuit 250, and/or other processing element at runtime. Modification Interface 130 comprises the functionality for modifying execution and/or functionality of Application Program 18, Processor 11, Logic Circuit 250, and/or other processing element based on anticipatory Instruction Sets 526. In one example, Modification Interface 130 comprises the functionality to access, modify, and/or perform other manipulations on runtime engine/environment, virtual machine, operating system, compiler, just-in-time (JIT) compiler, interpreter, translator, execution stack, file, object, data structure, and/or other computing system elements. In another example, Modification Interface 130 comprises the functionality to access, modify, and/or perform other manipulations on memory, storage, bus, interfaces, and/or other computing system elements. In a further example, Modification Interface 130 comprises the functionality to access, modify, and/or perform other manipulations on Processor 11 registers and/or other Processor 11 elements. In a further example, Modification Interface 130 comprises the functionality to access, modify, and/or perform other manipulations on inputs and/or outputs of Application Program 18, Processor 11, Logic Circuit 250, and/or other processing element. In a further example, Modification Interface 130 comprises the functionality to access, create, delete, modify, and/or perform other manipulations on functions, methods, procedures, routines, subroutines, and/or other elements of Application Program 18. In a further example, Modification Interface 130 comprises the functionality to access, create, delete, modify, and/or perform other manipulations on source code, bytecode, compiled, interpreted, or otherwise translated code, machine code, and/or other code. In a further example, Modification Interface 130 comprises the functionality to access, create, delete, modify, and/or perform other manipulations on values, variables, parameters, and/or other data or information. Modification Interface 130 comprises any features, functionalities, and embodiments of Acquisition Interface 120, and vice versa. Modification Interface 130 also comprises other disclosed functionalities.

Modification Interface 130 can employ various techniques for modifying execution and/or functionality of Application Program 18, Processor 11, Logic Circuit 250, and/or other processing element. In some aspects, some of the previously described techniques and/or tools can be utilized. Code instrumentation, for instance, may involve inserting additional code, overwriting or rewriting existing code, and/or branching to a separate segment of code in Application Program 18 as previously described. For example, instrumented code may include the following:

Object1.moveLeft(12);
modifyApplication( );

In the above sample code, instrumented call to Modification Interface's 130 function (i.e. modifyApplication( ), etc.) can be placed after a function (i.e. moveLeft(12), etc.) of Application Program 18. Similar call to an application modifying function can be placed after or before some or all functions/routines/subroutines, some or all lines of code, some or all statements, some or all instructions or instruction sets, some or all basic blocks, and/or some or all other code segments of Application Program 18. One or more application modifying function calls can be placed anywhere in Application Program's 18 code and can be executed at any points in Application Program's 18 execution. The application modifying function (i.e. modifyApplication( ), etc.) may include Artificial Intelligence Unit 110-determined anticipatory Instruction Sets 526 that can modify execution and/or functionality of Application Program 18. In some embodiments, the previously described obtaining Application Program's 18 instruction sets, data, and/or other information as well as modifying execution and/or functionality of Application Program 18 can be implemented in a single function that performs both tasks (i.e. traceAndModifyApplication( ), etc.).

In some embodiments, various computing systems and/or platforms may provide native tools for modifying execution and/or functionality of Application Program 18, Processor 11, Logic Circuit 250, and/or other processing element. Independent vendors may provide tools with similar functionalities that can be utilized across different platforms. These tools enable a wide range of techniques or capabilities such as instrumentation, self-modifying code capabilities, dynamic code capabilities, branching, code rewriting, code overwriting, hot swapping, accessing and/or modifying objects or data structures, accessing and/or modifying functions/routines/subroutines, accessing and/or modifying variable or parameter values, accessing and/or modifying processor registers, accessing and/or modifying inputs and/or outputs, providing runtime memory access, and/or other capabilities. One of ordinary skill in art will understand that, while all possible variations of the techniques for modifying execution and/or functionality of Application Program 18, Processor 11, Logic Circuit 250, and/or other processing element are too voluminous to describe, these techniques are within the scope of this disclosure.

In one example, modifying execution and/or functionality of Application Program 18 can be implemented through utilizing metaprogramming techniques, which include applications that can self-modify or that can create, modify, and/or manipulate other applications. Self-modifying code, dynamic code, reflection, and/or other techniques can be used to facilitate metaprogramming. In some aspects, metaprogramming is facilitated through a programming language's ability to access and manipulate the internals of the runtime engine directly or via an API. In other aspects, metaprogramming is facilitated through dynamic execution of expressions (i.e. anticipatory Instruction Sets 526, etc.) that can be created and/or executed at runtime. In yet other aspects, metaprogramming is facilitated through application modification tools, which can perform modifications on an application regardless of whether the application's programming language enables metaprogramming capabilities. Some operating systems may protect an application loaded into memory by restricting access to the loaded application. This protection mechanism can be circumvented by utilizing operating system's, processor's, and/or other low level features or commands to unprotect the loaded application. For example, a self-modifying application may modify the in-memory image of itself. To do so, the application can obtain the in-memory address of its code. The application may then change the operating system's or platform's protection on this memory range allowing it to modify the code (i.e. insert anticipatory Instruction Sets 526, etc.). In addition to a self-modifying application, one application can utilize similar technique to modify another application. Linux mprotect command or similar commends of other operating systems can be used to change protection (i.e. unprotect, etc.) for a region of memory, for example. Other platforms, tools, and/or techniques may provide equivalent or similar functionalities as the above described ones.

In a further example, modifying execution and/or functionality of Application Program 18 can be implemented through native capabilities of dynamic, interpreted, and/or scripting programming languages and/or platforms. Most of these languages and/or platforms can perform functionalities at runtime that static programming languages may perform during compilation. Dynamic, interpreted, and/or scripting languages provide native functionalities such as self-modification of code, dynamic code, extending the application, adding new code, extending objects and definitions, and/or other functionalities that can modify an application's execution and/or functionality at runtime. Examples of dynamic, interpreted, and/or scripting languages include Lisp, Perl, PHP, JavaScript, Ruby, Python, Smalltalk, Tcl, VBScript, and/or others. Similar functionalities can also be provided in languages such as Java, C, and/or others using reflection. Reflection includes the ability of an application to examine and modify the structure and behavior of the application at runtime. For example, JavaScript can modify its own code as it runs by utilizing Function object constructor as follows:

myFunc=new Function(arg1, arg2, argN, functionBody);

The sample code above causes a new function object to be created with the specified arguments and body. The body and/or arguments of the new function object may include new instruction sets (i.e. anticipatory Instruction Sets 526, etc.). The new function can be invoked as any other function in the original code. In another example, JavaScript can utilize eval method that accepts a string of JavaScript statements (i.e. anticipatory Instruction Sets 526, etc.) and execute them as if they were within the original code. An example of how eval method can be used to modify an application includes the following JavaScript code:

anticipatoryInstr='Object1.moveForward(32);';
   if (anticipatoryInstr !="" && anticipatoryInstr !=null)
   {
   eval(anticipatoryInstr);
   }

In the sample code above, Artificial Intelligence Unit 110 may generate anticipatory Instruction Set 526 (i.e. 'Object1.moveForward(32)' for moving an object forward 32 units, etc.) and save it in anticipatoryInstr variable, which eval method can then execute. Lisp is another example of dynamic, interpreted, and/or scripting language that includes similar capabilities as previously described JavaScript. For example, Lisp's compile command can create a function at runtime, eval command may parse and evaluate an expression at runtime, and exec command may execute a given instruction set (i.e. string, etc.) at runtime. In another example, dynamic as well as some non-dynamic languages may provide macros, which combine code introspection and/or eval capabilities. In some aspects, macros can access inner workings of the compiler, interpreter, virtual machine, runtime environment/engine, and/or other components of the computing platform enabling the definition of language-like constructs and/or generation of a complete program or sections thereof. Other platforms, tools, and/or techniques may provide equivalent or similar functionalities as the above described ones.

In a further example, modifying execution and/or functionality of Application Program 18 can be implemented through dynamic code, dynamic class loading, reflection, and/or other native functionalities of a programming language or platform. In static applications or static programming, a class can be defined and/or loaded at compile time. Conversely, in dynamic applications or dynamic programming, a class can be loaded into a running environment at runtime. For example, Java Runtime Environment (JRE) may not require that all classes be loaded at compile time and class loading can occur when a class is first referenced at runtime. Dynamic class loading enables inclusion or injection of on-demand code and/or functionalities at runtime. System provided or custom class loaders may enable loading of classes into the running environment. Custom class loaders can be created to enable custom functionalities such as, for example, specifying a remote location from which a class can be loaded. In addition to dynamic loading of a pre-defined class, a class can also be created at runtime. In some aspects, a class source code can be created at runtime. A compiler such as javac, com.sun.tools.javac.Main, javax.tools, javax.tools.JavaCompiler, and/or other packages can then be utilized to compile the source code. Javac, com.sun.tools.javac.Main, javax.tools, javax.tools.JavaCompiler, and/or other packages may include an interface to invoke Java compiler from within a running application. A Java compiler may accept source code in a file, string, object (i.e. Java String, StringBuffer, CharSequence, etc.) and/or other source, and may generate Java bytecode (i.e. class file, etc.). Once compiled, a class loader can then load the compiled class into the running environment. In other aspects, a tool such as Javaassist (i.e. Java programming assistant) can be utilized to enable an application to create or modify a class at runtime. Javassist may include a Java library that provides functionalities to create and/or manipulate Java bytecode of an application as well as reflection capabilities. Javassist may provide source-level and bytecode-level APIs. Using the source-level API, a class can be created and/or modified using only source code, which Javassist may compile seamlessly on the fly. Javassist source-level API can therefore be used without knowledge of Java bytecode specification. Bytecode-level API enables creating and/or editing a class bytecode directly. In yet other aspects, similar functionalities to the aforementioned ones may be provided in tools such as Apache Commons BCEL (Byte Code Engineering Library), ObjectWeb ASM, CGLIB (Byte Code Generation Library), and/or others. Once a dynamic code or class is created and loaded, reflection in high-level programming languages such as Java and/or others can be used to manipulate or change the runtime behavior of an application. Examples of reflective programming languages and/or platforms include Java, JavaScript, Smalltalk, Lisp, Python, .NET Common Language Runtime (CLR), Tcl, Ruby, Perl, PHP, Scheme, PL/SQL, and/or others. Reflection can be used in an application to access, examine, modify, and/or manipulate a loaded class and/or its elements. Reflection in Java can be implemented by utilizing a reflection API such as java.lang.Reflect package. The reflection API provides functionalities such as, for example, loading or reloading a class, instantiating a new instance of a class, determining class and instance methods, invoking class and instance methods, accessing and manipulating a class, fields, methods and constructors, determining the modifiers for fields, methods, classes, and interfaces, and/or other functionalities. The above described dynamic code, dynamic class loading, reflection, and/or other functionalities are similarly provided in the .NET platform through its tools such as, for example, System.CodeDom.Compiler namespace, System.Reflection.Emit namespace, and/or other native or other .NET tools. Other platforms in addition to Java and .NET may provide similar tools and/or functionalities. In some designs, dynamic code, dynamic class loading, reflection, and/or other functionalities can be used to facilitate modification of an application by inserting or injecting instruction sets (i.e. anticipatory Instruction Sets 526, etc.) into a running application. For example, an existing or dynamically created class comprising VSADO Unit 100 functionalities can be loaded into a running application through manual, automatic, or dynamic instrumentation. Once the class is created and loaded, an instance of VSADO Unit 100 class may be constructed. The instance of VSADO Unit 100 can then take or exert control of the application and/or implement alternate instruction sets (i.e. anticipatory Instruction Sets 526, etc.) at any point in the application's execution. Other platforms, tools, and/or techniques may provide equivalent or similar functionalities as the above described ones.

In a further example, modifying execution and/or functionality of Application Program 18 can be implemented through independent tools that can be utilized across different platforms. Such tools provide instrumentation and/or other capabilities on more than one platform or computing system and may facilitate application modification or insertion of instruction sets (i.e. anticipatory Instruction Sets 526, etc.). Examples of these tools include Pin, DynamoRIO, DynInst, Kprobes, KernInst, OpenPAT, DTrace, SystemTap, and/or others. In some aspects, Pin and/or any of its elements, methods, and/or techniques can be utilized for dynamic instrumentation. Pin can perform instrumentation by taking control of an application after it loads into memory. Pin may insert itself into the address space of an executing application enabling it to take control. Pin JIT compiler can then compile and implement alternate code (i.e. anticipatory Instruction Sets 526, etc.). Pin provides an extensive API for instrumentation at several abstraction levels. Pin supports two modes of instrumentation, JIT mode and probe mode. JIT mode uses a just-in-time compiler to insert instrumentation and recompile program code while probe mode uses code trampolines for instrumentation. Pin was designed for architecture and operating system independence. In other aspects, KernInst and/or any of its elements, methods, and/or techniques can be utilized for dynamic instrumentation. KernInst includes an instrumentation framework designed for dynamically inserting code into a running kernel of an operating system. KernInst implements probe-based dynamic instrumentation where code can be inserted, changed, and/or removed at will. KernInst API enables client tools to construct their own tools for dynamic kernel instrumentation to suit variety of purposes such as insertion of alternate instruction sets (i.e. anticipatory Instruction Sets 526, etc.). Client tools can communicate with KernInst over a network (i.e. internet, wireless network, LAW, WAN, etc). Other platforms, tools, and/or techniques may provide equivalent or similar functionalities as the above described ones.

In a further example, modifying execution and/or functionality of Application Program 18 can be implemented through utilizing operating system's native tools or capabilities such as Unix ptrace command. Ptrace includes a system call that may enable one process to control another allowing the controller to inspect and manipulate the internal state of its target. Ptrace can be used to modify a running application such as modifying an application with alternate instruction sets (i.e. anticipatory Instruction Sets 526, etc.). By attaching to an application using the ptrace call, the controlling application can gain extensive control over the operation of its target. This may include manipulation of its instruction sets, execution path, file descriptors, memory, registers, and/or other components. Ptrace can single-step through the target's code, observe and intercept system calls and their results, manipulate the target's signal handlers, receive and send signals on the target's behalf, and/or perform other operations within the target application. Ptrace's ability to write into the target application's memory space enables the controller to modify the running code of the target application. Other platforms, tools, and/or techniques may provide equivalent or similar functionalities as the above described ones.

In a further example, modifying execution and/or functionality of Application Program 18 can be implemented through utilizing just-in-time (JIT) compiling. JIT compilation (also known as dynamic translation, dynamic compilation, etc.) includes compilation performed during an application's execution (i.e. runtime, etc.). A code can be compiled when it is about to be executed, and it may be cached and reused later without the need for additional compilation. In some aspects, a JIT compiler can convert source code or byte code into machine code. In other aspects, a JIT compiler can convert source code into byte code. JIT compiling may be performed directly in memory. For example, JIT compiler can output machine code directly into memory and immediately execute it. Platforms such as Java, .NET, and/or others may implement JIT compilation as their native functionality. Platform independent tools for custom system design may include JIT compilation functionalities as well. In some aspects, JIT compilation includes redirecting application's execution to a JIT compiler from a specific entry point. For example, Pin can insert its JIT compiler into the address space of an application. Once execution is redirected to it, JIT compiler may receive alternate instruction sets (i.e. anticipatory Instruction Sets 526, etc.) immediately before their compilation. The JIT compiled instruction sets can be stored in memory or another repository from where they may be retrieved and executed. Alternatively, for example, JIT compiler can create a copy of the original application code or a segment thereof, and insert alternate code (i.e. anticipatory Instruction Sets 526, etc.) before compiling the modified code copy. In some aspects, JIT compiler may include a specialized memory such as fast cache memory dedicated to JIT compiler functionalities from which the modified code can be fetched rapidly. JIT compilation and/or any compilation in general may include compilation, interpretation, or other translation into machine code, bytecode, and/or other formats or types of code. Other platforms, tools, and/or techniques may provide equivalent or similar functionalities as the above described ones.

In a further example, modifying execution and/or functionality of Application Program 18 can be implemented through dynamic recompilation. Dynamic recompilation includes recompiling an application or part thereof during execution. An application can be modified with alternate features or instruction sets that may take effect after recompilation. Dynamic recompilation may be practical in various types of applications including object oriented, event driven, forms based, and/or other applications. In a typical windows-based application, most of the action after initial startup occurs in response to user or system events such as moving the mouse, selecting a menu option, typing text, running a scheduled task, making a network connection, and/or other events when an event handler is called to perform an operation appropriate for the event. Generally, when no events are being generated, the application is idle. For example, when an event occurs and an appropriate event handler is called, instrumentation can be implemented in the application's source code to insert alternate instruction sets (i.e. anticipatory Instruction Sets 526, etc.) at which point the modified source code can be recompiled and/or executed. In some aspects, the state of the application can be saved before recompiling its modified source code so that the application may continue from its prior state. Saving the application's state can be achieved by saving its variables, data structures, objects, location of its current instruction, and/or other necessary information in environmental variables, memory, or other repositories where they can be accessed once the application is recompiled. In other aspects, application's variables, data structures, objects, address of its current instruction, and/or other necessary information can be saved in a repository such as file, database, or other repository accessible to the application after recompilation of its source code. Other platforms, tools, and/or techniques may provide equivalent or similar functionalities as the above described ones.

In a further example, modifying execution and/or functionality of Application Program 18 can be implemented through modifying or redirecting Application Program's 18 execution path. Generally, an application can be loaded into memory and the flow of execution proceeds from one instruction set to the next until the end of the application. An application may include a branching mechanism that can be driven by keyboard or other input devices, system events, and/or other computing system components or events that may impact the execution path. The execution path can also be altered by an external application through acquiring control of execution and/or redirecting execution to a function, routine/subroutine, or an alternate code segment at any point in the application's execution. A branch, jump, or other mechanism can be utilized to implement the redirected execution. For example, a jump instruction can be inserted at a specific point in an application's execution to redirect execution to an alternate code segment. A jump instruction set may include, for example, an unconditional branch, which always results in branching, or a conditional branch, which may or may not result in branching depending on a condition. When executing an application, a computer may fetch and execute instruction sets in sequence until it encounters a branch instruction set. If the instruction set is an unconditional branch, or it is conditional and the condition is satisfied, the computer may fetch its next instruction set from a different instruction set sequence or code segment as specified by the branch instruction set. After the execution of the alternate code segment, control may be redirected back to the original jump point or to another point in the application. For example, modifying an application can be implemented by redirecting execution of an application to alternate instruction sets (i.e. anticipatory Instruction Sets 526, etc.). Alternate instruction sets can be pre-compiled, pre-interpreted, or otherwise pre-translated and ready for execution. Alternate instruction sets can also be JIT compiled, JIT interpreted, or otherwise JIT translated before execution. Other platforms, tools, and/or techniques may provide equivalent or similar functionalities as the above described ones.

In a further example, modifying execution and/or functionality of Application Program 18 can be implemented through assembly language. Assembly language instructions may be directly related with the architecture's machine instructions as previously described. Assembly language can, therefore, be a powerful tool for implementing direct hardware (i.e. processor registers, memory, etc.) access and manipulations as well as access and manipulations of specialized processor features or instructions. Assembly language can also be a powerful tool for implementing low-level embedded systems, real-time systems, interrupt handlers, self or dynamically modifying code, and/or other applications. Specifically, for instance, self or dynamically modifying code that can be used to facilitate modifying of an application can be seamlessly implemented using assembly language. For example, using assembly language, instruction sets can be dynamically created and loaded into memory similar to the ones that a compiler may generate. Furthermore, using assembly language, memory space of a loaded application can be accessed to modify (including rewrite, overwrite, etc.) original instruction sets or to insert jumps or branches to alternate code elsewhere in memory. Some operating systems may implement protection from changes to applications loaded into memory. Operating system's, processor's, or other low level features or commands can be used to unprotect the protected locations in memory before the change as previously described. Alternatively, a pointer that may reside in a memory location where it could be readily altered can be utilized where the pointer may reference alternate code. In one example, assembly language can be utilized to write alternate code (i.e. anticipatory Instruction Sets 526, etc.) into a location in memory outside a running application's memory space. Assembly language can then be utilized to redirect the application's execution to the alternate code by inserting a jump or branch into the application's in-memory code, by redirecting program counter, or by other technique. In another example, assembly language can be utilized to overwrite or rewrite the entire or part of an application's in-memory code with alternate code. In some aspects, high-level programming languages can call an external assembly language program to facilitate application modification as previously described. In yet other aspects, relatively low-level programming languages such as C may allow embedding assembly language directly in their source code such as, for example, using asm keyword of C. Other platforms, tools, and/or techniques may provide equivalent or similar functionalities as the above described ones.

In a further example, modifying execution and/or functionality of Application Program 18 can be implemented through binary rewriting. Binary rewriting tools and/or techniques may modify an application's executable. In some aspects, modification can be minor such as in the case of optimization where the original executable's functionality is kept. In other aspects, modification may change the application's functionality such as by inserting alternate code (i.e. anticipatory Instruction Sets 526, etc.). Examples of binary rewriting tools include SecondWrite, ATOM, DynamoRIO, Purify, Pin, EEL, DynInst, PLTO, and/or others. Binary rewriting may include disassembly, analysis, and/or modification of target application. Since binary rewriting works directly on machine code executable, it is independent of source language, compiler, virtual machine (if one is utilized), and/or other higher level abstraction layers. Also, binary rewriting tools can perform application modifications without access to original source code. Binary rewriting tools include static rewriters, dynamic rewriters, minimally-invasive rewriters, and/or others. Static binary rewriters can modify an executable when the executable is not in use (i.e. not running). The rewritten executable may then be executed including any new or modified functionality. Dynamic binary rewriters can modify an executable during its execution, thereby enabling modification of an application's functionality at runtime. In some aspects, dynamic rewriters can be used for instrumentation or selective modifications such as insertion of alternate code (i.e. anticipatory Instruction Sets 526, etc.), and/or for other runtime transformations or modifications. For example, some dynamic rewriters can be configured to intercept an application's execution at indirect control transfers and insert instrumentation or other application modifying code. Minimally-invasive rewriters may keep the original machine code to the greatest extent possible. They support limited modifications such as insertion of jumps into and out of instrumented code. Other platforms, tools, and/or techniques may provide equivalent or similar functionalities as the above described ones.

Figure 29:
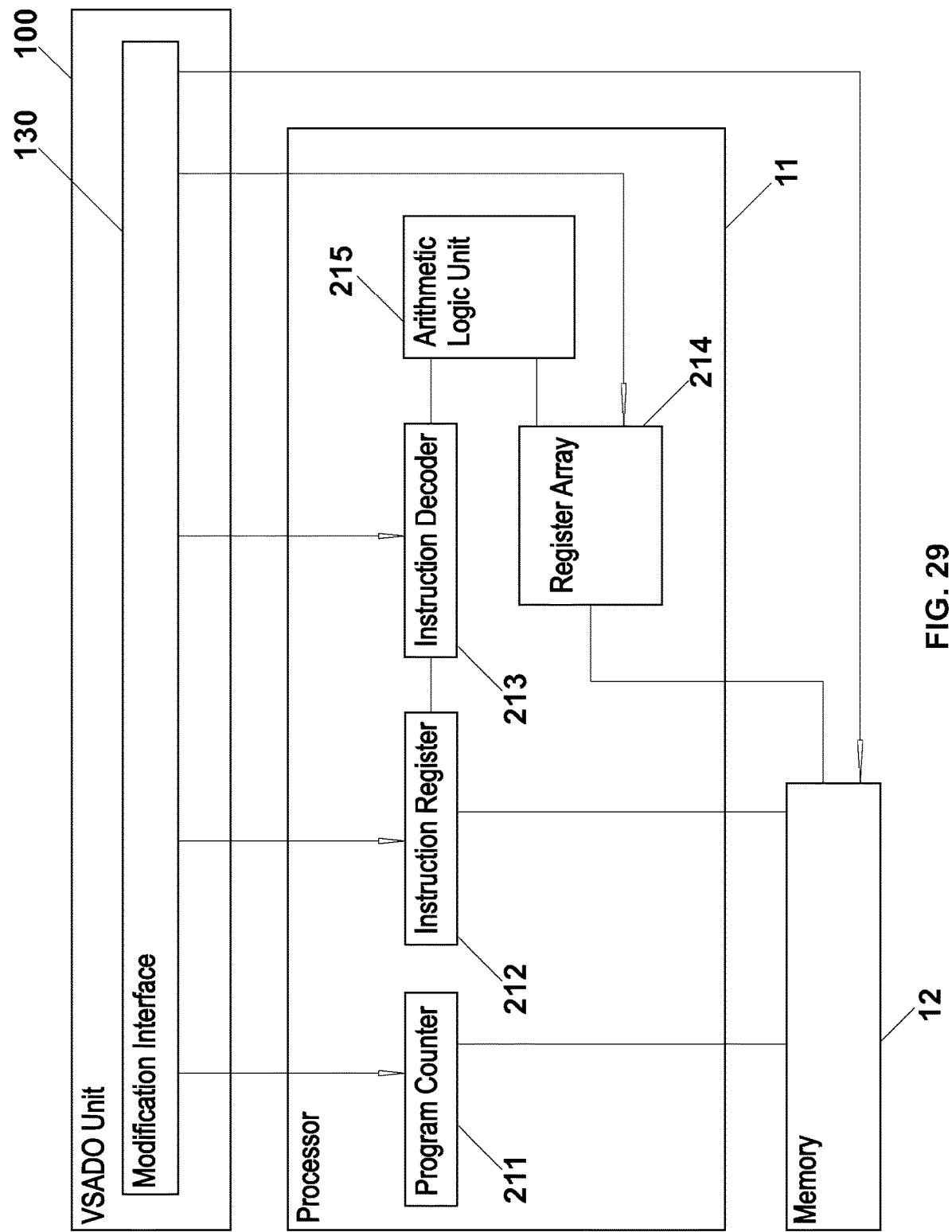
FIG. 29 illustrates some embodiments of modifying execution and/or functionality of Processor 11 through modification of Processor 11 registers, memory, or other computing system components.

Referring to FIG. 29, in a further example, modifying execution and/or functionality of Processor 11 can be implemented through modification of processor registers, memory, or other computing system components. In some aspects, modifying execution and/or functionality of Processor 11 can be implemented by redirecting Processor's 11 execution to alternate instruction sets (i.e. anticipatory Instruction Sets 526, etc.). In one example, Program Counter 211 may hold or point to a memory address of the next instruction set that will be executed by Processor 11. Artificial Intelligence Unit 110 may generate anticipatory Instruction Sets 526 and store them in Memory 12 as previously described. Modification Interface 130 may then change Program Counter 211 to point to the location in Memory 12 where anticipatory Instruction Sets 526 are stored. The anticipatory Instruction Sets 526 can then be fetched from the location in Memory 12 pointed to by the modified Program Counter 211 and loaded into Instruction Register 212 for decoding and execution. Once anticipatory Instruction Sets 526 are executed, Modification Interface 130 may change Program Counter 211 to point to the last instruction set before the redirection or to any other instruction set. In other aspects, anticipatory Instruction Sets 526 can be loaded directly into Instruction Register 212. As previously described, examples of other processor or computing system components that can be used during an instruction cycle include memory address register (MAR), memory data register (MDR), data registers, address registers, general purpose registers (GPRs), conditional registers, floating point registers (FPRs), constant registers, special purpose registers, machine-specific registers, Register Array 214, Arithmetic Logic Unit 215, control unit, and/or other circuits or components. Any of the aforementioned processor registers, memory, or other computing system components can be accessed and/or modified to facilitate the disclosed functionalities. In some embodiments, processor interrupt may be issued to facilitate such access and/or modification. In some designs, modifying execution and/or functionality of Processor 11 can be implemented in a program, combination of programs and hardware, or purely hardware system. Dedicated hardware may be built to perform modifying execution and/or functionality of Processor 11 with marginal or no impact to computing overhead. Other platforms, tools, and/or techniques may provide equivalent or similar functionalities as the above described ones.

Figure 30A:
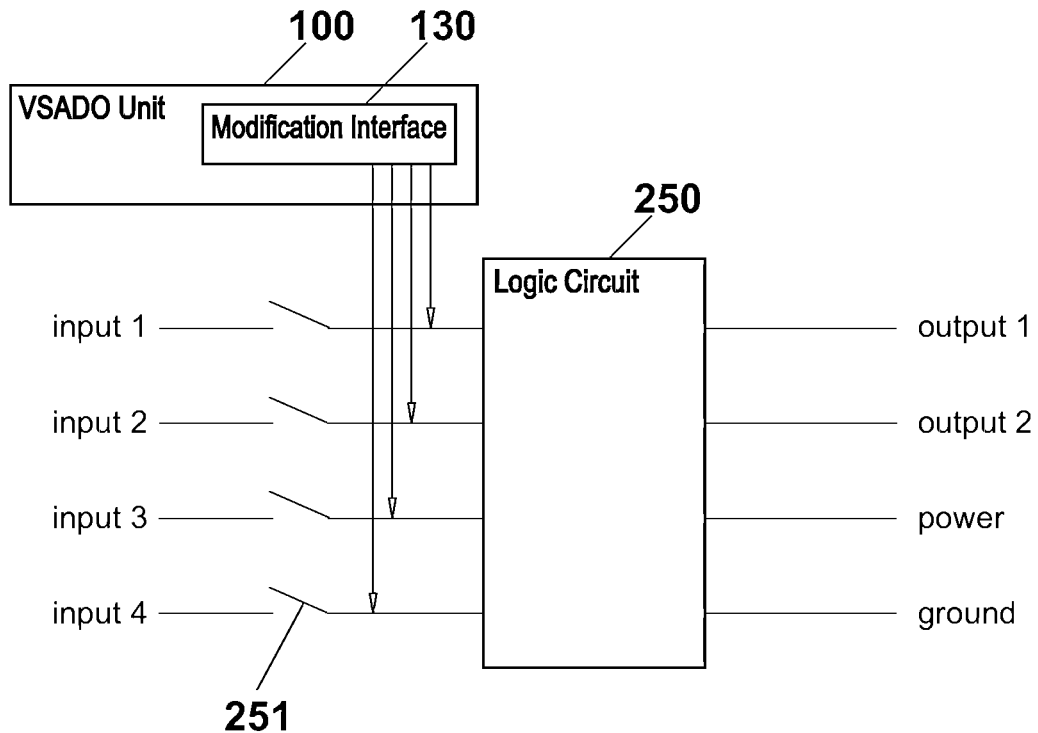
FIGS. 30A-30B illustrate some embodiments of modifying execution and/or functionality of Logic Circuit 250 through modification of inputs and/or outputs of Logic Circuit 250.
Figure 30B:
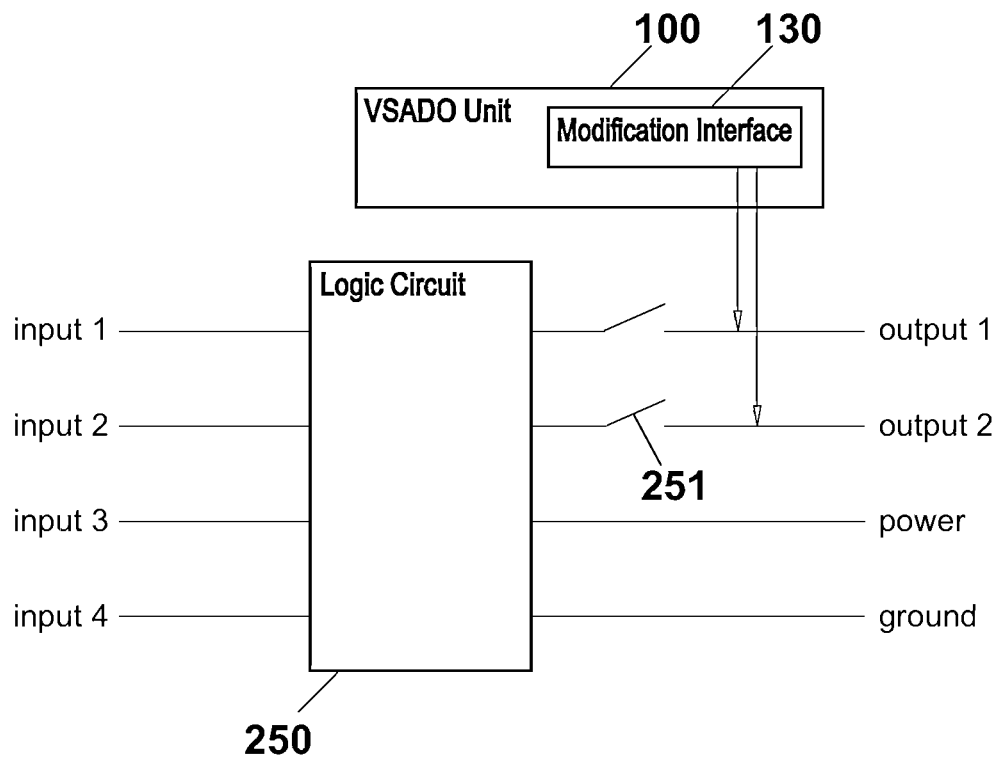

Referring to FIGS. 30A-30B, in a further example, modifying execution and/or functionality of Logic Circuit 250 can be implemented through modification of inputs and/or outputs of Logic Circuit 250. While Processor 11 includes any type of logic circuit, Logic Circuit 250 is described separately herein to offer additional detail on its functioning. Logic Circuit 250 comprises the functionality for performing logic operations using the circuit's inputs and producing outputs based on the logic operations performed as previously described. In one example, Logic Circuit 250 may perform some logic operations using four input values and produce two output values. Modifying execution and/or functionality of Logic Circuit 250 can be implemented by replacing its input values with anticipatory input values (i.e. anticipatory Instruction Sets 526, etc.). Artificial Intelligence Unit 110 may generate anticipatory input values as previously described. Modification Interface 130 can then transmit the anticipatory input values to Logic Circuit 250 through the four hardwired connections as shown in FIG. 30A. Modification Interface 130 may use Switches 251 to prevent delivery of any input values that may be sent to Logic Circuit 250 from its usual input source. As such, VSADO Unit 100 may cause Logic Circuit 250 to perform its logic operations using the four anticipatory input values, thereby implementing autonomous Device 98 operation. In another example, Logic Circuit 250 may perform some logic operations using four input values and produce two output values. Modifying execution and/or functionality of Logic Circuit 250 can be implemented by replacing its output values with anticipatory output values (i.e. anticipatory Instruction Sets 526, etc.). Artificial Intelligence Unit 110 may generate anticipatory output values (i.e. anticipatory Instruction Sets 526, etc.) as previously described. Modification Interface 130 can then transmit the anticipatory output values through the two hardwired connections as shown in FIG. 30B. Modification Interface 130 may use Switches 251 to prevent delivery of any output values that may be sent by Logic Circuit 250. As such, VSADO Unit 100 may bypass Logic Circuit 250 and transmit the two anticipatory output values to downstream elements, thereby implementing autonomous Device 98 operation. In a further example, instead of or in addition to modifying input and/or output values of Logic Circuit 250, the execution and/or functionality of Logic Circuit 250 may be modified by modifying values or signals in one or more Logic Circuit's 250 internal components such as registers, memories, buses, and/or others (i.e. similar to the previously described modifying of Processor 11 components, etc.). In some designs, modifying execution and/or functionality of Logic Circuit 250 can be implemented in a program, combination of programs and hardware, or purely hardware system. Dedicated hardware may be built to perform modifying execution and/or functionality of Logic Circuit 250 with marginal or no impact to computing overhead. Any of the elements and/or techniques for modifying execution and/or functionality of Logic Circuit 250 can similarly be implemented with Processor 11 and/or other processing elements.

In some embodiments, VSADO Unit 100 may directly modify the functionality of an actuator (previously described, not shown). For example, Logic Circuit 250 or other processing element may control an actuator that enables Device 98 to perform mechanical, physical, and/or other operations. An actuator may receive one or more input values or control signals from Logic Circuit 250 or other processing element directing the actuator to perform specific operations. Modifying functionality of an actuator can be implemented by replacing its input values with anticipatory input values (i.e. anticipatory Instruction Sets 526, etc.) as previously described with respect to replacing input values of Logic Circuit 250. Specifically, for instance, Artificial Intelligence Unit 110 may generate anticipatory input values as previously described. Modification Interface 130 can then transmit the anticipatory input values to the actuator. Modification Interface 130 may use Switches 251 to prevent delivery of any input values that may be sent to the actuator from its usual input source. As such, VSADO Unit 100 may cause the actuator to perform its operations using the anticipatory input values, thereby implementing autonomous Device 98 operation.

One of ordinary skill in art will recognize that FIGS. 30A-30B depict one of many implementations of Logic Circuit 250 and that any number of input and/or output values can be utilized in alternate implementations. One of ordinary skill in art will also recognize that Logic Circuit 250 may include any number and/or combination of logic components to implement any logic operations.

Other additional techniques or elements can be utilized as needed for modifying execution and/or functionality of Application Program 18, Processor 11, Logic Circuit 250, and/or other processing elements, or some of the disclosed techniques or elements can be excluded, or a combination thereof can be utilized in alternate embodiments.

Figure 31:
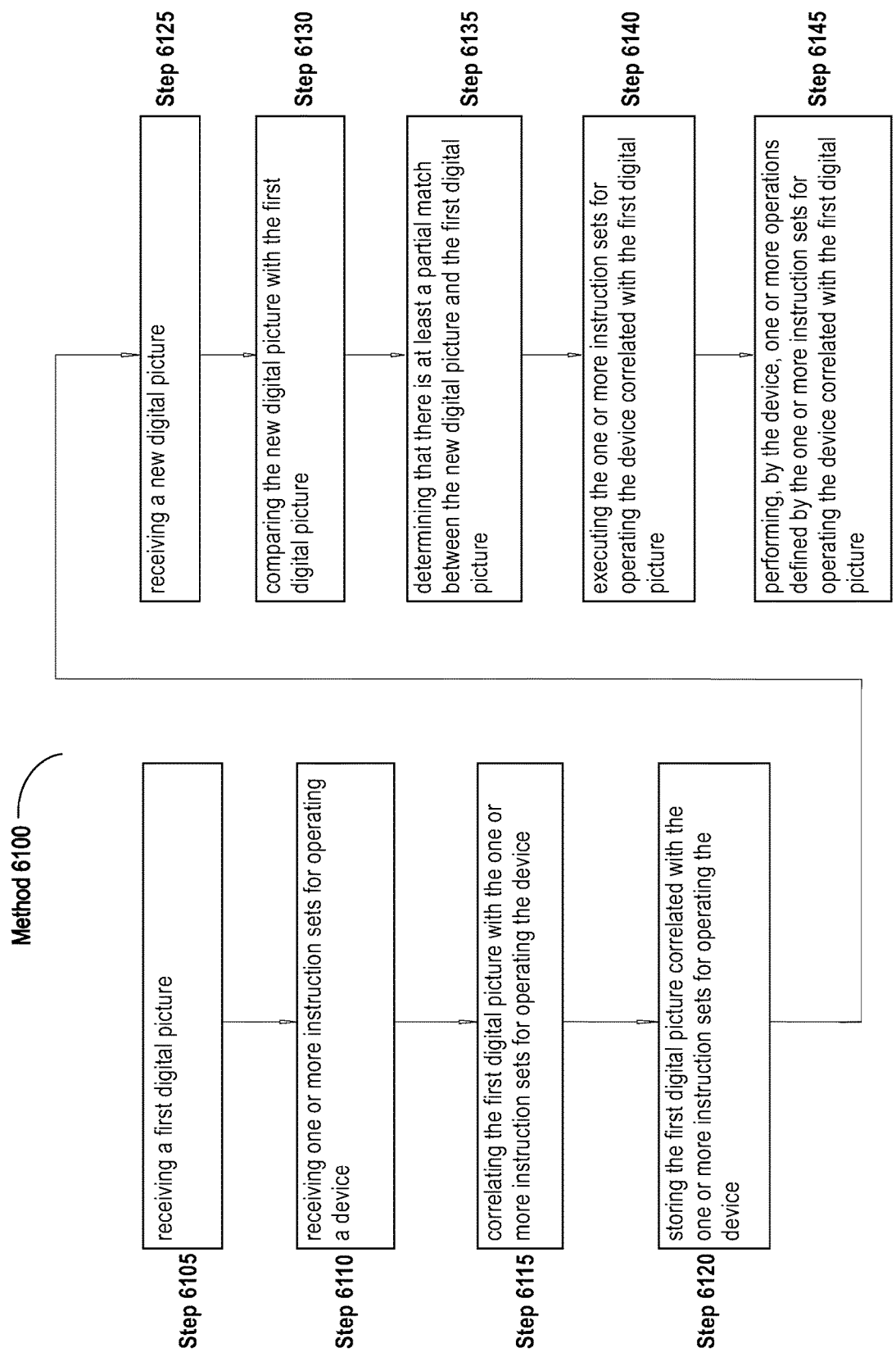
FIG. 31 illustrates a flow chart diagram of an embodiment of method 6100 for learning and/or using visual surrounding for autonomous device operation.

Referring to FIG. 31, the illustration shows an embodiment of a method 6100 for learning and/or using visual surrounding for autonomous device operation. The method can be used on a computing device or system to enable learning of a device's operation in various visual surroundings and enable autonomous device operation in similar visual surroundings. Method 6100 may include any action or operation of any of the disclosed methods such as method 6200, 6300, 6400, 6500, 6600, and/or others. Additional steps, actions, or operations can be included as needed, or some of the disclosed ones can be optionally omitted, or a different combination or order thereof can be implemented in alternate embodiments of method 6100.

At step 6105, a first digital picture is received. A digital picture (i.e. Digital Picture 525, etc.) may include a depiction of a device's (i.e. Device's 98, etc.) visual surrounding. A digital picture may include a depiction of a remote device's (i.e. Remote Device's 97, etc.) visual surrounding. In some embodiments, a digital picture may include a collection of color encoded pixels or dots. A digital picture comprises any type or form of digital picture such as JPEG, GIF, TIFF, PNG, PDF, and/or other digitally encoded picture. In other embodiments, a stream of digital pictures (i.e. motion picture, video, etc.) may include one or more digital pictures. A stream of digital pictures comprises any type or form of digital motion picture such as MPEG, AVI, FLV, MOV, RM, SWF, WMV, DivX, and/or other digitally encoded motion picture. In some aspects, a digital picture may include or be substituted with a stream of digital pictures, and vice versa. Therefore, the terms digital picture and stream of digital pictures may be used interchangeably herein depending on context. One or more digital pictures can be captured by a picture capturing apparatus (i.e. Picture Capturing Apparatus 90, etc.) such as a still or motion picture camera, or other picture capturing apparatus. In some aspects, a picture capturing apparatus may be part of a device whose visual surrounding is being used for VSADO functionalities. In other aspects, a picture capturing apparatus may be part of a remote device, accessible via a network, whose visual surrounding is being used for VSADO functionalities. Picture capturing apparatus may be provided in any other device, system, process, or configuration. In some embodiments, capturing and/or receiving may be responsive to a triggering object, action, event, time, and/or other stimulus. Receiving comprises any action or operation by or for a Picture Capturing Apparatus 90, Digital Picture 525, and/or other disclosed elements.

At step 6110, one or more instruction sets for operating a device are received. In some embodiments, an instruction set (i.e. Instruction Set 526, etc.) may be used or executed by a processor (i.e. Processor 11, etc.) for operating a device (i.e. Device 98, etc.). In other embodiments, an instruction set may be part of an application program (i.e. Application Program 18, etc.) for operating a device. The application can run or execute on one or more processors or other processing elements. In further embodiments, an instruction set may be used, executed, or produced by a logic circuit (i.e. Logic Circuit 250, etc.) for operating a device. For example, such instruction set may be or include one or more inputs into or outputs from a logic circuit. In further embodiments, an instruction set may be used by an actuator for operating a device. For example, such instruction set may be or include one or more inputs into an actuator. Operating a device includes performing any operations on or with the device. An instruction set may temporally correspond to a digital picture. In some aspects, an instruction set that temporally corresponds to a digital picture may include an instruction set used or executed at the time of receiving or capturing the digital picture. In other aspects, an instruction set that temporally corresponds to a digital picture may include an instruction set used or executed within a certain time period before and/or after receiving or capturing the digital picture. Any time period may be utilized. In further aspects, an instruction set that temporally corresponds to a digital picture may include an instruction set used or executed from the time of capturing of the digital picture to the time of capturing of a next digital picture. In further aspects, an instruction set that temporally corresponds to a digital picture may include an instruction set used or executed from the time of capturing of a preceding digital picture to the time of capturing of the digital picture. Any other temporal relationship or correspondence between digital pictures and correlated instruction sets can be implemented. In general, an instruction set that temporally corresponds to a digital picture enables structuring knowledge of a device's operation at or around the time of the receiving or capturing the digital picture. Such functionality enables spontaneous or seamless learning of a device's operation in various visual surroundings as user operates the device in real life situations. In some designs, an instruction set can be received from a processor, application program, logic circuit, and/or other processing element as the instruction set is being used or executed. In other aspects, an instruction set can be received from a processor, application program, logic circuit, and/or other processing element after the instruction set is used or executed. In further aspects, an instruction set can be received from a processor, application program, logic circuit, and/or other processing element before the instruction set has been used or executed. An instruction set can be received from a running processor, running application program, running logic circuit, and/or other running processing element. As such, an instruction set can be received at runtime. In other designs, an instruction set can be received from an actuator. In some embodiments, an instruction set may include one or more commands, keywords, symbols (i.e. parentheses, brackets, commas, semicolons, etc.), instructions, operators (i.e. =, <, >, etc.), variables, values, objects (i.e. file handle, network connection, Object1, etc.), data structures (i.e. table, database, user defined data structure, etc.), functions (i.e. Function1( ), FIRST( ), MIN( ), SQRT( ), etc.), parameters, states, signals, inputs, outputs, references thereto, and/or other components for performing an operation. In other embodiments, an instruction set may include source code, bytecode, intermediate code, compiled, interpreted, or otherwise translated code, runtime code, assembly code, machine code, and/or any other computer code. In further embodiments, an instruction set can be compiled, interpreted or otherwise translated into machine code or any intermediate code (i.e. bytecode, assembly code, etc.). In further embodiments, an instruction set may include one or more inputs into and/or outputs from a logic circuit. In further embodiments, an instruction set may include one or more inputs into an actuator. In some aspects, an instruction set can be received from memory (i.e. Memory 12, etc.), hard drive, or any other storage element or repository. In other aspects, an instruction set can be received over a network such as Internet, local area network, wireless network, and/or other network. In further aspects, an instruction set can be received by an interface (i.e. Acquisition Interface 120, etc.) configured to obtain instruction sets from a processor, application program, logic circuit, actuator, and/or other element. In general, an instruction set can be received by any element of the system. In some embodiments, receiving may be responsive to a triggering object, action, event, time, and/or other stimulus. Receiving comprises any action or operation by or for an Acquisition Interface 120, Instruction Set 526, and/or other disclosed elements.

At step 6115, the first digital picture is correlated with the one or more instruction sets for operating the device. In some aspects, individual digital pictures can be correlated with one or more instruction sets. In other aspects, streams of digital pictures can be correlated with one or more instruction sets. In further aspects, individual digital pictures or streams of digital pictures can be correlated with temporally corresponding instruction sets as previously described. In further aspects, a digital picture or stream of digital pictures may not be correlated with any instruction sets. Correlating may include structuring or generating a knowledge cell (i.e. Knowledge Cell 800, etc.) and storing one or more digital pictures correlated with any instruction sets into the knowledge cell. Therefore, knowledge cell may include any data structure or arrangement that can facilitate such storing. A knowledge cell includes a unit of knowledge of how a device operated in a visual surrounding. In some designs, extra information (i.e. Extra Info 527, etc.) may optionally be used to facilitate enhanced comparisons or decision making in autonomous device operation where applicable. Therefore, any digital picture, instruction set, and/or other element may include or be correlated with extra information. Extra information may include any information useful in comparisons or decision making performed in autonomous device operation. Examples of extra information include time information, location information, computed information, observed information, sensory information, contextual information, and/or other information. In some embodiments, correlating may be responsive to a triggering object, action, event, time, and/or other stimulus. Correlating may be omitted where learning of a device's operations in visual surroundings is not implemented. Correlating comprises any action or operation by or for a Knowledge Structuring Unit 520, Knowledge Cell 800, and/or other disclosed elements.

At step 6120, the first digital picture correlated with the one or more instruction sets for operating the device is stored. A digital picture correlated with one or more instruction sets may be part of a stored plurality of digital pictures correlated with one or more instruction sets. Digital pictures correlated with any instruction sets can be stored in a memory unit or other repository. The previously described knowledge cells comprising digital pictures correlated with any instruction sets can be used in/as neurons, nodes, vertices, or other elements in any of the data structures or arrangements (i.e. neural networks, graphs, sequences, collection of knowledge cells, etc.) used for storing the knowledge of a device's operation in visual surroundings. Knowledge cells may be connected, interrelated, or interlinked into knowledge structures using statistical, artificial intelligence, machine learning, and/or other models or techniques. Such interconnected or interrelated knowledge cells can be used for enabling autonomous device operation. The interconnected or interrelated knowledge cells may be stored or organized into a knowledgebase (i.e. Knowledgebase 530, etc.). In some embodiments, knowledgebase may be or include a neural network (i.e. Neural Network 530a, etc.). In other embodiments, knowledgebase may be or include a graph (i.e. Graph 530b, etc.). In further embodiments, knowledgebase may be or include a collection of sequences (i.e. Collection of Sequences 530c, etc.). In further embodiments, knowledgebase may be or include a sequence (i.e. Sequence 533, etc.). In further embodiments, knowledgebase may be or include a collection of knowledge cells (i.e. Collection of Knowledge Cells 530d, etc.). In general, knowledgebase may be or include any data structure or arrangement, and/or repository capable of storing the knowledge of a device's operation in various visual surroundings. Knowledgebase may also include or be substituted with various artificial intelligence methods, systems, and/or models for knowledge structuring, storing, and/or representation such as deep learning, supervised learning, unsupervised learning, neural networks (i.e. convolutional neural network, recurrent neural network, deep neural network, etc.), search-based, logic and/or fuzzy logic-based, optimization-based, tree/graph/other data structure-based, hierarchical, symbolic and/or sub-symbolic, evolutionary, genetic, multi-agent, deterministic, probabilistic, statistical, and/or other methods, systems, and/or models. Storing may be omitted where learning of a device's operations in visual surroundings is not implemented. Storing comprises any action or operation by or for a Knowledgebase 530, Neural Network 530a, Graph 530b, Collection of Sequences 530c, Sequence 533, Collection of Knowledge Cells 530d, Knowledge Cell 800, Node 852, Layer 854, Connection 853, Similarity Comparison 125, and/or other disclosed elements.

At step 6125, a new digital picture is received. Step 6125 may include any action or operation described in Step 6105 as applicable.

At step 6130, the new digital picture is compared with the first digital picture. Comparing one digital picture with another digital picture may include comparing at least a portion of one digital picture with at least a portion of the other digital picture. In some embodiments, digital pictures may be compared individually. In some aspects, comparing of individual pictures may include comparing one or more regions of one picture with one or more regions of another picture. In other aspects, comparing of individual pictures may include comparing one or more features of one picture with one or more features of another picture. In further aspects, comparing of individual pictures may include comparing pixels of one picture with pixels of another picture. In other aspects, comparing of individual pictures may include recognizing a person or object in one digital picture and recognizing a person or object in another digital picture, and comparing the person or object from the one digital picture with the person or object from the other digital picture. Comparing may also include other aspects or properties of digital pictures or pixels examples of which comprise color adjustment, size adjustment, content manipulation, transparency (i.e. alpha channel, etc.), use of a mask, and/or others. In other embodiments, digital pictures may be compared collectively as part of streams of digital pictures (i.e. motion pictures, videos, etc.). In some aspects, collective comparing may include comparing one or more digital pictures of one stream of digital pictures with one or more digital pictures of another stream of digital pictures. In some aspects, Dynamic Time Warping (DTW) and/or other techniques can be utilized for comparison and/or aligning temporal sequences (i.e. streams of digital pictures, etc.) that may vary in time or speed. Any combination of the aforementioned and/or other elements or techniques can be utilized in alternate embodiments of the comparing. Comparing may be omitted where anticipating of a device's operation in visual surroundings is not implemented. Comparing comprises any action or operation by or for a Decision-making Unit 540, Similarity Comparison 125, and/or other disclosed elements.

At step 6135, a determination is made that there is at least a partial match between the new digital picture and the first digital picture. In some embodiments, determining at least a partial match between individually compared digital pictures includes determining that similarity between one or more portions of one digital picture and one or more portions of another digital picture exceeds a similarity threshold. In other embodiments, determining at least a partial match between individually compared digital pictures includes determining at least a partial match between one or more portions of one digital picture and one or more portions of another digital picture. A portion of a digital picture may include a region, a feature, a pixel, or other portion. In further embodiments, determining at least a partial match between individually compared digital pictures includes determining that the number or percentage of matching or substantially matching regions of the compared pictures exceeds a threshold number (i.e. 1, 2, 5, 11, 39, etc.) or threshold percentage (i.e. 38%, 63%, 77%, 84%, 98%, etc.). In some aspects, the type of regions, the importance of regions, and/or other elements or techniques relating to regions can be utilized for determining similarity using regions. In further aspects, some of the regions can be omitted in determining similarity using regions. In further aspects, similarity determination can focus on regions of interest from the compared pictures. In further aspects, detection or recognition of persons or objects in regions of the compared pictures can be utilized for determining similarity. Where a reference to a region is used herein it should be understood that a portion of a region or a collection of regions can be used instead of or in addition to the region. In further embodiments, determining at least a partial match between individually compared digital pictures includes determining that the number or percentage of matching or substantially matching features of the compared pictures exceeds a threshold number (i.e. 3, 22, 47, 93, 128, 431, etc.) or a threshold percentage (i.e. 49%, 53%, 68%, 72%, 95%, etc.). In some aspects, the type of features, the importance of features, and/or other elements or techniques relating to features can be utilized for determining similarity using features. In further aspects, some of the features can be omitted in determining similarity using features. In further aspects, similarity determination can focus on features in certain regions of interest from the compared pictures. In further aspects, detection or recognition of persons or objects using features in the compared pictures can be utilized for determining similarity. Where a reference to a feature is used herein it should be understood that a portion of a feature or a collection of features can be used instead of or in addition to the feature. In further embodiments, determining at least a partial match between individually compared digital pictures may include determining that the number or percentage of matching or substantially matching pixels of the compared pictures exceeds a threshold number (i.e. 449, 2219, 92229, 442990, 1000028, etc.) or a threshold percentage (i.e. 39%, 45%, 58%, 72%, 92%, etc.). In some aspects, some of the pixels can be omitted in determining similarity using pixels. In further aspects, similarity determination can focus on pixels in certain regions of interest from the compared pictures. Where a reference to a pixel is used herein it should be understood that a collection of pixels can be used instead of or in addition to the pixel. In further embodiments, determining at least a partial match between individually compared digital pictures may include determining substantial similarity between at least a portion of one digital picture and at least a portion of another digital picture. In some aspects, substantial similarity of individually compared digital pictures can be achieved when a similarity between at least a portion of one digital picture and at least a portion of another digital picture exceeds a similarity threshold. In other aspects, substantial similarity of individually compared digital pictures can be achieved when the number or percentage of matching or substantially matching regions of the compared pictures exceeds a threshold number (i.e. 3, 22, 47, 93, 128, 431, etc.) or a threshold percentage (i.e. 49%, 53%, 68%, 72%, 95%, etc.). In further aspects, substantial similarity of individually compared digital pictures can be achieved when the number or percentage of matching or substantially matching features of the compared pictures exceeds a threshold number (i.e. 1, 2, 5, 11, 39, etc.) or threshold percentage (i.e. 38%, 63%, 77%, 84%, 98%, etc.). In further aspects, substantial similarity of individually compared digital pictures can be achieved when the number or percentage of matching or substantially matching pixels of the compared pictures exceeds a threshold number (i.e. 449, 2219, 92229, 442990, 1000028, etc.) or a threshold percentage (i.e. 39%, 45%, 58%, 72%, 92%, etc.). In some designs, substantial similarity of individually compared digital pictures can be achieved taking into account objects or persons detected within the compared digital pictures. For example, substantial similarity can be achieved if same or similar objects or persons are detected in the compared pictures. In some embodiments, determining at least a partial match between collectively compared digital pictures (i.e. streams of digital pictures [i.e. motion pictures, videos, etc.], etc.) may include determining that the number or percentage of matching or substantially matching digital pictures of the compared streams of digital pictures exceeds a threshold number (i.e. 28, 74, 283, 322, 995, 874, etc.) or a threshold percentage (i.e. 29%, 33%, 58%, 72%, 99%, etc.). In some aspects, Dynamic Time Warping (DTW) and/or other techniques for aligning temporal sequences (i.e. streams of digital pictures, etc.) that may vary in time or speed can be utilized in determining similarity of collectively compared digital pictures or streams digital pictures. In other aspects, the order of digital pictures, the importance of digital pictures, and/or other elements or techniques relating to digital pictures can be utilized for determining similarity of collectively compared digital pictures or streams digital pictures. In further aspects, some of the digital pictures can be omitted in determining similarity of collectively compared digital pictures or streams digital pictures. In some designs, a threshold for a number or percentage similarity can be used to determine a match or substantial match between any of the aforementioned elements. Any combination of the aforementioned and/or other elements or techniques can be utilized in alternate embodiments. Determining may be omitted where anticipating of a device's operation in visual surroundings is not implemented. Determining comprises any action or operation by or for a Decision-making Unit 540, Similarity Comparison 125, and/or other disclosed elements.

At step 6140, the one or more instruction sets for operating the device correlated with the first digital picture are executed. The executing may be performed in response to the aforementioned determining. The executing may be caused by VSADO Unit 100, Artificial Intelligence Unit 110, and/or other disclosed elements. An instruction set may be executed by a processor (i.e. Processor 11, etc.), application program (i.e. Application Program 18, etc.), logic circuit (i.e. Logic Circuit 250, etc.), and/or other processing element. An instruction set may be executed or acted upon by an actuator. Executing may include executing one or more alternate instruction sets instead of or prior to an instruction set that would have been executed in a regular course of execution. In some aspects, alternate instruction sets comprise one or more instruction sets for operating a device correlated with one or more digital pictures. In some embodiments, executing may include modifying a register or other element of a processor with one or more alternate instruction sets. Executing may also include redirecting a processor to one or more alternate instruction sets. In other embodiments, processor may be or comprises a logic circuit. Executing may include modifying an element of a logic circuit with one or more alternate instruction sets, redirecting the logic circuit to one or more alternate instruction sets, replacing the inputs into the logic circuit with one or more alternate inputs or instruction sets, and/or replacing the outputs from the logic circuit with one or more alternate outputs or instruction sets. In further embodiments, a processor may include an application including instruction sets for operating a device, the application running on the processor. In some aspects, executing includes executing one or more alternate instruction sets as part of the application. In other aspects, executing includes modifying the application. In further aspects, executing includes redirecting the application to one or more alternate instruction sets. In further aspects, executing includes modifying one or more instruction sets of the application. In further aspects, executing includes modifying the application's source code, bytecode, intermediate code, compiled code, interpreted code, translated code, runtime code, assembly code, machine code, or other code. In further aspects, executing includes modifying memory, processor register, storage, repository or other element where the application's instruction sets are stored or used. In further aspects, executing includes modifying instruction sets used for operating an object of the application. In further aspects, executing includes modifying an element of a processor, an element of a device, a virtual machine, a runtime engine, an operating system, an execution stack, a program counter, or a user input used in running the application. In further aspects, executing includes modifying the application at source code write time, compile time, interpretation time, translation time, linking time, loading time, runtime, or other time. In further aspects, executing includes modifying one or more of the application's lines of code, statements, instructions, functions, routines, subroutines, basic blocks, or other code segments. In further aspects, executing includes a manual, automatic, dynamic, just in time (JIT), or other instrumentation of the application. In further aspects, executing includes utilizing one or more of a .NET tool, .NET application programming interface (API), Java tool, Java API, operating system tool, independent tool or other tool for modifying the application. In further aspects, executing includes utilizing a dynamic, interpreted, scripting or other programming language. In further aspects, executing includes utilizing dynamic code, dynamic class loading, or reflection. In further aspects, executing includes utilizing assembly language. In further aspects, executing includes utilizing metaprogramming, self-modifying code, or an application modification tool. In further aspects, executing includes utilizing just in time (JIT) compiling, JIT interpretation, JIT translation, dynamic recompiling, or binary rewriting. In further aspects, executing includes utilizing dynamic expression creation, dynamic expression execution, dynamic function creation, or dynamic function execution. In further aspects, executing includes adding or inserting additional code into the application's code. In further aspects, executing includes modifying, removing, rewriting, or overwriting the application's code. In further aspects, executing includes branching, redirecting, extending, or hot swapping the application's code. Branching or redirecting an application's code may include inserting a branch, jump, or other means for redirecting the application's execution. Executing comprises any action or operation by or for a Processor 11, Application Program 18, Logic Circuit 250, Modification Interface 130, and/or other disclosed elements.

At step 6145, one or more operations defined by the one or more instruction sets for operating the device correlated with the first digital picture are performed by the device. The one or more operations may be performed in response to the aforementioned executing. An operation includes any operation that can be performed by, with, or on the device. An operation includes any operation that can be performed by, with, or on an actuator. In one example, an operation includes any operation (i.e. moving, maneuvering, collecting, unloading, lifting, screwing, gripping, etc.) with or by a computing enabled machine (i.e. Computing Enabled Machine 98*a*, etc.). In a further example, an operation includes any operation with or by a fixture (i.e. Fixture 98*b*, etc.). In a further example, an operation includes any operation (i.e. setting, starting, stopping, etc.) on or by a control device (i.e. Control Device 98*c*, etc.). In one example, an operation includes any operation on a smartphone (i.e. Smartphone 98*d*, etc.) or other mobile computer. In a further example, an operation includes any operation on or by a computer or computing enabled device. In a further example, an operation includes any motion or operation on or by an actuator. One of ordinary skill in art will recognize that, while all possible variations of operations on a device are too voluminous to list and limited only by the device's design and/or user's utilization, other operations are within the scope of this disclosure in various implementations.

Figure 32:
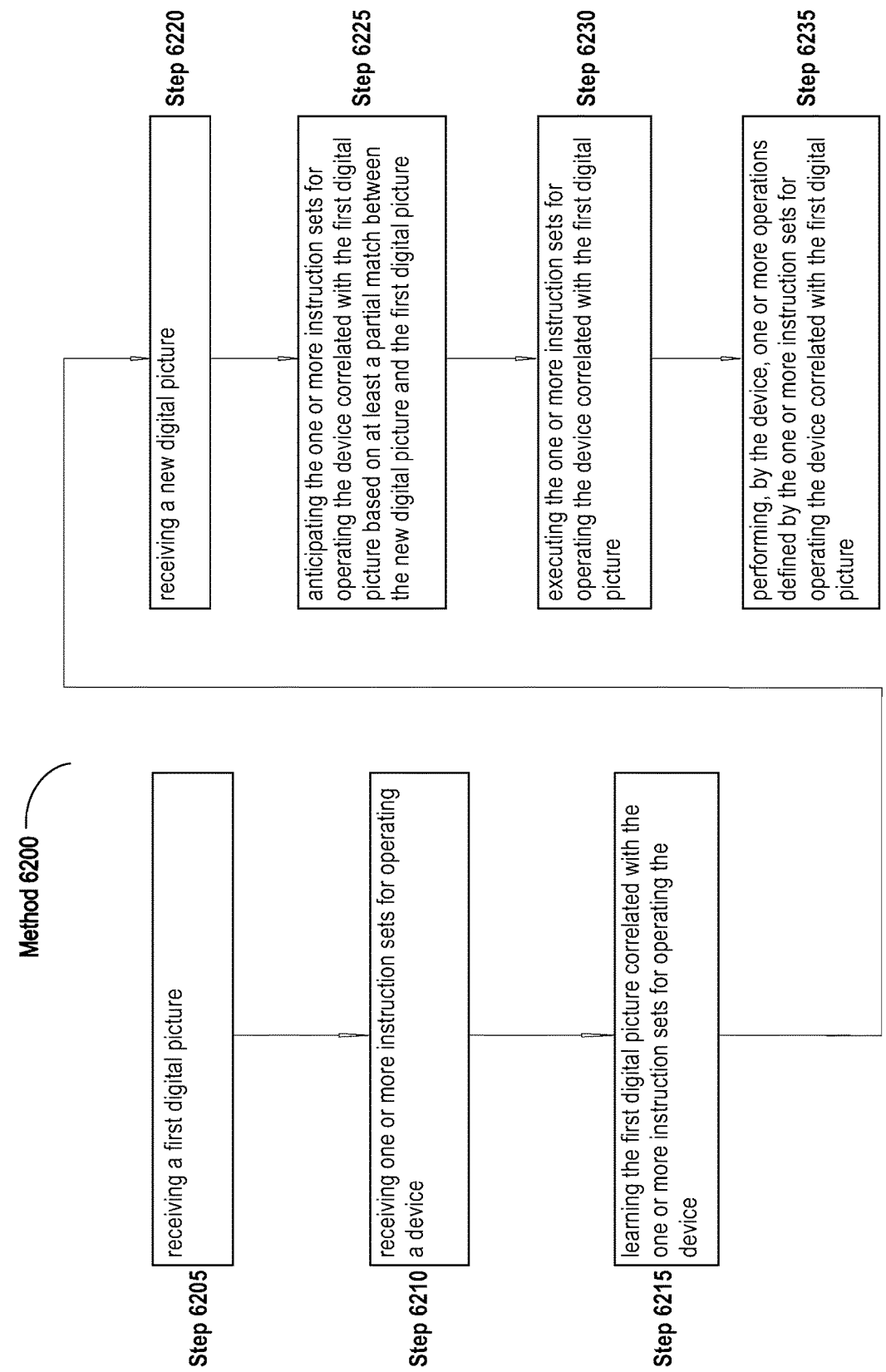
FIG. 32 illustrates a flow chart diagram of an embodiment of method 6200 for learning and/or using visual surrounding for autonomous device operation.

Referring to FIG. 32, the illustration shows an embodiment of a method 6200 for learning and/or using visual surrounding for autonomous device operation. The method can be used on a computing device or system to enable learning of a device's operation in various visual surroundings and enable autonomous device operation in similar visual surroundings. Method 6200 may include any action or operation of any of the disclosed methods such as method 6100, 6300, 6400, 6500, 6600, and/or others. Additional steps, actions, or operations can be included as needed, or some of the disclosed ones can be optionally omitted, or a different combination or order thereof can be implemented in alternate embodiments of method 6200.

At step 6205, a first digital picture is received. Step 6205 may include any action or operation described in Step 6105 of method 6100 as applicable.

At step 6210, one or more instruction sets for operating a device are received. Step 6210 may include any action or operation described in Step 6110 of method 6100 as applicable.

At step 6215, the first digital picture correlated with the one or more instruction sets for operating the device are learned. Step 6215 may include any action or operation described in Step 6115 and/or Step 6120 of method 6100 as applicable.

At step 6220, a new digital picture is received. Step 6220 may include any action or operation described in Step 6125 of method 6100 as applicable.

At step 6225, the one or more instruction sets for operating the device correlated with the first digital picture are anticipated based on at least a partial match between the new digital picture and the first digital picture. Step 6225 may include any action or operation described in Step 6130 and/or Step 6135 of method 6100 as applicable.

At step 6230, the one or more instruction sets for operating the device correlated with the first digital picture are executed. Step 6230 may include any action or operation described in Step 6140 of method 6100 as applicable.

At step 6235, one or more operations defined by the one or more instruction sets for operating the device correlated with the first digital picture are performed by the device. Step 6235 may include any action or operation described in Step 6145 of method 6100 as applicable.

Figure 33:
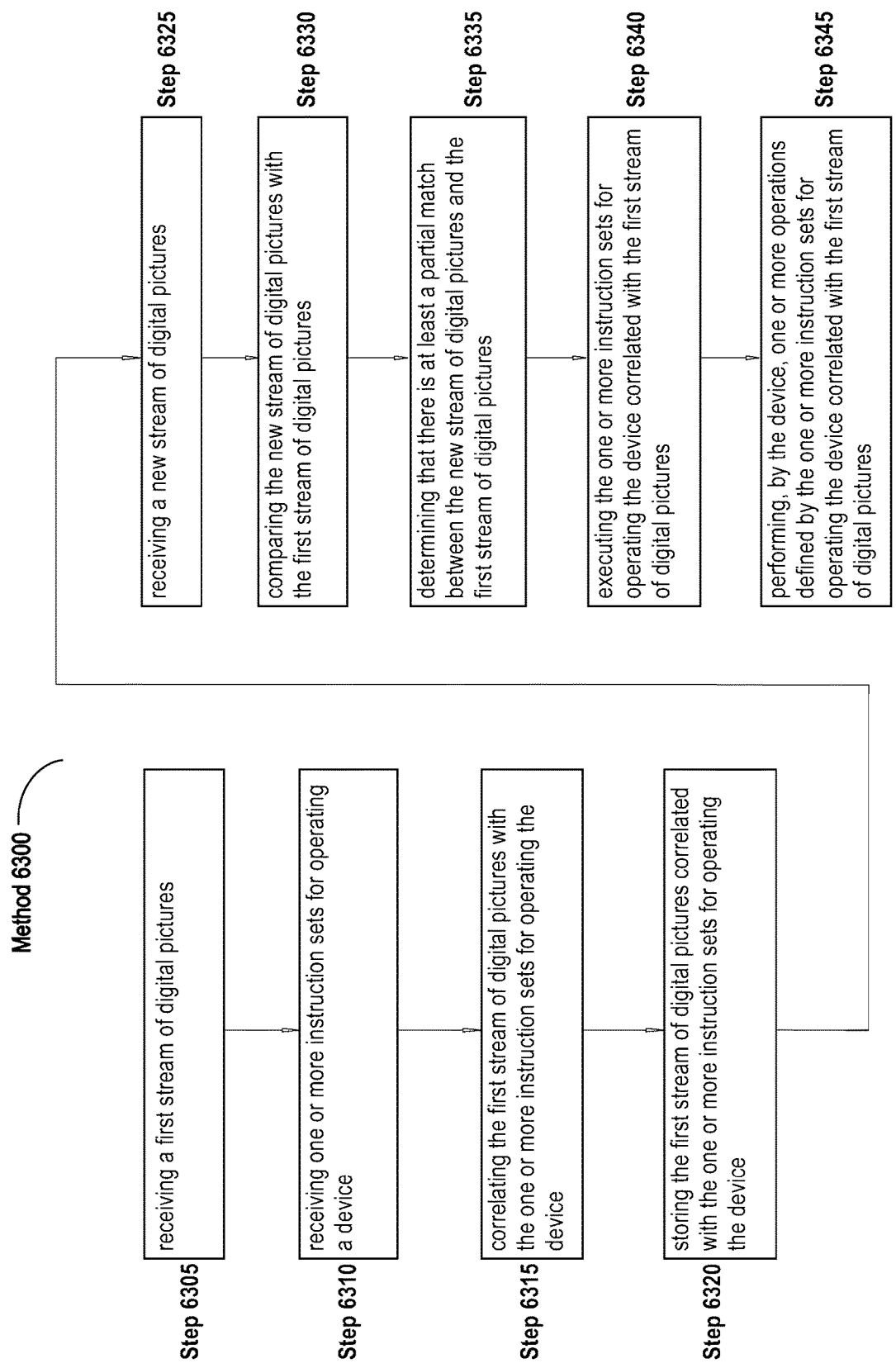
FIG. 33 illustrates a flow chart diagram of an embodiment of method 6300 for learning and/or using visual surrounding for autonomous device operation.

Referring to FIG. 33, the illustration shows an embodiment of a method 6300 for learning and/or using visual surrounding for autonomous device operation. The method can be used on a computing device or system to enable learning of a device's operation in various visual surroundings and enable autonomous device operation in similar visual surroundings. Method 6300 may include any action or operation of any of the disclosed methods such as method 6100, 6200, 6400, 6500, 6600, and/or others. Additional steps, actions, or operations can be included as needed, or some of the disclosed ones can be optionally omitted, or a different combination or order thereof can be implemented in alternate embodiments of method 6300.

At step 6305, a first stream of digital pictures is received. Step 6305 may include any action or operation described in Step 6105 of method 6100 as applicable.

At step 6310, one or more instruction sets for operating a device are received. Step 6310 may include any action or operation described in Step 6110 of method 6100 as applicable.

At step 6315, the first stream of digital pictures is correlated with the one or more instruction sets for operating the device. Step 6315 may include any action or operation described in Step 6115 of method 6100 as applicable.

At step 6320, the first stream of digital pictures correlated with the one or more instruction sets for operating the device is stored. Step 6320 may include any action or operation described in Step 6120 of method 6100 as applicable.

At step 6325, a new stream of digital pictures is received. Step 6325 may include any action or operation described in Step 6125 of method 6100 as applicable.

At step 6330, the new stream of digital pictures is compared with the first stream of digital pictures. Step 6330 may include any action or operation described in Step 6130 of method 6100 as applicable.

At step 6335, a determination is made that there is at least a partial match between the new stream of digital pictures and the first stream of digital pictures. Step 6335 may include any action or operation described in Step 6135 of method 6100 as applicable.

At step 6340, the one or more instruction sets for operating the device correlated with the first stream of digital pictures are executed. Step 6340 may include any action or operation described in Step 6140 of method 6100 as applicable.

At step 6345, one or more operations defined by the one or more instruction sets for operating the device correlated with the first stream of digital pictures are performed by the device. Step 6345 may include any action or operation described in Step 6145 of method 6100 as applicable.

Figure 34:
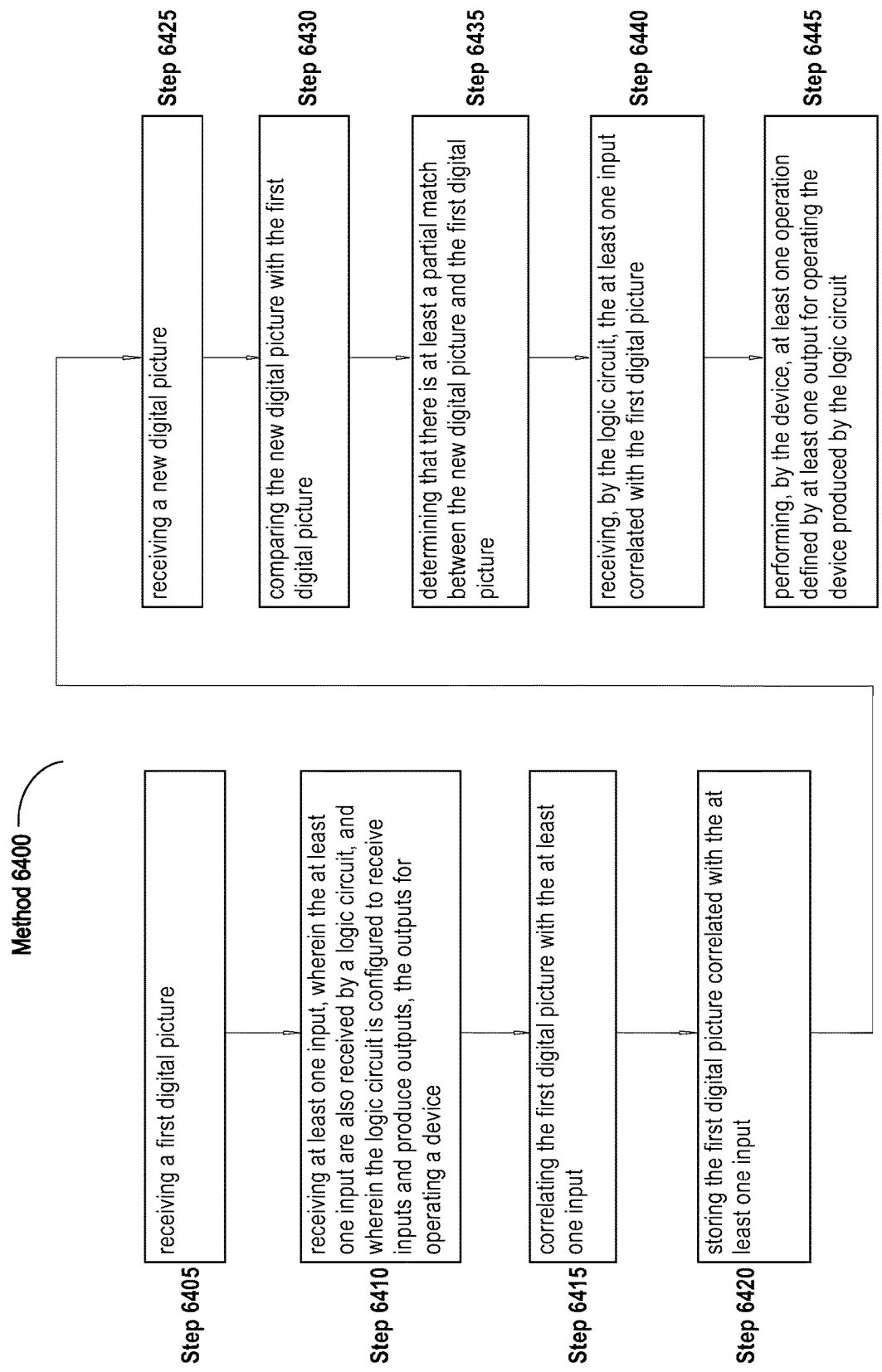
FIG. 34 illustrates a flow chart diagram of an embodiment of method 6400 for learning and/or using visual surrounding for autonomous device operation.

Referring to FIG. 34, the illustration shows an embodiment of a method 6400 for learning and/or using visual surrounding for autonomous device operation. The method can be used on a computing device or system to enable learning of a device's operation in various visual surroundings and enable autonomous device operation in similar visual surroundings. Method 6400 may include any action or operation of any of the disclosed methods such as method 6100, 6200, 6300, 6500, 6600, and/or others. Additional steps, actions, or operations can be included as needed, or some of the disclosed ones can be optionally omitted, or a different combination or order thereof can be implemented in alternate embodiments of method 6400.

At step 6405, a first digital picture is received. Step 6405 may include any action or operation described in Step 6105 of method 6100 as applicable.

At step 6410, at least one input are received, wherein the at least one input are also received by a logic circuit, and wherein the logic circuit is configured to receive inputs and produce outputs, the outputs for operating a device. Step 6410 may include any action or operation described in Step 6110 of method 6100 as applicable.

At step 6415, the first digital picture is correlated with the at least one input. Step 6415 may include any action or operation described in Step 6115 of method 6100 as applicable.

At step 6420, the first digital picture correlated with the at least one input is stored. Step 6420 may include any action or operation described in Step 6120 of method 6100 as applicable.

At step 6425, a new digital picture is received. Step 6425 may include any action or operation described in Step 6125 of method 6100 as applicable.

At step 6430, the new digital picture is compared with the first digital picture. Step 6430 may include any action or operation described in Step 6130 of method 6100 as applicable.

At step 6435, a determination is made that there is at least a partial match between the new digital picture and the first digital picture. Step 6435 may include any action or operation described in Step 6135 of method 6100 as applicable.

At step 6440, the at least one input correlated with the first digital picture are received by the logic circuit. Step 6440 may include any action or operation described in Step 6140 of method 6100 as applicable.

At step 6445, at least one operation defined by at least one output for operating the device produced by the logic circuit are performed by the device. Step 6445 may include any action or operation described in Step 6145 of method 6100 as applicable.

Figure 35:
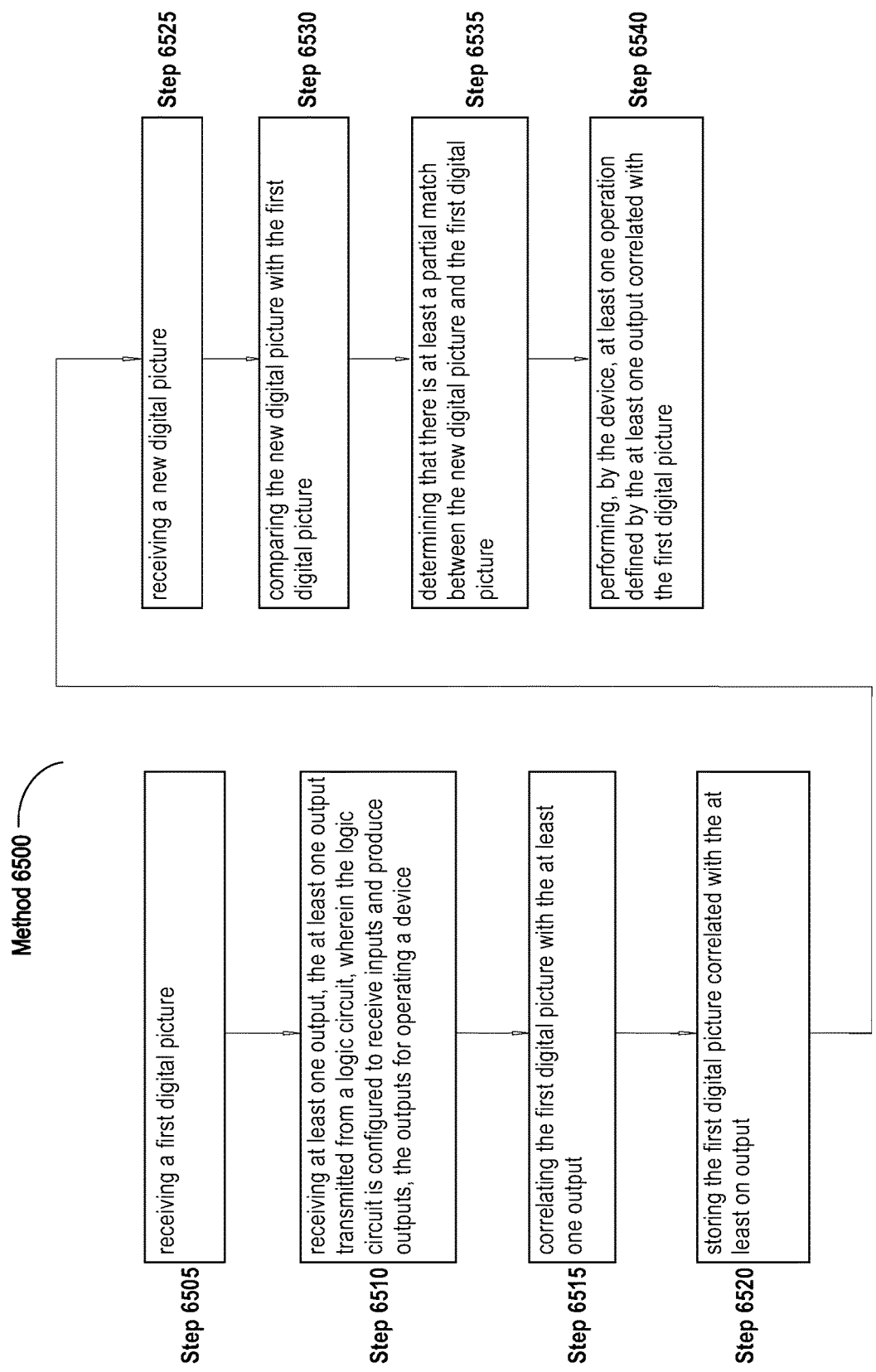
FIG. 35 illustrates a flow chart diagram of an embodiment of method 6500 for learning and/or using visual surrounding for autonomous device operation.

Referring to FIG. 35, the illustration shows an embodiment of a method 6500 for learning and/or using visual surrounding for autonomous device operation. The method can be used on a computing device or system to enable learning of a device's operation in various visual surroundings and enable autonomous device operation in similar visual surroundings. Method 6500 may include any action or operation of any of the disclosed methods such as method 6100, 6200, 6300, 6400, and/or others. Additional steps, actions, or operations can be included as needed, or some of the disclosed ones can be optionally omitted, or a different combination or order thereof can be implemented in alternate embodiments of method 6500.

At step 6505, a first digital picture is received. Step 6505 may include any action or operation described in Step 6105 of method 6100 as applicable.

At step 6510, at least one output are received, the at least one output transmitted from a logic circuit, wherein the logic circuit is configured to receive inputs and produce outputs, the outputs for operating a device. Step 6510 may include any action or operation described in Step 6110 of method 6100 as applicable.

At step 6515, the first digital picture is correlated with the at least one output. Step 6515 may include any action or operation described in Step 6115 of method 6100 as applicable.

At step 6520, the first digital picture correlated with the at least one output is stored. Step 6520 may include any action or operation described in Step 6120 of method 6100 as applicable.

At step 6525, a new digital picture is received. Step 6525 may include any action or operation described in Step 6125 of method 6100 as applicable.

At step 6530, the new digital picture is compared with the first digital picture. Step 6530 may include any action or operation described in Step 6130 of method 6100 as applicable.

At step 6535, a determination is made that there is at least a partial match between the new digital picture and the first digital picture. Step 6535 may include any action or operation described in Step 6135 of method 6100 as applicable.

At step 6540, at least one operation defined by the at least one output correlated with the first digital picture are performed by the device. Step 6540 may include any action or operation described in Step 6145 of method 6100 as applicable.

Figure 36:
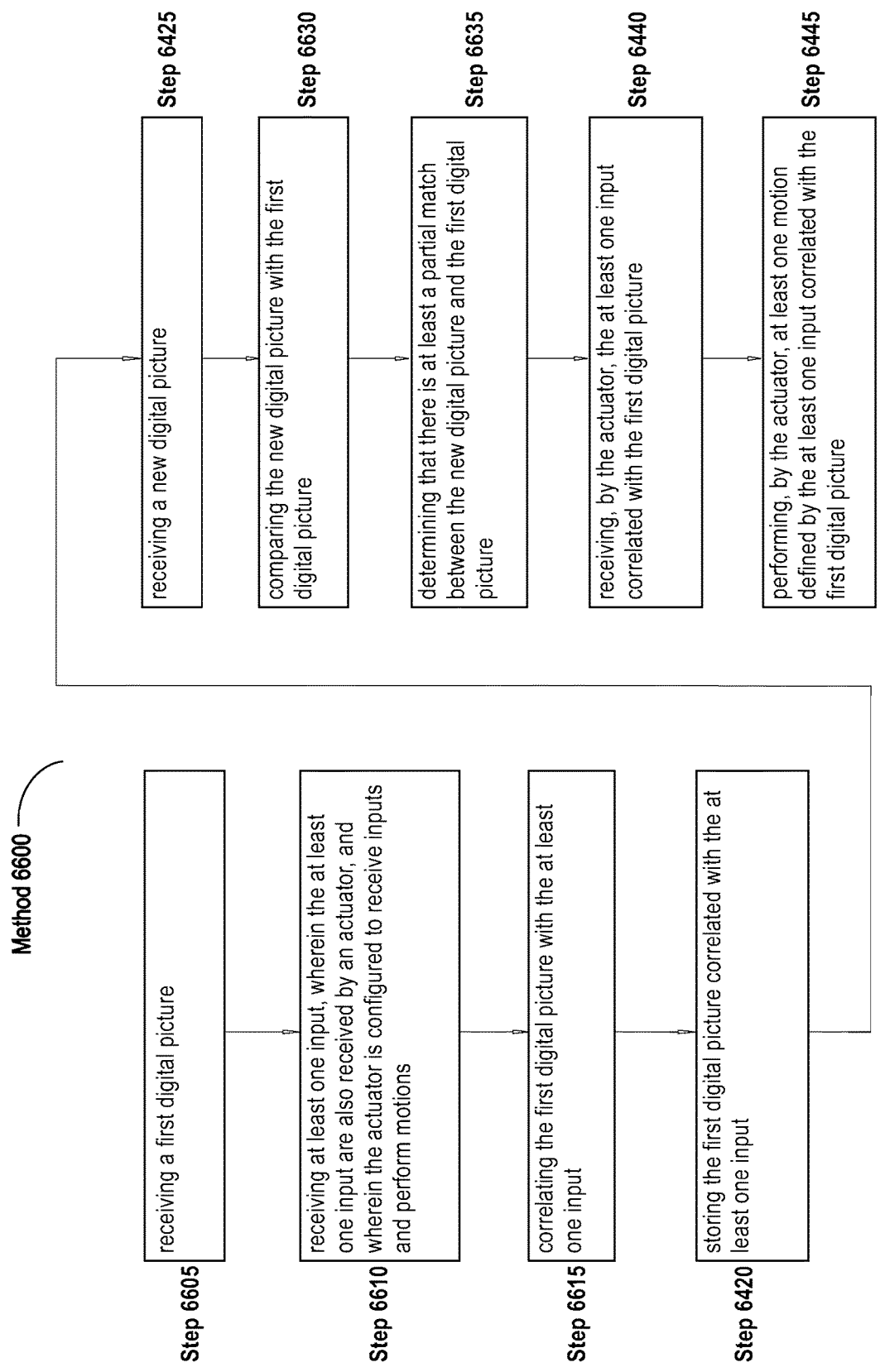
FIG. 36 illustrates a flow chart diagram of an embodiment of method 6600 for learning and/or using visual surrounding for autonomous device operation.

Referring to FIG. 36, the illustration shows an embodiment of a method 6600 for learning and/or using visual surrounding for autonomous device operation. The method can be used on a computing device or system to enable learning of a device's operation in various visual surroundings and enable autonomous device operation in similar visual surroundings. Method 6600 may include any action or operation of any of the disclosed methods such as method 6100, 6200, 6300, 6400, 6500, and/or others. Additional steps, actions, or operations can be included as needed, or some of the disclosed ones can be optionally omitted, or a different combination or order thereof can be implemented in alternate embodiments of method 6600.

At step 6605, a first digital picture is received. Step 6605 may include any action or operation described in Step 6105 of method 6100 as applicable.

At step 6610, at least one input are received, wherein the at least one input are also received by an actuator, and wherein the actuator is configured to receive inputs and perform motions. Step 6610 may include any action or operation described in Step 6110 of method 6100 as applicable.

At step 6615, the first digital picture is correlated with the at least one input. Step 6615 may include any action or operation described in Step 6115 of method 6100 as applicable.

At step 6620, the first digital picture correlated with the at least one input is stored. Step 6620 may include any action or operation described in Step 6120 of method 6100 as applicable.

At step 6625, a new digital picture is received. Step 6625 may include any action or operation described in Step 6125 of method 6100 as applicable.

At step 6630, the new digital picture is compared with the first digital picture. Step 6630 may include any action or operation described in Step 6130 of method 6100 as applicable.

At step 6635, a determination is made that there is at least a partial match between the new digital picture and the first digital picture. Step 6635 may include any action or operation described in Step 6135 of method 6100 as applicable.

At step 6640, the at least one input correlated with the first digital picture are received by the actuator. Step 6640 may include any action or operation described in Step 6140 of method 6100 as applicable.

At step 6645, at least one motion defined by the at least one input correlated with the first digital picture are performed by the actuator. Step 6645 may include any action or operation described in Step 6145 of method 6100 as applicable.

Figure 37:
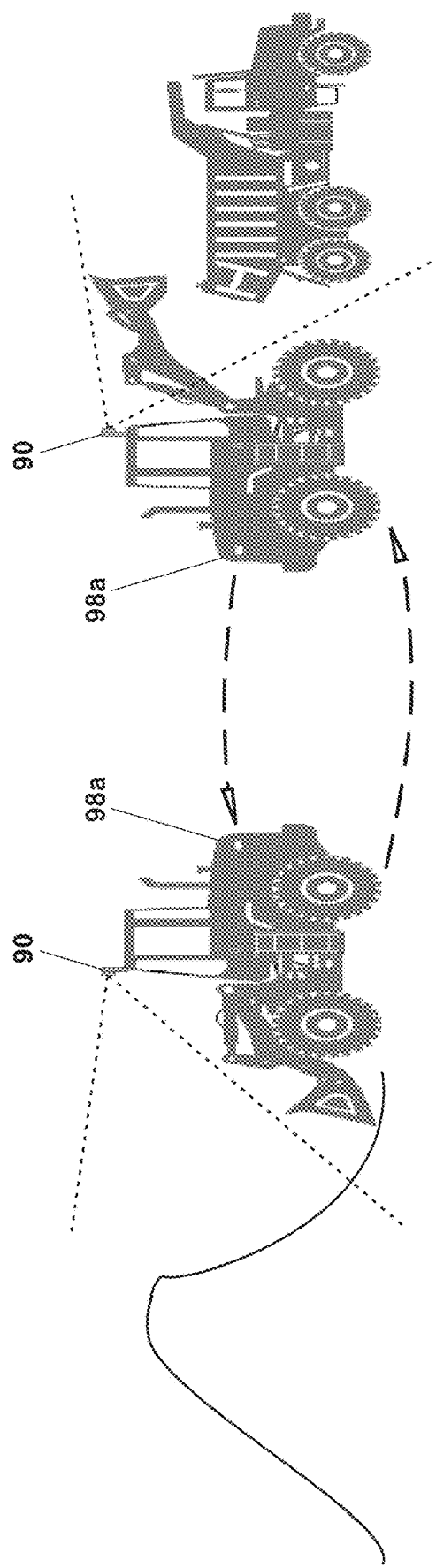

Referring to FIG. 37, in some exemplary embodiments, Device 98 may be or include a Computing-enabled Machine 98*a*. Examples of Computing-enabled Machine 98*a* comprise a loader, a bulldozer, an excavator, a crane, a forklift, a truck, an assembly machine, a material/object handling machine, a sorting machine, an industrial machine, a kitchen appliance, a robot, a tank, an airplane, a helicopter, a vessel, a submarine, a ground/aerial/aquatic vehicle, and/or other computing-enabled machine. In some aspects, Computing-enabled Machine 98*a* may itself include computing capabilities. In other aspects, computing capabilities may be included in a remote computing device (i.e. server, etc.) and provided to Computing-enabled Machine 98*a* (i.e. via a network, etc.). Computing-enabled Machine 98*a* may be operated by User 50 in person or remotely. Computing-enabled Machine 98*a* may include Picture Capturing Apparatus 90 such as a motion picture, still picture, or other camera that captures one or more Digital Pictures 525 of Computing-enabled Machine's 98*d* surrounding. Computing-enabled Machine 98*a* may also include or be controlled by Logic Circuit 250 (i.e. microcontroller, etc.), Processor 11 (i.e. including any Application Program 18 running thereon, etc.), and/or other processing element that receives User's 50 (i.e. operator's, etc.) operating directions and causes desired operations with Computing-enabled Machine 98*a* such as moving, maneuvering, collecting, unloading, pushing, digging, lifting, and/or other operations. User 50 can interact with Logic Circuit 250, Processor 11, Application Program 18, and/or other processing element through inputting operating directions (i.e. manipulating levers, pressing buttons, etc.) via Human-machine Interface 23 such as one or more levers or other input device. For instance, responsive to User's 50 manipulating one or more levers, Logic Circuit 250 or Processor 11 may cause Computing-enabled Machine's 98d arm with bucket to collect a load, one or more motors or other actuators to move or maneuver Computing-enabled Machine 98a, lifting system (i.e. hydraulic, pneumatic, mechanical, electrical, etc.) to lift a load, and/or arm with bucket to unload a load. Computing-enabled Machine 98a may also include or be coupled to VSADO Unit 100. VSADO Unit 100 may be embedded (i.e. integrated, etc.) into or coupled to Computing-enabled Machine's 98d Logic Circuit 250, Processor 11, and/or other processing element. VSADO Unit 100 may also be a program embedded (i.e. integrated, etc.) into or interfaced with Application Program 18 running on Processor 11 and/or other processing element. VSADO Unit 100 can obtain Instruction Sets 526 used or executed by Logic Circuit 250, Processor 11, Application Program 18, and/or other processing element. In some aspects, Instruction Sets 526 may include one or more inputs into or outputs from Computing-enabled Machine's 98d Logic Circuit 250 (i.e. microcontroller, etc.). In other aspects, Instruction Sets 526 may include one or more instruction sets from Computing-enabled Machine's 98d Processor's 11 registers or other components. In further aspects, Instruction Sets 526 may include one or more instruction sets used or executed in Application Program 18 running on Processor 11 and/or other processing element. VSADO Unit 100 may also optionally obtain any Extra Info 527 (i.e. time, location, computed, observed, sensory, and/or other information, etc.) related to Computing-enabled Machine's 98d operation. As User 50 operates Computing-enabled Machine 98a in various visual surroundings as shown, VSADO Unit 100 may learn Computing-enabled Machine's 98d operations in visual surroundings by correlating Digital Pictures 525 of Computing-enabled Machine's 98d surrounding with one or more Instruction Sets 526 used or executed by Logic Circuit 250, Processor 11, Application Program 18, and/or other processing element. Any Extra Info 527 related to Computing-enabled Machine's 98d operation may also optionally be correlated with Digital Pictures 525 of Computing-enabled Machine's 98d surrounding. VSADO Unit 100 may store this knowledge into Knowledgebase 530 (i.e. Neural Network 530a, Graph 530b, Collection of Sequences 530c, Sequence 533, Collection of Knowledge Cells 530d, etc.). In the future, VSADO Unit 110 may compare incoming Digital Pictures 525 of Computing-enabled Machine's 98d surrounding with previously learned Digital Pictures 525 including optionally using any Extra Info 527 for enhanced decision making. If substantially similar or at least a partial match is found or determined, the Instruction Sets 526 correlated with the previously learned Digital Pictures 525 can be autonomously executed by Logic Circuit 250, Processor 11, Application Program 18, and/or other processing element, thereby enabling autonomous operation of Computing-enabled Machine 98a in a similar visual surrounding as in a previously learned one. For instance, Computing-enabled Machine 98a (i.e. loader, etc.) comprising VSADO Unit 100 may learn User 50-directed collecting, moving, maneuvering, lifting, and/or unloading in a visual surrounding that includes a pile of material, truck, and/or other objects with which Computing-enabled Machine 98a may need to interact. In the future, when visual surrounding that includes same or similar objects is encountered, or when same or similar objects are detected, Computing-enabled Machine 98a may implement collecting, moving, maneuvering, lifting, and/or unloading autonomously.

Figure 38:
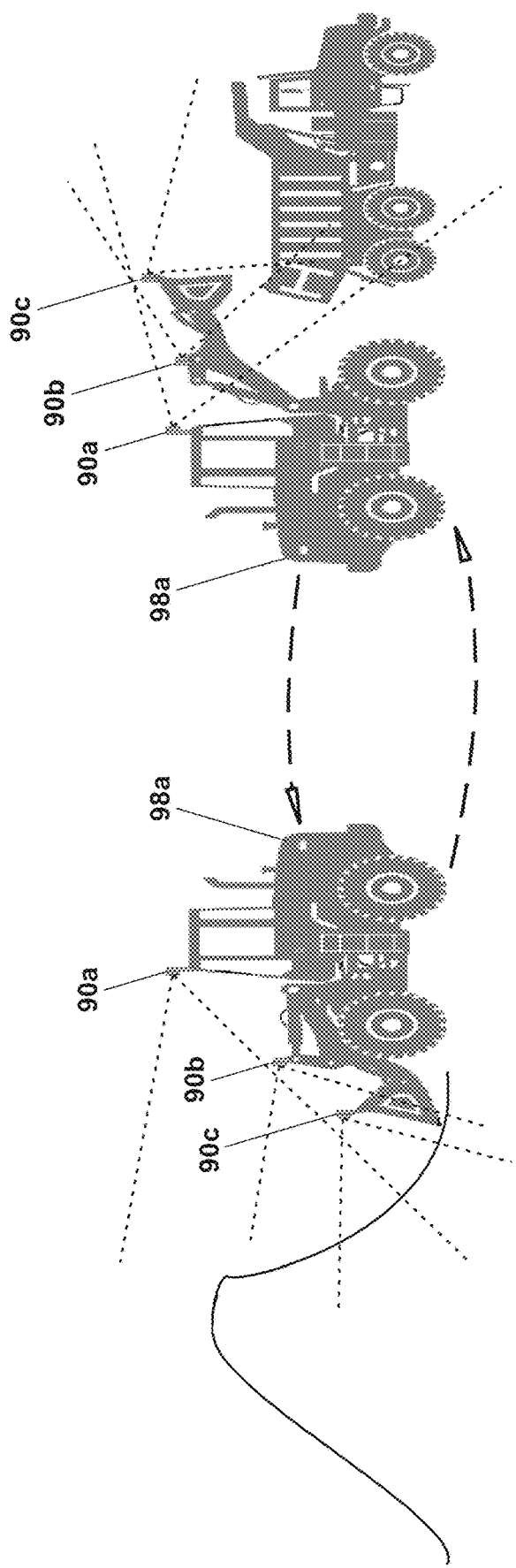
FIG. 38 illustrates an exemplary embodiment of Computing-enabled Machine 98a comprising or coupled to a plurality of Picture Capturing Apparatuses 90.

Referring to FIG. 38, in some exemplary embodiments, Device 98 may be or include a Computing-enabled Machine 98a comprising or coupled to a plurality of Picture Capturing Apparatuses 90. In one example, different Picture Capturing Apparatuses 90 may capture Digital Pictures 525 of different angles of Computing-enabled Machine's 98d front. In another example, different Picture Capturing Apparatuses 90 may capture Digital Pictures 525 of the front, sides, and/or back of Computing-enabled Machine 98a. In a further example as shown, different Picture Capturing Apparatuses 90 may be placed on different sub-devices, sub-systems, or elements of Computing-enabled Machine 98a. Specifically, for instance, Picture Capturing Apparatus 90a may be placed on the roof of Computing-enabled Machine 98a (i.e. loader, etc.), Picture Capturing Apparatus 90b may be placed on the arm of Computing-enabled Machine 98a, and Picture Capturing Apparatus 90c may be placed on the bucket of Computing-enabled Machine 98a. In some designs where multiple Picture Capturing Apparatuses 90 are utilized, as User 50 operates Computing-enabled Machine 98a in various visual surroundings, VSADO Unit 100 may learn Computing-enabled Machine's 98d operations in visual surroundings by correlating collective Digital Pictures 525 of Computing-enabled Machine's 98d surrounding from multiple Picture Capturing Apparatuses 90 with one or more Instruction Sets 526 used or executed by Logic Circuit 250, Processor 11, Application Program 18, and/or other processing element. In other designs where multiple Picture Capturing Apparatuses 90 are utilized, multiple VSADO Units 100 may also be utilized (i.e. one VSADO Unit 100 for each Picture Capturing Apparatus 90, etc.). In such designs, as User 50 operates Computing-enabled Machine 98a in various visual surroundings, VSADO Unit 100 may learn Computing-enabled Machine's 98d operations in visual surroundings by correlating Digital Pictures 525 of Computing-enabled Machine's 98d surrounding from Picture Capturing Apparatus 90 assigned to the VSADO Unit 100 with one or more Instruction Sets 526 used or executed by Logic Circuit 250, Processor 11, Application Program 18, and/or other processing element. Each sub-device, sub-system, or element can, therefore, perform its own learning and/or decision making in autonomous operation.

In some embodiments, Computing-enabled Machine 98a may include a plurality of Logic Circuits 250 (i.e. microcontrollers, etc.), Processors 11, Application Programs 18, and/or other processing elements. In some aspects, each processing element may control a sub-device, sub-system, or element of Computing-enabled Machine's 98d. For example, one Processor 11 (i.e. including any Application Programs 18 running thereon, etc.) may control the moving system (i.e. drivetrain, powertrain, etc.) of Computing-enabled Machine 98a (i.e. loader), one Logic Circuit 250 may control an arm of Computing-enabled Machine 98a, and a second Logic Circuit 250 may control a bucket of Computing-enabled Machine 98a. In some designs where multiple processing elements are utilized, as User 50 operates Computing-enabled Machine 98a in various visual surroundings, VSADO Unit 100 may learn Computing-enabled Machine's 98d operations in visual surroundings by correlating Digital Pictures 525 of Computing-enabled Machine's 98d surrounding with collective one or more Instruction Sets 526 used or executed by a plurality of Logic Circuits 250, Processors 11, Application Programs 18, and/ or other processing elements. In other designs where multiple processing elements are utilized, multiple VSADO Units 100 may also be utilized (i.e. one VSADO Unit 100 for each processing element, etc.). In such designs, as User 50 operates Computing-enabled Machine 98*a* in various visual surroundings, VSADO Unit 100 may learn Computing-enabled Machine's 98*d* operations in visual surroundings by correlating Digital Pictures 525 of Computing-enabled Machine's 98*d* surrounding with one or more Instruction Sets 526 used or executed by Logic Circuit 250, Processor 11, Application Program 18, and/or other processing element assigned to the VSADO Unit 100.

In some embodiments, Computing-enabled Machine 98*a* (i.e. loader, etc.) may be controlled by a combination of VSADO Unit 100 and other systems and/or techniques. In some aspects, Computing-enabled Machine 98*a* controlled by VSADO Unit 100 may encounter a visual surrounding that has not been encountered or learned before. In such situations, User 50 and/or non-VSADO system may take control of Computing-enabled Machine's 98*d* operation. VSADO Unit 100 may take control again when Computing-enabled Machine 98*a* encounters a previously learned visual surrounding. Naturally, VSADO Unit 100 can learn Computing-enabled Machine's 98*d* operation in visual surroundings while User 50 and/or non-VSADO system is in control of Device 98, thereby reducing or eliminating the need for future involvement of User 50 and/or non-VSADO system. In some implementations, one User 50 can control or assist in controlling multiple Computing-enabled Machines 98*d* comprising VSADO Units 100. For example, User 50 can control or assist in controlling a Computing-enabled Machine 98*a* that may encounter a visual surrounding that has not been encountered or learned before while the Computing-enabled Machines 98*d* operating in previously learned visual surroundings can operate autonomously. In other aspects, Computing-enabled Machine 98*a* may be primarily controlled by User 50 and/or non-VSADO system. User 50 and/or non-VSADO system can release control to VSADO Unit 100 for any reason (i.e. User 50 gets tired or distracted, non-VSADO system gets stuck or cannot make a decision, etc.), at which point Computing-enabled Machine 98*a* can be controlled by VSADO Unit 100. In further aspects, VSADO Unit 100 may take control in certain special visual surroundings where VSADO Unit 100 may offer superior performance even if User 50 and/or non-VSADO system may generally be preferred. Once Computing-enabled Machine 98*a* leaves such special visual surrounding, VSADO Unit 100 may release control to User 50 and/or non-VSADO system. In general, VSADO Unit 100 can take control from, share control with, or release control to User 50, non-VSADO system, and/or other system or process at any time, under any circumstances, and remain in control for any period of time as needed.

In some embodiments, VSADO Unit 100 may control one or more sub-devices, sub-systems, or elements of Computing-enabled Machine 98*a* (i.e. loader) while User 50 and/or non-VSADO system may control other one or more sub-devices, sub-systems, or elements of Computing-enabled Machine 98*a*. For example, User 50 and/or non-VSADO system may control the moving system (i.e. drivetrain, powertrain, etc.) of Computing-enabled Machine 98*a*, while VSADO Unit 100 may control an arm and bucket of Computing-enabled Machine 98*a*. Any other combination of controlling various sub-devices, sub-systems, or elements of Computing-enabled Machine 98*a* by VSADO Unit 100 and User 50 and/or non-VSADO system can be implemented.

One of ordinary skill in art will understand that the features, functionalities, and embodiments described with respect to Computing-enabled Machine 98*a* can similarly be implemented on any computing enabled machine such as a bulldozer, an excavator, a crane, a forklift, a truck, an assembly machine, a material/object handling machine, a sorting machine, an industrial machine, a kitchen appliance, a robot, a tank, an airplane, a helicopter, a vessel, a submarine, a ground/aerial/aquatic vehicle, and/or other computing-enabled machine.

Figure 39:
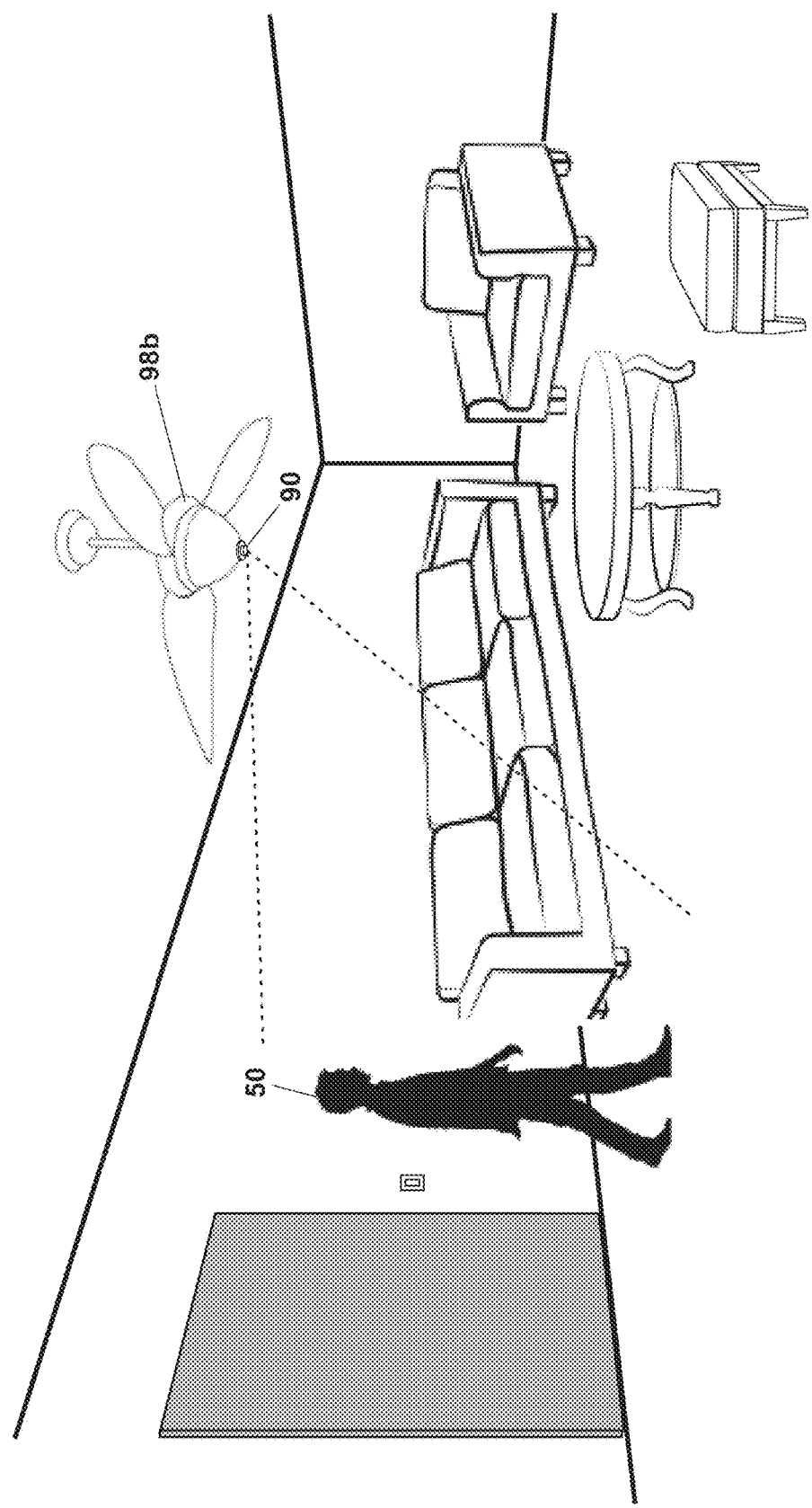
FIG. 39 illustrates an exemplary embodiment of Fixture 98b.

Referring to FIG. 39, in some exemplary embodiments, Device 98 may be or include a Fixture 98*b*. Examples of Fixture 98*b* comprise a fan, a light, automated blind, and/or other fixture. Fixture 98*b* may include Picture Capturing Apparatus 90 such as a motion picture, still picture, or other camera that captures one or more Digital Pictures 525 of Fixture's 98*b* surrounding. Fixture 98*b* may also include or be controlled by Logic Circuit 250 (i.e. microcontroller, etc.), Processor 11 (i.e. including any Application Program 18 running thereon, etc.), and/or other processing element that receives User's 50 operating directions and causes desired operations with Fixture 98*b* such as setting speed of a fan, adjusting intensity of a light, adjusting angle of an automated blind, and/or other operations. User 50 can interact with Logic Circuit 250, Processor 11, Application Program 18, and/or other processing element through inputting operating directions (i.e. pressing control buttons, switching switches, etc.) via Human-machine Interface 23 such as a controller, switch, or other input device. For instance, responsive to User's 50 pressing a control button, Logic Circuit 250 or Processor 11 may cause Fixture 98*b* to set a speed (i.e. in the case of a fan, etc.). Fixture 98*b* may also include or be coupled to VSADO Unit 100. VSADO Unit 100 may be embedded (i.e. integrated, etc.) into or coupled to Fixture's 98*b* Logic Circuit 250, Processor 11, and/or other processing element. VSADO Unit 100 may also be a program embedded (i.e. integrated, etc.) into or interfaced with Application Program 18 running on Processor 11 and/or other processing element. VSADO Unit 100 can obtain Instruction Sets 526 used or executed by Logic Circuit 250, Processor 11, Application Program 18, and/or other processing element. In some aspects, Instruction Sets 526 may include one or more inputs into or outputs from Fixture's 98*b* Logic Circuit 250 (i.e. microcontroller, etc.). In other aspects, Instruction Sets 526 may include one or more instruction sets from Fixture's 98*b* Processor's 11 registers or other components. In further aspects, Instruction Sets 526 may include one or more instruction sets used or executed in Application Program 18 running on Processor 11 and/or other processing element. VSADO Unit 100 may also optionally obtain any Extra Info 527 (i.e. time, location, computed, observed, sensory, and/or other information, etc.) related to Fixture's 98*b* operation. As User 50 operates Fixture 98*b* in a visual surrounding as shown, VSADO Unit 100 may learn Fixture's 98*b* operation in the visual surrounding by correlating Digital Pictures 525 of Fixture's 98*b* surrounding with one or more Instruction Sets 526 used or executed by Logic Circuit 250, Processor 11, Application Program 18, and/or other processing element. Any Extra Info 527 related to Fixture's 98*b* operation may also optionally be correlated with Digital Pictures 525 of Fixture's 98*b* surrounding. VSADO Unit 100 may store this knowledge into Knowledgebase 530 (i.e. Neural Network 530*a*, Graph 530*b*, Collection of Sequences 530*c*, Sequence 533, Collection of Knowledge Cells 530*d*, etc.). In the future, VSADO Unit 110 may compare incoming Digital Pictures 525 of Fixture's 98*b* surrounding with previously learned Digital Pictures 525 including optionally using any Extra Info 527 for enhanced decision making. If substantially similar or at least a partial match is found or determined, the Instruction Sets 526 correlated with the previously learned Digital Pictures 525 can be autonomously executed by Logic Circuit 250, Processor 11, Application Program 18, and/or other processing element, thereby enabling autonomous operation of Fixture 98*b* in a similar visual surrounding as in a previously learned one. For instance, Fixture 98*b* (i.e. ceiling fan, etc.) comprising VSADO Unit 100 may learn User's 50 setting speed of Fixture 98*b* in a visual surrounding that includes User 50 entering or being present in a room. In the future, when visual surrounding that includes User 50 entering or being present in the room, or when User 50 or his/her body part (i.e. face, etc.) is detected, Fixture 98*b* may implement setting of its speed autonomously. In some aspects, Fixture 98*b* comprising VSADO Unit 100 may engage autonomous operation (i.e. autonomous fan speed setting, etc.) if a specific person is detected by using facial recognition, thereby personalizing the operation of Fixture 98*b*. In other aspects, Fixture 98*b* may engage autonomous operation (i.e. autonomous fan speed setting, etc.) if any person is detected by using person or object recognition.

Figure 40:
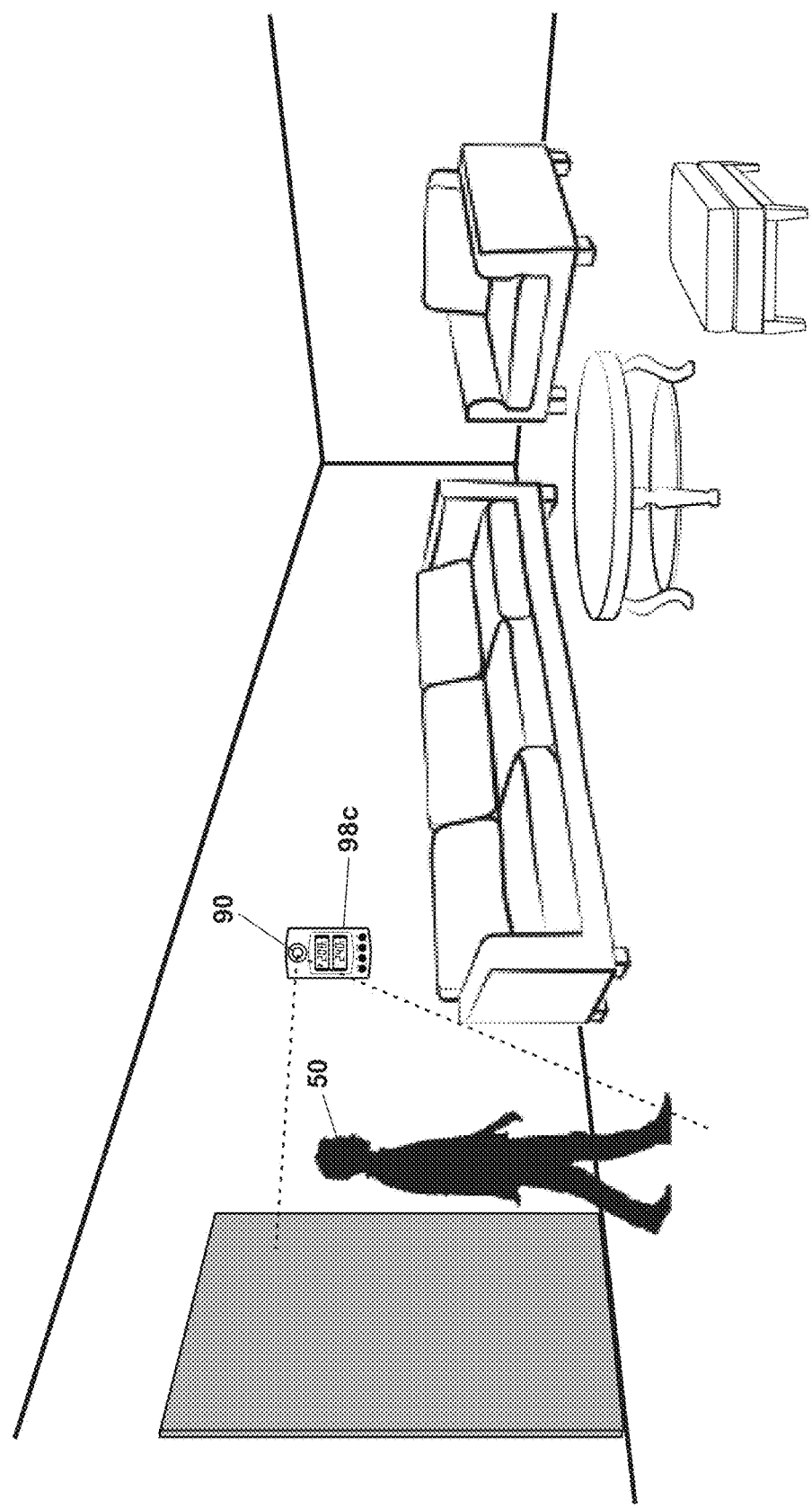
FIG. 40 illustrates an exemplary embodiment of Control Device 98c.

Referring to FIG. 40, in some exemplary embodiments, Device 98 may be or include a Control Device 98*c*. Examples of Control Device 98*c* comprise a thermostat, a control panel, a remote or other controller, and/or other control device. Control Device 98*c* may include Picture Capturing Apparatus 90 such as a motion picture, still picture, or other camera that captures one or more Digital Pictures 525 of Control Device's 98*c* surrounding. Control Device 98*c* may also include Logic Circuit 250 (i.e. microcontroller, etc.), Processor 11 (i.e. including any Application Program 18 running thereon, etc.), and/or other processing element that receives User's 50 operating directions and causes desired operations on a device or system controlled by Control Device 98*c* such as regulating temperature of an air conditioning system, and/or other operations. User 50 can interact with Logic Circuit 250, Processor 11, Application Program 18, and/or other processing element through inputting operating directions (i.e. pressing control buttons, etc.) via Human-machine Interface 23 such as a control panel or other input device. For instance, responsive to User's 50 pressing a control button, Logic Circuit 250 or Processor 11 may cause Control Device 98*c* to increase or decrease a temperature of an air conditioning system. Control Device 98*c* may also include or be coupled to VSADO Unit 100. VSADO Unit 100 may be embedded (i.e. integrated, etc.) into or coupled to Control Device's 98*c* Logic Circuit 250, Processor 11, and/or other processing element. VSADO Unit 100 may also be a program embedded (i.e. integrated, etc.) into or interfaced with Application Program 18 running on Processor 11 and/or other processing element. VSADO Unit 100 can obtain Instruction Sets 526 used or executed by Logic Circuit 250, Processor 11, Application Program 18, and/or other processing element. In some aspects, Instruction Sets 526 may include one or more inputs into or outputs from Control Device's 98*c* Logic Circuit 250 (i.e. microcontroller, etc.). In other aspects, Instruction Sets 526 may include one or more instruction sets from Control Device's 98*c* Processor's 11 registers or other components. In further aspects, Instruction Sets 526 may include one or more instruction sets used or executed in Application Program 18 running on Processor 11 and/or other processing element. VSADO Unit 100 may also optionally obtain any Extra Info 527 (i.e. time, location, computed, observed, sensory, and/or other information, etc.) related to Control Device's 98*c* operation. As User 50 operates Control Device 98*c* in a visual surrounding as shown, VSADO Unit 100 may learn Control Device's 98*c* operation in the visual surrounding by correlating Digital Pictures 525 of Control Device's 98*c* surrounding with one or more Instruction Sets 526 used or executed by Logic Circuit 250, Processor 11, Application Program 18, and/or other processing element. Any Extra Info 527 related to Control Device's 98*c* operation may also optionally be correlated with Digital Pictures 525 of Control Device's 98*c* surrounding. VSADO Unit 100 may store this knowledge into Knowledgebase 530 (i.e. Neural Network 530*a*, Graph 530*b*, Collection of Sequences 530*c*, Sequence 533, Collection of Knowledge Cells 530*d*, etc.). In the future, VSADO Unit 110 may compare incoming Digital Pictures 525 of Control Device's 98*c* surrounding with previously learned Digital Pictures 525 including optionally using any Extra Info 527 for enhanced decision making. If substantially similar or at least a partial match is found or determined, the Instruction Sets 526 correlated with the previously learned Digital Pictures 525 can be autonomously executed by Logic Circuit 250, Processor 11, Application Program 18, and/or other processing element, thereby enabling autonomous operation of Control Device 98*c* in a similar visual surrounding as in a previously learned one. For instance, Control Device 98*c* comprising VSADO Unit 100 may learn User's 50 setting temperature of an air conditioning system controlled by Control Device 98*c* in a visual surrounding that includes User 50 entering or being present in a room. In the future, when visual surrounding that includes User 50 entering or being present in the room, or when User 50 or his/her body part (i.e. face, etc.) is detected, Control Device 98*c* may implement setting temperature of the air conditioning system autonomously. In some aspects, Control Device 98*c* may engage autonomous operation (i.e. autonomous temperature setting of an air conditioning system, etc.) if a specific person is detected by using facial recognition, thereby personalizing the operation of Control Device 98*c*. In other aspects, Control Device 98*c* may engage autonomous operation (i.e. autonomous temperature setting of an air conditioning system, etc.) if any person is detected by using person or object recognition.

Figure 41:
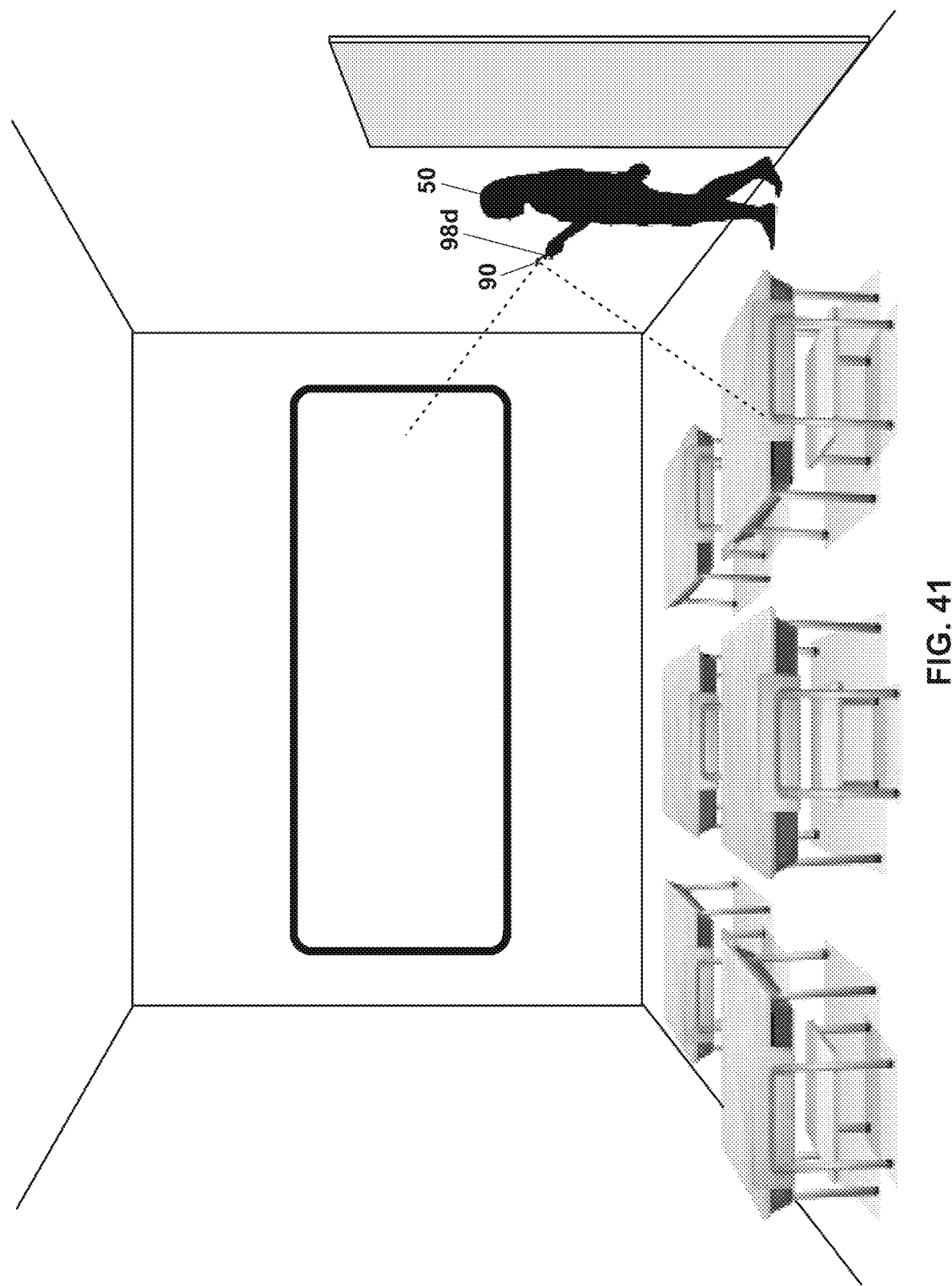
FIG. 41 illustrates an exemplary embodiment of Smartphone 98d.

Referring to FIG. 41, in some exemplary embodiments, Device 98 may be or include a Smartphone 98*d*. Examples of Smartphone 98*d* comprise Apple iPhone, Samsung Galaxy, Microsoft Lumia, and/or other smartphone. Smartphone 98*d* may include Picture Capturing Apparatus 90 such as a motion picture, still picture, or other camera that captures one or more Digital Pictures 525 of Smartphone's 98*a* surrounding. Smartphone 98*d* may include Processor 11 and one or more Application Programs 18 such as a phone control application that receives User's 50 operating directions and causes desired operations with Smartphone 98*d* such as making a call, ending a call, increasing volume, setting Smartphone 98*d* on vibrate mode, and/or other operations. User 50 can interact with Processor 11 and/or Application Program 18 through inputting operating directions (i.e. touching touchscreen elements, etc.) via Human-machine Interface 23 such as a touchscreen or other input device. For instance, responsive to User's 50 touching a touchscreen element, Processor 11 and/or Application Program 18 may cause Smartphone 98*d* to go into a vibrate mode. Smartphone 98*d* may also include or be coupled to VSADO Unit 100. VSADO Unit 100 may be embedded (i.e. integrated, etc.) into or coupled to Smartphone's 98*a* Processor 11 and/or other processing element. VSADO Unit 100 may also be a program embedded (i.e. integrated, etc.) into or interfaced with Application Program 18 running on Processor 11 and/or other processing element. VSADO Unit 100 can obtain Instruction Sets 526 used or executed by Processor 11, Application Program 18, and/or other processing element. In some aspects, Instruction Sets 526 may include one or more instruction sets used or executed in Application Program 18 running on Processor 11 and/or other processing element. In other aspects, Instruction Sets 526 may include one or more instruction sets from Smartphone's 98*a* Processor's 11 registers or other components. VSADO Unit 100 may also optionally obtain any Extra Info 527 (i.e. time, location, computed, observed, sensory, and/or other information, etc.) related to Smartphone's 98*a* operation. As User 50 operates Smartphone 98*d* in a visual surroundings as shown, VSADO Unit 100 may learn Smartphone's 98*a* operation in the visual surrounding by correlating Digital Pictures 525 of Smartphone's 98*a* surrounding with one or more Instruction Sets 526 used or executed by Processor 11, Application Program 18, and/or other processing element. Any Extra Info 527 related to Smartphone's 98*a* operation may also optionally be correlated with Digital Pictures 525 of Smartphone's 98*a* surrounding. VSADO Unit 100 may store this knowledge into Knowledgebase 530 (i.e. Neural Network 530*a*, Graph 530*b*, Collection of Sequences 530*c*, Sequence 533, Collection of Knowledge Cells 530*d*, etc.). In the future, VSADO Unit 110 may compare incoming Digital Pictures 525 of Smartphone's 98*a* surrounding with previously learned Digital Pictures 525 including optionally using any Extra Info 527 for enhanced decision making. If substantially similar or at least a partial match is found or determined, the Instruction Sets 526 correlated with the previously learned Digital Pictures 525 can be autonomously executed by Processor 11, Application Program 18, and/or other processing element, thereby enabling autonomous operation of Smartphone 98*d* in a similar visual surrounding as in a previously learned one. For instance, Smartphone 98*d* comprising VSADO Unit 100 may learn User's 50 setting of Smartphone 98*d* on vibrate mode in a visual surrounding that includes a classroom. In the future, when visual surrounding that includes a classroom is encountered, or when classroom is detected, Smartphone 98*d* may implement vibrate setting autonomously. In some aspects, similar functionality can be utilized in visual surroundings that include a house of worship, cemetery, and/or others.

In some embodiments, VSADO Unit 100 can be used to enable Smartphone 98*d*, computer, and/or application to learn User's 50 movements for interacting with or controlling Smartphone 98*d*, computer, and/or application. In one example, while viewing a web page in a web browser running on Smartphone 98*d*, User 50 may perform a head nod during or after which User 50 may scroll down the web page. Smartphone 98*d* comprising VSADO Unit 100 may learn User's 50 scrolling of a web page in a visual surrounding that includes User 50 performing a head nod. In the future, when visual surrounding that includes User 50 performing a head nod is encountered or detected, Smartphone 98*d* may implement scrolling of a web page in a web browser autonomously. In another example, while operating a user controllable object (i.e. avatar, etc.) in a computer game running on Smartphone 98*d*, User 50 may lean right during or after which User 50 may direct the user controllable object to turn or steer right. Smartphone 98*d* comprising VSADO Unit 100 may learn User's 50 directing the user controllable object to turn or steer right in a visual surrounding that includes User 50 leaning right. In the future, when visual surrounding that includes User 50 leaning right is encountered or detected, Smartphone 98*d* may implement directing the user controllable object to turn or steer right in a computer game autonomously. Therefore, VSADO Unit 100 can spontaneously learn both User's 50 movements and Instruction Sets 526 implementing an operation without User 50 needing to program, manually designate, or otherwise assign the movements to Instruction Sets 526 implementing the operation. Such functionality enables learning of User 50-chosen movements and User 50-chosen operations seamlessly as User 50 operates a device, application, and/or object thereof in real life situations without the need for special training sessions. Any User's 50 movements can be utilized examples of which include moving head, moving facial parts (i.e. eyes, lips, etc.), moving shoulders, moving hands, moving hand parts (i.e. fingers, etc.), moving body, moving body parts (i.e. arms, legs, etc.), and/or others. Any of the functionalities described with respect to Smartphone 98*d* similarly apply to any computer or computing enabled device.

It must be noted that as used herein and in the appended claims, the singular forms "a", "an", and "the" include plural referents unless the context clearly dictates otherwise.

A number of embodiments have been described herein. While this disclosure contains many specific implementation details, these should not be construed as limitations on the scope of any inventions or of what may be claimed, but rather as descriptions of features specific to particular embodiments. It should be understood that various modifications can be made without departing from the spirit and scope of the invention. The logic flows depicted in the figures do not require the particular order shown, or sequential order, to achieve desirable results. In addition, other or additional steps, elements, or connections can be included, or some of the steps, elements, or connections can be eliminated, or a combination thereof can be utilized in the described flows, illustrations, or descriptions. Further, the various aspects of the disclosed devices, apparatuses, systems, and/or methods can be combined in whole or in part with each other to produce additional implementations. Moreover, separation of various components in the embodiments described herein should not be understood as requiring such separation in all embodiments, and it should be understood that the described components can generally be integrated together in a single software product or packaged into multiple software products. Accordingly, other embodiments are within the scope of the following claims.

The invention claimed is:

1. A system comprising:
one or more non-transitory machine readable media storing machine readable code that, when executed, causes at least:
receiving or generating one or more digital pictures, wherein the one or more digital pictures depict at least a portion of a first device's surrounding;
receiving or generating one or more instruction sets for operating the first device; and
learning that includes: inputting at least a portion of the one or more digital pictures into one or more inputs of a knowledgebase, and applying the one or more instruction sets for operating the first device to one or more outputs of the knowledgebase, and wherein the one or more inputs are correlated with the one or more outputs.

2. The system of claim 1, wherein the one or more outputs include the one or more instruction sets for operating the first device, and wherein the machine readable code, when executed, further causes at least:

receiving or generating a new one or more digital pictures;

determining the one or more instruction sets for operating the first device at least by: inputting at least a portion of the new one or more digital pictures into the one or more inputs, and using a correlation between the one or more inputs and the one or more instruction sets for operating the first device; and at least in response to the determining, causing the first device or a second device to perform one or more operations defined by the one or more instruction sets for operating the first device.

3. The system of claim 2, wherein the learning further includes learning at least a portion of the one or more instruction sets for operating the first device.

4. The system of claim 2, wherein the learning further includes learning at least an information related to the one or more instruction sets for operating the first device, and wherein the information includes a weight.

5. The system of claim 2, wherein the learning further includes learning the correlation between the one or more inputs and the one or more instruction sets for operating the first device.

6. The system of claim 2, wherein the learning further includes learning an information related to the correlation between the one or more inputs and the one or more instruction sets for operating the first device, and wherein the information includes a weight.

7. The system of claim 2, wherein the learning further includes operating the first device at least partially by a user.

8. The system of claim 2, wherein the new one or more digital pictures depict at least a portion of the first device's surrounding, and wherein the first device is caused to perform the one or more operations defined by the one or more instruction sets for operating the first device.

9. The system of claim 8, wherein the one or more instruction sets for operating the first device are applied to the first device.

10. The system of claim 2, wherein the new one or more digital pictures depict at least a portion of the second device's surrounding, and wherein the second device is caused to perform the one or more operations defined by the one or more instruction sets for operating the first device.

11. The system of claim 10, wherein the one or more instruction sets for operating the first device are applied to the second device.

12. The system of claim 2, wherein the one or more outputs further include another one or more instruction sets for operating the first device, and wherein at least a portion of the one or more instruction sets for operating the first device or at least an information related to the one or more instruction sets for operating the first device is learned in a learning process that includes operating the first device at least partially by a user, and wherein at least a portion of the another one or more instruction sets for operating the first device or at least an information related to the another one or more instruction sets for operating the first device is learned in another learning process that includes operating the first device at least partially by the user.

13. The system of claim 2, wherein the one or more outputs further include another one or more instruction sets for operating the first device, and wherein at least a portion of the one or more instruction sets for operating the first device or at least an information related to the one or more instruction sets for operating the first device is learned in a learning process that includes operating the first device at least partially by a user, and wherein at least a portion of the another one or more instruction sets for operating the first device or at least an information related to the another one or more instruction sets for operating the first device is learned in another learning process that includes operating the first device at least partially by another user.

14. The system of claim 2, wherein the one or more outputs further include another one or more instruction sets for operating a third device, and wherein at least a portion of the one or more instruction sets for operating the first device or at least an information related to the one or more instruction sets for operating the first device is learned in a learning process that includes operating the first device at least partially by a user, and wherein at least a portion of the another one or more instruction sets for operating the third device or at least an information related to the another one or more instruction sets for operating the third device is learned in another learning process that includes operating the third device at least partially by the user.

15. The system of claim 2, wherein the one or more outputs further include another one or more instruction sets for operating a third device, and wherein at least a portion of the one or more instruction sets for operating the first device or at least an information related to the one or more instruction sets for operating the first device is learned in a learning process that includes operating the first device at least partially by a user, and wherein at least a portion of the another one or more instruction sets for operating the third device or at least an information related to the another one or more instruction sets for operating the third device is learned in another learning process that includes operating the third device at least partially by another user.

16. The system of claim 2, wherein the one or more outputs further include another one or more instruction sets for operating a third device.

17. The system of claim 2, wherein the one or more outputs further include another one or more instruction sets for operating a third device, and wherein the machine readable code, when executed, further causes at least:

receiving or generating another one or more digital pictures, wherein the another one or more digital pictures depict at least a portion of a fourth device's surrounding;

determining the another one or more instruction sets for operating the third device at least by: inputting at least a portion of the another one or more digital pictures into the one or more inputs, and using a correlation between the one or more inputs and the another one or more instruction sets for operating the third device; and at least in response to the determining the another one or more instruction sets for operating the third device, causing the fourth device to perform one or more operations defined by the another one or more instruction sets for operating the third device.

18. The system of claim 2, wherein the new one or more digital pictures depict: at least a portion of the first device's surrounding, or at least a portion of the second device's surrounding.

19. The system of claim 2, wherein the new one or more digital pictures depict: at least a portion of the first device, or at least a portion of the second device.

20. The system of claim 2, wherein the machine readable code, when executed, further causes at least:

modifying: the one or more instruction sets for operating the first device, or a copy of the one or more instruction sets for operating the first device, wherein the applying the one or more instruction sets for operating the first device to the one or more outputs of the knowledgebase includes: applying the modified the one or more instruction sets for operating the first device to the one or more outputs of the knowledgebase, or applying the modified the copy of the one or more instruction sets for operating the first device to the one or more outputs of the knowledgebase, and wherein the one or more instruction sets for operating the first device included in the one or more outputs include: the modified the one or more instruction sets for operating the first device, or the modified the copy of the one or more instruction sets for operating the first device, and wherein the determining the one or more instruction sets for operating the first device at least by: the inputting the at least the portion of the new one or more digital pictures into the one or more inputs, and using the correlation between the one or more inputs and the one or more instruction sets for operating the first device includes:

determining the modified the one or more instruction sets for operating the first device at least by: the inputting the at least the portion of the new one or more digital pictures into the one or more inputs, and using the correlation between the one or more inputs and the modified the one or more instruction sets for operating the first device, or determining the modified the copy of the one or more instruction sets for operating the first device at least by: the inputting the at least the portion of the new one or more digital pictures into the one or more inputs, and using the correlation between the one or more inputs and the modified the copy of the one or more instruction sets for operating the first device, and wherein the causing the first device or the second device to perform the one or more operations defined by the one or more instruction sets for operating the first device includes: causing the first device or the second device to perform one or more operations defined by the modified the one or more instruction sets for operating the first device, or causing the first device or the second device to perform one or more operations defined by the modified the copy of the one or more instruction sets for operating the first device.

21. The system of claim 2, wherein the machine readable code, when executed, further causes at least:

modifying: the one or more instruction sets for operating the first device, or a copy of the one or more instruction sets for operating the first device, wherein the determining the one or more instruction sets for operating the first device at least by: the inputting the at least the portion of the new one or more digital pictures into the one or more inputs, and using the correlation between the one or more inputs and the one or more instruction sets for operating the first device includes:

determining the modified the one or more instruction sets for operating the first device at least by: the inputting the at least the portion of the new one or more digital pictures into the one or more inputs, and using the correlation between the one or more inputs and the modified the one or more instruction sets for operating the first device, or determining the modified the copy of the one or more instruction sets for operating the first device at least by: the inputting the at least the portion of the new one or more digital pictures into the one or more inputs, and using a correlation between the one or more inputs and the modified the copy of the one or more instruction sets for operating the first device, and wherein the causing the first device or the second device to perform the one or more operations defined by the one or more instruction sets for operating the first device includes: causing the first device or the second device to perform one or more operations defined by the modified the one or more instruction sets for operating the first device, or causing the first device or the second device to perform one or more operations defined by the modified the copy of the one or more instruction sets for operating the first device.

22. The system of claim 2, wherein the machine readable code, when executed, further causes at least:

modifying: the one or more instruction sets for operating the first device, or a copy of the one or more instruction sets for operating the first device, wherein the causing the first device or the second device to perform the one or more operations defined by the one or more instruction sets for operating the first device includes: causing the first device or the second device to perform one or more operations defined by the modified the one or more instruction sets for operating the first device, or causing the first device or the second device to perform one or more operations defined by the modified the copy of the one or more instruction sets for operating the first device.

23. The system of claim 2, wherein the machine readable code, when executed, further causes at least:

modifying: the one or more digital pictures, or a copy of the one or more digital pictures, and wherein the inputting the at least the portion of the one or more digital pictures into the one or more inputs includes: inputting at least a portion of the modified the one or more digital pictures into the one or more inputs, or inputting at least a portion of the modified the copy of the one or more digital pictures into the one or more inputs.

24. The system of claim 2, wherein the machine readable code, when executed, further causes at least:

modifying: the new one or more digital pictures, or a copy of the new one or more digital pictures, and wherein the inputting the at least the portion of the new one or more digital pictures into the one or more inputs includes: inputting at least a portion of the modified the new one or more digital pictures into the one or more inputs, or inputting at least a portion of the modified the copy of the new one or more digital pictures into the one or more inputs.

25. The system of claim 2, wherein the system further comprising:

a server that receives from the first device the one or more instruction sets for operating the first device, and wherein the second device receives from the server the one or more instruction sets for operating the first device, and wherein the second device is caused to perform the one or more operations defined by the one or more instruction sets for operating the first device.

26. The system of claim 2, wherein the system further comprising:

a server that receives from the first device at least a portion of the knowledgebase, and wherein the second device receives from the server the at least the portion of the knowledgebase, and wherein the second device is caused to perform the one or more operations defined by the one or more instruction sets for operating the first device.

27. The system of claim 2, wherein the knowledgebase is a neural network.

28. The system of claim 2, wherein the knowledgebase includes an artificial intelligence system.

29. The system of claim 2, wherein the one or more inputs are correlated with the one or more instruction sets for operating the first device using the correlation between the one or more inputs and the one or more instruction sets for operating the first device.

30. The system of claim 2, wherein the one or more inputs are correlated with the one or more instruction sets for operating the first device using at least one or more connections between the one or more inputs and the one or more instruction sets for operating the first device, and wherein the using the correlation between the one or more inputs and the one or more instruction sets for operating the first device includes using at least one connection of the one or more connections.

31. The system of claim 2, wherein the one or more inputs are one or more input nodes, and wherein the one or more outputs are one or more output nodes.

32. The system of claim 2, wherein the learning further includes:
adjusting one or more weights between the one or more inputs and the one or more outputs.

33. The system of claim 2, wherein the learning further includes:
back-propagating information from the one or more outputs to the one or more inputs.

34. The system of claim 2, wherein the applying the one or more instruction sets for operating the first device to the one or more outputs of the knowledgebase includes adding the one or more instruction sets for operating the first device to the one or more outputs of the knowledgebase.

35. The system of claim 2, wherein the applying the one or more instruction sets for operating the first device to the one or more outputs of the knowledgebase includes comparing the one or more instruction sets for operating the first device with one or more instruction sets included in the one or more outputs.

36. The system of claim 2, wherein the determining the one or more instruction sets for operating the first device is further performed at least by:
receiving the one or more instruction sets for operating the first device from the one or more outputs.

37. The system of claim 2, wherein the one or more digital pictures depict at least a portion of the first device.

38. The system of claim 2, wherein the one or more instruction sets for operating the first device include one or more information about one or more states of: the first device, or a portion of the first device.

39. The system of claim 2, wherein the one or more instruction sets for operating the first device include one or more representations of another one or more instruction sets for operating the first device.

40. The system of claim 2, wherein the one or more instruction sets for operating the first device are further for operating at least a third device.

41. The system of claim 2, wherein the new one or more digital pictures depict: at least a portion of the first device's surrounding at a time, a representation of at least a portion of the first device's surrounding at a time, at least a portion of the second device's surrounding at a time, or a representation of at least a portion of the second device's surrounding at a time.

42. The system of claim 2, wherein the new one or more digital pictures depict: at least a portion of the first device's surrounding during a time period, a representation of at least a portion of the first device's surrounding during a time period, at least a portion of the second device's surrounding during a time period, or a representation of at least a portion of the second device's surrounding during a time period.

43. The system of claim 2, wherein the inputting the at least the portion of the one or more digital pictures into the one or more inputs of the knowledgebase includes inputting at least an object detected in the one or more digital pictures into the one or more inputs of the knowledgebase, and wherein the inputting the at least the portion of the new one or more digital pictures into the one or more inputs includes inputting at least an object detected in the new one or more digital pictures into the one or more inputs.

44. The system of claim 2, wherein the causing the first device or the second device to perform the one or more operations defined by the one or more instruction sets for operating the first device includes causing the first device or the second device to autonomously perform the one or more operations defined by the one or more instruction sets for operating the first device.

45. The system of claim 2, wherein the first device is a simulated device in a simulation application, and wherein the one or more digital pictures are received from or generated by the simulation application, and wherein the one or more instruction sets for operating the first device are received from or generated by the simulation application.

46. The system of claim 2, wherein at least some parts of the system are included in: a single device, or multiple devices, and wherein the first device includes a robot, a vehicle, an appliance, a fixture, a control device, a smartphone, an electronic device, or a computing-enabled machine, and wherein the second device includes a robot, a vehicle, an appliance, a fixture, a control device, a smartphone, an electronic device, or a computing-enabled machine, and wherein the one or more digital pictures include: one or more still digital pictures, or one or more motion digital pictures, and wherein the new one or more digital pictures include: one or more still digital pictures, or one or more motion digital pictures, and wherein an instruction set of the one or more instruction sets for operating the first device includes at least one of: only one instruction, multiple instructions, one or more commands, one or more keywords, one or more symbols, one or more operators, one or more variables, one or more parameters, one or more characters, one or more numbers, one or more values, one or more signals, one or more binary bits, one or more functions, one or more function references, one or more objects, one or more object references, one or more data structures, one or more data structure references, one or more states, one or more representations of one or more states, one or more inputs, one or more representations of one or more inputs, one or more codes, one or more data, or one or more information.

47. The system of claim 2, wherein the first device is a first robot, and wherein the second device is a second robot.

48. The system of claim 2, wherein the first device is a first vehicle, and wherein the second device is a second vehicle.

49. The system of claim 2, wherein the first device is a first appliance, and wherein the second device is a second appliance.

50. The system of claim 2, wherein the first device is a first fixture, and wherein the second device is a second fixture.

51. The system of claim 2, wherein the first device is a first control device, and wherein the second device is a second control device.

52. The system of claim 2, wherein the first device is a first smartphone, and wherein the second device is a second smartphone.

53. The system of claim 2, wherein the first device is a first computing-enabled machine, and wherein the second device is a second computing-enabled machine.

54. The system of claim 2, wherein at least a portion of the knowledgebase is stored in or on at least one of: at least one non-transitory machine readable medium of the one or more non-transitory machine readable media, another one or more non-transitory machine readable media, one or more volatile memories, one or more non-volatile memories, one or more storage devices, or one or more storage systems, and wherein the system further comprises:
one or more processors, wherein the machine readable code is executed by the one or more processors, and wherein the one or more processors cause the receiving or the generating the one or more digital pictures, the receiving or the generating the one or more instruction sets for operating the first device, the learning, the receiving or the generating the new one or more digital pictures, the determining, and the causing the first device or the second device to perform the one or more operations.

55. The system of claim 2, wherein the one or more digital pictures are received from a picture capturing apparatus included in the first device, and wherein the new one or more digital pictures are received from: the picture capturing apparatus included in the first device, or a picture capturing apparatus included in the second device.

56. The system of claim 2, wherein the one or more instruction sets for operating the first device are received from or generated by an application for operating the first device.

57. The system of claim 2, wherein the one or more instruction sets for operating the first device are received from or generated by one or more microcontrollers for operating the first device.

58. The system of claim 2, wherein the one or more instruction sets for operating the first device are received from one or more actuators of the first device.

59. The system of claim 2, wherein the one or more instruction sets for operating the first device temporally correspond to the one or more digital pictures.

60. The system of claim 2, wherein the causing the first device or the second device to perform the one or more operations defined by the one or more instruction sets for operating the first device includes executing the one or more instruction sets for operating the first device.

61. The system of claim 2, wherein the one or more digital pictures are: one or more whole digital pictures, one or more representations of one or more whole digital pictures, one or more portions of at least one digital picture, one or more representations of one or more portions of at least one digital picture, one or more features, one or more representations of one or more features, one or more collections of pixels, or one or more collections of values, and wherein the new one or more digital pictures are: one or more whole digital pictures, one or more representations of one or more whole digital pictures, one or more portions of at least one digital picture, one or more representations of one or more portions of at least one digital picture, one or more features, one or more representations of one or more features, one or more collections of pixels, or one or more collections of values.

62. The system of claim 2, wherein the at least the portion of the first device's surrounding includes a representation of the at least the portion of the first device's surrounding.

63. The system of claim 2, wherein the one or more digital pictures are generated, and wherein the generating the one or more digital pictures includes:
detecting one or more objects in the first device's surrounding; and
generating the one or more digital pictures to depict one or more representations of the detected one or more objects.

64. The system of claim 63, wherein the one or more objects in the first device's surrounding include one or more objects whose locations are within a threshold distance from the first device.

65. The system of claim 2, wherein the one or more inputs include: one input for one digital picture, multiple inputs for multiple digital pictures, one input for one portion of one digital picture, multiple inputs for multiple portions of one digital picture, multiple inputs for multiple portions of multiple digital pictures, one input for one representation of one digital picture, multiple inputs for multiple representations of multiple digital pictures, one input for one representation of one portion of one digital picture, multiple inputs for multiple representations of multiple portions of one digital picture, or multiple inputs for multiple representations of multiple portions of multiple digital pictures.

66. A method comprising:
accessing a knowledgebase that includes one or more inputs for inputting at least a portion of one or more digital pictures, wherein the one or more inputs are correlated with one or more instruction sets for operating a first device;
receiving or generating one or more digital pictures that depict at least a portion of a second device's surrounding;
determining the one or more instruction sets for operating the first device at least by: inputting at least a portion of the received or the generated one or more digital pictures into the one or more inputs, and using a correlation between the one or more inputs and the one or more instruction sets for operating the first device; and
performing, by the second device, one or more operations defined by the one or more instruction sets for operating the first device, wherein the performing is performed at least in response to the determining.

67. The method of claim 66, wherein the first device is a first vehicle, and wherein the second device is a second vehicle.

68. The method of claim 67, wherein at least a portion of the one or more instruction sets for operating the first device is learned in a learning process.

69. The method of claim 67, wherein at least an information related to the one or more instruction sets for operating the first device is learned in a learning process, and wherein the information includes a weight.

70. The method of claim 67, wherein the correlation between the one or more inputs and the one or more instruction sets for operating the first device is learned in a learning process.

71. The method of claim 67, wherein an information related to the correlation between the one or more inputs and the one or more instruction sets for operating the first device is learned in a learning process, and wherein the information includes a weight.

72. The method of claim 67, wherein at least a portion of the knowledgebase is learned in a learning process that includes operating the first device at least partially by a user.

73. The method of claim 67, wherein the one or more instruction sets for operating the first device are applied to the second device.

74. The method of claim 67, wherein the one or more inputs are further correlated with another one or more instruction sets for operating the first device, and wherein at least a portion of the one or more instruction sets for operating the first device or at least an information related to the one or more instruction sets for operating the first device is learned in a learning process that includes operating the first device at least partially by a user, and wherein at least a portion of the another one or more instruction sets for operating the first device or at least an information related to the another one or more instruction sets for operating the first device is learned in another learning process that includes operating the first device at least partially by the user.

75. The method of claim 67, wherein the one or more inputs are further correlated with another one or more instruction sets for operating the first device, and wherein at least a portion of the one or more instruction sets for operating the first device or at least an information related to the one or more instruction sets for operating the first device is learned in a learning process that includes operating the first device at least partially by a user, and wherein at least a portion of the another one or more instruction sets for operating the first device or at least an information related to the another one or more instruction sets for operating the first device is learned in another learning process that includes operating the first device at least partially by another user.

76. The method of claim 67, wherein the one or more inputs are further correlated with another one or more instruction sets for operating a third device, and wherein at least a portion of the one or more instruction sets for operating the first device or at least an information related to the one or more instruction sets for operating the first device is learned in a learning process that includes operating the first device at least partially by a user, and wherein at least a portion of the another one or more instruction sets for operating the third device or at least an information related to the another one or more instruction sets for operating the third device is learned in another learning process that includes operating the third device at least partially by the user.

77. The method of claim 67, wherein the one or more inputs are further correlated with another one or more instruction sets for operating a third device, and wherein at least a portion of the one or more instruction sets for operating the first device or at least an information related to the one or more instruction sets for operating the first device is learned in a learning process that includes operating the first device at least partially by a user, and wherein at least a portion of the another one or more instruction sets for operating the third device or at least an information related to the another one or more instruction sets for operating the third device is learned in another learning process that includes operating the third device at least partially by another user.

78. The method of claim 67, wherein the one or more inputs are further correlated with another one or more instruction sets for operating a third device.

79. The method of claim 67, wherein the one or more inputs are further correlated with another one or more instruction sets for operating a third device, and wherein the method further comprising:
- receiving or generating another one or more digital pictures that depict at least a portion of a fourth device's surrounding;
- determining the another one or more instruction sets for operating the third device at least by: inputting at least a portion of the received or the generated another one or more digital pictures into the one or more inputs, and using a correlation between the one or more inputs and the another one or more instruction sets for operating the third device; and
- performing, by the fourth device, one or more operations defined by the one or more instruction sets for operating the third device, wherein the performing, by the fourth device, the one or more operations defined by the one or more instruction sets for operating the third device is performed at least in response to the determining the another one or more instruction sets for operating the third device.

80. The method of claim 67, wherein the method further comprising:
- modifying: the one or more instruction sets for operating the first device, or a copy of the one or more instruction sets for operating the first device,
- wherein the determining the one or more instruction sets for operating the first device at least by: the inputting the at least the portion of the received or the generated one or more digital pictures into the one or more inputs, and using the correlation between the one or more inputs and the one or more instruction sets for operating the first device includes:
  - determining the modified the one or more instruction sets for operating the first device at least by: the inputting the at least the portion of the received or the generated one or more digital pictures into the one or more inputs, and using the correlation between the one or more inputs and the modified the one or more instruction sets for operating the first device, or
  - determining the modified the copy of the one or more instruction sets for operating the first device at least by: the inputting the at least the portion of the received or the generated one or more digital pictures into the one or more inputs, and using a correlation between the one or more inputs and the modified the copy of the one or more instruction sets for operating the first device, and
- wherein the performing, by the second device, the one or more operations defined by the one or more instruction sets for operating the first device includes: performing, by the second device, one or more operations defined by the modified the one or more instruction sets for operating the first device, or performing, by the second device, one or more operations defined by the modified the copy of the one or more instruction sets for operating the first device.

81. The method of claim 67, wherein the method further comprising:
- modifying: the one or more instruction sets for operating the first device, or a copy of the one or more instruction sets for operating the first device, wherein the performing, by the second device, the one or more operations defined by the one or more instruction sets for operating the first device includes: performing, by the second device, one or more operations defined by the modified the one or more instruction sets for operating the first device, or performing, by the second device, one or more operations defined by the modified the copy of the one or more instruction sets for operating the first device.

82. The method of claim 67, wherein the method further comprising:
modifying: the received or the generated one or more digital pictures, or a copy of the received or the generated one or more digital pictures, and
wherein the inputting the at least the portion of the received or the generated one or more digital pictures into the one or more inputs includes: inputting at least a portion of the modified the received or the generated one or more digital pictures into the one or more inputs, or inputting at least a portion of the modified the copy of the received or the generated one or more digital pictures into the one or more inputs.

83. The method of claim 67, wherein the one or more instruction sets for operating the first device are received by a server from the first device, and wherein the one or more instruction sets for operating the first device are received by the second device from the server.

84. The method of claim 67, wherein the one or more instruction sets for operating the first device are included in the knowledgebase, and wherein at least a portion of the knowledgebase is received by a server from the first device, and wherein the at least the portion of the knowledgebase is received by the second device from the server.

85. The method of claim 67, wherein the knowledgebase is a neural network.

86. The method of claim 67, wherein the knowledgebase includes an artificial intelligence system.

87. The method of claim 67, wherein the one or more inputs are correlated with the one or more instruction sets for operating the first device using the correlation between the one or more inputs and the one or more instruction sets for operating the first device.

88. The method of claim 67, wherein the one or more inputs are correlated with the one or more instruction sets for operating the first device using at least one or more connections between the one or more inputs and the one or more instruction sets for operating the first device, and wherein the using the correlation between the one or more inputs and the one or more instruction sets for operating the first device includes using at least one connection of the one or more connections.

89. The method of claim 67, wherein the one or more inputs are one or more input nodes, and wherein the knowledgebase further includes one or more output nodes that include the one or more instruction sets for operating the first device, and wherein the one or more input nodes are correlated with the one or more output nodes using at least one or more connections.

90. The method of claim 67, wherein the knowledgebase further includes one or more outputs that include the one or more instruction sets for operating the first device, and wherein the correlation between the one or more inputs and the one or more instruction sets for operating the first device or an information related to the correlation between the one or more inputs and the one or more instruction sets for operating the first device is learned in a learning process that includes:
receiving or generating another one or more digital pictures that depict at least a portion of the first device's surrounding;
receiving or generating the one or more instruction sets for operating the first device;
inputting at least a portion of the generated or the received another one or more digital pictures into the one or more inputs; and
applying the one or more instruction sets for operating the first device to the one or more outputs.

91. The method of claim 90, wherein the information related to the one or more instruction sets for operating the first device includes one or more weights, and wherein the learning process further includes:
adjusting the one or more weights.

92. The method of claim 90, wherein the learning process further includes:
back-propagating information from the one or more outputs to the one or more inputs.

93. The method of claim 90, wherein the applying the one or more instruction sets for operating the first device to the one or more outputs includes adding the one or more instruction sets for operating the first device to the one or more outputs.

94. The method of claim 90, wherein the applying the one or more instruction sets for operating the first device to the one or more outputs includes comparing the one or more instruction sets for operating the first device with one or more instruction sets included in the one or more outputs.

95. The method of claim 67, wherein the knowledgebase further includes one or more outputs that include the one or more instruction sets for operating the first device, and wherein the determining the one or more instruction sets for operating the first device is further performed at least by:
receiving the one or more instruction sets for operating the first device from the one or more outputs.

96. The method of claim 67, wherein the received or the generated one or more digital pictures further depict at least a portion of the second device.

97. The method of claim 67, wherein the one or more instruction sets for operating the first device include one or more information about one or more states of: the first device, or a portion of the first device.

98. The method of claim 67, wherein the one or more instruction sets for operating the first device include one or more representations of another one or more instruction sets for operating the first device.

99. The method of claim 67, wherein the one or more instruction sets for operating the first device are further for operating at least a third device.

100. The method of claim 67, wherein the received or the generated one or more digital pictures depict: the at least the portion of the second device's surrounding at a time, or a representation of the at least the portion of the second device's surrounding at a time.

101. The method of claim 67, wherein the received or the generated one or more digital pictures depict: the at least the portion of the second device's surrounding during a time period, or a representation of the at least the portion of the second device's surrounding during a time period.

102. The method of claim 67, wherein the inputting the at least the portion of the received or the generated one or more digital pictures into the one or more inputs includes inputting at least an object detected in the received or the generated one or more digital pictures into the one or more inputs.

103. The method of claim 67, the performing, by the second device, the one or more operations defined by the one or more instruction sets for operating the first device is performed autonomously.

104. The method of claim 67, wherein the first device is a simulated device in a simulation application, and wherein the one or more instruction sets for operating the first device are received from or generated by the simulation application.

105. The method of claim 67, wherein the received or the generated one or more digital pictures include: one or more still digital pictures, or one or more motion digital pictures, and wherein an instruction set of the one or more instruction sets for operating the first device includes at least one of: only one instruction, multiple instructions, one or more commands, one or more keywords, one or more symbols, one or more operators, one or more variables, one or more parameters, one or more characters, one or more numbers, one or more values, one or more signals, one or more binary bits, one or more functions, one or more function references, one or more objects, one or more object references, one or more data structures, one or more data structure references, one or more states, one or more representations of one or more states, one or more inputs, one or more representations of one or more inputs, one or more codes, one or more data, or one or more information.

106. The method of claim 67, wherein at least a portion of the knowledgebase is stored in or on at least one of: one or more non-transitory machine readable media, one or more volatile memories, one or more non-volatile memories, one or more storage devices, or one or more storage systems, and wherein at least a portion of the method is implemented using one or more processors.

107. The method of claim 67, wherein the received or the generated one or more digital pictures are received from a picture capturing apparatus.

108. The method of claim 67, wherein the one or more instruction sets for operating the first device are received from or generated by an application for operating the first device.

109. The method of claim 67, wherein the one or more instruction sets for operating the first device are received from or generated by one or more microcontrollers for operating the first device.

110. The method of claim 67, wherein the one or more instruction sets for operating the first device are received from one or more actuators of the first device.

111. The method of claim 67, wherein the method further comprising:
executing the one or more instruction sets for operating the first device.

112. The method of claim 67, wherein the received or the generated one or more digital pictures are: one or more whole digital pictures, one or more representations of one or more whole digital pictures, one or more portions of at least one digital picture, one or more representations of one or more portions of at least one digital picture, one or more features, one or more representations of one or more features, one or more collections of pixels, or one or more collections of values.

113. The method of claim 67, wherein the at least the portion of the second device's surrounding includes a representation of the at least the portion of the second device's surrounding.

114. The method of claim 67, wherein the received or the generated one or more digital pictures are generated, and wherein the generating the one or more digital pictures includes:
detecting one or more objects in the second device's surrounding; and
generating the one or more digital pictures to depict one or more representations of the detected one or more objects.

115. The method of claim 114, wherein the one or more objects in the second device's surrounding include one or more objects whose locations are within a threshold distance from the second device.

116. The method of claim 67, wherein the one or more inputs include: one input for one digital picture, multiple inputs for multiple digital pictures, one input for one portion of one digital picture, multiple inputs for multiple portions of one digital picture, multiple inputs for multiple portions of multiple digital pictures, one input for one representation of one digital picture, multiple inputs for multiple representations of multiple digital pictures, one input for one representation of one portion of one digital picture, multiple inputs for multiple representations of multiple portions of one digital picture, or multiple inputs for multiple representations of multiple portions of multiple digital pictures.

117. A first device comprising:
a knowledgebase that includes one or more inputs for inputting at least a portion of one or more digital pictures, wherein the one or more inputs are correlated with one or more instruction sets for operating a second device;
one or more processors; and
one or more non-transitory machine readable media storing machine readable code that, when executed by the one or more processors, causes the one or more processors to perform at least:
receiving or generating one or more digital pictures that depict at least a portion of the first device's surrounding;
determining the one or more instruction sets for operating the second device at least by: inputting at least a portion of the received or the generated one or more digital pictures into the one or more inputs, and using a correlation between the one or more inputs and the one or more instruction sets for operating the second device; and
at least in response to the determining, causing the first device to perform one or more operations defined by the one or more instruction sets for operating the second device.

118. The first device of claim 117, wherein the first device is a first vehicle, and wherein the second device is a second vehicle.

119. The first device of claim 118, wherein at least a portion of the one or more instruction sets for operating the second device is learned in a learning process.

120. The first device of claim 118, wherein at least an information related to the one or more instruction sets for operating the second device is learned in a learning process, and wherein the information includes a weight.

121. The first device of claim 118, wherein the correlation between the one or more inputs and the one or more instruction sets for operating the second device is learned in a learning process.

122. The first device of claim 118, wherein an information related to the correlation between the one or more inputs and the one or more instruction sets for operating the second device is learned in a learning process, and wherein the information includes a weight.

123. The first device of claim 118, wherein at least a portion of the knowledgebase is learned in a learning process that includes operating the second device at least partially by a user.

124. The first device of claim 118, wherein the one or more instruction sets for operating the second device are applied to the first device.

125. The first device of claim 118, wherein the one or more inputs are further correlated with another one or more instruction sets for operating the second device, and wherein at least a portion of the one or more instruction sets for operating the second device or at least an information related to the one or more instruction sets for operating the second device is learned in a learning process that includes operating the second device at least partially by a user, and wherein at least a portion of the another one or more instruction sets for operating the second device or at least an information related to the another one or more instruction sets for operating the second device is learned in another learning process that includes operating the second device at least partially by the user.

126. The first device of claim 118, wherein the one or more inputs are further correlated with another one or more instruction sets for operating the second device, and wherein at least a portion of the one or more instruction sets for operating the second device or at least an information related to the one or more instruction sets for operating the second device is learned in a learning process that includes operating the second device at least partially by a user, and wherein at least a portion of the another one or more instruction sets for operating the second device or at least an information related to the another one or more instruction sets for operating the second device is learned in another learning process that includes operating the second device at least partially by another user.

127. The first device of claim 118, wherein the one or more inputs are further correlated with another one or more instruction sets for operating a third device, and wherein at least a portion of the one or more instruction sets for operating the second device or at least an information related to the one or more instruction sets for operating the second device is learned in a learning process that includes operating the second device at least partially by a user, and wherein at least a portion of the another one or more instruction sets for operating the third device or at least an information related to the another one or more instruction sets for operating the third device is learned in another learning process that includes operating the third device at least partially by the user.

128. The first device of claim 118, wherein the one or more inputs are further correlated with another one or more instruction sets for operating a third device, and wherein at least a portion of the one or more instruction sets for operating the second device or at least an information related to the one or more instruction sets for operating the second device is learned in a learning process that includes operating the second device at least partially by a user, and wherein at least a portion of the another one or more instruction sets for operating the third device or at least an information related to the another one or more instruction sets for operating the third device is learned in another learning process that includes operating the third device at least partially by another user.

129. The first device of claim 118, wherein the one or more inputs are further correlated with another one or more instruction sets for operating a third device.

130. The first device of claim 118, wherein the machine readable code, when executed by the one or more processors, causes the one or more processors to further perform at least:
modifying: the one or more instruction sets for operating the second device, or a copy of the one or more instruction sets for operating the second device,
wherein the determining the one or more instruction sets for operating the second device at least by: the inputting the at least the portion of the received or the generated one or more digital pictures into the one or more inputs, and using the correlation between the one or more inputs and the one or more instruction sets for operating the second device includes:
determining the modified the one or more instruction sets for operating the second device at least by: the inputting the at least the portion of the received or the generated one or more digital pictures into the one or more inputs, and using the correlation between the one or more inputs and the modified the one or more instruction sets for operating the second device, or
determining the modified the copy of the one or more instruction sets for operating the second device at least by: the inputting the at least the portion of the received or the generated one or more digital pictures into the one or more inputs, and using a correlation between the one or more inputs and the modified the copy of the one or more instruction sets for operating the second device, and
wherein the causing the first device to perform the one or more operations defined by the one or more instruction sets for operating the second device includes: causing the first device to perform one or more operations defined by the modified the one or more instruction sets for operating the second device, or causing the first device to perform one or more operations defined by the modified the copy of the one or more instruction sets for operating the second device.

131. The first device of claim 118, wherein the machine readable code, when executed by the one or more processors, causes the one or more processors to further perform at least:
modifying: the one or more instruction sets for operating the second device, or a copy of the one or more instruction sets for operating the second device,
wherein the causing the first device to perform the one or more operations defined by the one or more instruction sets for operating the second device includes: causing the first device to perform one or more operations defined by the modified the one or more instruction sets for operating the second device, or causing the first device to perform one or more operations defined by the modified the copy of the one or more instruction sets for operating the second device.

132. The first device of claim 118, wherein the machine readable code, when executed by the one or more processors, causes the one or more processors to further perform at least:
modifying: the received or the generated one or more digital pictures, or a copy of the received or the generated one or more digital pictures, and
wherein the inputting the at least the portion of the received or the generated one or more digital pictures into the one or more inputs includes: inputting at least a portion of the modified the received or the generated one or more digital pictures into the one or more inputs, or inputting at least a portion of the modified the copy of the received or the generated one or more digital pictures into the one or more inputs.

133. The first device of claim 118, wherein the one or more instruction sets for operating the second device are received by the first device from a server, and wherein the one or more instruction sets for operating the second device are received by the server from the second device.

134. The first device of claim 118, wherein the one or more instruction sets for operating the second device are included in the knowledgebase, and wherein at least a portion of the knowledgebase is received by the first device from a server, and wherein the at least the portion of the knowledgebase is received by the server from the second device.

135. The first device of claim 118, wherein the knowledgebase is a neural network.

136. The first device of claim 118, wherein the knowledgebase includes an artificial intelligence system.

137. The first device of claim 118, wherein the one or more inputs are correlated with the one or more instruction sets for operating the second device using the correlation between the one or more inputs and the one or more instruction sets for operating the second device.

138. The first device of claim 118, wherein the one or more inputs are correlated with the one or more instruction sets for operating the second device using at least one or more connections between the one or more inputs and the one or more instruction sets for operating the second device, and wherein the using the correlation between the one or more inputs and the one or more instruction sets for operating the second device includes using at least one connection of the one or more connections.

139. The first device of claim 118, wherein the one or more inputs are one or more input nodes, and wherein the knowledgebase further includes one or more output nodes that include the one or more instruction sets for operating the second device, and wherein the one or more input nodes are correlated with the one or more output nodes using at least one or more connections.

140. The first device of claim 118, wherein the knowledgebase further includes one or more outputs that include the one or more instruction sets for operating the second device, and wherein at least a portion of the one or more instruction sets for operating the second device or at least an information related to the one or more instruction sets for operating the second device is learned in a learning process that includes:
receiving or generating another one or more digital pictures;
receiving or generating the one or more instruction sets for operating the second device;
inputting at least a portion of the another one or more digital pictures into the one or more inputs; and
applying the one or more instruction sets for operating the second device to the one or more outputs.

141. The first device of claim 140, wherein the information related to the one or more instruction sets for operating the second device includes one or more weights, and wherein the learning process further includes:
adjusting the one or more weights.

142. The first device of claim 140, wherein the learning process further includes:
back-propagating an information from the one or more outputs to the one or more inputs.

143. The first device of claim 140, wherein the applying the one or more instruction sets for operating the second device to the one or more outputs includes adding the one or more instruction sets for operating the second device to the one or more outputs.

144. The first device of claim 140, wherein the applying the one or more instruction sets for operating the second device to the one or more outputs includes comparing the one or more instruction sets for operating the second device with one or more instruction sets included in the one or more outputs.

145. The first device of claim 118, wherein the knowledgebase further includes one or more outputs that include the one or more instruction sets for operating the second device, and wherein the determining the one or more instruction sets for operating the second device is further performed at least by:
receiving the one or more instruction sets for operating the second device from the one or more outputs.

146. The first device of claim 118, wherein the received or the generated one or more digital pictures further depict at least a portion of the first device.

147. The first device of claim 118, wherein the one or more instruction sets for operating the second device include one or more information about one or more states of: the second device, or a portion of the second device.

148. The first device of claim 118, wherein the one or more instruction sets for operating the second device include one or more representations of another one or more instruction sets for operating the second device.

149. The first device of claim 118, wherein the one or more instruction sets for operating the second device are further for operating at least a third device.

150. The first device of claim 118, wherein the received or the generated one or more digital pictures depict: the at least the portion of the first device's surrounding at a time, or a representation of the at least the portion of the first device's surrounding at a time.

151. The first device of claim 118, wherein the received or the generated one or more digital pictures depict: the at least the portion of the first device's surrounding during a time period, or a representation of the at least the portion of the first device's surrounding during a time period.

152. The first device of claim 118, wherein the inputting the at least the portion of the received or the generated one or more digital pictures into the one or more inputs includes inputting at least an object detected in the received or the generated one or more digital pictures into one or more inputs.

153. The first device of claim 118, wherein the causing the first device to perform the one or more operations defined by the one or more instruction sets for operating the second device includes causing the first device to autonomously perform the one or more operations defined by the one or more instruction sets for operating the second device.

154. The first device of claim 118, wherein the second device is a simulated device in a simulation application, and wherein the one or more instruction sets for operating the second device are received from or generated by the simulation application.

155. The first device of claim 118, wherein at least a portion of the one or more instruction sets for operating the second device or at least an information related to the one or more instruction sets for operating the second device is learned on the second device.

156. The first device of claim 118, wherein the one or more processors include: one or more computing devices, one or more electronic devices, or one or more microcontrollers, and wherein the received or the generated one or more digital pictures include: one or more still digital pictures, or one or more motion digital pictures, and wherein an instruction set of the one or more instruction sets for operating the second device includes at least one of: only one instruction, multiple instructions, one or more commands, one or more keywords, one or more symbols, one or more operators, one or more variables, one or more parameters, one or more characters, one or more numbers, one or more values, one or more signals, one or more binary bits, one or more functions, one or more function references, one or more objects, one or more object references, one or more data structures, one or more data structure references, one or more states, one or more representations of one or more states, one or more inputs, one or more representations of one or more inputs, one or more codes, one or more data, or one or more information.

157. The first device of claim 118, wherein at least a portion of the knowledgebase is stored in or on at least one of: at least one non-transitory machine readable medium of the one or more non-transitory machine readable media, another one or more non-transitory machine readable media, one or more volatile memories, one or more non-volatile memories, one or more storage devices, or one or more storage systems.

158. The first device of claim 118, wherein the received or the generated one or more digital pictures are received from a picture capturing apparatus.

159. The first device of claim 118, wherein the one or more instruction sets for operating the second device are received from or generated by an application for operating the second device.

160. The first device of claim 118, wherein the one or more instruction sets for operating the second device are received from or generated by one or more microcontrollers for operating the second device.

161. The first device of claim 118, wherein the one or more instruction sets for operating the second device are received from one or more actuators of the second device.

162. The first device of claim 118, wherein the causing the first device to perform the one or more operations defined by the one or more instruction sets for operating the second device includes executing the one or more instruction sets for operating the second device.

163. The first device of claim 118, wherein the received or the generated one or more digital pictures are: one or more whole digital pictures, one or more representations of one or more whole digital pictures, one or more portions of at least one digital picture, one or more representations of one or more portions of at least one digital picture, one or more features, one or more representations of one or more features, one or more collections of pixels, or one or more collections of values.

164. The first device of claim 118, wherein the at least the portion of the first device's surrounding includes a representation of the at least the portion of the first device's surrounding.

165. The first device of claim 118, wherein the received or the generated one or more digital pictures are generated, and wherein the generating the one or more digital pictures includes:
 detecting one or more objects in the first device's surrounding; and
 generating the one or more digital pictures to depict one or more representations of the detected one or more objects.

166. The first device of claim 165, wherein the one or more objects in the first device's surrounding include one or more objects whose locations are within a threshold distance from the first device.

167. The first device of claim 118, wherein the one or more inputs include: one input for one digital picture, multiple inputs for multiple digital pictures, one input for one portion of one digital picture, multiple inputs for multiple portions of one digital picture, multiple inputs for multiple portions of multiple digital pictures, one input for one representation of one digital picture, multiple inputs for multiple representations of multiple digital pictures, one input for one representation of one portion of one digital picture, multiple inputs for multiple representations of multiple portions of one digital picture, or multiple inputs for multiple representations of multiple portions of multiple digital pictures.

168. A system comprising:
 means for accessing a knowledgebase that includes one or more inputs for inputting at least a portion of one or more digital pictures, wherein the one or more inputs are correlated with one or more instruction sets for operating a first device;
 means for receiving or generating one or more digital pictures;
 means for determining the one or more instruction sets for operating the first device at least by: inputting at least a portion of the received or the generated one or more digital pictures into the one or more inputs, and using a correlation between the one or more inputs and the one or more instruction sets for operating the first device; and
 means for causing, at least in response to the determining, the first device or the second device to perform one or more operations defined by the one or more instruction sets for operating the first device.

169. The system of claim 168, wherein the means for accessing includes one or more processors, the means for receiving or the generating includes one or more processors, the means for determining includes one or more processors, and the means for causing includes one or more processors.

* * * * *